(12) United States Patent
Nakayama et al.

(10) Patent No.: US 6,434,263 B1
(45) Date of Patent: Aug. 13, 2002

(54) OPTICAL MEMBER INSPECTING APPARATUS AND METHOD OF INSPECTION THEREOF

(75) Inventors: Toshihiro Nakayama; Masato Hara; Masayuki Sugiura; Atsushi Kida, all of Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/579,804

(22) Filed: May 26, 2000

Related U.S. Application Data

(62) Division of application No. 08/658,549, filed on Jun. 5, 1996, now Pat. No. 6,148,097.

(30) Foreign Application Priority Data

| Jun. 7, 1995 | (JP) | 7-164825(P) |
| Jun. 7, 1995 | (JP) | 7-164826(P) |
| Jun. 7, 1995 | (JP) | 7-164827(P) |
| Jun. 15, 1995 | (JP) | 7-172911(P) |
| Jun. 19, 1995 | (JP) | 7-175518(P) |
| Jun. 19, 1995 | (JP) | 7-175519(P) |
| Jun. 28, 1995 | (JP) | 7-184795(P) |
| Jul. 3, 1995 | (JP) | 7-189844(P) |
| Jul. 3, 1995 | (JP) | 7-189853(P) |
| Jul. 24, 1995 | (JP) | 7-208398(P) |
| Jul. 24, 1995 | (JP) | 7-208399(P) |
| Jul. 24, 1995 | (JP) | 7-208400(P) |
| Aug. 7, 1995 | (JP) | 7-221120(P) |
| Apr. 1, 1996 | (JP) | 8-101834(P) |

(51) Int. Cl.$^7$ ............................................. G06K 9/00

(52) U.S. Cl. ..................... 382/141; 382/141; 382/144; 382/145

(58) Field of Search ..................... 382/141, 144, 382/145, 146–153; 356/354, 355, 432–433, 384, 390, 124–127, 399–401; 430/5, 311–313; 359/798–800; 250/236, 548, 223 B, 557, 234

(56) References Cited

U.S. PATENT DOCUMENTS

| 4,794,647 A | * 12/1988 | Forgues et al. | 382/141 |
| 4,959,537 A | * 9/1990 | Kimoto et al. | 250/223 B |
| 5,216,481 A | * 6/1993 | Minato | 356/240 |
| 5,336,976 A | * 8/1994 | Web | 315/134 |
| 5,500,732 A | * 3/1996 | Ebel et al. | 356/124 |
| 6,134,342 A | * 10/2000 | Doke et al. | 382/141 |

OTHER PUBLICATIONS

Japanese Unexamined Patent Publication No. 5-342356.
Japanese Unexamined Patent Publication No. 6-139341.
Japanese Unexamined Patent Publication No. 6-348824.
Japanese Unexamined Patent Publication No. 5-85168.

* cited by examiner

*Primary Examiner*—Phuoc Tran
*Assistant Examiner*—Duy M. Dang
(74) *Attorney, Agent, or Firm*—Pitney, Hardin, Kipp & Szuch LLP

(57) ABSTRACT

An optical member inspection apparatus includes an inspection optical system having a light source, and a diffusing means for diffusing the light emitted from the light source. The diffusing means has a central portion and a peripheral portion. The diffusion transmittance of the peripheral portion is higher than the diffusion transmittance of the central portion. The inspection optical system is also provided with an image pick-up means to pick-up an image of the optical member to be inspected, and is positioned so as, to receive that light emitted from the light source and transmitted through the diffusing means and the optical member. A judging means is also provided, for judging whether or not the optical member has a defect, in accordance with image signals output from the image pick-up means.

3 Claims, 75 Drawing Sheets

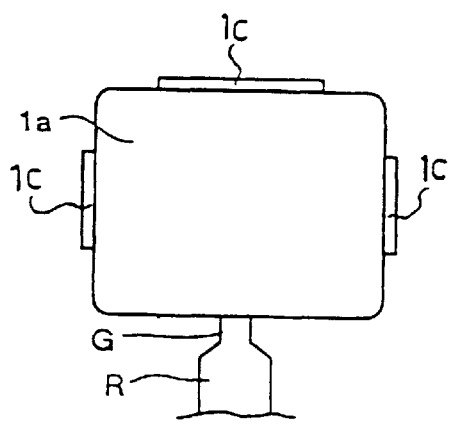
FIG. 2A1
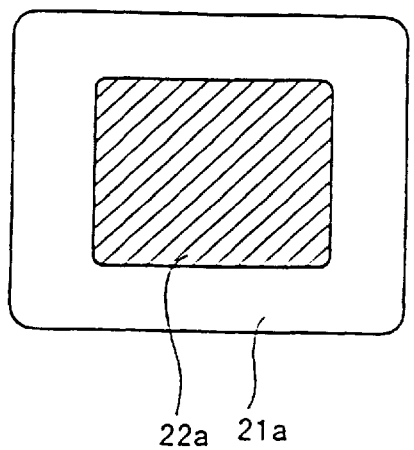
FIG. 2A2
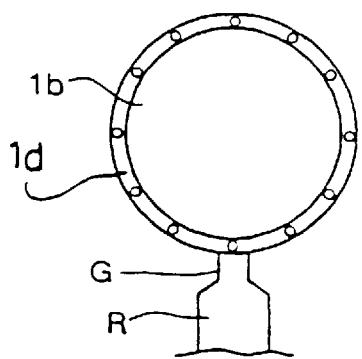
FIG. 2B1
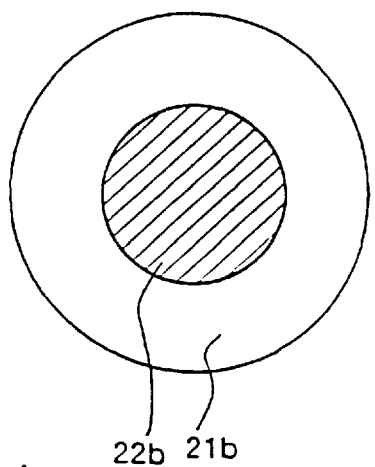
FIG. 2B2
FIG. 4
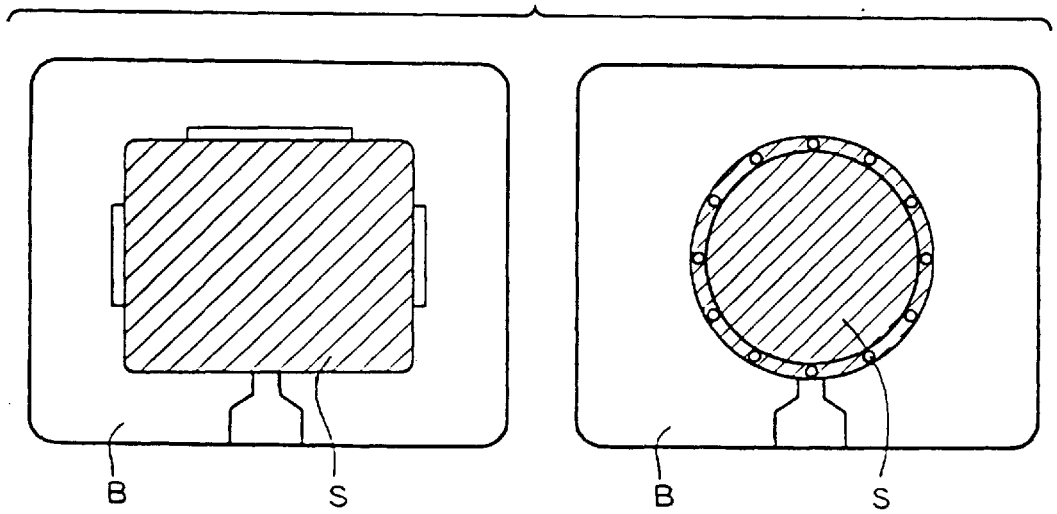

FIG. 3A
FIG. 3B
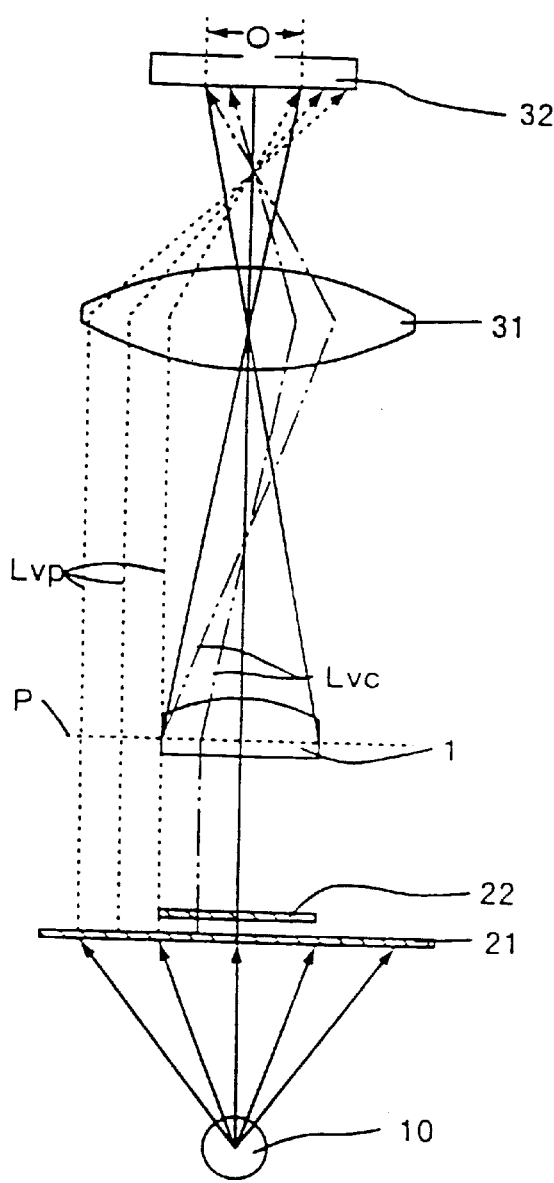
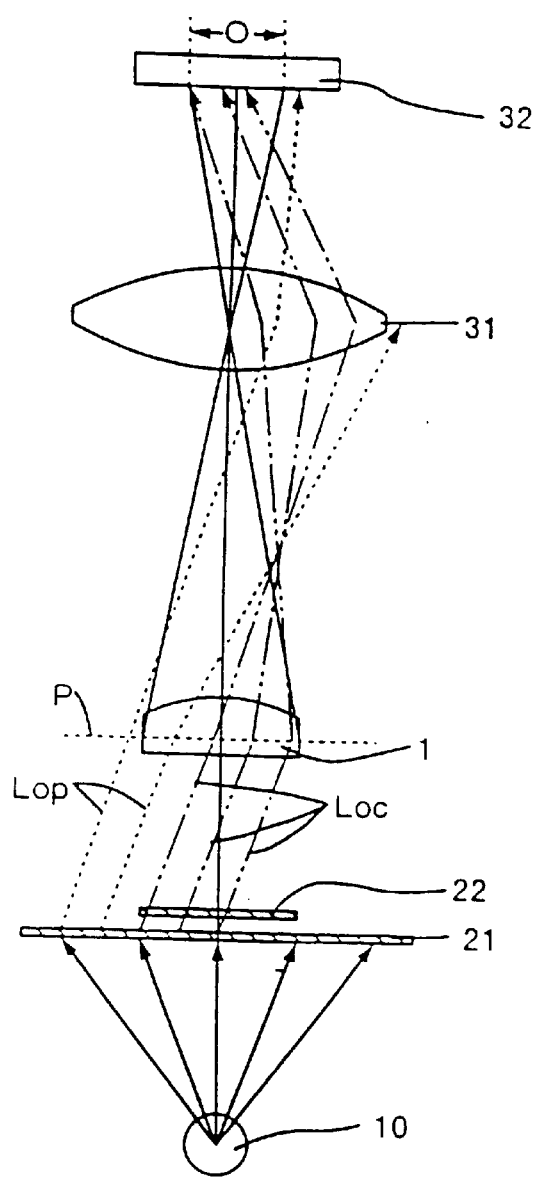

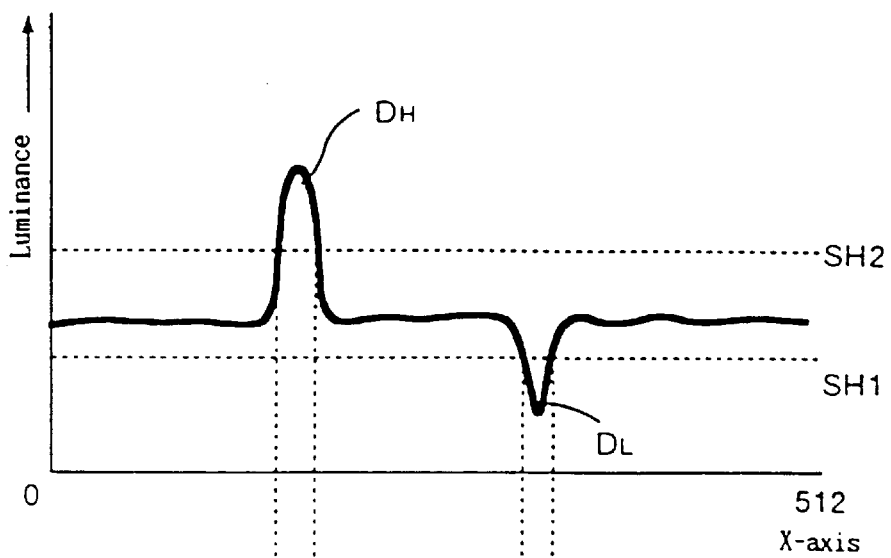
F I G. 7A
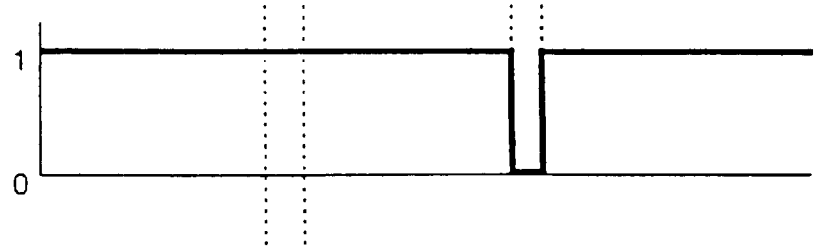
F I G. 7B
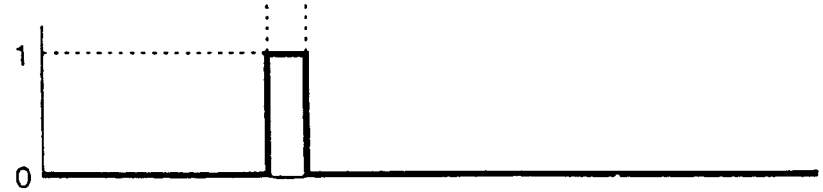
F I G. 7C

FIG. 8A
FIG. 8B
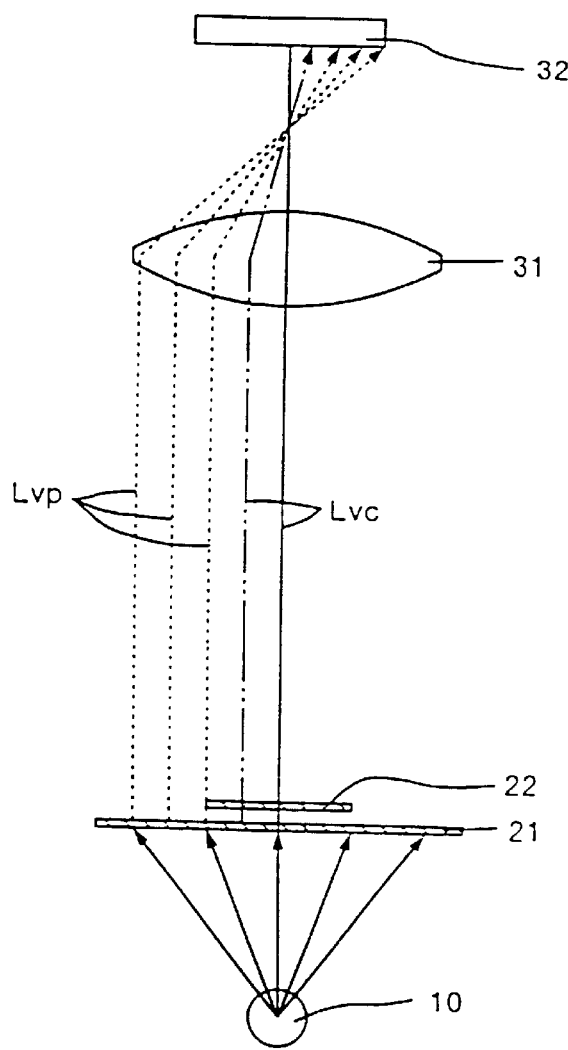
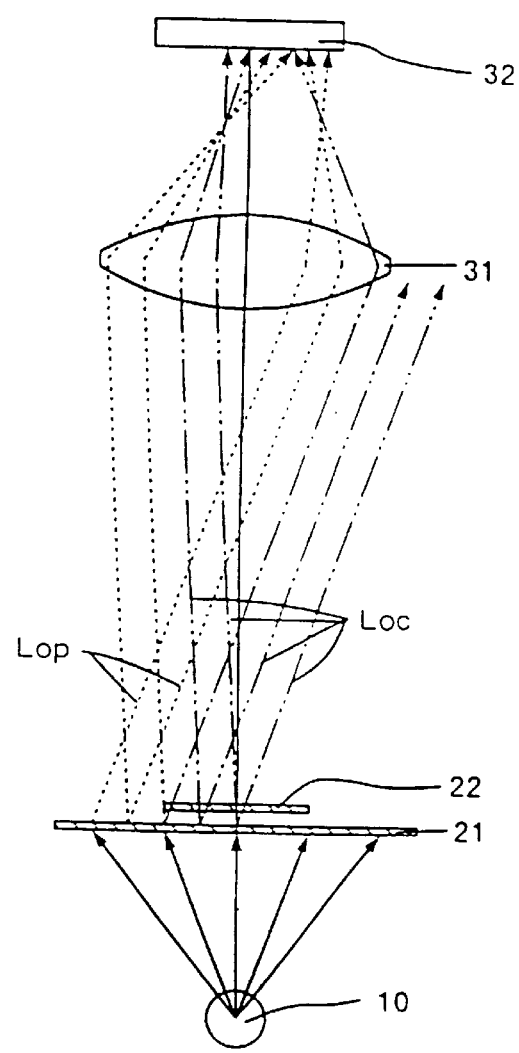

F I G. 14A    F I G. 14B    F I G. 14C
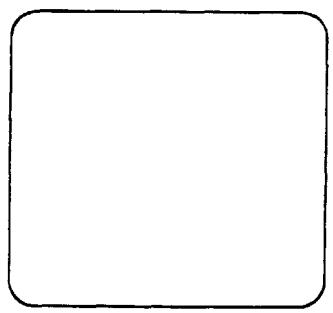
21
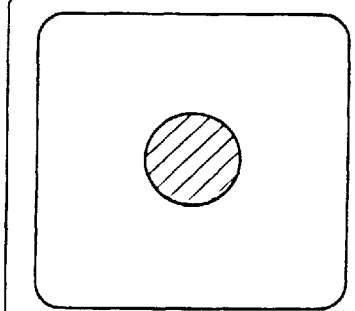
22
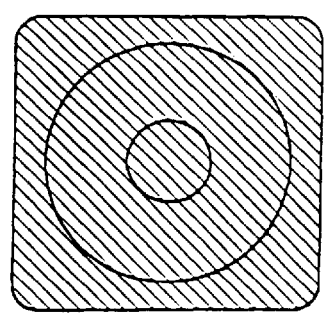
23
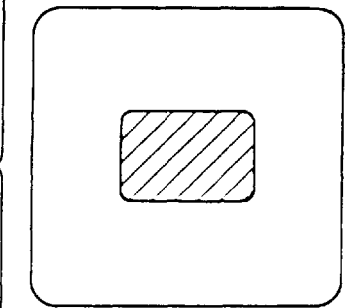
22
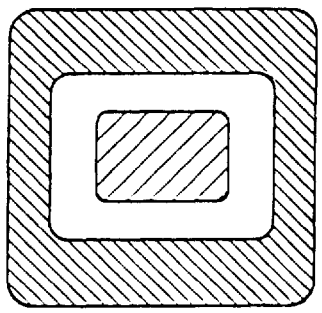
23
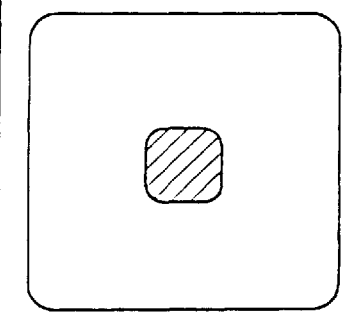
22
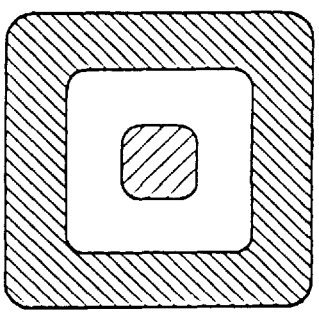
23

F I G. 18C
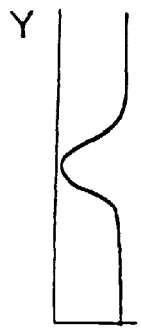
F I G. 18A
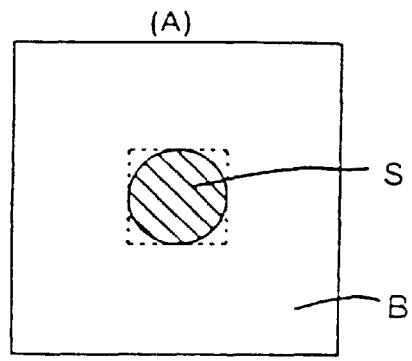
F I G. 18B
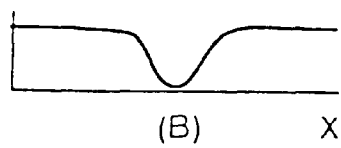
F I G. 19C
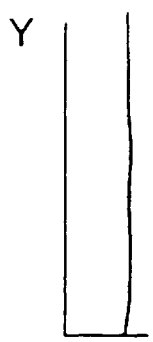
F I G. 19A
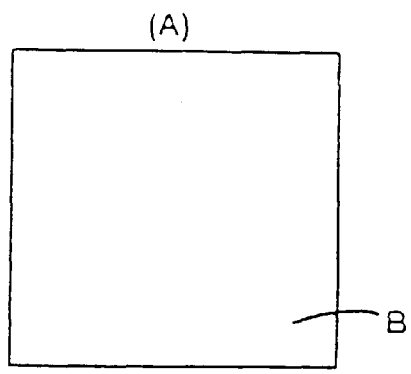
F I G. 19B
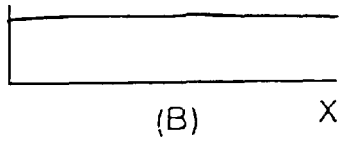

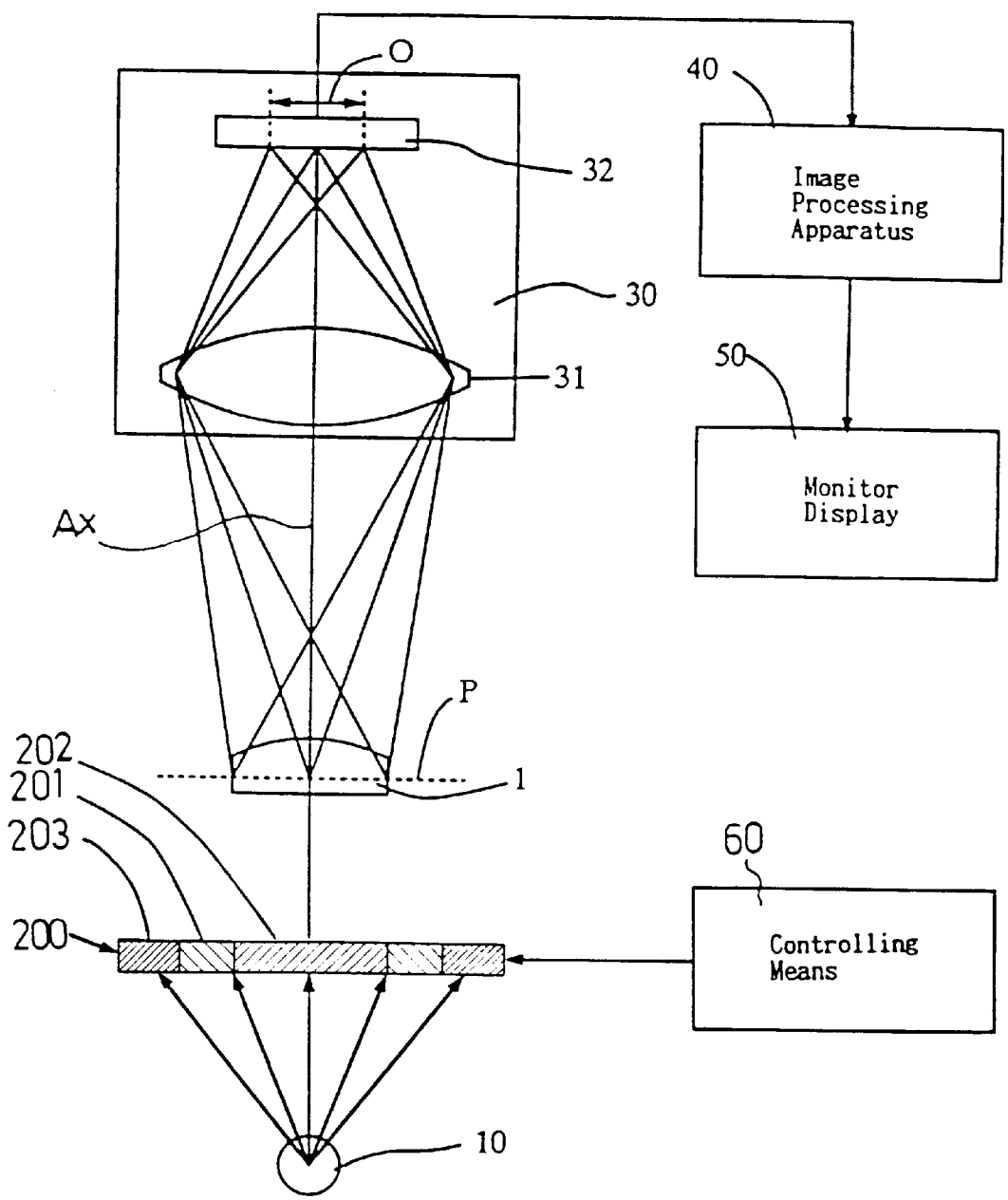

FIG. 27A1
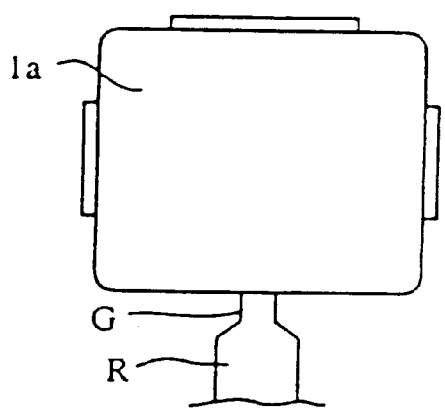
FIG. 27A2
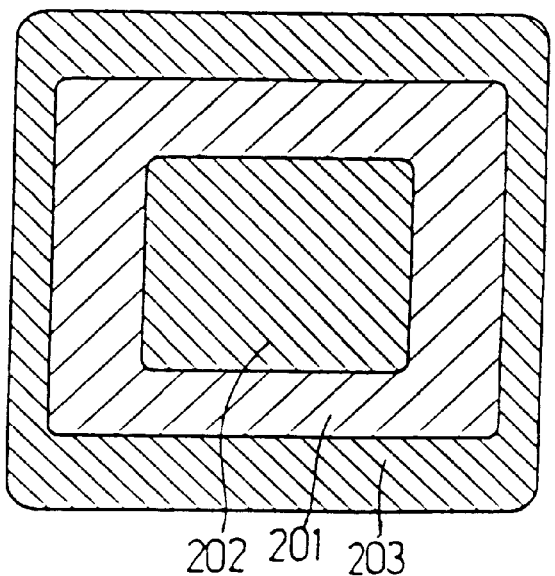
FIG. 27B1
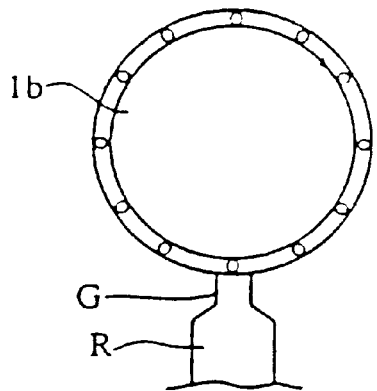
FIG. 27B2
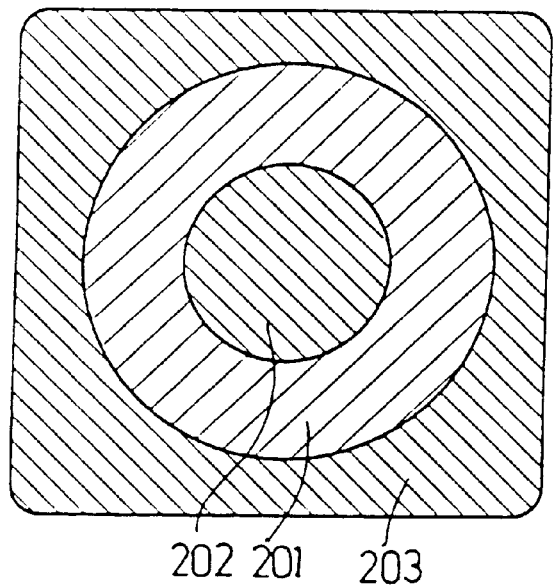

F I G. 74
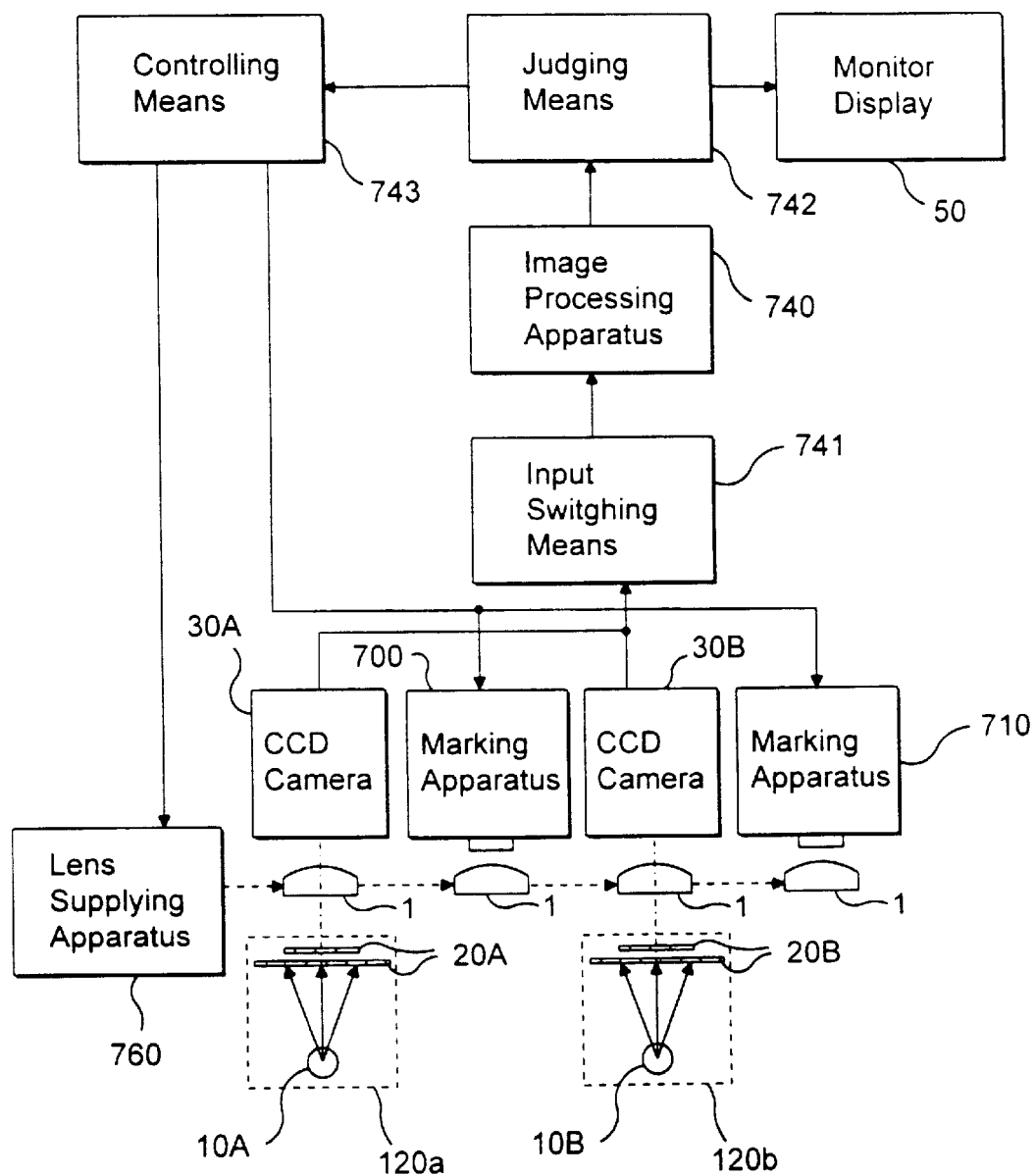

OPTICAL MEMBER INSPECTING APPARATUS AND METHOD OF INSPECTION THEREOF

This Application is a division of Ser. No. 08/658,549 filed Jun. 5, 1996, now U.S. Pat. No. 6,148,097.

BACKGROUND OF THE INVENTION

1. Field of the Invention

The present invention relates to an apparatus and method thereof for inspecting optical members, mostly optical members made of plastic, and more particularly relates to an apparatus and method for inspecting optical members using image processing technology.

2. Description of the Related Art

Recently, optical members made of plastic have been widely used in photographing lens systems or finders of cameras, due to their lightweight and low-cost qualities.

However, with such optical members there is a possibility that dust, e.g., in the form of carbonated plastic, remains in the mold after injection molding and thus might enter inside a lens being molded. Additionally, since plastic is softer than glass, there is a higher possibility of a flawed lens being produced, and therefore inspection for defects before assemble has an increased importance.

Defect inspection is undertaken in order to judge whether an optical member has sufficient performance to be used, namely whether it is non-defective and useable, or is defective and can not be used.

In the prior art, defect inspection is usually either in the form of visual inspection by the naked eye, in which a skilled worker illuminates the optical member, such as a lens or prism, by an intense light, or in the form of image processing of an inputted image obtained by picking-up an image of the optical member.

If dust has entered a lens, factors such as the size of the dust, the depth of entry, or the distance from the optical axis, need to be determined. On the other hand, if there is a flaw, factors such as the size of the flaw, the surface on which the flaw is, or the distance of the flaw from the optical axis, need to be determined.

The criteria used for judging whether an optical member is defective or non-defective, is different depending on whether dust has entered the member or whether there is a flaw, for example, even in the case that the dust and the flaw have the same size, one may be allowable, e.g., the dust, while the other type of defect, e.g., the flaw, is not. Therefore, an inspector should judge whether the lens is defective or non-defective, not only from the extent of the defect, but also from the identification of the type of defect, i.e., whether it is dust or a flaw.

In visual inspections by the naked eye, a judgement as to whether a lens is defective or non-defective is subjective according to each individual inspector, and thus judgement criteria may change according to the physical condition of the same inspector, e.g., in the weakening of the eyes, to say nothing of the judgement criteria of a different inspector, thus making it difficult to maintain unitary judgements.

SUMMARY OF THE INVENTION

The present invention is made considering the problems of the prior art as described above. An object of the present invention to provide an optical member inspection apparatus and method of inspection thereof capable of judging the defectiveness of an optical member according to objective criteria.

Another object of the present invention is to provide an optical member inspection apparatus capable of obtaining the most appropriate luminance in accordance with the shape of an object to be inspected.

Yet another object of the present invention is to provide an optical member inspection apparatus capable of obtaining the most appropriate luminance in accordance with the color of a defect.

Still another object of the present invention is to provide an optical member inspection apparatus capable of obtaining the most appropriate luminance for detecting defects according to the type of an object to be inspected.

Another object of the present invention is to provide an apparatus capable of being used for an optical member, as a subject for inspection, that has a function of a wedge prism which deflects light in one direction.

Another object of the present invention is to provide an optical member inspection apparatus and method of inspection thereof provided with a magnification adjustment function capable of setting magnification according to objective criteria.

Still another object of the present invention is to provide an optical member inspection apparatus, in regard to an inspection apparatus by using image processing, capable of promptly detecting a defect of an object to be inspected.

Another object of the present invention is to provide an optical member inspection apparatus capable of detecting a mold mark separated from other defects using image processing.

Yet another object of the present invention is to provide a method of mark separation capable of separating a mark accurately through simple processing, from an input image obtained by picking-up an image of an optical member, and also provides an optical member inspection apparatus using the same method.

Still another object of the present invention is to provide a method of efficient inspection in the case of a sequential inspection of optical members in regard to a plural number of items to be inspected, and also provide an optical member inspection apparatus using the method.

Another object of the present invention is to provide an optical member inspection apparatus and method of inspection thereof, for which it is not necessary to execute complicated image processing for the removal of noise etc., while the subject inspection range is wider than the designed effective aperture.

Yet another object of the present invention is to provide an optical member inspection apparatus capable of expediting the duration of inspection in the case of a sequential inspection of a plural number of objects to be inspected.

Still another object of the present invention is to provide a method of controlling of lighting luminance, according to a histogram of a picked-up image, and also provides an optical member inspection apparatus using the same method.

To achieve the objects mentioned above, according to an aspect of the present invention, an optical member inspection apparatus is provided having an inspection optical system having a light source, and a diffusing means for diffusing the light emitted from the light source. The diffusing means has a central portion and a peripheral portion. The diffusion transmittance of the peripheral portion is higher than the diffusion transmittance of the central portion. The inspection optical system also has an image pick-up means to pick-up an image of the optical member to be inspected, and is positioned so as to receive that light emitted from the light source and transmitted through the diffusing means and the optical member. A judging means is also provided, for judging whether or not the optical member has a defect, in accordance with image signals output from the image pick-up means.

Preferably, the diffusing means consists of a plane plate member, having central and peripheral portions, extending substantially perpendicular to an optical axis of the image pick-up means. However, first and second diffusing plates, together determining the central and peripheral portions, could also be used as the diffusing means. The shapes of the central and peripheral portions, are preferably determined according to the shape of the optical member to be inspected. In addition, it is also preferred that the central and peripheral portions are each variable in shape, and that the optical member inspection apparatus includes means for setting each shape.

The diffusing means preferably consists of a liquid crystal panel having a plurality of segments, each segment having a diffusion transmittance that can be varied according to a voltage applied thereto. The setting means sets the shape of the peripheral and central portions by controlling the voltage applied to each segment.

Preferably, a wavelength selecting means is provided for selecting a wavelength of that light incident on the optical member. The wavelength selecting means can vary the spectral transmittance of the central and peripheral portions.

In addition, a means for moving at least the diffusing means in a direction along the optical axis of the image pick-up means, is preferably provided.

The diffusing means preferably consists of first and second diffusing plates, each placed approximately perpendicular to the optical axis of the image pick-up means, and each having a uniform diffusion transmittance. The second diffusing plate is positioned at a center of the first diffusing plate so as to form the central portion. With such an arrangement, the moving means can preferably move at least the second diffusing plate in the optical axis direction. However, the moving means could be selected to move both the light source and the diffusing means, as a whole, in the optical axis direction.

It is preferred that the optical member inspection apparatus also has a means for moving the light source relative to the diffusing means, in a direction along the optical axis of the image pick-up means, so that light can be projected towards the diffusing means at a predetermined emission angle.

It is also preferred that means are provided for moving at least the diffusing means in a direction perpendicular to the optical axis of the image pick-up means, and that a lighting unit, consisting of the light source and the diffusing means, are moved, by the moving means, in the direction perpendicular to the optical axis of the image pick-up means.

Using the optical member inspection apparatus of the present invention, there is provided a method for inspecting an optical member, consisting of firstly, positioning the diffusing means such that light transmitted through the optical member and picked-up by the image pick-up means, substantially corresponds to light transmitted through the central portion of the diffusing means. Secondly, an image of the optical member is input from the image pick-up means, and thirdly, according to the input image, it is judged whether or not the optical member is defective.

Preferably, the image pick-up means can be adjusted by adjusting magnification.

The optical member inspection apparatus preferably further consists of a means for displaying an image of the optical member picked-up by the image pick-up means. A reference value storing means is also preferably provided, in which a value of a reference outline of the optical member and a recommended magnification of the image pick-up means are registered for each type of the optical member. A means for calculating a reference frame using the reference outline value and the recommended magnification read from the reference value storing means, in accordance with a type of the optical member, is also preferably provided. In addition, a means is preferably provided for calculating a magnification of the image pick-up means, in order to make an outline of an image of the optical member, picked-up by the image pick-up means, coincide with the reference frame. A means for adjusting the magnification of the image pick-up means, according to the magnification calculated by the magnification calculating means, is also preferably provided.

The magnification adjusting means preferably consists of first and second storing means, for respectively storing a size of the outline of the picked-up image of the optical member, and a size of the reference frame. By comparing the sizes stored in the first and second storing means, the magnification adjusting means adjusts the magnification of the image pick-up means.

In another aspect of the present invention an optical member inspection apparatus is provided, in which light emitted from a lighting means and transmitted through an optical member to be inspected is picked-up by an image pick-up means for inspecting a defect of the optical member. The lighting means emits low and high luminance light towards the optical member. The low luminance light is emitted parallel to an optical axis of the image pick-up means, while the high luminance light is emitted inclined relative to the optical axis of the image pick-up means.

In a further aspect of the present invention, a method is provided for inspecting an optical member, in which light emitted from a light source is diffused by a diffusing means before being made incident on the optical member. The light emitted from the optical member is picked-up by an image pick-up means. The diffusing means includes central and peripheral portions. The diffusion transmittance of the peripheral portion is higher than the diffusion transmittance of the central portion. The method consists of firstly, inputting an image, including an image of the optical member, from the image pick-up means. Secondly, the image of the optical member is separated from the input image. Thirdly, the image of the optical member is binarized, using a primary threshold value lower than an average luminance of the image of the optical member. Fourthly, the image of the optical member is binarized, using a secondary threshold value higher than the average luminance of the optical member image, and fifthly, it is judged whether or not the optical member is defective by taking first and second binarized signals as defects of different types.

According to a further aspect of the present invention an optical member inspection apparatus is provided consisting of a light source, and a diffusing means for diffusing light emitted from the light source. The diffusing means consists of central and peripheral portions. The diffusion transmittance of the peripheral portion is higher than the diffusion transmittance of the central portion. An image pick-up means, positioned to receive light emitted from the light source and transmitted through the diffusing means and the optical member, is also provided to pick-up an image of an optical member to be inspected. The image pick-up means is adjustable in magnification. A reference value storing means is provided, in which a value of a reference outline of the optical member and a recommended magnification of the image pick-up means are registered for each type of the optical member. A means for calculating a reference frame using the reference outline value and the recommended magnification, read from the reference value storing means, in accordance with a type of the optical member, is also provided. In addition, a means for displaying the reference frame, superimposed on an image of the optical member picked-up by the image pick-up means, is provided.

In a further aspect of the present invention, a method is provided for inspecting an optical member, in which light emitted from a light source is diffused by a diffusing means, consisting of central and peripheral portions, before being made incident on the optical member. Light emitted from the optical member is picked-up by an image pick-up means. The diffusion transmittance of the peripheral portion is higher than the peripheral portion of the central portion. The method consists of firstly, inputting an image, including an image of the optical member, from the image pick-up means. Secondly, separating the optical member image from the input image. Thirdly, calculating a reference frame using a value of a reference outline of the optical member and a recommended magnification of the image pick-up means. The calculated reference frame and the calculated recommended magnification are prestored according to the type of the optical member. Fourthly a magnification of the image pick-up means is adjusted, so that an outline of an image of the optical member, picked-up by the image pick-up means, may coincide with the reference frame, and fifthly, it is judged whether or not the optical member is defective, according to an image of the optical member picked-up by the image pick-up means at the adjusted magnification.

According to a further aspect of the present invention, a method is provided for inspecting an optical member, in which light emitted from a light source is diffused by a diffusing means, before being made incident on the optical member. The light emitted from the optical member is picked-up by an image pick-up means. The diffusing means includes central and peripheral portions, with the diffusion transmittance of the peripheral portion being higher than the diffusion transmittance of the central portion. The method consists of the processes of firstly, inputting an image of the optical member from the image pick-up means. Secondly, the input image is binarized and a preliminary separating operation is executed, in which the image of the optical member is roughly separated from the input image according to a luminance distribution of the binarized input image. Thirdly, it is judged whether or not the preliminary separating operation has been successfully executed. If it is judged that the preliminary separating operation has been success the a main separating operation is executed, in which an image to be inspected is separated from the roughly separated image of the optical member, and fifthly, the separated image to be inspected is binarized to judge whether or not the optical member is defective.

Preferably, in the above method, the preliminary separating operation is executed such that a rectangular section, including the image of the optical member, is separated from the input image, according to a luminance distribution in an X-axis direction and a Y-axis direction.

The X-axis direction and the Y-axis direction being perpendicular with each other.

It is preferred that the above-mentioned fifth process consists of binarizing the separated image to be inspected that is separated in the preliminary separating operation, using a primary threshold value. The primary threshold value being lower than an average luminance of the separated image to be inspected. Secondly, the separated image to be inspected that is separated in the preliminary separating operation is binarized using a secondary threshold value. The secondary threshold value being higher than the average luminance of the separated image to be inspected, and thirdly, it is judged whether or not the optical member is defective by taking first and second binarized signals, obtained respectively through the two binarizing processes, as defects of different types.

According to still another aspect of the present invention, an optical member inspection apparatus is provided including means for picking-up an image of an optical member to be inspected, to output the image of the optical member. The output image of the optical member is binarized by provided means, to detect a suspected mold defect. A first plurality of counters, each counting a number of appearances of the suspected mold defect at a common position on a plurality of optical members molded by a common mold, are also provided. When the number of appearances reaches a first predetermined number, means are provided for deciding that the suspected mold defect appearing at the common position is a real mold defect.

Preferably, a second plurality of counters, are also provided, each counting the number of non-appearances of the suspected mold defect at the common position during a period the suspected mold defect fails to appear, before the number of appearances has reached the first predetermined number. The number of the first plurality of counters is identical to the number of second plurality of counters. First and second reset means are also provided, for respectively resetting one counter in the first plurality of counters when the number of non-appearances in a corresponding counter in the second plurality of counters reaches a second predetermined number, and for resetting one counter in the second plurality of counters when the suspected mold defect reappears at the common position before the number of non-appearances of the one counter in the second plurality of counters has reached the second predetermined number.

In yet another aspect of the present invention an optical member inspection apparatus is provided consisting of means for picking-up an image of an optical member to be inspected, to output the image of the optical member. Means for provided for binarizing the output image of the optical member to detect a suspected mold defect. A first plurality of counters and a second plurality of counter are provided, for each counting a number of appearances of the suspected mold defect at a common position on a plurality of optical members molded by a common mold, and for each counting a number of non-appearances of the suspected mold defect at the common position during a period the suspected mold defect fails to appear, before the number of appearances has reached a first predetermined number, respectively. The number of the first plurality of counters being identical to the number of second plurality of counters. First and second reset means are provided for respectively resetting one counter in the first plurality of counters when the number of non-appearances of a corresponding counter in the second plurality of counters reaches a second predetermined number, and for resetting one counter in the second plurality of counters when the suspected mold defect reappears at the common position, before the number of non-appearances of the one counter in the second plurality of counters has reached the second predetermined number. Additionally, means are provided for deciding that the suspected mold defect at the common position is a real mold defect, when the number of appearances reaches the first predetermined number.

In another aspect of the present invention, a method is provided for separating an image of a mark, formed on an optical member to be inspected, from an image of the optical member input from an image pick-up means picking-up an image of the optical member. The method consists of firstly, binarizing the input image of the optical member to draw (extract) a figure corresponding to the mark or a defect of the optical member from the binarized input image. Secondly, a binarized image of a reference mark having no defect is expanded. Thirdly, a primary image is generated, including a figure corresponding to the mark and a figure corresponding to the defect, the defect being located in a vicinity of the figure corresponding to the mark, by executing an AND operation of the binarized input image and the expanded binarized reference mark per pixel. Fourthly, the image of the mark is generated by removing all figures of defects not connected to the figure corresponding to the mark from the primary image, in accordance with information regarding the reference mark, and fifthly generating an image excluding the image of the mark, by extracting the image of the mark generated from the binarized input image.

Preferably, the figures included in the primary image are numbered in order of size from a largest to a smallest. The number of numbered figures being identical to the number of reference marks. A non-numbered figure or figures amongst the figures included in the primary image, being eliminated to thereby generate the image of the mark.

According to another aspect of the present invention, there is provided an optical member inspection apparatus for judging whether or not an optical member to be inspected is defective. The optical member having a mark formed thereon. The optical member inspection apparatus including a means for picking-up an image of the optical member, to output an image of the optical member. Means are provided for binarizing the image of the optical member, and for drawing (extracting) a figure corresponding to the mark or a defect of the optical member from the binarized input image. In addition means are provided for expanding a binarized image of a reference mark having no defect. First, second and third generating means are provided for respectively generating a primary image including the figure corresponding to the mark and a figure corresponding to the defect, the defect being located in a vicinity of the figure corresponding to the mark, by executing an AND operation of the binarized input image and the expanded binarized reference mark per pixel, and for generating the image of the mark by removing all figures of defects not connected to the figure corresponding to the mark from the primary image, in accordance with information regarding the reference mark, and for generating an image excluding the image of the mark, by extracting the image of the mark generated by the second generating means from the binarized input image. Additionally, means are provided for judging whether or not the optical member is defective, in accordance with at least one of the image of the mark generated by the second generating means and the image excluding the image of the mark that is generated by the third generating means.

Preferably, the third generating means numbers figures included in the primary image in order of size from a largest to a smallest. The number of numbered figures being identical to the number of reference marks. In addition, the third generating means eliminates a non-numbered figure, or figures, amongst the figures included in the primary image, to thereby generate the image of the mark.

In yet a further aspect of the present invention, there is provided a method of inspecting a plurality of optical members, each optical member being inspected by a plurality of types of inspection, to detect a defect. In this method, the type of inspection having the higher frequency of detection of the defect, the earlier the type of inspection is executed. The frequency of detection being statistically obtained.

Preferably, in the case where one optical member, amongst the plurality of optical members to be inspected, is judged to be defective in one type of inspection, the remaining types of inspection are not executed on the defective optical member.

According to yet another aspect of the present invention, there is provided an optical member inspection apparatus for inspecting a plurality of optical members, each optical member being inspected by a plurality of types of inspection, to detect a defect. In this optical member inspection apparatus, the higher a frequency of detection of the defect in one type of inspection, amongst the plurality of types of inspection, is, the earlier that inspection is executed. The frequency of detection being statistically obtained through an inspecting operation.

In yet another aspect of the present invention, an optical member inspection apparatus is provided having a plurality of image inputting means provided respectively for a plurality of types of inspection. Means are provided for consecutively supplying an optical member to be inspected to respective image input positions of the plurality of image inputting means, and means are provided for judging that the optical member is defective, when a defect of more than a predetermined value is detected on the optical member in at least one type of inspection amongst the plurality of types of inspection. A supply order controlling means for controlling the supplying means in accordance with a frequency of existence of the defect for each of the plurality of types of inspection, is provided. The frequency of existence being statistically obtained through an inspecting operation, so as to firstly supply the optical member to one of the image input positions corresponding to a type of inspection in which a frequency of detection of the defect is higher than any other type of inspection amongst the plurality of types of inspection.

According to another aspect of the present invention, an optical member inspection apparatus is provided consisting of means for picking-up an image of an optical member to be inspected, to output the image of the optical member. Means for setting a plurality of areas to be inspected in the image of the optical member, is also provided. One of the plurality of areas is an outermost area including a boundary line defining a designed effective aperture of the optical member. In addition, means are provided for setting a criterion for judgement for each of the plurality of areas, the criteria being different from one another. A criterion set for the outermost area is alleviative, compared with the other criteria. Means are also provided for judging whether or not each of the plurality of areas is defective, in accordance with a corresponding criterion from the criteria set by the criterion setting means.

In a further aspect of the present invention, there is provided a method of inspecting an optical member to judge whether or not the optical member is defective. A plurality of areas to be inspected are set in an image of the optical member, picked-up by an image pick-up means. A criterion for judgement is set differently for each of the plurality of areas. The method consisting of firstly, setting an outermost area, including a boundary line defining a designed effective aperture of the optical member, as one of the plurality of areas. Secondly, the optical member for the outermost area is inspected with a predetermined criterion, from the set criteria. The predetermined criterion being alleviative, compared with the other criteria.

According to another aspect of the present invention, there is provided an optical member inspection apparatus consisting of placing means for consecutively placing each of a plurality of optical members to be inspected, firstly, at a first position, where each image of an optical member is picked-up, and subsequently at a second position, where each optical member is stamped with a predetermined mark. Means for picking-up an image of each optical member at the first position, to output an image, are also provided. In addition, means are provided for judging whether or not each optical member is defective, according to the image of the optical member output from the image pick-up means, and means for stamping the predetermined mark on each optical member at the second position, depending on a judgement of the judging means regarding the optical member, are also provided. The placing means conveys one optical member to be inspected, which has not yet been inspected, to the first position, while conveying another optical member to be inspected, which has been already inspected at the first position, to the second position.

Preferably, the stamping means stamps the mark only when the optical member is judged to be defective by the judging means.

In another aspect of the present invention, a method is provided including a first process of inspecting an optical member to judge whether or not the optical member is defective, and a second process of stamping a mark on the optical member depending upon a result of the inspection. The first and second processes are performed at different positions at the same time.

In yet another aspect of the present invention, a method of inspection and marking is provided, consisting of inspection and marking process. In the inspection process, it is inspected whether or not an optical member to be inspected is at an inspection position. In the marking process a mark is stamped on the optical member at a marking position, different from the inspection position, according to a result of inspection of the inspection process. An optical member to be inspected, which has not yet been inspected, is conveyed to the inspection position while another optical member to be inspected, which has been already inspected at the first position, is being conveyed to the second position.

According to a further aspect of the present invention, there is provided a method of controlling a luminance of light emitted from a light source used in an inspection apparatus for inspecting an optical member. The light emitted from the light source is transmitted to means for picking-up an image of the optical member through the optical member, an image output from the image pick-up means being image-processed to obtain an image of the optical member. The method consists of firstly, forming a histogram showing a luminance distribution of the image of the optical member by a number of pixels. Secondly, a threshold value is obtained according to a discriminant analysis method, based on the histogram, and thirdly, the luminance of light emitted from the light source is controlled, in accordance with the threshold value.

In another aspect of the present invention, there is provided a method of controlling a luminance of light illuminating an object to be inspected. The method consists of firstly, obtaining a threshold value according to a discriminant analysis method, based on a histogram of an image of the object, and secondly of controlling the luminance of light, in accordance with the threshold value.

According to a further aspect of the present invention, an optical member inspection apparatus is provided having means for lighting an optical member to be inspected. Means are also provided for picking-up an image of the optical member, lighted by the lighting means, to output an image of the optical member. Means for image-processing the image of the optical member so as to inspect the optical member, are also provided. In addition, there is provided means for forming a histogram which shows a luminance distribution of the image of the optical member by a number of pixels, and means for obtaining a threshold value according to a discriminant analysis method, based on the histogram, and for controlling a luminance of light emitted from the lighting means in accordance with the threshold value.

According to still another aspect of the present invention, an optical member inspection apparatus is provided, which picks-up an image of an object to be inspected, lighted by lighting means, and judges whether or not the object is defective according to the image of the object. The light emitted from the lighting means has a luminance distribution which clearly differentiates between a luminance of an area to be inspected, including an image of the object, and a luminance of a background area, excluding the object image, in the image. The luminance of light emitted from the lighting means being controlled in accordance with a threshold value obtained according to a discriminant analysis method.

The present disclosure relates to subject matter contained in Japanese patent applications No. 7-164825 (filed on Jun. 7, 1995), No. 7-164826 (filed on Jun. 7, 1995), No. 7-164827 (filed on Jun. 7, 1995), No. 7-172911 (filed on Jun. 15, 1995), No. 7-175518 (filed on Jun. 19, 1995), No. 7-175519 (filed on Jun. 19, 1995), No. 7-184795 (filed on Jun. 28, 1995), No. 7-189844 (filed on Jul. 3, 1995), No. 7-189853 (filed on Jul. 3, 1995), No. 7-208398 (filed on Jul. 24, 1995), No. 7-208399 (filed on Jul. 24, 1995), No. 7-208400 (filed on Jul. 24, 1995), No. 7-221120 (filed on Aug. 7, 1995) and No. 8-101834 (filed on Apr. 1, 1996) which are expressly incorporated herein by reference in their entireties.

BRIEF DESCRIPTION OF THE DRAWINGS

The invention will be described below in detail with reference to the accompanying drawings, in which similar parts are indicated by like reference numerals, and wherein:

FIGS. 2(A-1), (A-2), (B-1) and (B-2) are schematic views of the apparatus of FIG. 1, showing plan shapes of objects to be inspected and plan shapes of diffusing means;

FIGS. 3(A) and (B) are illustrative schematic views showing examples of optical paths in the optical system of FIG. 1, when a lens to be inspected is set;

FIG. 4 is a schematic view of images of lenses to be inspected having no defect, picked-up by the apparatus of FIG. 1;

FIGS. 7(A)–(C) are examples of distributions of luminance on a scanning line of an image picked-up by the apparatus of FIG. 1, wherein (A) is a signal-of the original image, (B) is a binarized signal of a low luminance portion, and (C) is a binarized signal of a high luminance portion;

FIGS. 8(A)–(B) are illustrative schematic views of optical paths in the optical system of FIG. 1, when the lens to be inspected is not set;

FIGS. 14(A)–(C) are plain views showing structures of diffusing means of the apparatus shown in FIG. 11;

FIG. 18 is a schematic view showing an image of a lens set to be inspected, and distribution of projection thereof;

FIG. 19 is a schematic view showing an image of a lens not set to be inspected, and distribution of projection thereof;

FIG. 26 is a schematic view of an overall construction of an optical system and a block diagram of a processing system of a second embodiment of an optical member inspection apparatus, according to the first aspect of the present invention;

FIGS. 27(A-1), (A-2), (B-1) and (B-2) are comparative schematic views of the apparatus shown in FIG. 26, showing plan shapes of objects to be inspected and plan shapes of diffusing means;

FIG. 74 is a schematic view showing a block diagram of a processing system of an embodiment of an optical member inspection apparatus having a marking function, according to an eighth aspect of the present invention;

DESCRIPTION OF THE PREFERRED EMBODIMENTS

Figure 1:
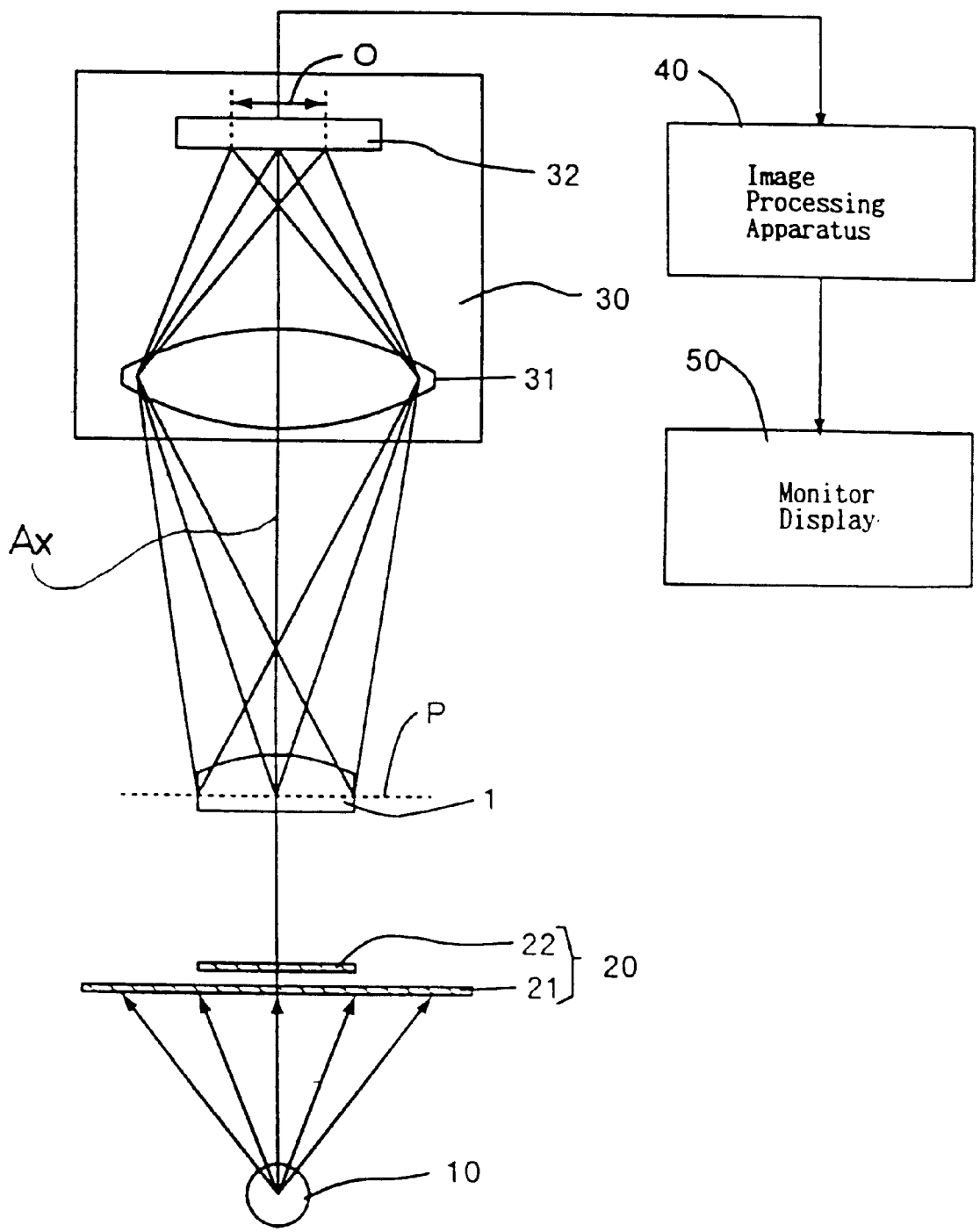
FIG. 1 is a schematic view of an overall construction of an optical system and a block diagram of a processing system of a first embodiment of an optical member inspection apparatus according to a first aspect of the present invention.

FIG. 1 illustrates an overall construction of an optical system and a block diagram of a processing system of a first embodiment of an optical member inspection apparatus This first embodiment is characterized in that the optical member inspection apparatus has a light source, and a diffusing means for diffusing the light emitted from the light source. The diffusing means has a central portion and a peripheral portion. The diffusion transmittance of the peripheral portion is higher than the diffusion transmittance of the central portion. An image pick-up means is provided to pick-up an image of the optical member to be inspected, and is positioned so as to receive that light emitted from the light source and transmitted through the diffusing means and the optical member. A judging means is also provided, for judging whether or not the optical member has a defect, in accordance with image signals output from the image pick-up means.

Since the diffusing means is provided with a unique diffusion transmittance as noted above, light which is emitted from the central portion of the diffusing means, parallel to the optical axis, is incident upon the optical member to be inspected, and light which is emitted from the peripheral portion of the diffusing means, inclined relative to the optical axis, is also incident on the optical member to be inspected. However, the image of the optical member that is formed on the image pick-up means is mainly formed by the light emitted from the central portion, and thus the light emitted from the peripheral portion hardly affects the formation of the image on the image pick-up means.

However, if dust exists which absorbs light, e.g., a dark or black-colored dust, in or on the optical member to be inspected, the portion of the image that corresponds to the light absorbing dust will appear darker (i.e., luminance is lower) than the surrounding portion of the image, which surrounds the darker portion. On the other hand, if dust exists which scatters or diffuses light, e.g., a flaw or white-colored dust, in or on the optical member to be inspected, the beam of light that is emitted from the central portion and incident on the light scattering defect is scattered at the point of the light scattering defect. However, at the same time, the beam of light that is emitted from the peripheral portion and incident on the light scattering defect is also scattered at the light scattering defect to thereby reach the image pick-up means. Consequently, the portion of the image that corresponds to the light scattering defect will appear brighter (i.e., luminance is higher) than the surrounding portion of the image, which surrounds the brighter portion. Therefore, it is possible to simultaneously detect different types of defects, i.e., a light absorbing type of defect and a light scattering type of defect, from a single image of the optical member to be inspected, based on the average luminance of the original image of the optical member.

In the embodiments of the first aspect of the present invention, an optical member made of plastic (i.e., a plastic lens) is preferably designated to be the subject to be inspected by the optical member inspection apparatus. The optical system of the first embodiment will now be described with reference to FIG. 1.

The optical system of the inspection apparatus has a light source 10, a diffusing means 20 consisting of a first diffusing plate 21 and a second diffusing plate 22, which diffuses light emitted from the light source 10. A CCD camera 30 serves as an image pick-up means for picking-up an image incident thereon. The light transmitted through the diffusing means 20 is transmitted through a positive lens 1, i.e., the lens to be inspected, before reaching the CCD camera 30.

The light source 10 and the lens 1 to be inspected are positioned along an optical axis Ax of the CCD camera 30. The CCD camera 30 basically consists of an objective lens 31 and a CCD sensor 32, and is adjusted in such a manner that a focusing plane P is positioned on the approximate central position of the lens 1 (in the direction of the thickness of the lens). The focusing plane P and an image receiving area of the CCD sensor 32 are optically conjugate via the objective lens 31. An image of the lens 1 positioned on the focusing plane P, is formed within the area indicated by ○, i.e., lens image forming area, in FIG. 1 on the CCD sensor 32.

In order for the CCD camera 30 to receive a sufficient quantity of light, it is preferable to provide a condenser lens, between the diffusing means 20 and the CCD camera 30. In the present embodiment the positive lens 1 functions as a condenser lens.

An image output from the CCD camera 30 is processed by an image processing apparatus 40. The image processing apparatus 40 has a judging means which judges whether the lens 1 to be inspected is defective. Information regarding the lens 1 is displayed on a monitor display 50, which serves as a display means.

The shapes of the first and second diffusing plates 21, 22 are approximately the same as the shape of the lens 1 (when viewed from above, as shown in FIG. 2, hereinafter referred to as the. plan shape), although the second diffusing plate 22 is smaller than the first diffusing plate 21. The size of the second diffusing plate 22 is made to approximately coincide with the size of the lens 1. With such an arrangement, all light emitted perpendicularly from the central portion of-the diffusing means 20 is incident on the lens 1, while that light emitted perpendicularly from a peripheral portion of the first diffusing plate 21 does not pass through the second diffusing plate 22, and is not incident on the lens 1. The reason that the plan shape of the first diffusing plate 21 is similar to the lens 1, is so that that light emitted obliquely from the peripheral portion of the diffusing means 20 may be incident equally on the lens 1.

The centers of the first and the second diffusing plates 21, 22 coincide with each other, and are positioned perpendicular to the optical axis Ax of the CCD camera 30. The diffusing plates 21 and 22 may have an identical or a different diffusion transmittance, but if the diffusing means 20 is considered as a whole, in the central portion where the first and second diffusing plates are overlaid, the diffusion transmittance is low, while in the peripheral portion where the diffusing plates 21 and 22 are not overlaid, the diffusion transmittance is relatively high.

FIG. 2 illustrates examples of plan shapes of lenses to be inspected and the diffusing plates 21, 22. As shown in FIG. 2(A-1), if the lens to be inspected is a lens la for a finder having a rectangular plan shape, it is preferable that the plan shapes of the first and second diffusing plates 21a, 22a are also rectangular as shown in FIG. 2(A-2). While, if the lens to be inspected is a circular lens 1b as shown in FIG. 2(B-1), it is preferable that the plan shapes of the diffusing plates 21b, 22b are circular as shown in FIG. 2(B-2). "R" in FIG. 2 indicates a runner provided on the multi-cavity mold, and "G" indicates a gate into which molten material is poured to form the lens. In addition, 1c and 1d, respectively shown in FIGS. 2(A-1) and (B-1), indicate parts used for supporting the lens.

Note that since the inspection apparatus of the present embodiment is designed to inspect a plastic lens, molded by a multi-cavity mold, without cutting the runner away therefrom, the lens to be inspected is connected to the runner R via the gate G as shown in FIG. 2.

FIG. 3 is an illustrative schematic view showing examples of optical paths between the light source 10 and the CCD sensor 32 when the lens 1 to be inspected is set in a position to be inspected. FIG. 3(A) shows an optical path of that light emitted perpendicularly from the diffusing means 20, and FIG. 3(B) shows an optical path of that light emitted obliquely from the diffusing means 20. That light incident upon the lens image forming area ○ (i.e., that portion of the CCD sensor 32 on which the image of the lens 1 is formed) of the CCD sensor 32, is limited to substantially only low luminance light transmitted through the second diffusing plate 22, and therefore the luminance of the lens image forming area ○ is lower than the rest of the area of the CCD sensor 32.

As shown in FIG. 3(A), that light emitted perpendicularly from the central portion of the diffusing means 20, i.e., Lvc (indicated by chain double-dashed lines in FIG. 3(A)), is transmitted through the lens 1 and the objective lens 31, to form an image of the lens 1 on the lens image forming area ○ of the CCD sensor 32. On the other hand, that light emitted perpendicularly from the peripheral portion of the diffusing means 20, i.e. Lvp (indicated by dashed lines in FIG. 3(A)), does not pass through the lens 1, and is incident upon the CCD sensor 32 outside the lens image forming area ○, after passing through the objective lens 31.

As shown in FIG. 3(B), that light emitted obliquely from the central portion of the diffusing means 20, i.e., Loc (indicated by the chain double-dashed lines in FIG. 3 (B)), is transmitted through the lens 1 and the objective lens 31, to form an image of the lens 1 on the lens image forming area ○ of the CCD sensor 32. On the other hand, that light emitted obliquely from the peripheral portion of the diffusing means 20, i.e., Lop (indicated by the dashed lines in FIG. 3(B)), and transmitted through the lens 1, is not incident on the objective lens 31, i.e., is not incident on the lens image forming area ○. While that part of the light Lop which is not transmitted through the lens 1 is incident on the CCD sensor 32 outside the lens image forming area ○, after passing through the objective lens 31.

In the examples shown in FIG. 3, low luminance light emitted from the central portion of the diffusing means 20 and transmitted through the lens 1, is incident on the lens image forming area ○ of the CCD sensor 32, and high luminance light emitted from the peripheral portion of the diffusing means 20 and passing in. the vicinity of the lens 1, but not passing through the lens 1, is incident on a peripheral portion of the CCD sensor 32, i.e., outside the lens image forming area ○. Therefore, in the image picked-up by the CCD sensor 32, as shown in FIG. 4, there contain high luminance background areas B, substantially formed by that high luminance light incident on the peripheral portion of the CCD sensor 32 without having been transmitted through the second diffusing plate 22, and the image of the lens 1 to be inspected (lens image forming area ○) S, i.e., the inspection portion, formed by that low luminance light transmitted through the central portion of the diffusing means 20.

Figure 5:
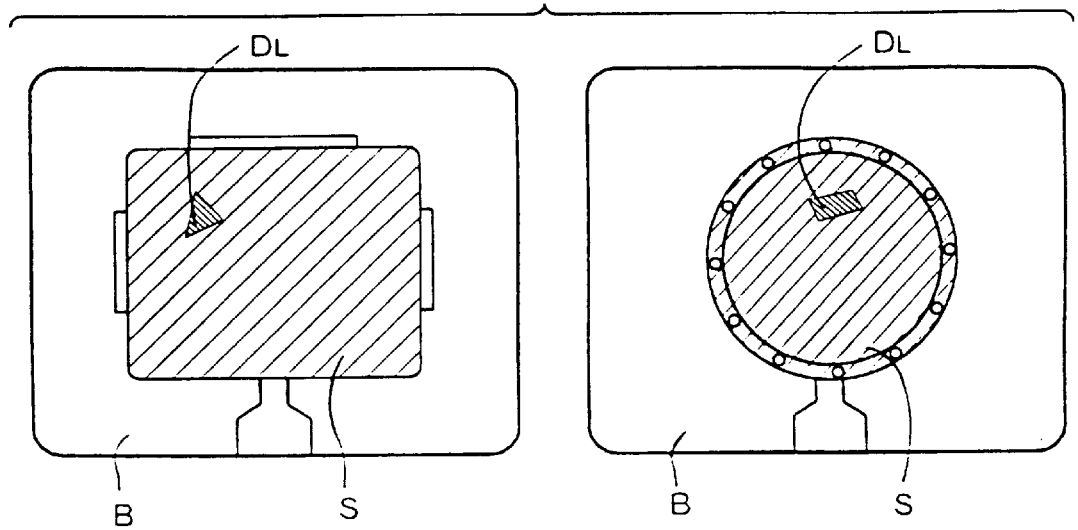
FIG. 5 is a schematic view of images of lenses to be inspected having an absorptive defect, picked-up by the apparatus of FIG. 1.

If the lens 1 to be inspected contains a defect, in the form of black dust (i.e., an absorptive defect) for example, that light emitted from the central portion of the diffusing means, i.e., Lvc or Loc, which forms an image of the lens 1, will be partially absorbed by the defect, and thus will not be incident on the CCD sensor 32. Therefore, defect images $D_L$, having a luminance lower than that of the inspection portion (image of the lens) S, are formed within the inspection portion S, as shown in FIG. 5.

Figure 6:
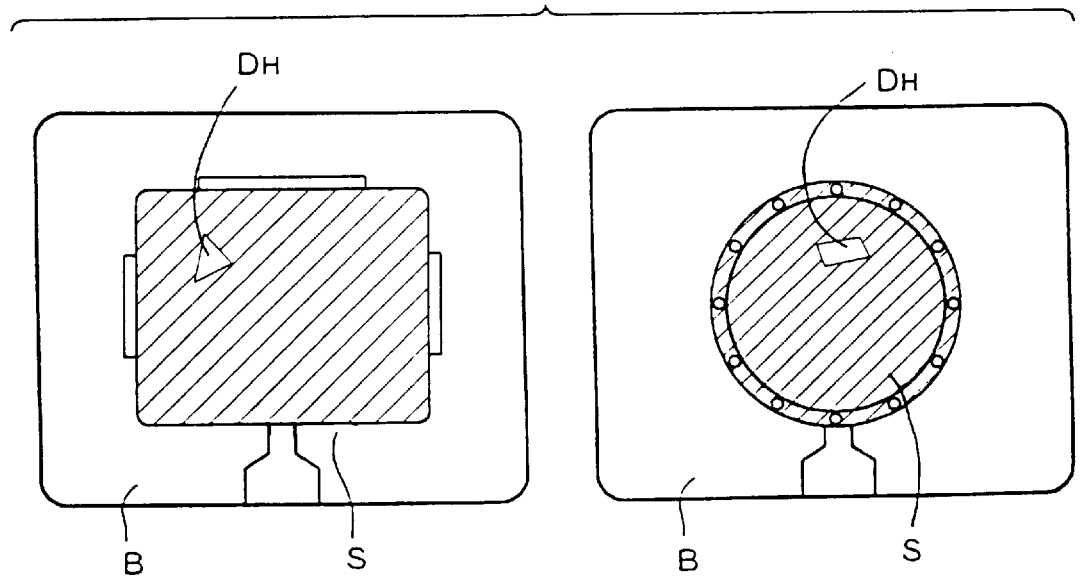
FIG. 6 is a schematic view of images of lenses to be inspected having a scatterable defect, picked-up by the apparatus of FIG. 1.

On the other hand, if the lens 1 contains a defect, in the form of white dust or a flaw (i.e., a scatterable defect) for example, that light incident on the surface of the lens 1 will be scattered by such a defect, namely, part of that high luminance light emitted obliquely from the diffusing means 20, i.e., the light Lop, which is usually not incident on the lens image forming area ○ of the CCD sensor 32, will become incident on the lens image forming area ○ due to the scatterable defect, and thus defect images $D_H$ having a luminance higher than the lens image S will be formed, as shown in FIG. 6.

If a low luminance image $D_L$, due to the absorptive defect, and a high luminance image $D_H$, due to the scatterable defect, are formed on a scanning line in the X-axis direction, a sequence of pixels along the scanning line can be output as shown in FIG. 7(A). The image processing apparatus 40 is capable of separately coding the two different types of defects as respectively shown in FIGS. 7 (B) and (C), by binarization using two threshold values SH1 and SH2.

As described above, by arranging the distribution of light emitted from the light source into two stages, i.e., by using two diffusing plates 21, 22, and by additionally forming the shape of the second diffusing plate 22 to be similar to the plan shape of the lens 1 to be inspected, within the inspection portion S having a luminance lower than that of the background area B, it is possible to recognize a defect as being an absorptive defect, as the image $D_L$ having a luminance lower than the inspection portion S, or as a scatterable defect, as the image $D_H$ having a luminance higher than that of the inspection portion S. Therefore, it is possible to simultaneously detect different types of defects from a single image of the lens to be inspected.

However, if the distribution of light emitted towards the lens 1 to be inspected is uniform, and if a scatterable defect exists, the quantity of light distributed is attenuated due to the light being scattered at the position of the scatterable defect, and it is detected as a low luminance portion, similar to the case of an absorptive defect on the CCD sensor 32. Therefore, it is impossible to judge the type of defect from a single image data.

During an inspection of a lens, since the criteria for judging whether a lens is defective may vary according to the type of defect to be detected, it is necessary to judge the type of defect thereof, and so if it is possible to judge the type of defect in a single inspection, as in the present embodiment, the inspection process can be simplified.

If a lens to be inspected is not set in place, in relation to that light emitted perpendicularly from the diffusing means 20, as shown in FIG. 8(A), that light emitted perpendicularly from the central portion of the diffusing means 20, i.e., the light Lvc (indicated by chain double-dashed lines in FIG. 8(A)), is incident on a central portion of the CCD sensor 32, while that light emitted perpendicularly from the peripheral portion of the diffusing means 20, i.e., the light Lvp (indicated by dashed lines in FIG. 8(A)), is incident on a peripheral portion of the CCD sensor 32. Regarding that light emitted obliquely from the diffusing means 20, as shown in FIG. 8(B), that light emitted obliquely from a central portion of the diffusing means 20, i.e., the light Loc (indicated by chain double-dashed lines in FIG. 8(B)), and that light emitted obliquely from a peripheral portion of the diffusing means 20, i.e., the light Lop (indicated by dashed lines in FIG. 8 (B)), are substantially made incident on the CCD sensor 32 at random positions.

Therefore, if the lens to be inspected is not set in place, a substantially uniform distribution of light on the CCD sensor 32 is obtained.

Figure 9:
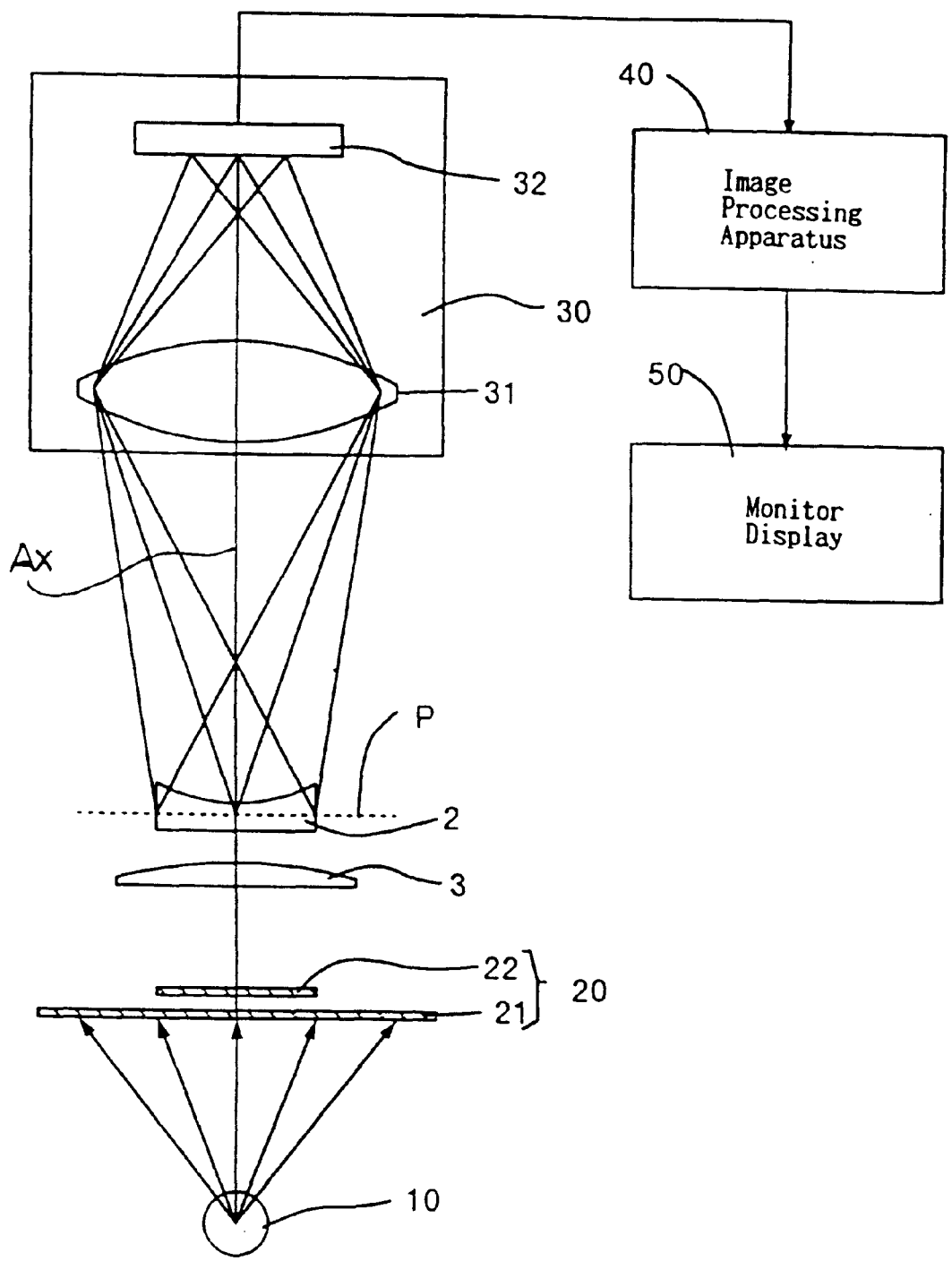
FIG. 9 is a schematic view according to the structure of FIG. 1, wherein a negative lens is inspected by the apparatus of the first embodiment of the first aspect of the present invention.

FIG. 9 illustrates the structure of an optical system in regard to the optical member inspection apparatus according to the first embodiment of the present invention, during an inspection of a negative lens 2.

In the example shown in FIG. 1, since the inspected positive lens 1 functions as a condenser lens, that light which is transmitted through the first and second diffusing plates 21 and 22, and through the lens to be inspected 1, is converged towards the CCD camera 30. On the other hand, if the lens to be inspected is a negative lens 2, in the case of the structure shown in FIG. 1, that light which is transmitted through the negative lens 2 will be scattered, and thus that light transmitted through the negative lens to be inspected may not be effectively made incident on the CCD camera 30, and thus there is a possibility that the quantity of light is insufficient to be picked-up.

It is for this reason that between the diffusing means 20 and the negative lens 2 to be inspected, a positive adjusting lens 3, serving as a condenser lens, is positioned to converge (in advance) light to be incident on the negative lens 2, so that light transmitted through the negative lens 2 may travel towards the CCD camera 30.

A composite focal length of a lens system f, consisting of two thin lenses, provided that the focal length of each lens is f1 and f2 respectively, and the distance between the lenses is d, is commonly determined by the following formula:

$$f=(f1+f2-d)/(f1 \times F2).$$

Supposing that f1 represents the focal length of the negative lens 2 to be inspected, f2 represents the focal length of the adjusting lens 3, and d represents the distance between the adjusting lens 3 and the negative lens 2, the focal length f2 of the adjusting lens 3 and the distance between the lenses d may be determined so that the composite focal length f may be fixed within a range that that light transmitted through the negative lens 2 may be effectively made incident upon the CCD camera 30.

For an efficient operation of the apparatus, it is preferable that the distance between the diffusing plates 21, 22 and the negative lens 2 is constant, and therefore the focal length f2 is fixed by specifying the distance between the lenses d so that the adjusting lens 3 may be positioned between the diffusing plates 21, 22 and the negative lens 2.

In the case where the adjusting lens 3 is positioned between the diffusing means 20 and the negative lens 2, it will be necessary to design the size of the second diffusing plate 22 to be larger than the one shown in FIG. 1, in order to make only a part of that light emitted perpendicularly from the central portion of the diffusing means 20 and transmitted through the second diffusing plate 22 incident on the negative lens 2, similar to the example shown in FIG. 1.

Figure 10:
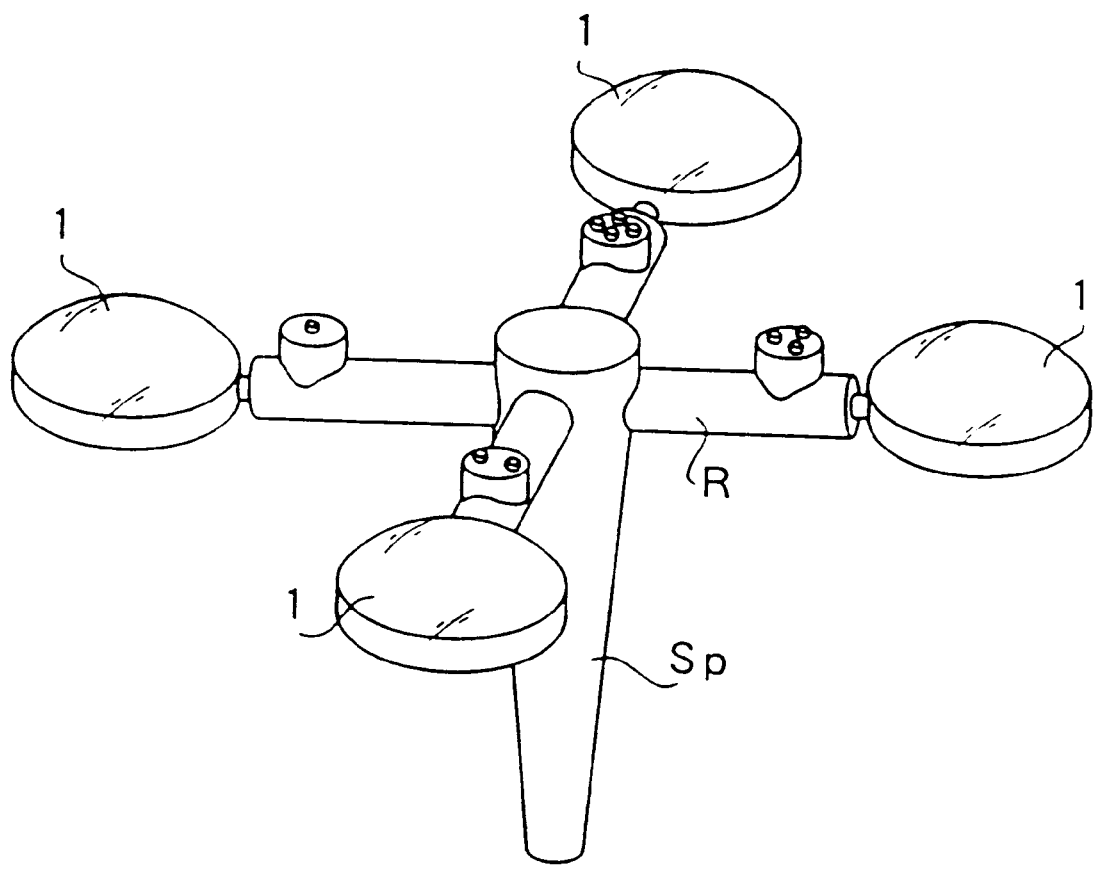
FIG. 10 is a schematic perspective view showing positive lenses molded by a four-cavity mold and connected to runners, as an example of objects to be inspected.

The following description of the present embodiment will be made in regard to an optical member inspection apparatus having two inspection optical systems respectively provided on the right and left thereof, according to the above arrangement. The structure of the apparatus in the present embodiment is such that a plural number of lenses 1 to be inspected, molded by a multi-cavity mold (in this case, a mold having four cavities) as shown in FIG. 10, may be inspected without being removed from a spool Sp and runners R.

Figure 11:
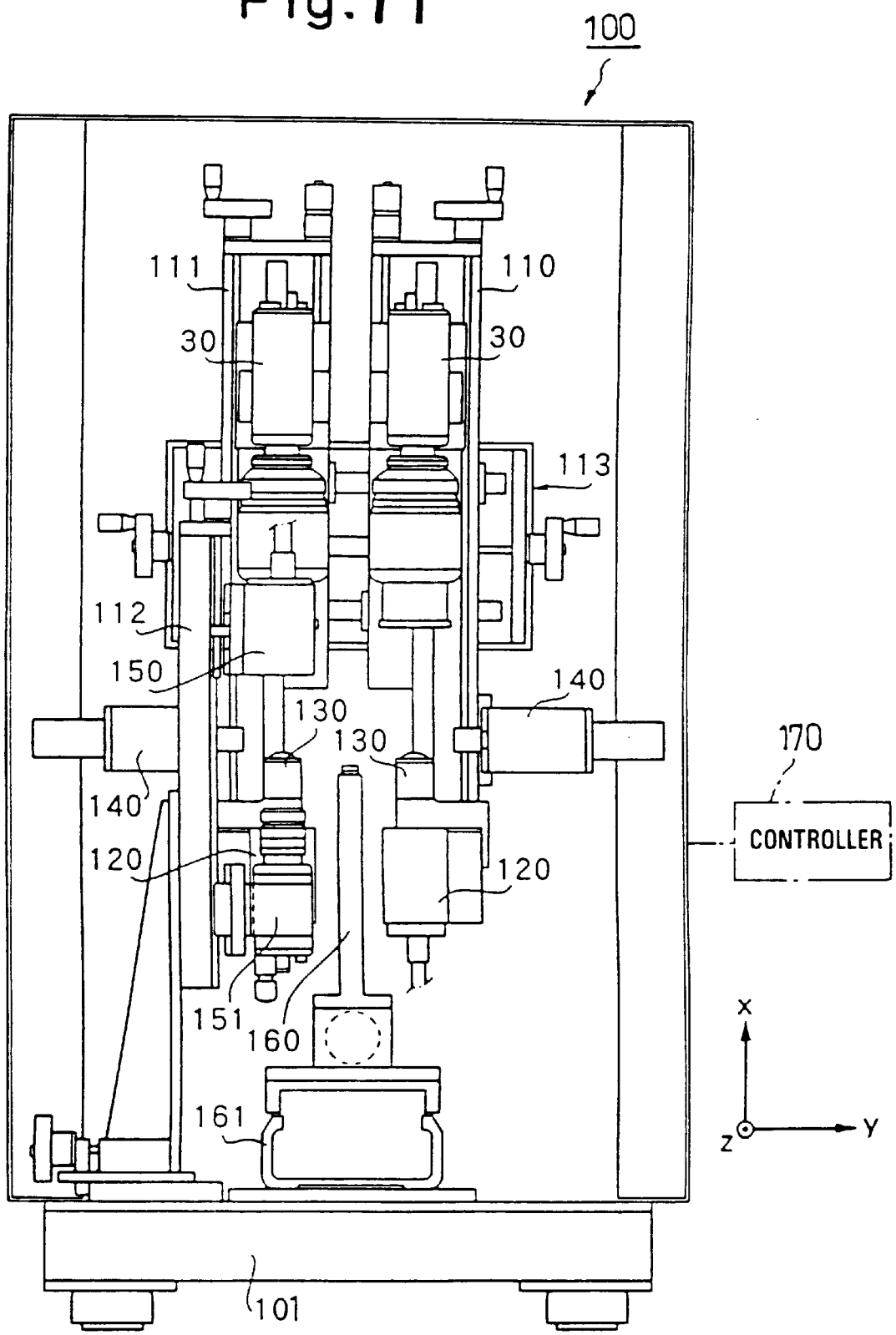
FIG. 11 is a front elevational view of an example of the structure of the optical system of the first embodiment of the first aspect of the present invention.
Figure 12:
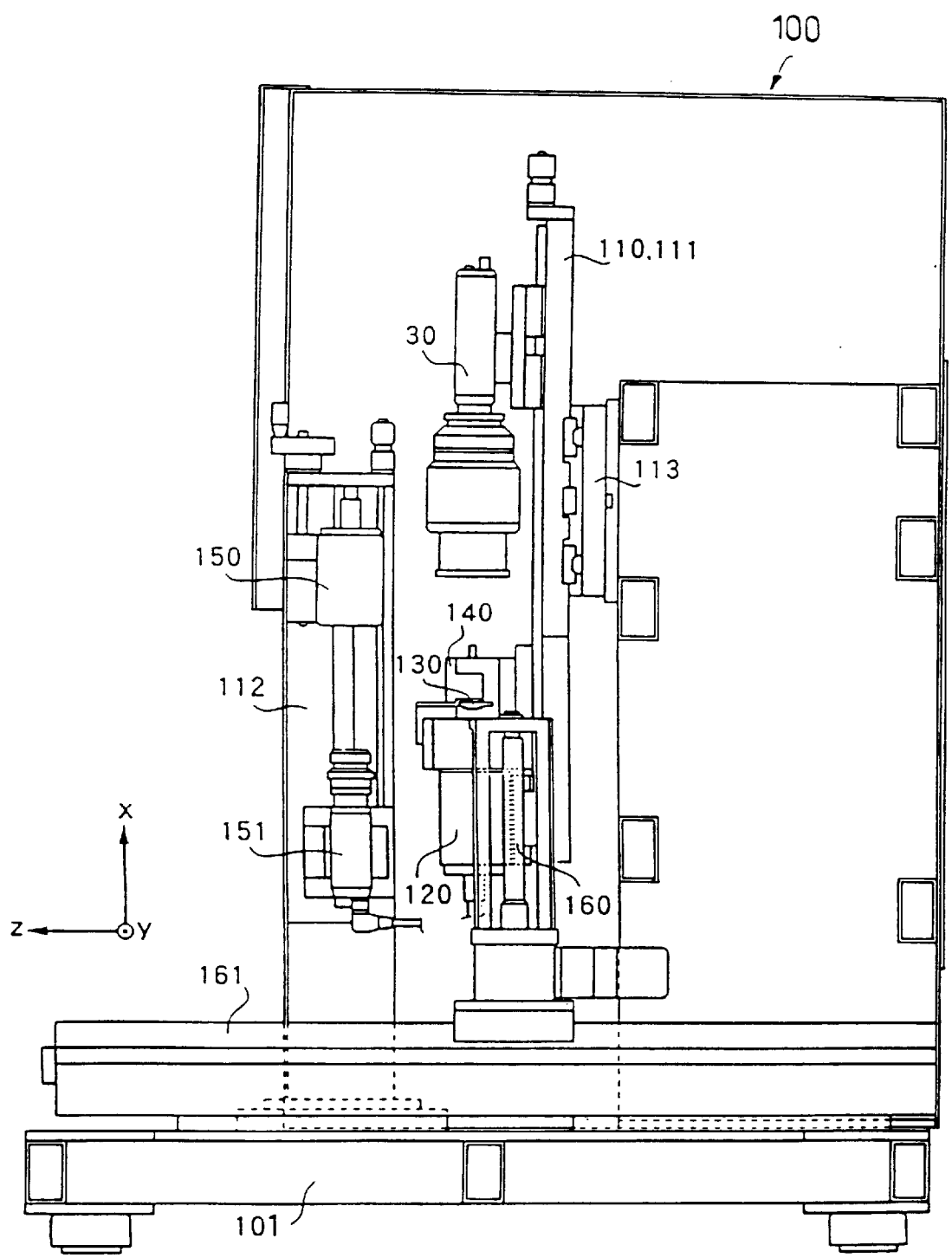
FIG. 12 is a longitudinal sectional view of the apparatus shown in FIG. 11.

As illustrated in FIGS. 11 and 12, in a main apparatus (lens inspection apparatus) 100, a first guide rail member 110, a second guide rail member 111, and a third guide rail member 112 are positioned in the X-axis direction, parallel to the direction of the optical axis Ax. On both of each the first and second guide rail members 110, 111 a CCD camera 30 and a lighting unit 120 are mounted, each being independently movable in the X-axis direction. The first and second guide rail members 110, 111 are supported by a position adjusting means 113 fixed to the main apparatus 100, and are separately adjustable along the Y-axis direction, perpendicular to the X-axis direction.

Both on the first and second guide rail members 110, 111, auxiliary lens units 130 are detachably mounted, and marking units 140 are also mounted to stamp an inspected defective lens.

On the third guide rail member 112, a light source unit 150 and a CCD camera 151 are slidably mounted in the X-axis direction, and constitute a reading unit to read a molded lens identification number N marked on the runners R holding the lenses 1 to be inspected.

On a base 101 of the main apparatus 100, a lens supporting unit 160, which supports the lens 1 to be inspected (while connected to the runner R), is slidably mounted on a rail 161 laid in the Z-axis direction. At the top end of the supporting unit 160, a tapered insertion bore (not shown) is formed in order to insert the spool Sp.

Figure 13:
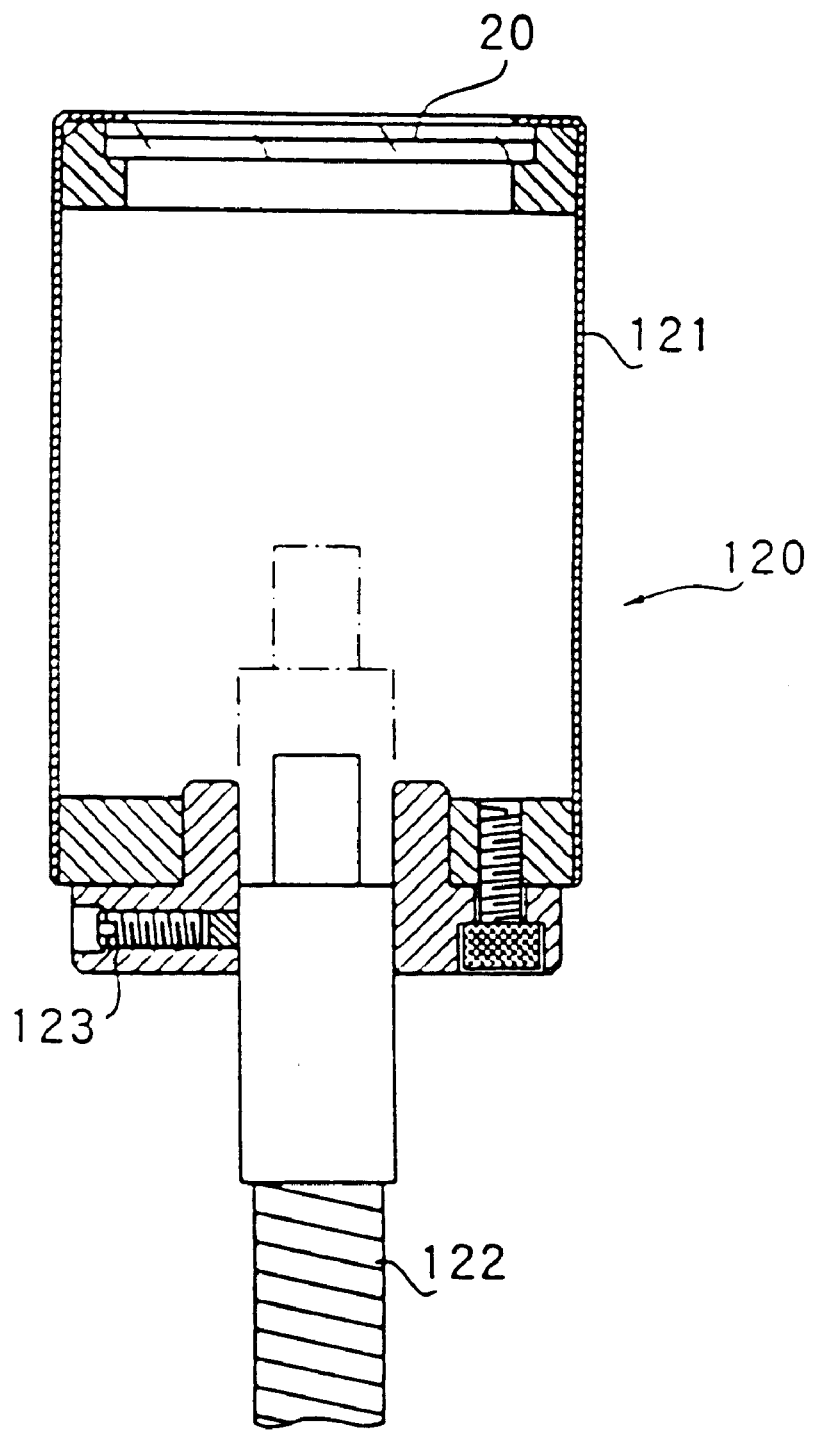
FIG. 13 is a sectional view of a lighting unit of the apparatus shown in FIG. 11.

In the lighting unit 120, as illustrated in FIG. 13, an optical fiber 122, which transmits light from the light source 10, is introduced to the inside of a casing 121 of the lighting unit 120, via the bottom of the casing 121, and at an upper opening of the casing 121, the diffusing means 20, in the form of a single plate, is mounted. The central portion of the diffusing means 20 (corresponding to the second diffusing plate 22 and the central portion of the first diffusing plate 21) has a low diffusion transmittance, and the peripheral portion of the diffusing means 20 (corresponding to the peripheral portion of the first diffusing plate 21) has a high diffusion transmittance. A variety of diffusing means 20, in the form of plates, are prepared so as to correspond to the plan shape of the lens to be inspected.

One end of the optical fiber 122 is secured to the casing 121 by a set screw 123, and by loosening the set screw 123 it is possible to vary the length of insertion of the optical fiber 122 within a range indicated by the solid and broken lines in FIG. 13. Since the emission angle of light emitted from the optical fiber 122 is fixed, if the length of insertion of the optical fiber 122 is varied, an effect similar to that caused by varying the distance between the light source 10 and the diffusing means 20 will result, and therefore the ratio of the emissive quantity of light from the central and peripheral portions of the diffusing means 20 can be adjusted.

The first diffusing plate 21 of each diffusing means 20 has a standard shape which is positioned in the upper opening of the lighting unit 120, as shown in FIG. 14(A). On the surface of the first diffusing plate 21 the sheet-shaped second diffusing plate 22, which defines the central portion of the diffusing means, is adhered, as shown in FIG. 14(B). A light intercepting mask 23, which intercepts light outside the outer periphery of the peripheral portion of the diffusing means, is then adhered as shown in FIG. 14(C).

Figure 15:
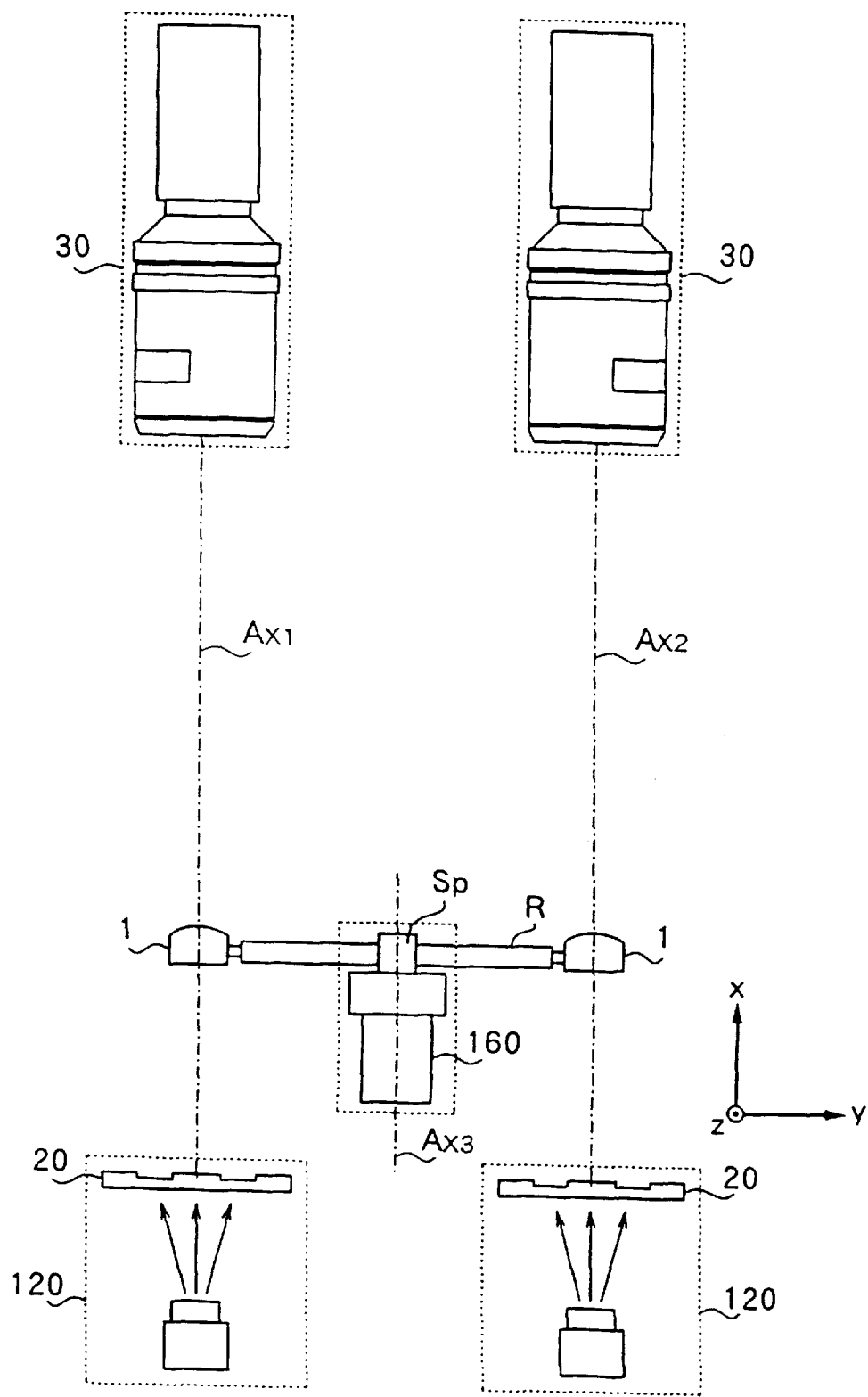
FIG. 15 is a schematic view showing a relationship between lenses to be inspected, in a state connected to runners, set in a lens supporting unit of the apparatus shown in FIG. 11, and inspection optical systems on the right and left of the apparatus.

FIG. 15 is a schematic view illustrating the position of the lenses 1 to be inspected when set in the lens supporting unit 160 in the state when connected to the runners R, and the inspection optical systems (provided on the right and left of the apparatus). The lenses 1 are held in such a manner that the end of the spool Sp is inserted into the insertion bore at the top end of the lens supporting unit 160, and are rotatively supported around a rotational axis Ax3, which is parallel to the optical axes Ax1 and Ax2 of the left and right inspection optical systems. The distance between the optical axes Ax1 and Ax2 is adjustable by operating the position adjusting means 113. By adjusting the distance between the axes Ax1 and Ax2, each of the axes Ax1 and Ax2 is adjusted so that they approximately coincide with the optical axes of the lenses 1 to be inspected.

The following description will be made in regard to the initial setting of the two inspection optical systems. Both inspection optical systems are designed to be capable of inspecting under different focal conditions, i.e., the focal point of each optical system can be different, on the assumption that the dust or flaw to be inspected is located along different positions in the optical axes Ax1 and Ax2.

If a lens to be inspected is a lens for a finder on which a mark (e.g., a visual field frame which specifies the range of a visual field of a finder, or an AF frame) is formed on a plane surface of the lens, for example, the criteria used for judging whether there is a defect on the plane surface of the lens is stricter than that used to judge whether there is a flaw or dust at any other position on or in the lens, since is not desirable for a finder frame or an AF frame to be viewed together with a defect through a view finder. Thus, it is preferable that the depth of field of one of the inspection optical systems is capable of being reduced so that only the defect on the plane surface may be enhanced, and therefore such a defect may be detected separate from another defect.

Therefore, in the case of inspecting such a lens for a finder, by focusing on the plane surface in such a manner that the depth of field of the left inspection optical system is reduced (i.e., the aperture is opened wider), the purpose of the left inspection optical system is to solely enhance the defect on the plane surface of the lens, and at the same time, the depth of field of the right inspection optical system may be increased (e.g., F=11), so as to detect dust and flaws at positions other than the plane surface of the lens to be inspected.

According to the setting of the focal condition (aperture) as mentioned above, each inspection optical system has a different ratio of high to low luminance of light, i.e., the ratio of light emitted from the peripheral and central parts of the diffusing means 20. Namely, in the left inspection optical system (wide aperture), the ratio of high luminance light (i.e., that light emitted from the peripheral portion of the diffusing means 20) is relatively high compared to the low luminance light emitted from the central portion, while in the right inspection optical system (small aperture), the ratio of low luminance light emitted from the central portion is relatively high.

In the case that the ratio of light emitted from the peripheral portion of the diffusing means is high and the ratio of light emitted from the central portion is low, the average luminance of the lens image forming portion will be low, while in the case of having a scatterable defect which scatters incident light, the difference between the average luminance and that light having high luminance incident on the defect will become wider, and therefore the ability to inspect a scatterable defect will increase. However, since the average luminance is low, in the case of having an absorptive defect which absorbs incident light, the difference between the average luminance and that light having low luminance incident on the defective part will become narrower, and therefore the ability to inspect for the absorptive defect will decrease.

On the other hand, in the case that the ratio of light from the peripheral portion is rather low and the ratio of light from the central portion is rather high, the average luminance of the lens image forming portion will increase, while in the case of the existence of an absorptive defect which absorbs incident light, the difference between the average luminance and that light having low luminance incident on the defect will become wider, and therefore the ability to inspect for an absorptive defect will increase. In this case however, the ability to inspect for a scatterable defect will decrease.

The ratio of light emitted from the central and peripheral portions of the diffusing means, can be varied, not only by altering the focal conditions (i.e., aperture), but also by varying the position of the emission end of the optical fiber 122 in the lighting unit 120, or by moving the whole of the lighting unit 120 in the X-axis direction.

The following discussion will be directed towards an inspecting operation using the above apparatus of the present embodiment, with reference to the accompanying flow charts. To prepare for the inspection of a lens, information regarding the lens to be inspected is loaded in the form of a data table in a controller 170, consisting of a computer or the like, connected to the main apparatus 100. In addition, appropriate diffusing plates are selected according to the information, and at the same time the magnification of the CCD camera 30 is appropriately set.

INSPECTION ROUTINE

Figure 16:
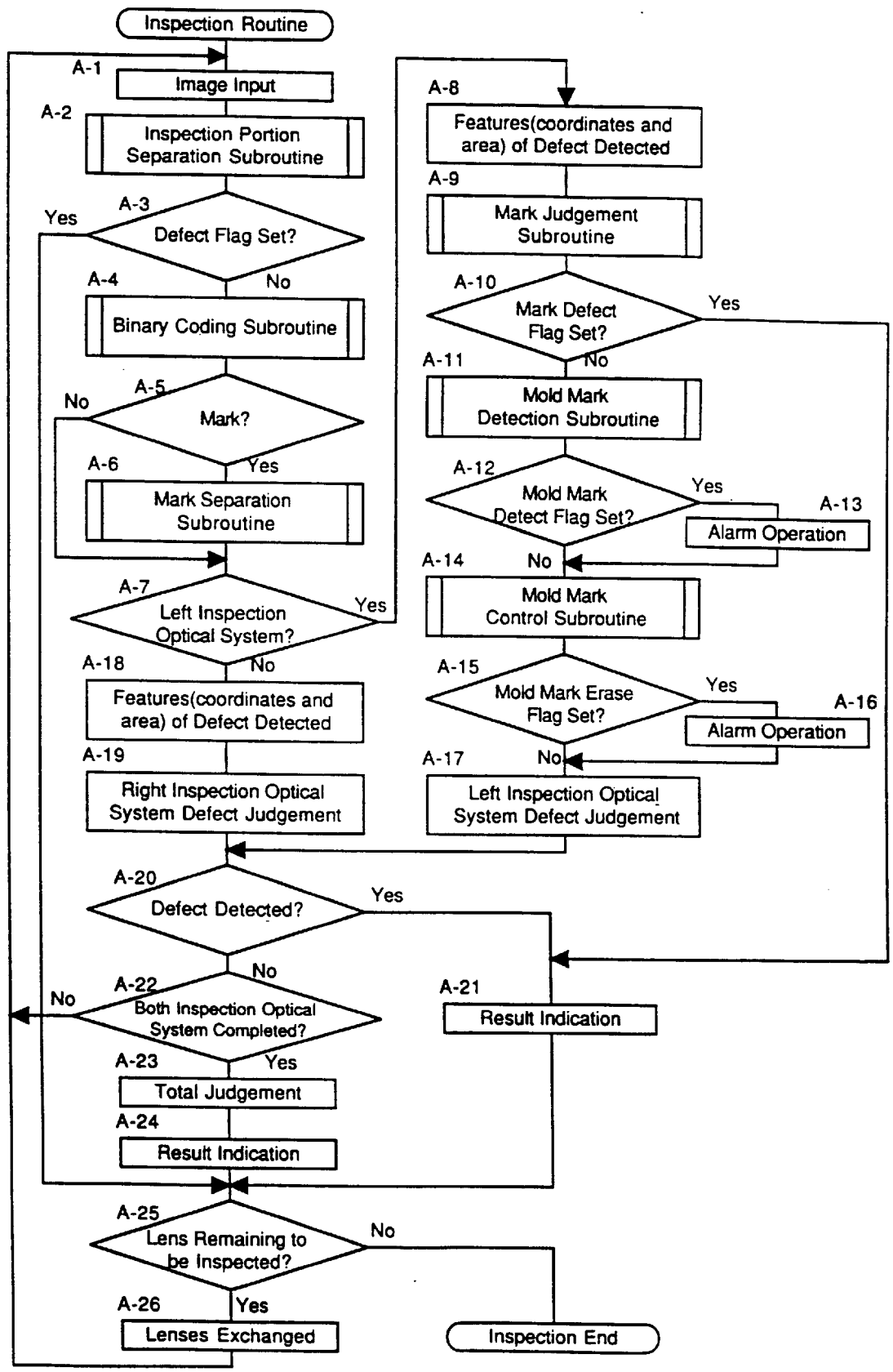
FIG. 16 is a flow chart showing the Inspection Routine of the apparatus shown in FIG. 11.

The overall inspection routine of the present embodiment is shown in the flow chart of FIG. 16. At A-1, a picked-up image, which may include an image of a lens 1, is input from the CCD camera 30, and at A-2 (Inspection Portion Separation Subroutine, shown in FIG. 17) a portion corresponding to the image of the lens 1 to be inspected (i.e., inspection portion) is separated from the input image according to the distribution of luminance.

If the lens 1, which should be inspected during the separation of the inspection portion, is not positioned at the specified inspection position, a defect flag is set during the separation process, and in the inspection routine, the decision as to whether the inspection should be continued or not is made according to whether the defect flag is set or not (at A-3).

At A-4 (Binary Coding Subroutine, shown in FIG. 20), the separated image of the inspection portion is separated by dynamic binarization into the scatterable defect, having a luminance higher than the average luminance, and the absorptive defect, having a luminance lower than the average luminance, and at A-5 it is checked whether there is a mark, and at A-6 (Mark Separation Subroutine, shown in FIG. 21), the mark of the visual field frame or the AF frame is separated from the binarized image, if required, and the respective judgements are executed by each of the left and right inspection optical systems.

The processes of inspection according to an image of the left inspection optical system are shown at A-8 through A-17, and the processes of inspection according to an image of the right inspection optical system are shown at A-18 and A-19. In each inspection, the features of the defect (e.g., the coordinates and area) are extracted (drawn) from a binary image of the separated inspection portion and accordingly it is judged whether the lens 1 is defective or not. If a defect is detected by any of the inspection systems, even if the other inspection system has not completed its inspection, the result is indicated and the inspection of the lens 1 is discontinued, as shown at A-20 and A-21.

If no defect is detected in either the left or right inspection system regarding one common lens 1, at A-22 through A-24, a total judgement from the results of both inspections is indicated, and at A-25 and A-26, the inspection is continued for the remaining lenses to be inspected, until there is no lens left to be inspected. At A-21 and A-24, during the indication of the total judgement, if the lens to be inspected is defective, a mark indicating the defect is stamped thereon by the marking unit 140.

Figure 23:
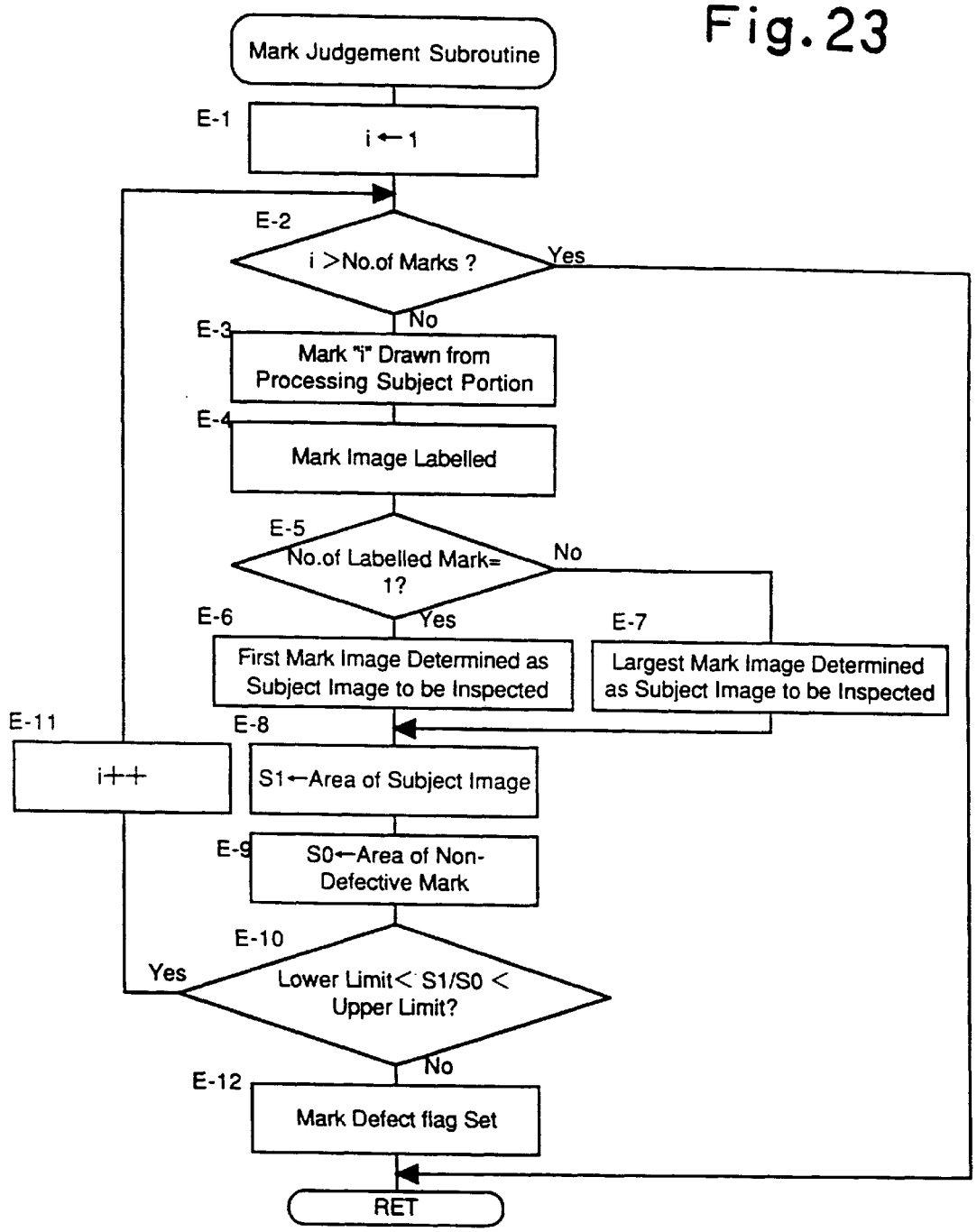
FIG. 23 is a flow chart showing a Mark Judgement Subroutine of the Inspection Routine shown in FIG. 16.
Figure 24:
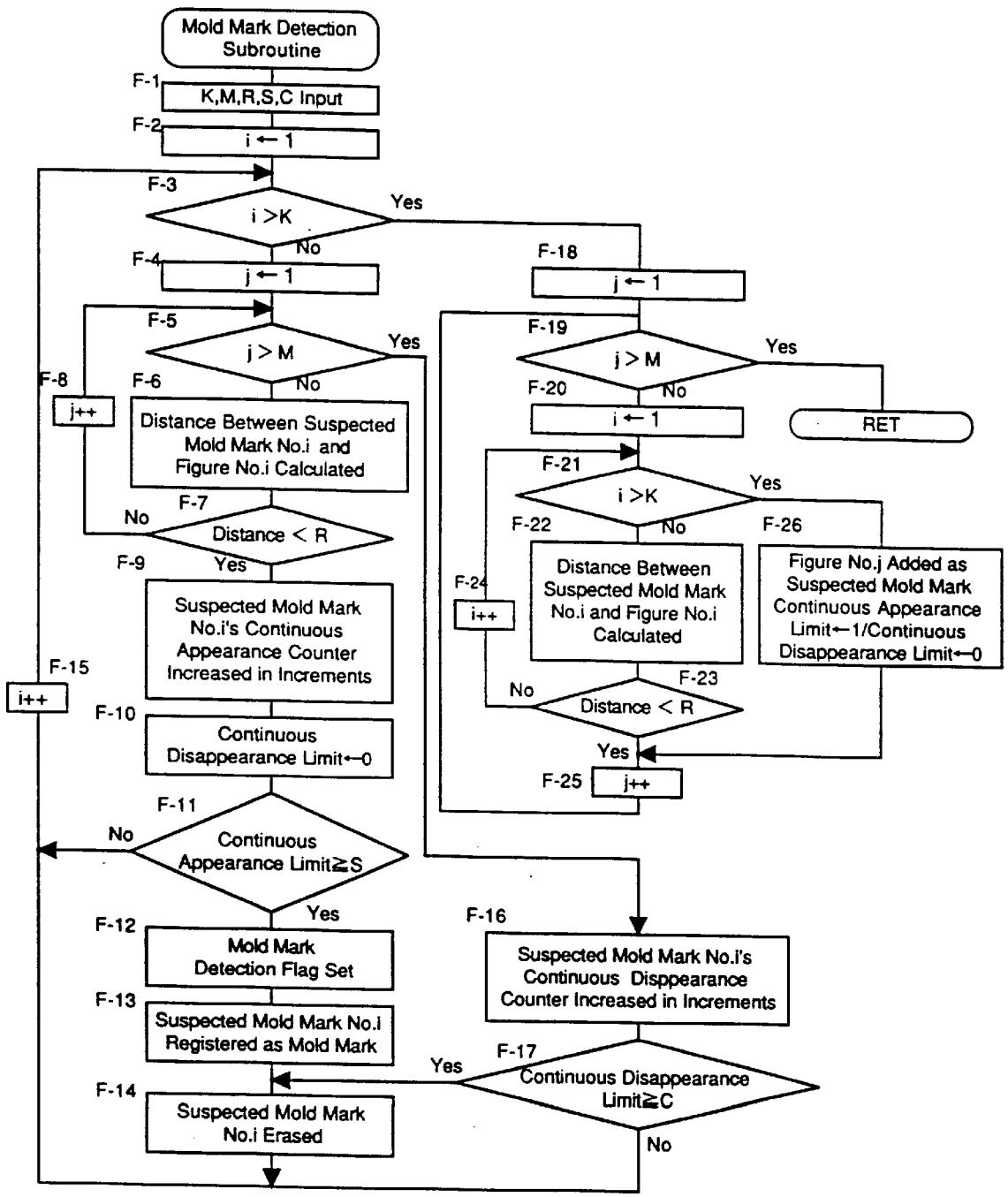
FIG. 24 is a flow chart showing a Mold Mark Detection Subroutine of the Inspection Routine shown in FIG. 16.
Figure 25:
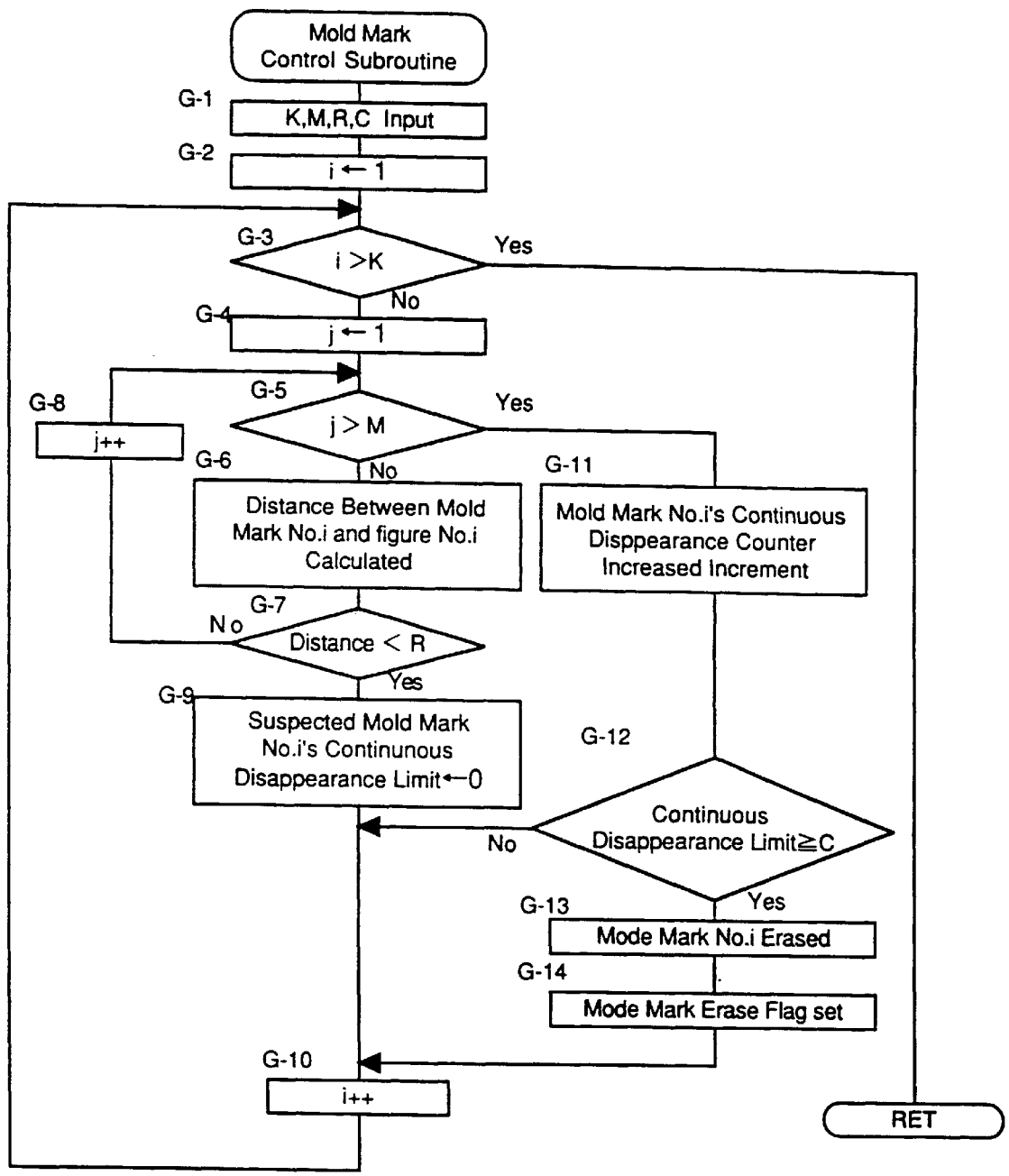
FIG. 25 is a flow chart showing a Mold Mark Control Subroutine of the Inspection Routine shown in FIG. 16.

The processes for the left inspection optical system are, at A-9 (Mark Judgement Subroutine, shown in FIG. 23) a judgement as to whether one of the parts of the lens designated as a mark (i.e., the AF frame etc.) is a defect is made by separating the marks from the lens, and at A-11 through A-16 (Mold Mark Detection Subroutine, Mold Mark Control Subroutine, respectively shown in FIGS. 24 and 25) whether a mold mark, i.e., a hollow-shaped or projection-shaped defect formed on the lens caused by either a chip of plastic or a scratch being on the mold, is present, is judged. If a mold mark is appears or disappears, an alarm is sounded to notify the inspector.

The following description will be directed towards each of the subroutines included in the flow chart of FIG. 16.

INSPECTION PORTION SEPARATION SUBROUTINE

In the Inspection Portion Separation Subroutine (inspection portion separation process), the image of the inspection portion is extracted (drawn) from the input original image of the lens, to separate the inspection portion from the background area. Necessary data including the original image, the threshold values of scanning in X-axis and Y-axis directions, the threshold value to separate the inspection portion from the background area, the size of the lens 1 to be inspected, the designated value of the effective aperture of the lens 1, and the designated value of the judging area, is input to the inspection apparatus.

Figure 17:
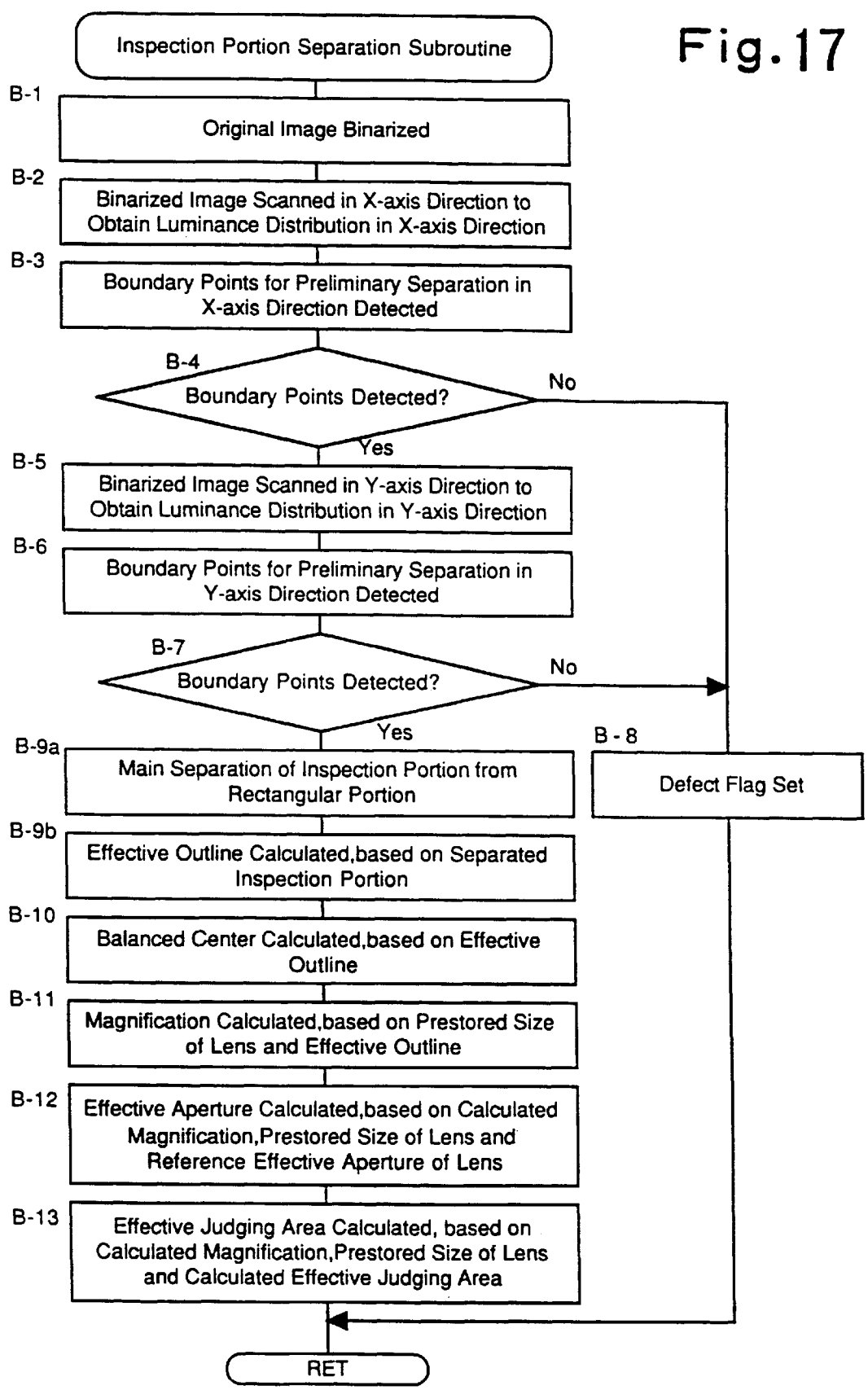
FIG. 17 is a flow chart showing an Inspection Portion Separation Subroutine of the Inspection Routine shown in FIG. 16.

As illustrated in FIG. 17, at B-1, the original image input from the CCD camera 30, is firstly binarized using the threshold value between the high luminance background area and the middle luminance inspection portion.

Then at B-2 through B-7, the binarized image is scanned in the X-axis and Y-axis directions (perpendicular to each other), and the luminance distribution of the image in each direction is calculated, and accordingly the boundary points (i.e., boundary points for the preliminary separation process) of each luminance distribution are detected, subsequently it is judged whether the boundary points of the luminance distribution in the X-axis and Y-axis directions are successfully detected.

The luminance distribution of the image is the sum total of the luminance of pixels sharing the same coordinate positions in the X-axis or Y-axis direction. In the case of the apparatus of the first embodiment of the present invention, if the lens 1 to be inspected is set in place, since it is possible to obtain an image, such as shown in FIG. 18(A), which includes middle luminance inspection portion S (indicated by hatching in FIG. 18(A)) in the high luminance background area B, the distribution of the image of the binarized image in each direction (X, Y) is as shown in FIGS. 18(B) and (C), and therefore, by detecting the boundary points of the luminance distribution, a limited portion including the inspection portion can be extracted in the form of a rectangle as indicated by the dashed line in FIG. 18(A).

On the other hand, if the lens 1 to be inspected is not set in place (FIG. 19(A)), since the luminance distribution of the image thereof is uniform as shown in FIGS. 19(B) and (C), it is impossible to detect the boundary points of the luminance distribution. Therefore, by judging whether the boundary points are calculated or not, it is possible to judge whether the lens 1 is set in place or not.

The processes at B-1 through B-7 show the preliminary separation process of the inspection portion, and with such a process if the boundary points are not detected at one of the inspections in the X and Y axes directions, a defect flag is set at B-8 and the process returns to the Inspection Routine. However, if the boundary points are detected in both the inspections in the X-axis and Y-axis directions, the main separation process commences.

In the main separation process, based on the data of each boundary point, obtained by the above-mentioned preliminary separation process, and the data of the shape of the lens to be inspected (input in advance), the inspection portion, which coincides with the actual lens to be inspected, is separated from the rectangular-shaped limited portion which was separated in the preliminary separation process. Since the portion to be inspected on the original image has already been limited, in the preliminary separation process, to the portion which only includes the approximate inspection portion, i.e., the rectangular-shaped limited portion in FIG. 18(A), it is possible to execute the main separation at high-speed and with high-accuracy.

At B-9 through B-13, the effective outline of the inspection portion and the balanced center thereof are calculated, and according to the size of the lens to be inspected, the reference effective aperture of the lens, the reference judging area, the magnification of the CCD camera 30, effective aperture and the effective judging area are calculated.

As described above, in the Inspection Portion Separation Subroutine of the present embodiment, since it is possible to judge whether a lens to be inspected is set in position in the preliminary separation process, where the amount of processing is lower than that of the main separation process, it is possible to judge the defect promptly, as compared to judging the same only after the inspection portion separation process has been entirely executed, it is possible to judge whether the lens is set in place or not promptly, and thus expedite the inspection process in the case where there are a large number of lenses to be inspected.

BINARY CODING SUBROUTINE

In the Binary Coding Subroutine (binary coding process) the features of the defect are drawn from the image of the inspection portion that is obtained by the above inspection portion separation process. Data necessary for the Binary Coding Subroutine, such as, the original image, the effective aperture of the inspection portion, a luminance shift value on the side of low luminance and a luminance shift value on the side of high luminance, etc., are input.

Figure 20:
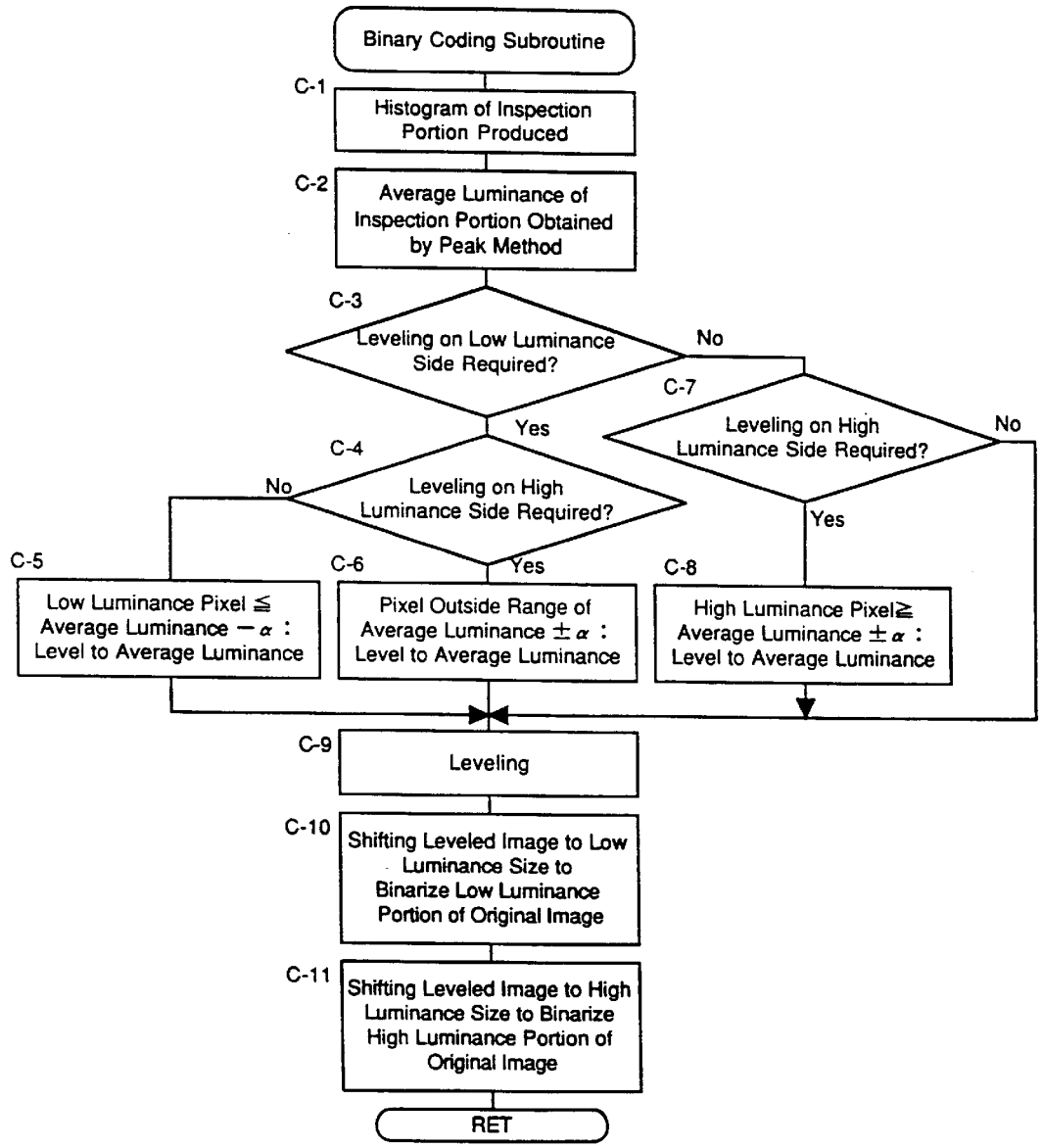
FIG. 20 is a flow chart showing a Binary Coding Subroutine of the Inspection Routine shown in FIG. 16.

As shown in FIG. 20, at C-1 a histogram of pixels forming the image of the inspection portion, obtained in the inspection portion separation process, is produced, and at C-2 the threshold value thereof according to the peak method is calculated, as the average luminance of the inspection portion.

At C-3 through C-8, according to the type of lens being inspected or the content of inspection, that part of the inspection portion having a significantly different luminance from the rest of the inspection portion, may be replaced by the average luminance. Replacement by the average luminance is made by leveling the significantly different luminance prior to the formation of the threshold value image, to be used in the dynamic binarization.

In the present embodiment, the image which is produced by leveling the original image is shifted according to the luminance shift value, which is predetermined according to the type of lens being inspected, to be used as the threshold value image in the dynamic binarization. However, if the leveled image obtained by merely leveling the original image is used as the threshold value image, if a defect exists which causes a luminance value having a large peak in the original image, there is a possibility that a defect having a small peak in the vicinity of the large peak, may not be detected. For example, if there is a defect in the original image having a high luminance value (peak) significantly different from the average luminance, even though the peak luminance of the defect may be leveled, i.e., become lower, the luminance of the area around the defect may be slightly raised. Subsequently, if the threshold value image is formed by shifting the leveled image by the luminance shift value, the threshold value of area around the defect may become higher, and there is a possibility that the high luminance defect having a small peak, positioned near to the large peak, may not be detected. Such a problem may also occur with low luminance peaks.

The processes at C-3 through C-8 are those for the purpose of preventing the above problems. However, according to the type of optical member being inspected there may be cases when the replacement of luminance is not necessary at all, or is only necessary on the side of low luminance, or is only necessary on the side of high luminance, or is necessary both on the sides of high and low luminance. If the replacement of luminance is executed prior to leveling, the duration of the inspection will increase according to the time required for such processing, and therefore replacement is only executed when required.

If a defect resulting in a high luminance, namely a scatterable defect, is not to be inspected, the replacement is only undertaken at C-5 for low luminance values having a value below the average luminance by a designated value α.

If a defect resulting in a low luminance, namely an absorptive defect, is not to be inspected, the replacement is only undertaken at C-8 for high luminance values having a value above the average luminance by a designated value α. If both scatterable and absorptive defects are to be inspected, the replacement is undertaken at C-6 for both high and low luminance values outside the range of ±α.

If the criteria for judgement is not strict and if it is sufficient only to be able to detect a defect having a luminance significantly different from the average luminance, since it is possible to detect the defect by specifying the luminance shift value to be large, the luminance is not replaced.

After the above-mentioned prior processing, the leveled image is formed by the replacement of average values, and by shifting the specified luminance shift value to the sides of low luminance and high luminance respectively, corresponding to the lens to be inspected, the threshold value images on the sides of low luminance and high luminance are formed.

Then, by comparing these threshold value images with the original image, by the method of floating the threshold value, at C-9, C-10 and C-11, dynamic binary processing is executed, and low and high luminance defects are respectively encoded as binarized images.

Using the above two types of binary processes, the two binarized images are obtained, as shown in FIGS. 7(B) and (C). From the respective binarized images, portions corresponding to the respective types of defect are detected as images, and according to the respective criteria it is judged whether each detected defect is allowable or not. In judging the defect of the optical member, since the criteria varies depending on the types of defect, it is possible to accurately judge by the separate judgement for each type of defect as described above.

If the threshold value used in the above dynamic binary process, is not appropriately specified, the following problems will arise, namely if inspection sensitivity is too high, unnecessary information may be detected in the judgement process, e.g., a minute flaw, therefore the judgement process subsequently executed may become over complicated, on the other hand, if inspection sensitivity is too low, flaws which should be considered as defects may not be detected, and therefore the judgement process may become inaccurate.

Therefore in the present embodiment, in order that the result of coding obtained by dynamic binarization may become the appropriate level for subsequent processing, the luminance shift values on the low and high luminance sides are registered beforehand according to the type of optical member being inspected, and during inspection the luminance shift values are read out according to the type of optical member.

MARK SEPARATION SUBROUTINE

The Mark Separation Subroutine (mark separation process) is undertaken during the inspection of an optical member having a mark formed thereon. In the Mark Separation Subroutine, information regarding a position and an area of a mark and the like are stored beforehand, in order to separate the portion having the mark from the original binarized image of the inspection portion.

Regarding a lens for a finder of a camera, there are often marks in the form of visual field marks (i.e., a visual field frame) which define the field of view, or autofocus marks (i.e., an AF frame) which define a range of autofocusing in the field of view, formed on the lens. These marks project slightly from the surrounding surface of the lens, due to a corresponding hollow formed on the mold used for forming the lens. Since light incident on the mark portion scatters, the mark portion is seen as a darker image than the rest of the surface of the lens and thus may be seen as a frame in the visual field of the finder.

During an inspection for a defect, since a mark portion has characteristics similar to those of a scatterable defect there is a possibility, when the lens having a mark on it is inspected, that the mark portion is erroneously recognized as a defect, in the case where even a minute portion of the image of the mark remains in the inspection portion, and thus the lens will be judged defective accordingly. In the case of a lens for a finder on which a mark is formed, after assembly of the finder, since the surface on which the mark is formed is positioned on the focusing plane, even a slight defect will be visible together with the mark. Due to this, the criteria for judging whether a defect exists is strict. Therefore, during an inspection of an optical member having a mark portion, it is necessary to thoroughly separate the image of the mark portion from the inspection portion beforehand.

Input data necessary to undertake the Mark Separation Subroutine includes binarized original image data, balanced center of the original image data, outline data, reference (ideal) mark image data and balanced center data thereof, data regarding the number of times a mask is expanded, and data regarding the number of marks.

The Mark Separation Subroutine will now be described with reference to FIGS. 21 and 22.

Figure 21:
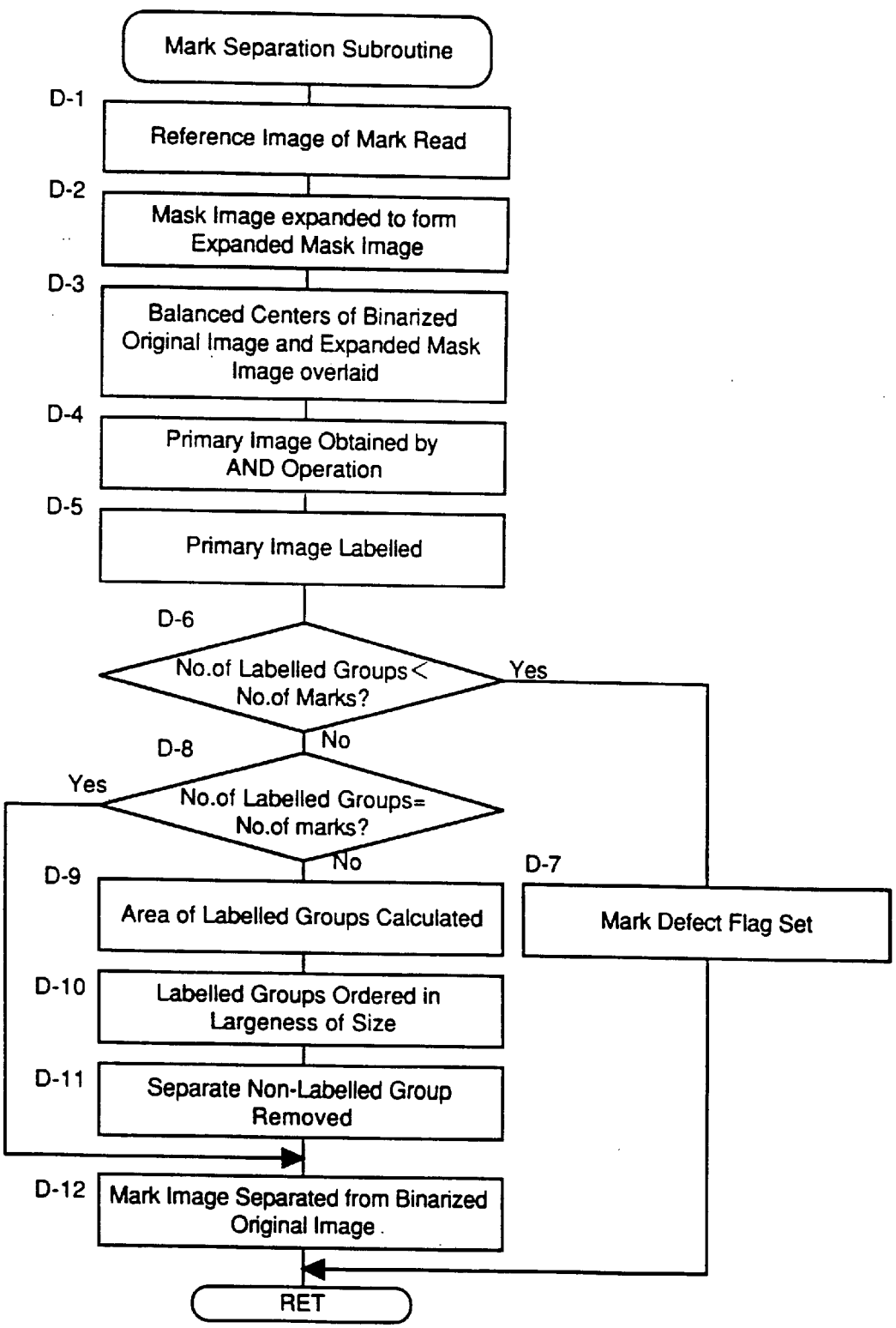
FIG. 21 is a flow chart showing a Mark Separation Subroutine of the Inspection Routine shown in FIG. 16.
Figure 22A:
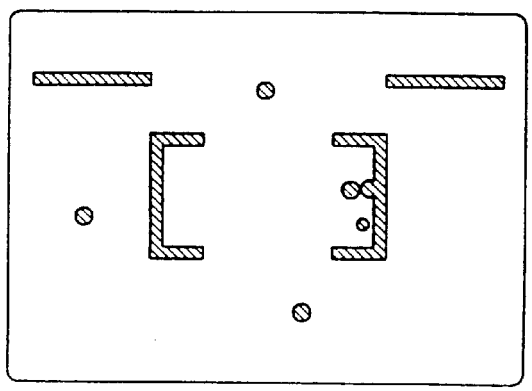
FIGS. 22(A)–(F) are schematic views of binary images showing a mark separation process.
Figure 22D:
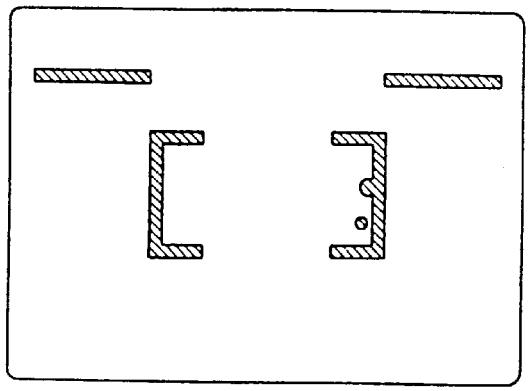
Figure 22B:
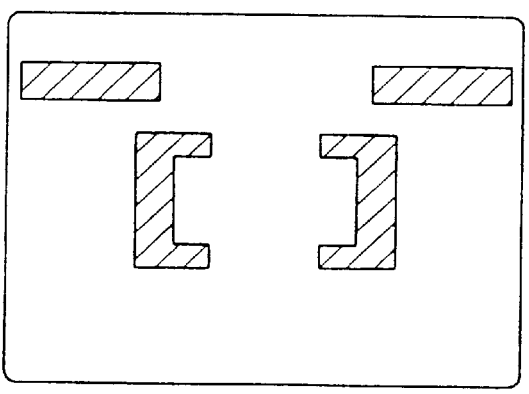
Figure 22E:
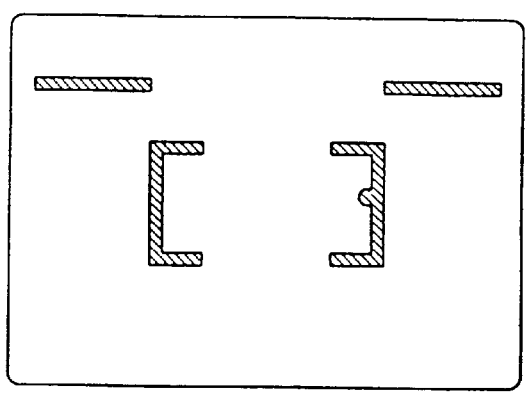
Figure 22C:
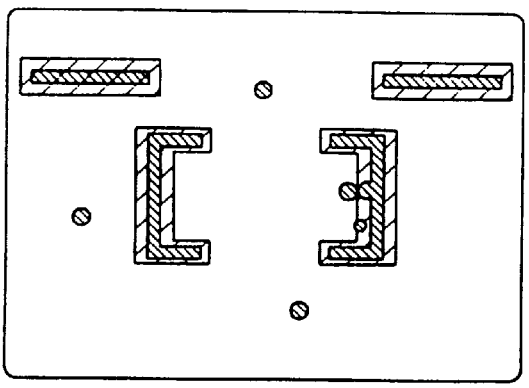

In FIG. 21, firstly, a reference image of the mark is read as a mask image, and an expanded mask image is formed by expanding the reference mark image at D-1 and D-2. FIG. 22(A) illustrates the binarized original image, and FIG. 22 (B) illustrates the expanded mask image. The binarized original image and the expanded mask image are overlaid so that their balanced centers coincide at D-3, as shown in FIG. 22(C). By calculating the logical multiplication (i.e., an AND operation) of each pixel, at D-4, a primary image is obtained as shown in FIG. 22(D), by removing those defects which are not covered by the expanded mask image. In the AND operation two corresponding binarized images are compared pixel by pixel to form a new image, in such a manner that the density of a pixel shall be "1" if the density of at least one of the pixels is "1", and the density of a pixel shall be "0" if the density of both pixels is "0". Due to the mask image being expanded, it is possible to cover the binarized original image even if the binarized original image is slightly out of position due to an error in the image being picked-up, etc. In the expansion process the density of the pixels close to the boundary of the mark portion is converted so as to have the same density as the mark portion. In the present embodiment, due to possible image pick-up errors, three expansions will be executed.

At D-5, a labelling process is undertaken, in which figures (i.e., marks and defects) included in the primary image (FIG. 22(D)) are respectively divided into groups and numbers are allocated to the respective groups, i.e., each group is labelled. At D-6, the number of labelled groups is compared with the number of marks input beforehand (i.e., four marks in this example), and if the number of labelled groups is less than the number of marks, it means that at least two marks have been recognized as a combination. At D-7 a mark defect flag is set and control returns to the Inspection Routine.

If the number of labelled groups is more than the number of marks input beforehand, it means that a defect exists, separate from the mark portion, in the mask portion. In this case, at D-8 through D-11, the areas of the labelled groups are respectively calculated, and the labelled groups, equal to the number of marks, are ordered in largeness of size. Since the mark portion may be assumed to be larger. than the separate defect remaining in the primary image (FIG. 22 (D)), the separate defect can be removed, as shown in FIG. 22(E).

However, if a defect and a mark portion have been combined and can not be separated, the combination will be recognized as a mark. In a mark judgement process, described below, since a judgement as to whether a defect exists is made by comparing the areas of the drawn (extracted) mark portion with a reference (ideal) portion thereof, in the case that the size of the defect, that has been combined with the mark, is large, the mark itself will be judged defective.

Figure 22F:
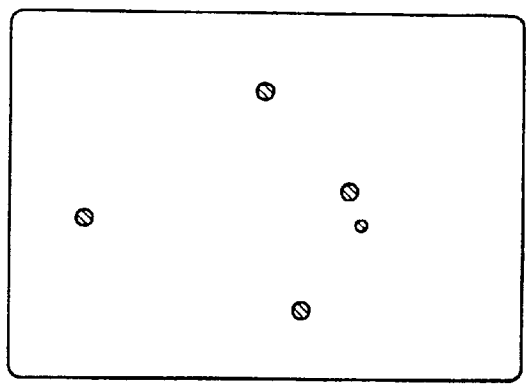

At D-12, the mark image is separated from the original image, as shown in FIG. 22(F). At D-8 and D-12, if the number of marks is equal to the number of labelled groups, the primary image is used as the mark image, since it means that a separate defect does not exist in the mask portion.

MARK JUDGEMENT SUBROUTINE

In the Mark Judgement Subroutine (mark judgement process) it is judged whether a mark formed on the surface of the optical member to be inspected is defective, based on a comparison between the ratio of the area of the mark and the area of a reference (ideal) mark. The mark judgement process requires the following data to be input, namely, data concerning the processing subject portion corresponding to the respective marks, data concerning the mark image separated in the mark separation process, data concerning the number of marks, reference mark area data, and upper and lower allowable limits of the ratios of the area of the mark.

In the flow chart in FIG. 23, at E-1 "i" is set to equal 1, and at E-2 it is checked whether the number of marks is less than "i", and if not control proceeds to E-3. At E-3 through E-8, a mark having the order numeral "i" is drawn from the processing subject portion, and the area S1 thereof is calculated. During the calculation of the area, figures, i.e., marks and defects, in the processing subject portion are labelled, at E-4 through E-7, the figure having the largest size is recognized as the mark. Even if a separate defect is included in the mark image drawn (extracted) in the mark separation process, the defect will be removed by the above process.

On the assumption that the area of the mark having the order numeral i is normally S0, at E-9 through E-11, it is judged whether the ratio of S1 and S0 is between the upper and lower limits, and if the ratio is outside the limits the mark defect flag is immediately set and control returns to the Inspection Routine.

In increments of counter i, each mark is judged, and if all the marks are judged to be non-defective, control returns to the Inspection Routine at E-2.

In the case that one mark is defective, the optical member will be judged to be defective and therefore judgement processing will end, without judging the remaining uninspected marks. Accordingly, the duration of the judgement process may be shortened.

MOLD MARK DETECTION SUBROUTINE

In the apparatus of the first embodiment, by using image processing technology, the mold mark is judged from the binarized image by a statistical method. Namely, in the Mold Mark Detection Subroutine (mold mark detection process), shown in FIG. 24, the mold mark is drawn (extracted) from the binarized image by the statistical method, and if a figure continuously exists in substantially the same position for a duration of a counter (initial counter), the figure will be judged to be a mold mark. However, if the figure temporarily disappears, another (second) counter commences counting until reaching a predetermined limit. If after the second counter has reached the predetermined limit, the figure has not reappeared, it is assumed that there is an error in detection, and the initial counter is reset to commence counting as normal, i.e., as if no figure had existed.

In the case that the optical member being inspected is formed by a multi-cavity mold, data regarding the mold mark will be registered for each cavity. The data is readable on demand, depending on which cavity the optical member is being formed in.

At F-1, data is input, namely,. the coordinates of the balanced center of the figure in the binarized image, the number of figures M, the coordinates of the balanced center of the suspected mold mark, the number of suspected mold marks K, the positional error margin R during judgement of identification of figures according to the coordinates of the balanced center, the continuous existence limit of the suspected mold mark (i.e., initial limit) S, and the continuous disappearance limit of the suspected mold mark (i.e., second limit) C.

When inspection commences, the number of suspected mold marks K is set 0, and if a defect which is considered to be a possible mold mark is detected during inspection, that defect will be registered as a suspected mold mark.

In the following processes, at F-2 through F-17, the registered suspected mold mark is used as a reference to judge whether there is a figure identical to the suspected mold mark, and the existing suspected mold marks are registered as mold marks, or are no longer considered to be mold marks, and after completion thereof, new suspected mold marks are added, avoiding an overlap of the counter thereof with the counter of the existing suspected mold marks, as shown at F-18 through F-26. If the number of suspected mold marks and that of the figures are both "0", after processes and judgements at F-1, 2, 3, 18 and 19, control returns to the Inspection Routine without executing any substantial processing.

If a suspected mold mark exists, it is judged whether there is a figure identical to such a suspected mold mark at F-2 through F-8, according to the distance between the coordinates of the balanced center of the suspected mold mark and the coordinates of the balanced center of the figure. If a figure identical to the mold mark exists, within the continuous existence limit, at F-9 and F-10, the continuous appearance counter is counted in increments and the continuous disappearance counter is reset to 0.

If the number of the continuous appearance counter has reached the continuous existence limit S, at F-11 through F-14, it is judged that a mold mark exists and the mold mark flag is set and the suspected mold mark is registered as a mold mark. The registered data includes the coordinates of the balanced center of the mold mark, the molded lens identification number of the detected lens, and data regarding which inspection optical system, i.e., the right or the left, the image was picked-up in.

At F-5, F-16, F-17 and F-15, even though all the figures are inspected, if there is no figure coincident to the corresponding suspected mold mark, the continuous disappearance counter is counted in increments, and if the continuous disappearance limit is exceeded before the existence of a figure corresponding to the suspected mold, the suspected mold mark is erased, and if the continuous disappearance limit has not been reached the inspection is continued.

After all the suspected mold marks have been inspected, at F-18 through 25, it is judged whether there is a coincident suspected mold mark, in regard to each of the figures, and at F-26, in regard to the figure having no identical suspected mold mark, it is added as a new suspected mold mark.

In the above process, it is possible to detect the existence of a mold mark by statistical estimation.

MOLD MARK CONTROL SUBROUTINE

The Mold Mark Control Subroutine (mold mark control process) is used to detect the disappearance of an existing mold mark. Plastic adhering to the mold, which may be the cause of the mold mark, may be exfoliated from the mold by the adhered molding product during molding, and in the case of an existence of a mold mark in the mold mark detection process, as long as the mold mark disappears immediately after it comes into existence, it is not necessary to feed information about it back to the production line.

The Mold Mark Control Subroutine, shown in FIG. 25 consists of a simplified mold mark detection process. At G-1, the following data is input, namely, the number of suspected mold marks K, the number of figures M, the positional error margin during judgement of identification of figures, and the continuous disappearance limit of the suspected mold mark C.

At G-2 through G-8, it is judged whether there is a coincident figure in regard to each of the mold marks, and in the case that there is a coincident figure, at G-9 and G-10, the continuous disappearance counter is reset to 0, and judgement of the following mold mark commences.

If a coincident figure does not exist, at G-11 the continuous disappearance counter is counted in increments, and if the number of the continuous disappearance counter exceeds the continuous disappearance limit C, at G-13 and G-14, the registration of the mold mark is erased and the mold mark erase flag is set. After inspection of all the mold marks is complete, processing is continued after returning to the Inspection Routine.

In the above Mold Mark Control Subroutine, it is possible to observe if a mold mark detected in the Mold Mark Detection Subroutine (mold mark detection process) continuously exists or not, or is finally erased, and in combination with the mold mark detection process, it is possible to control the mold mark statistically.

As above described, according to the optical member inspection apparatus in the above first embodiment according to a first aspect of the present invention, since it is possible to detect the defect of the optical member being inspected by the method of image processing according to the picked-up image of the optical member to be inspected, it is possible to make objective and uniform judgements regarding the optical member. In addition, by using the diffusing plates having different diffusion transmittances between the central and peripheral portions, it is possible to detect two types of defects in the optical member during a single image pick-up.

FIG. 26 illustrates an overall construction of an optical system and a block diagram of a processing system of a second embodiment of an optical member inspection apparatus according to the first aspect of the present invention. In the second embodiment, instead of the diffusing means 20 of the first embodiment, a liquid crystal panel 200 is used, and a controlling means 60 is used to control the liquid crystal panel 200. The optical system of the second embodiment will now be described with reference to FIG. 26.

The optical system of the inspection apparatus is provided with the light source 10, and the liquid crystal panel 200 which functions as a diffusing means. Reference numeral 1 designates an object, i.e., a positive lens, to be inspected. Light is emitted from the light source 10 and is transmitted through the liquid crystal panel 200 and the positive lens 1, to be incident on the CCD camera 30. The CCD camera 30 serves as an image pick-up means for picking-up an image incident thereon, i.e., that light transmitted through the lens 1 to be inspected.

The liquid crystal panel 200 consists of a large number of elements (pixels) arranged two-dimensionally. The diffusion transmittance of each of the elements of the liquid crystal panel 200 is controllable separately by controlling voltage applied thereto through a controlling means 60. The liquid crystal panel 200 is comprised of a central portion 202 having a low diffusion transmittance, a peripheral portion 201 having a high diffusion transmittance, and a masking portion 203 which intercepts light.

The size of the central portion 202 of the liquid crystal panel 200 is determined such that the width of light emitted perpendicularly (i.e., parallel to the optical axis Ax) therefrom is approximately equal to the width of the lens 1 to be inspected, as can be seen in FIG. 26. With such an arrangement, that light perpendicularly emitted from the central portion 202 of the liquid crystal panel 200 is incident on the lens 1, while that light perpendicularly emitted from the peripheral portion 201 is not incident on the lens 1.

FIG. 27 illustrates examples of plan shapes of lenses to be inspected and the peripheral portion 201 and the central portion 202 of the liquid crystal panel 200 set in positions so as to correspond to the lenses. As shown in FIG. 27(A-1), if the lens to be inspected is a lens 1a for a finder having a rectangular plan shape, it is preferable that the plan shapes of the peripheral and central portions 201, 202 are rectangular as shown in FIG. 27(A-2). While, if the lens to be inspected is a circular lens 1b, it is preferable that the plan shapes of the peripheral and central portions 201, 202 are respectively circular as shown in FIG. 27(B-2). "R" in FIG. 27 indicates a runner of the plastic lens molded by a multi-cavity mold, and "G" indicates a gate.

In the image picked-up by the CCD sensor 32 in the above structure, shown in FIG. 4, there contain high luminance background areas B, chiefly formed by that high luminance light emitted from the peripheral portion 201, and images of the lens 1 (i.e., lens image forming portion) S which is formed by that low luminance light emitted from the central portion 202.

By forming the plan shape of the central portion 202 and the lens 1 to be substantially the same, as above described, it is possible to distinguish between the luminance of the lens image forming portion and the background area of the image, thus resulting in easier separation processing of the subject portion.

Figure 28:
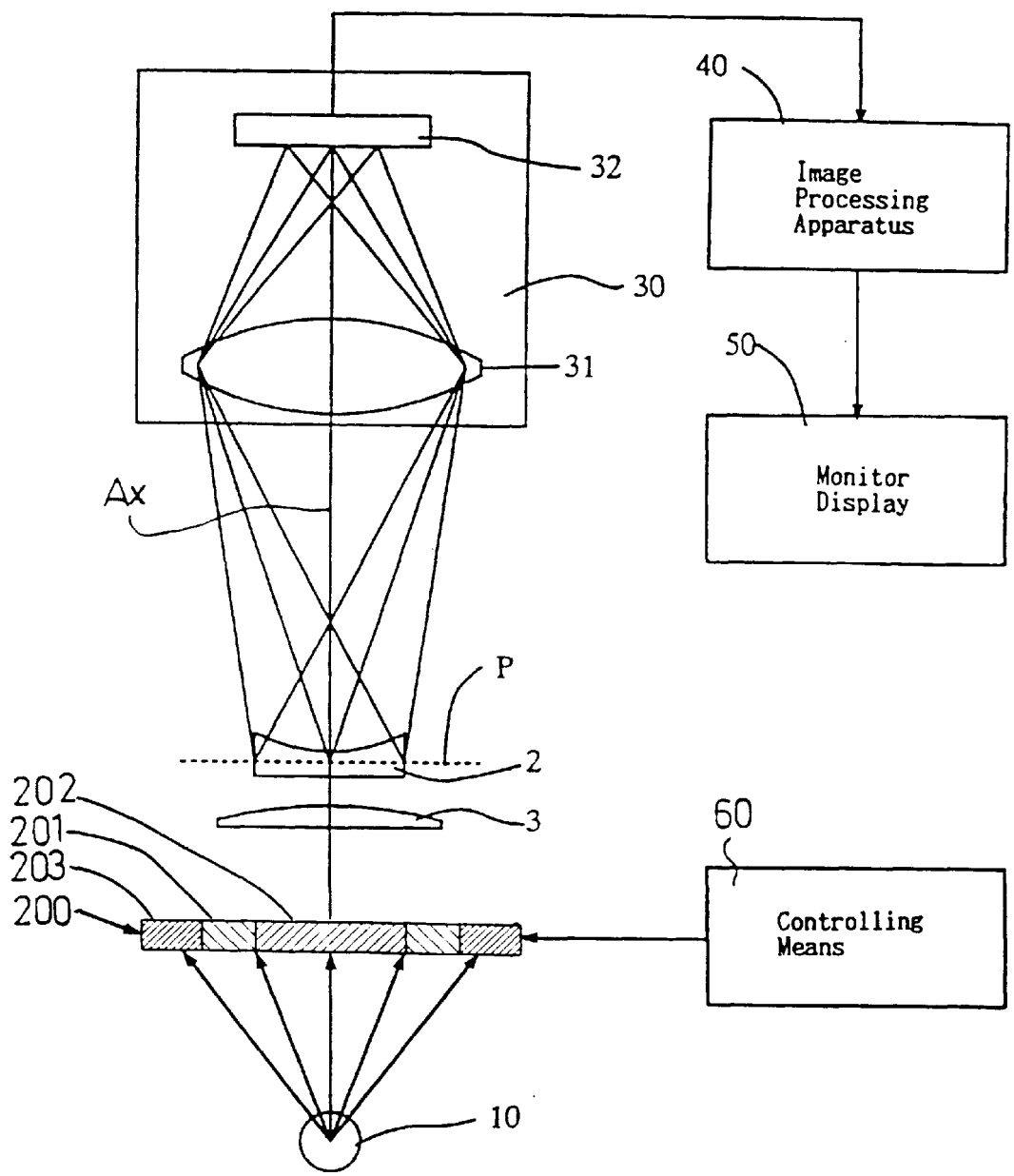
FIG. 28 is a schematic view according to the structure shown in FIG. 26, when a negative lens is inspected by the apparatus of the second embodiment of the first aspect of the present invention.

FIG. 28 illustrates an overall structure of an optical system in regard to the optical member inspection apparatus according to the second embodiment of the first aspect of the present invention, during an inspection of a negative lens 2.

In the example shown in FIG. 26, since the inspected positive lens 1 functions as a condenser lens, that light which is transmitted through the liquid crystal panel 200 and the lens 1 to be inspected, is converged towards the CCD camera 30. On the other hand, if the lens to be inspected is a negative lens, in the case of the structure shown in FIG. 26, that light which is transmitted through the negative lens to be inspected will be scattered, and thus may not be effectively made incident on the CCD camera 30, and thus there is a possibility that the quantity of light is insufficient for the image to be picked-up.

It is for this reason that between the liquid crystal panel 200 and the lens 2 to be inspected, a positive adjusting lens 3, serving as a condenser lens, is positioned to converge (in advance) light to be incident on the lens 2, so that the light transmitted through the lens 2 may travel towards the CCD camera 30, as shown in FIG. 28.

In the case where the adjusting lens 3 is positioned between the lens 2 and the liquid crystal panel 200, it will be necessary to design the size of the central portion 202 to be larger than the central portion shown in FIG. 26, in order to make a part of that light emitted perpendicularly from the central portion 202 only incident on the lens 2 to be inspected, similar to the example shown in FIG. 26.

Figure 29:
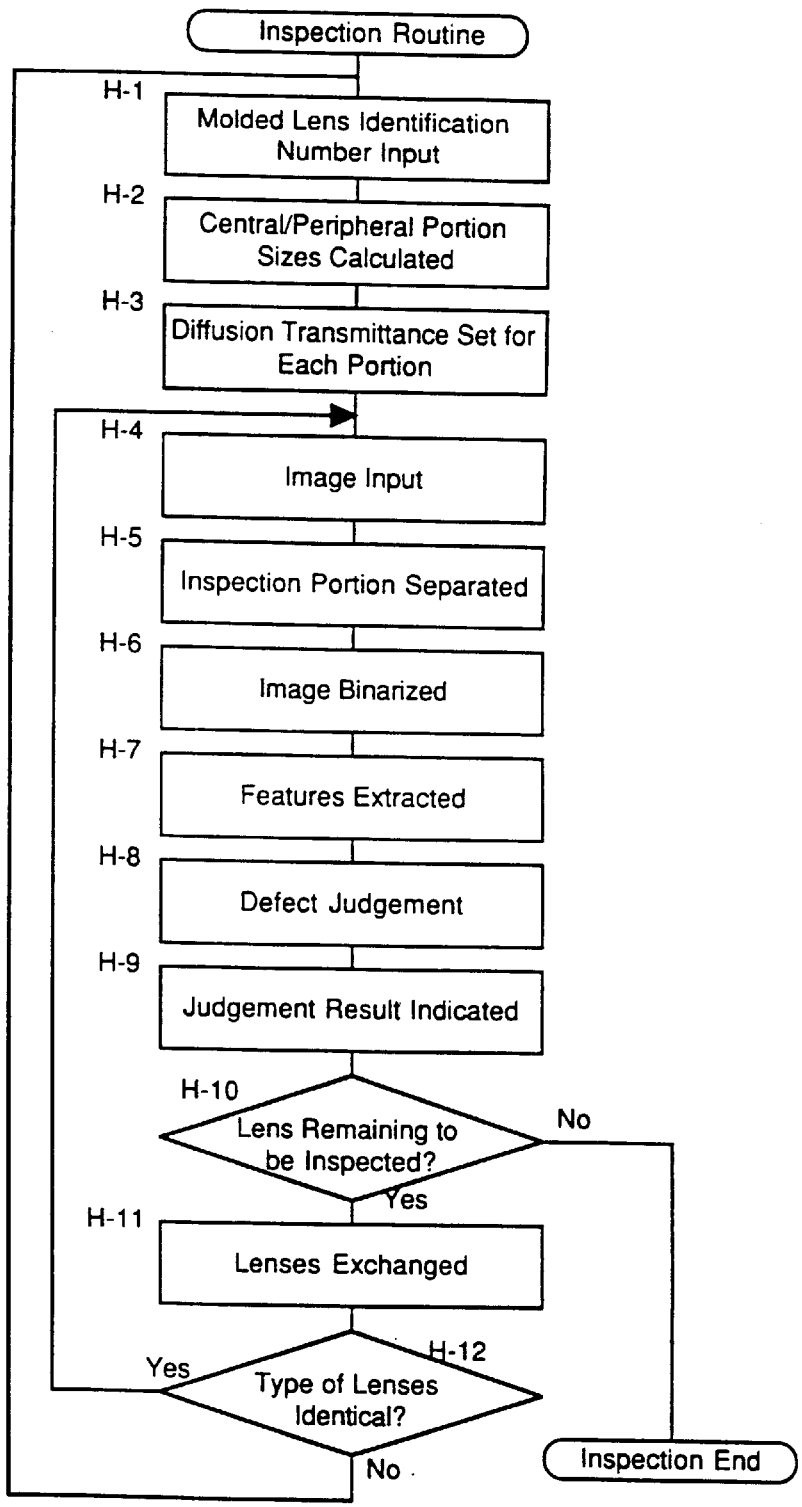
FIG. 29 is a flow chart showing an Inspection Routine of the apparatus shown in FIG. 26.

FIG. 29 is a flow chart showing an Inspection Routine using the inspection apparatus of the second embodiment of the first aspect of the present invention. At H-1, the molded lens identification number is input to the controlling means 60, in order to identify the type of optical member being inspected. The controlling means 60 reads data regarding the size, shape etc. of the lens being inspected from a data table according to the molded lens identification number, and at H-2, the designated size of the peripheral and central portions 201, 202 of the liquid crystal panel 200 are calculated.

By controlling the application of voltage to each element of the liquid crystal panel 200, according to the calculated size of each portion 201, 202, the controlling means 60 specifies the diffusion transmittance at the central portion 202, the peripheral portion 201 and the masking portion to 203 be respectively a%, b%, and 0% (zero percent), at H-3.

Thus the following relationship is defined:

$$0 < a < b < 100 (\%)$$

After the above processing is complete, the light source 10 is lit, and the image processing apparatus 40 inspects the lens according to the image picked-up by the CCD camera 30.

At H-4 the image is input from the CCD camera 30, and the inspection portion corresponding to the image of the lens to be inspected is separated at H-5 according to the luminance distribution.

At H-6, the separated image of the inspection portion is separated by dynamic binarization into scatterable defects, having a luminance higher than the average luminance, and the absorptive defects, having a luminance lower than the average luminance, and at H-7 through H-9, the features (e.g., coordinates and area) of the defect are drawn (extracted) from a binarized image of the separated inspection portion and accordingly it is judged whether the lens being inspected is defective or not. The result of this judgement is simultaneously indicated on a monitor display 50.

At H-10 through H-12, if the lenses are to be inspected sequentially, the inspected lens should be exchanged with a lens to be inspected, and if the new lens to be inspected is the same type of lens as the previously inspected lens, the processes from H-4 are repeated. If the new lens to be inspected is a different type from the previously inspected lens, the processes from H-1 are repeated. When the lenses to be inspected are all inspected, the inspection shall be completed.

As above described, according to the optical member inspection apparatus of the second embodiment according to the first aspect of the present invention, in addition to the effects achieved in the first embodiment, it is also possible to vary the setting (i.e., level of transmittance) of the diffusing means (liquid crystal panel 200) so as to correspond to the type of lens being inspected, since it is possible to vary the size of each portion (i.e., central and peripheral portions) of the diffusing means according to the shape of the lens being inspected, and therefore a prompt inspection can be realized.

Figure 30:
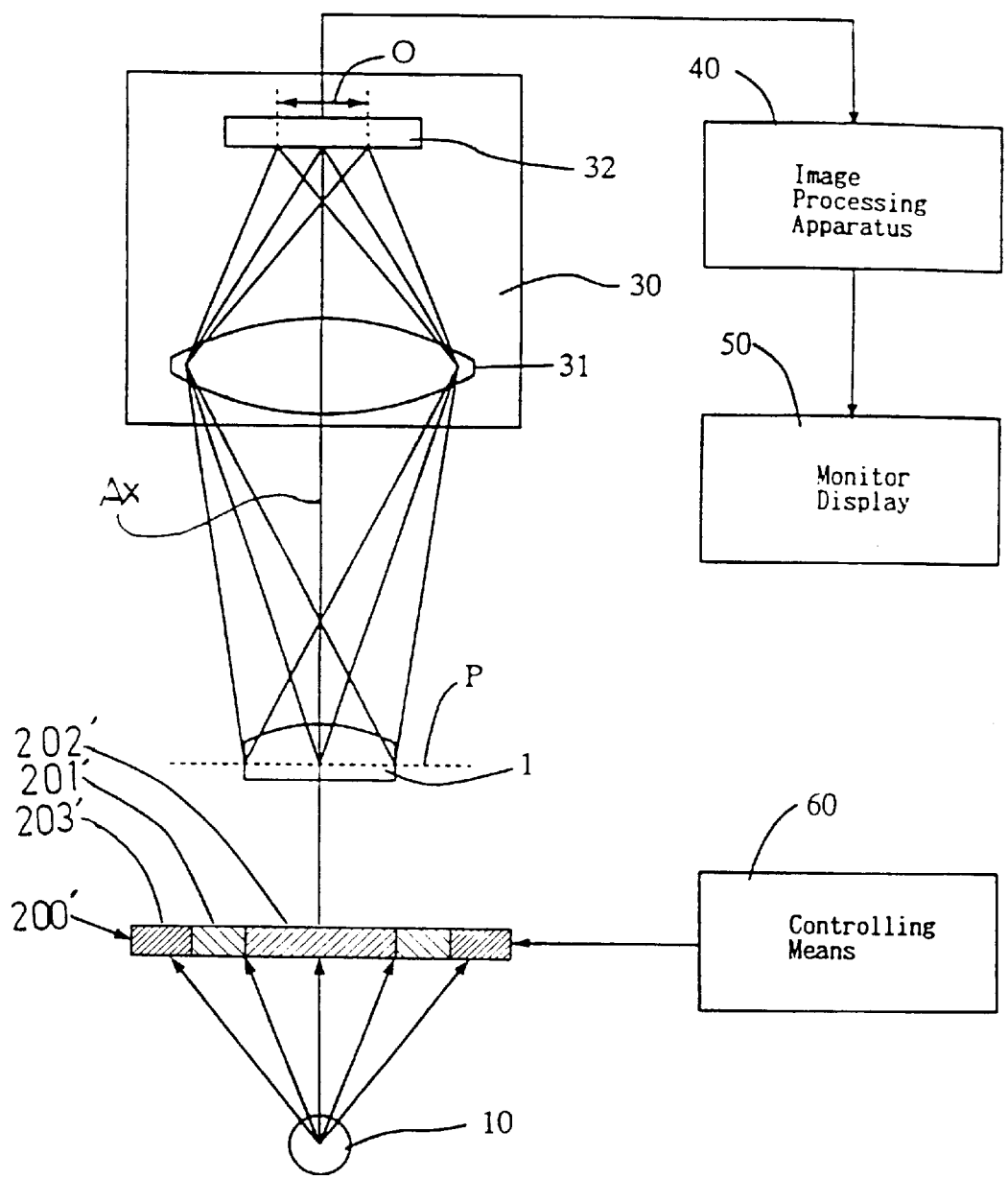
FIG. 30 is a schematic view of an overall construction of an optical system and a block diagram of a processing system of a third embodiment of an optical member inspection apparatus, according to the first aspect of the present invention.

FIG. 30 illustrates an overall construction of an optical system and a block diagram of a processing system of a third embodiment of an optical member inspection apparatus according to the first aspect of the present invention.

In the case where the transmittance of the optical member to be inspected, or the reflectance of a defect of the optical member, is subject to the wavelength of light transmitted through the optical member, the sensitivity in detecting a defect of the optical member can sometimes increase by specifying the wavelength of the light to be incident on the optical member. For instance, a plastic chip, which remains on a molding surface of a mold is transformed to be translucent, and often yellowed, due to molding heat, and sometimes enters the molded optical member. In such a case, by the incidence of the blue light component (i.e., complementary color), of the light, on the yellowed plastic, the difference of luminance between the average luminance of the image of the optical member and the luminance of the image of the defect is enlarged or enhanced, compared to using white light. This third embodiment is characterized in that the optical member inspection apparatus is provided with means for selecting a wavelength of that light incident on the optical member.

In the third embodiment, instead of the liquid crystal panel 200 used in the second embodiment, a color liquid crystal panel 200' is used to serve as a wavelength selecting means. Except for the use of the color liquid crystal panel 200' and several differences in regard to the method of control of the controlling means 60, the structure of the third embodiment is substantially the same as that of the second embodiment of the first aspect of the present invention.

The color liquid crystal panel 200' consists of a large number of elements (pixels) arranged two-dimensionally. The diffusion transmittance of each of the elements is controllable separately by controlling. voltage applied thereto through the controlling means 60. The liquid crystal panel 200' is comprised of a central portion 202' having a low diffusion transmittance, a peripheral portion 201' having a high diffusion transmittance, and a masking portion 203' which intercepts light. In the third embodiment, the controlling means 60 additionally adjusts the spectral transmittances at the central portion 202' and the peripheral portion 201' corresponding to the lens to be inspected or to the type of defect to be detected.

The size of the central portion 202' of the color liquid crystal panel 200' is determined in a similar way as that of the central portion 202 of the liquid crystal panel 200 in the second embodiment of the first aspect of the present invention, such that the width of light emitted perpendicularly (i.e., parallel to the optical axis Ax) from the central portion 202' is approximately equal to the width of the lens to be inspected 1. With such an arrangement, that light perpendicularly emitted from the central portion 202' of the color liquid crystal panel 200' is incident on the lens 1, while that light perpendicularly emitted from the peripheral portion 201' of the color liquid crystal panel 200' is not incident on the lens 1.

If the defect of the lens 1 is in the form of black dust, such a defect may be detected by white light being incident thereupon, and if there is an absorptive defect on the surface or inside the lens 1, for example a chip of yellowed plastic, by the incidence of the blue light component (i.e., complementary color), of the light, on the yellowed plastic, it is possible to enlarge the difference of luminance between a inspection portion S and a defect image DL, and thus the defect image DL can be easily detected by binarization.

Figure 31:
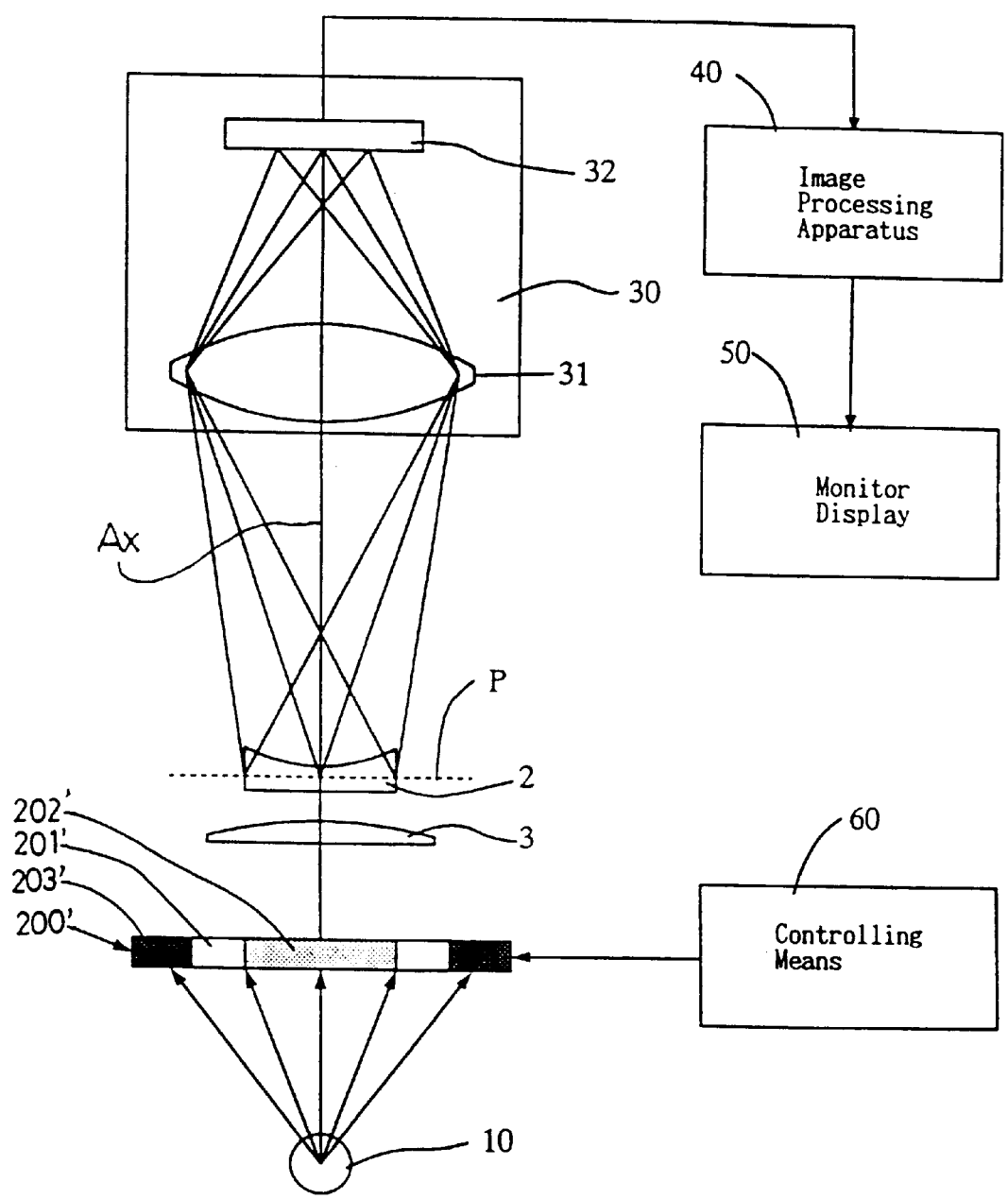
FIG. 31 is a schematic view according to the structure shown in FIG. 30, when a negative lens is inspected by the apparatus of the third embodiment of the first aspect of the present invention.

FIG. 31 illustrates an overall structure of an optical system in regard to the optical member inspection apparatus according to the third embodiment of the first aspect of the present invention, during an inspection of a negative lens 2. In the example shown in FIG. 30, since the inspected positive lens 1 functions as a condenser lens, that light which transmitted through the color liquid crystal panel 200' and through the lens 1 to be inspected, is converged towards the CCD camera 30. On the other hand, if the lens to be inspected is a negative lens 2, in the case of the structure shown in FIG. 30, that light which is transmitted through the lens to be inspected will be scattered, and thus that light transmitted through the lens to be inspected may not be effectively made incident on the CCD camera 30, and thus there is a possibility that the quantity of light is insufficient for the image to be picked-up.

It is for this reason that between the color liquid crystal panel 200' and the lens 2 to be inspected, a positive adjusting lens 3, serving as a condenser lens, is positioned to converge (in advance) light to be incident on the lens 2, so that the light transmitted through the lens 2 may be travel towards the CCD camera 30, as shown in FIG. 31.

Figure 32:
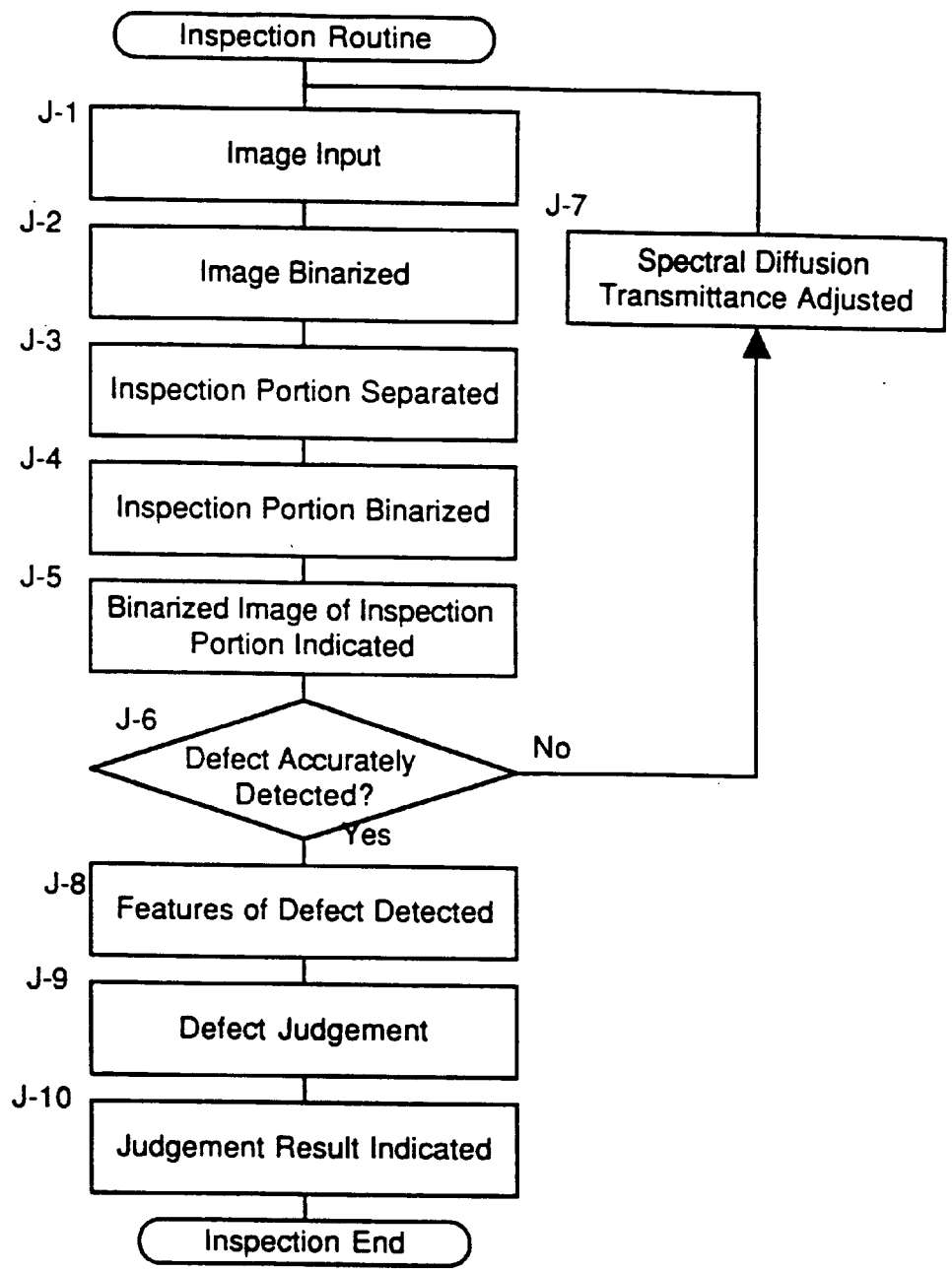
FIG. 32 is a flow chart showing an Inspection Routine of the apparatus shown in FIG. 30.

FIG. 32 is a flow chart showing an Inspection Routine using the inspection apparatus of the third embodiment. At J-1, the image is input from the CCD camera 30, and at the following processes J-2 and J-3, the input image is binarized and the inspection portion, corresponding to the image of lens to be inspected, is separated.

At J-4 and J-5, the separated image of the inspection portion is binarized by dynamic binarization processing, and the result is indicated on a monitor display 50. By observing the displayed image at J-6, an inspector may judge whether the defect is accurately detected or not, and if the detection is inaccurate, at J-7 the spectral diffusion transmittance of the color liquid crystal panel 200' is adjusted, and the processes J-1 through J-6 are repeated.

The adjustment at J-7 includes, in addition to the variation of the shapes and sizes of the peripheral portion 201' and the central portion 202', a variation in the spectral transmittances of the peripheral portion 201' and the central portion 202', namely a wavelength selection of the light incident on the lens to be inspected.

At J-8 through J-10, if the defect is judged to be accurately detected from the binarized image of the inspection portion, scatterable defects, having a luminance higher than the average luminance, and absorptive defects, having a luminance lower than the average luminance, are detected due to their respective. features, and a judgement as to whether there is a defect or not is made, according to the detected result. The result of this judgement is indicated on the monitor display 50.

As described above, according to the optical member inspection apparatus of the third embodiment according to the first aspect of the present invention, by selecting the wavelength of light incident on the lens to be inspected, it is possible to adjust the ability to detect a defect according to the type of lens to be inspected or the color of the defect.

Figure 33:
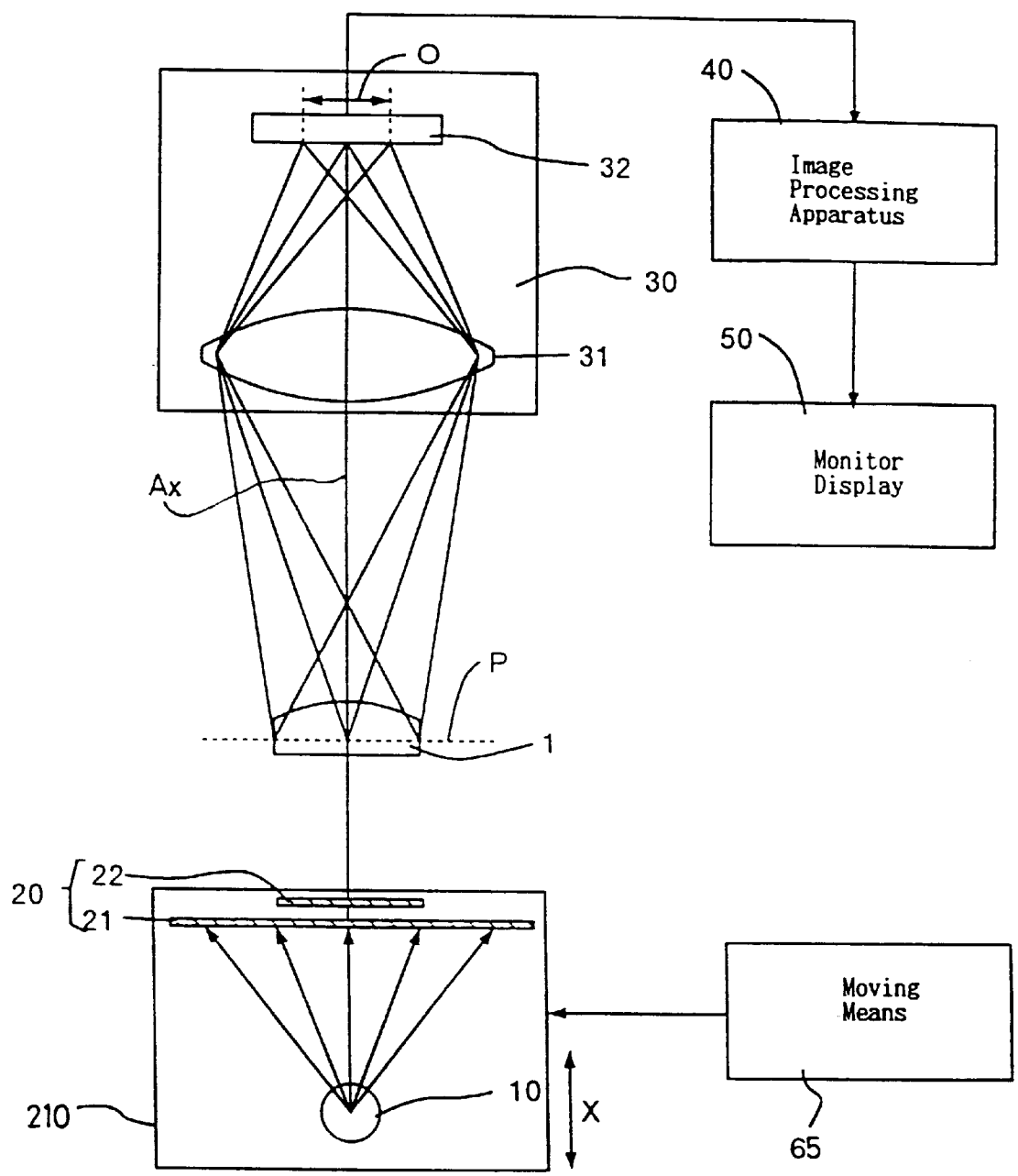
FIG. 33 is a schematic view of an overall construction of an optical system and a block diagram of a processing system of a fourth embodiment of an optical member inspection apparatus, according to the first aspect of the present invention.

FIG. 33 illustrates an overall construction of an optical system and a block diagram of a processing system of a fourth embodiment of an optical member inspection apparatus, according to the first aspect of the present invention. The structure of the optical system of the present embodiment is basically the same as that of the first embodiment of the first aspect of the present invention, however, in the present embodiment a lighting unit 210 movable in a direction denoted by "X" (X direction), parallel to the optical axis Ax of the image pick-up means (i.e., a CCD camera 30), and a moving means 65 used to move the lighting unit 210, are provided.

With this structure of the fourth embodiment, it is possible to adjust the ability to detect between the absorptive defect and the scatterable defect. The ability to detect increases as the difference in luminance increases between the average luminance of the image of the optical s member and the luminance of the image of the defect.

The ratio of light between the central and peripheral portions incident on the lens being inspected, varies according to a movement of the lighting unit 210 in the X direction. In the following discussion a comparison will be made between the cases in which the lighting unit 210 moves in a direction towards the lens to be inspected, as shown in FIG. 34(A), and in which the lighting unit 210 moves in a direction away from the lens to be inspected, as shown in FIG. 34(B).

If the diffusing means 20 moves as a whole unit, the shorter the distance between the diffusing means 20 and the lens 1 becomes, the incident angle of that light emitted from the peripheral-portion to be incident on the lens 1 will increase, and the intensity of scatterable light due to a defect will also increase. For example, in the case of FIG. 34(A), provided that the incident angle of light emitted from any one point on the first diffusing plate 21 and incident on the center of the lens 1 to be inspected is θ1, and in the case of FIG. 34(B), the incident angle of light emitted from any one point on the first diffusing plate 21 and incident on the center of the lens 1 is θ2, the following relationship is defined, namely, θ1>θ2.

Figure 34A:
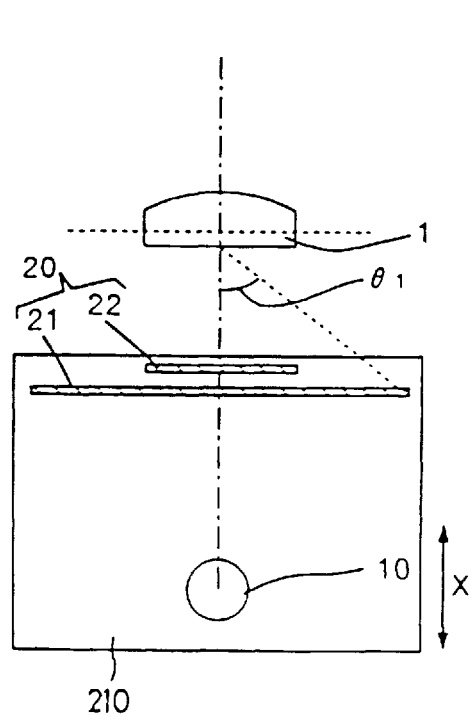
FIGS. 34(A)–(B) are schematic views showing an example of an adjustment of the distance between a lighting unit and a lens to be inspected of the apparatus shown in FIG. 33.

Therefore, in the case of a large incident angle as shown in FIG. 34(A), the ability to detect a scatterable defect will increase, while at the same time the ability to detect an absorptive defect will decrease. On the other hand, in the case of a small incident angle as shown in FIG. 34(B), the ability to detect a scatterable defect will decrease, while the ability to detect an absorptive defect will increase.

Figure 34B:
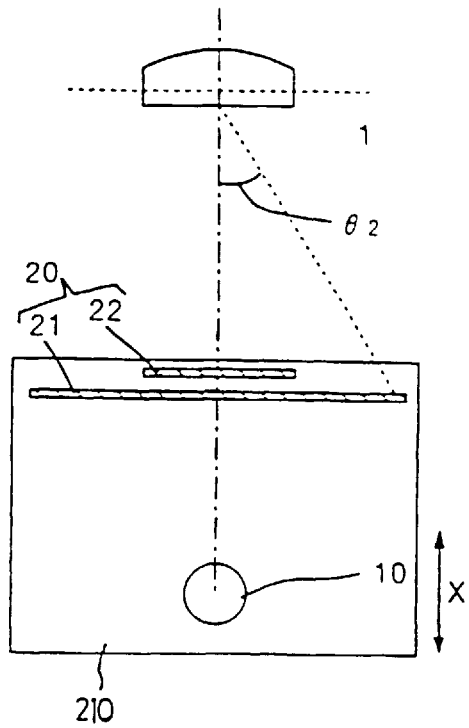

Likewise, in the present embodiment in which the lighting unit 210 moves as a whole unit, the luminance of the whole picked-up image and the average luminance of the inspection portion, will increase in the case of FIG. 34 (A), in which the distance from the light source 10 to the lens 1 is relatively short, compared to the case shown in FIG. 34(B). However, due to the variations of the luminance of the whole picked-up image and the average luminance of the inspection portion, both the luminance of the defect portion and the base luminance are shifted, and thus the scatterability specified by the difference of the luminance of the defect portion and the base luminance, and the ability to detect the absorptive defect will be as above described.

Figure 35A:
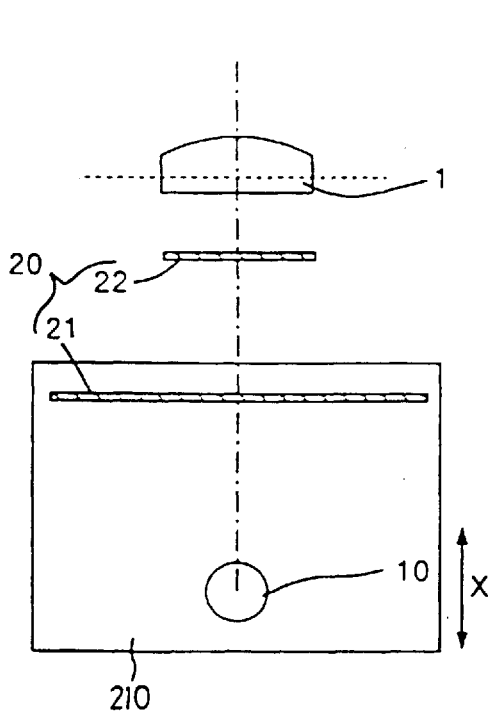
FIGS. 35(A)–(B) are schematic views showing an example of an adjustment of the distance between a second diffusing plate and a lens to be inspected of the. apparatus shown in FIG. 33.
Figure 35B:
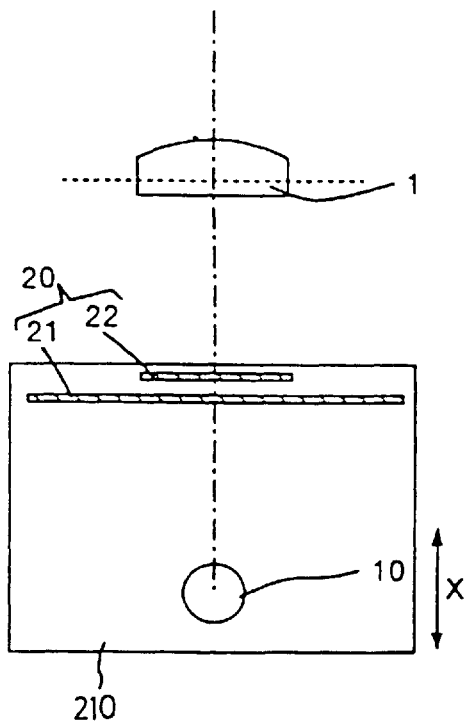

FIGS. 35(A) and 35(B) illustrate examples when only the second diffusing plate 22 is moved in the optical axis direction. In such cases, the incident angle of light emitted from the peripheral portion of the diffusing means does not vary, but the balance of quantities of light between that light emitted from the peripheral portion and that light emitted from the central portion will vary. If the second diffusing plate 22 moves towards the lens 1 as shown in FIG. 35(A), since the ratio of light emitted from the central portion increases, as compared with that light emitted from the peripheral portion, the ability to detect an absorptive defect also increases. While if the second diffusing plate 22 moves away from the lens 1 as shown in FIG. 35(B), since the ratio of light emitted from the peripheral portion increases, as compared with that light emitted from the central portion, the ability to detect a scatterable defect also increases.

Figure 36:
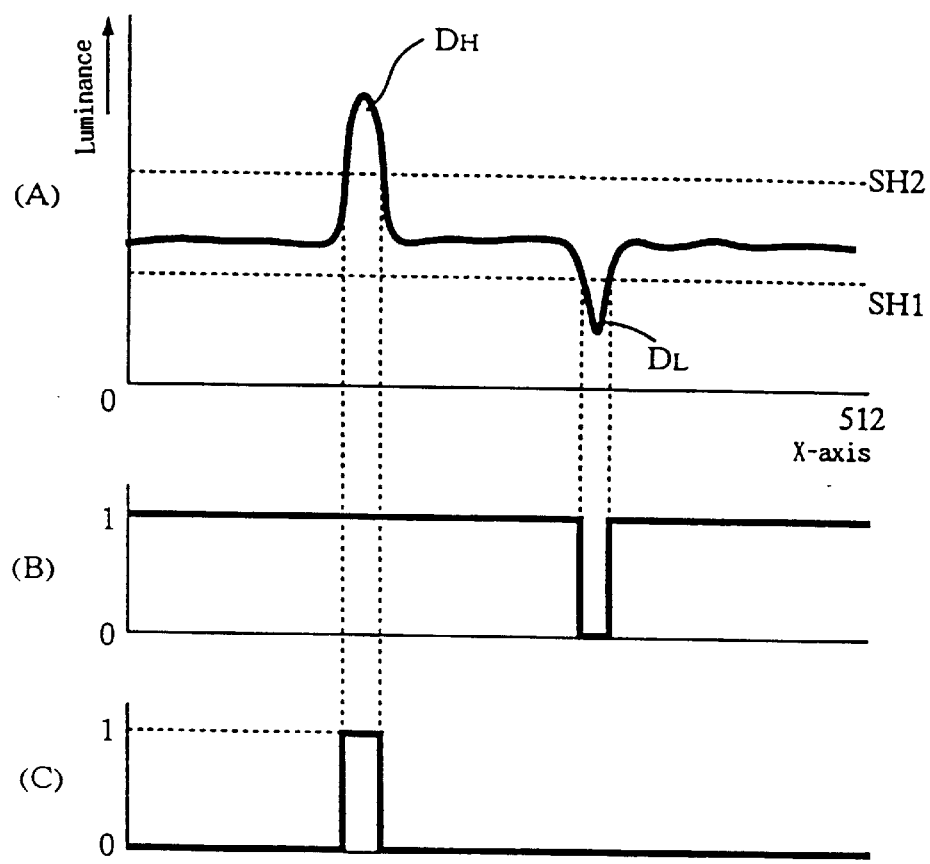
FIG. 36 is an example of a distribution of luminance on a scanning line of an image in the case of a relatively large ratio of light being emitted from a peripheral portion of the diffusing means to be incident on a lens to be inspected, wherein (A) is a signal of the original image, (B) is a binarized signal of a low luminance portion, and (C) is a binarized signal of a high luminance portion.

If the lighting unit 210 is moved towards the lens 1, since the incident angle of light incident on the lens 1 from the peripheral portion increases as described above, both the luminance of the high luminance portion DH due to the scatterable defect, and the luminance of the low luminance portion DL due to the absorptive defect, increase, as shown in FIG. 36(A). Therefore in such a case, the ability to detect a scatterable defect will increase, while the ability to detect an absorptive defect will decrease.

Figure 37:
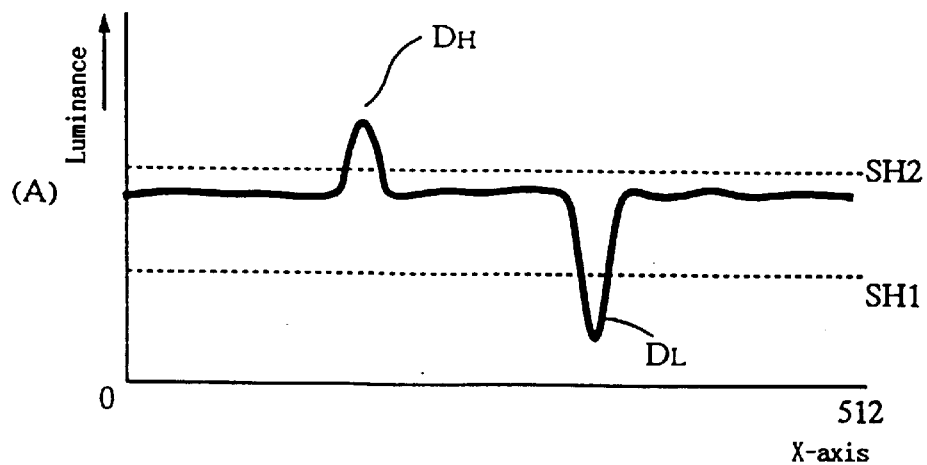
FIG. 37 is a schematic view of a signal of an original image showing a distribution of luminance on a scanning line in the case of a relatively small ratio of light being emitted from a peripheral portion of the diffusing means to be incident on a lens to be inspected.

Conversely, if the lighting unit 210 is moved away from the lens 1, since the quantity of all the light incident on the lens 1 decreases, the average luminance accordingly decreases. At the same time, the incident angle of the light incident on the lens from the peripheral portion decreases, thus both the luminance of the high luminance portion DH due to the scatterable defect, and the luminance of the low luminance portion DL due to the absorptive defect, will decrease, as shown in FIG. 37. Therefore, in such a case, the ability to detect an absorptive defect will increase, while the ability to detect a scatterable defect will decrease.

Figure 38:
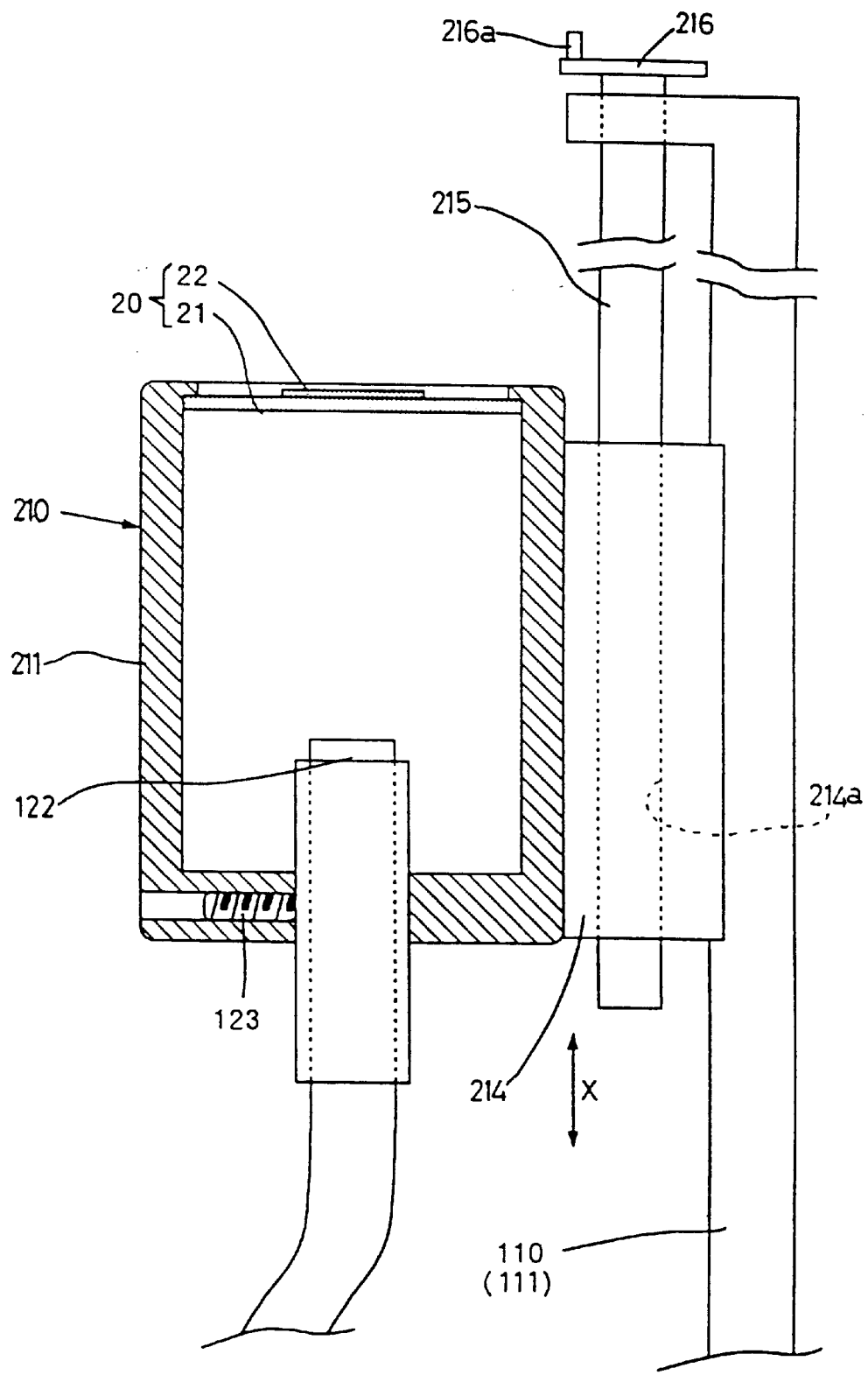
FIG. 38 is a sectional view showing an example of a structure of a lighting unit of the apparatus shown in FIG. 33.

FIG. 38 is a sectional view illustrating an example of a structure of the lighting unit 210. In the lighting unit 210, an optical fiber 122, which transmits light from the light source 10, is introduced to the inside of a casing 211 via the bottom thereof, and at an upper opening of the casing 211, the diffusing means 20 in the form of a single plate is mounted. The diffusing means 20 in the present example is arranged such that the sheet-shaped second diffusing plate 22 is adhered to the center of the plate-shaped first diffusing plate 21. That end of the optical fiber 122 projecting from the casing 211 is fixed by a set screw 123.

The lighting units 210 (note that only one of the lighting units 210 is shown in FIG. 38) are mounted to be slidable in the X direction, on guide rails 110 and 111 which are mounted to the main apparatus via slidable members 214. Screw rods 215 are mounted on the guide rails 110 and 111, and in the slidable members 214, screw holes 214a are formed to engage with the screw rods 214. By turning operational wheels 216, fixed at the top end of the screw rods 215, by holding knobs 216a, the position of the lighting units 210 can be adjusted in the X direction.

In the present example, the moving means 65 consists of the same components as shown in FIG. 10, namely the guide rails 110 and 111, the screw rod 215, the operational wheel 216 and the slidable member 214.

Figure 39:
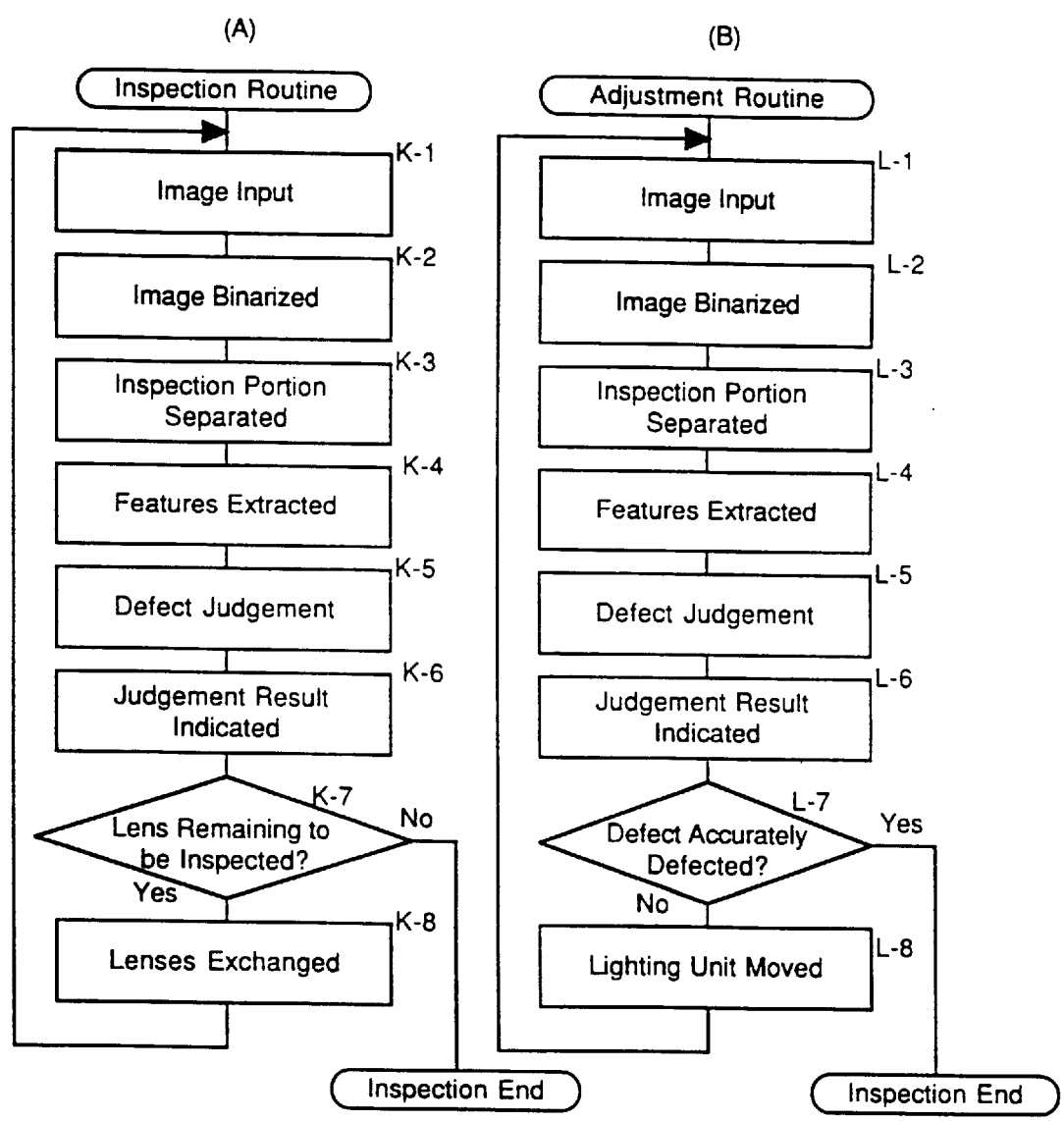
FIG. 39(A) is a flow chart showing an Inspection Routine of the apparatus shown in FIG. 33.
FIG. 39(B) is a flow chart showing an Adjustment Routine thereof.

The inspection process using the above apparatus will now be described with reference to the flow chart shown in FIG. 39. FIG. 39(A) illustrates the actual Inspection Routine, and FIG. 39(B) illustrates the Adjustment Routine which controls the adjustment of the ability to detect. In preparation for the inspection, information regarding the lens to be inspected is loaded in the form of a data table. In addition, according to the information, appropriate diffusing plates are selected, and the magnification of the CCD camera is appropriately set.

During the inspection, the Inspection Routine shown in FIG. 39(A) is executed. The processes at K-1 through K-8 in the present routine are the same as those at H-4 through H-11 (FIG. 29) in the Inspection Routine of the second embodiment of the first aspect of the present invention, therefore no explanation of the processes K-1 through K-8 shall be given.

The Adjustment Routine is executed in the case that a defect is not detected accurately due to a variation of the state of the inspected lens during inspection, or in the case that the criteria in regard to the absorptive or scatterable defect becomes stricter. In the Adjustment Routine, the inspection criteria can be adjusted by adjusting the balance of light incident on the lens to be inspected from the central and peripheral portions of the diffusing means.

In the Adjustment Routine, processes at L-1 through L-6, are the same as the processes at K-1 through K-6, and so no explanation shall be given. At L-7 an inspector compares the indicated defect with the actual defect of the lens to be inspected, and judges whether the defect has been accurately detected. If the detection is inaccurate, at L-8 the lighting unit 210 is moved, and the judgements are executed repeatedly until the detection is approved (i.e., the inspection is OK).

As above described, according to the optical inspection apparatus of the fourth embodiment of the first aspect of the present invention, by additionally moving the diffusing means in the optical axis direction, the relative intensity of scatterable light due to the defect may be varied, and therefore it is possible to adjust the ability to detect between the absorptive defect and the scatterable defect.

Figure 40:
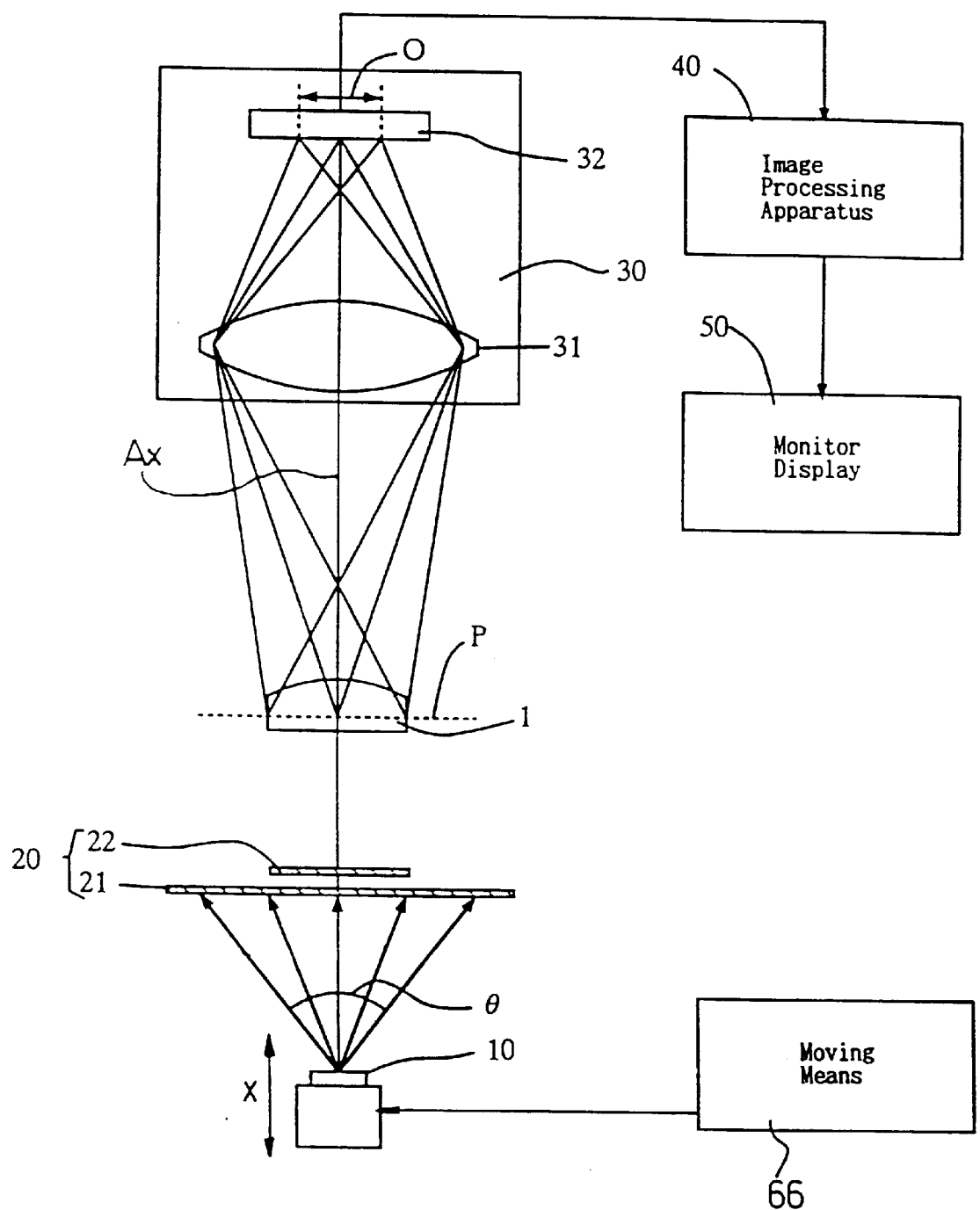
FIG. 40 is a schematic view of an overall construction of an optical system and a block diagram of a processing system of a fifth embodiment of an optical member inspection apparatus, according to the first aspect of the present invention.

FIG. 40 illustrates an overall construction of an optical system and a block diagram of a processing system of a fifth embodiment of an optical member inspection apparatus according to the first aspect of the present invention. In the fifth embodiment, the moving means 66, for moving the diffusing means 20, is movable in a direction parallel to the optical axis Ax of the CCD camera 30, is provided.

The light source 10 projects light having an angle of divergence θ, and is movable by the moving means 66 in the X direction, parallel to the optical axis Ax of the CCD camera 30. By moving the light source 10 in the X direction, it is possible to adjust the balance of the ability to detect between the absorptive and scatterable defects.

Figure 41A:
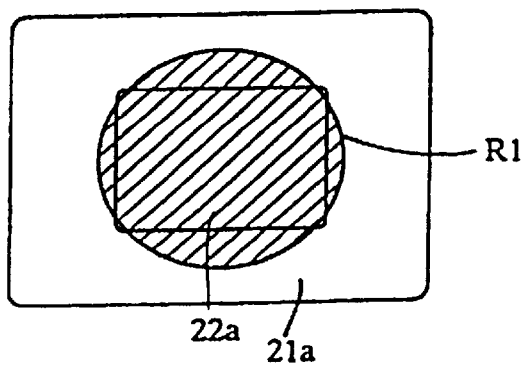
FIGS. 41(A)–(C) are schematic views showing a variation of in the projection range of light from a diffusing means according to a variation in distance between a light source and the diffusing means.

The ratio of light emitted from the central and peripheral portions of the diffusing means 20, incident on the lens to be inspected, varies according to the movement of the light source 10 in the X direction. If the distance between the light source 10 and the diffusing means 20 becomes shorter, the amount of light, emitted from the light source 10, incident on the diffusing means 20 decreases, as indicated by R1 (incident portion) in FIG. 41(A), and the ratio of light incident on the central portion of the diffusing means increases, while the ratio of light incident on the peripheral portion decreases.

Figure 41B:
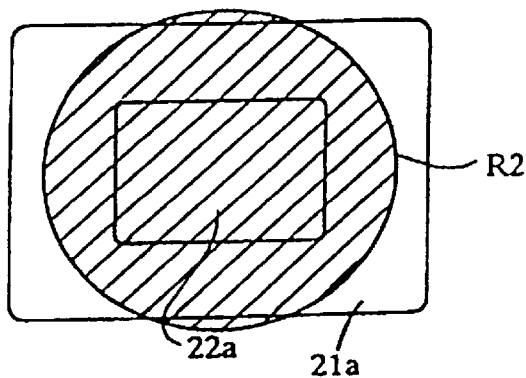
Figure 41C:
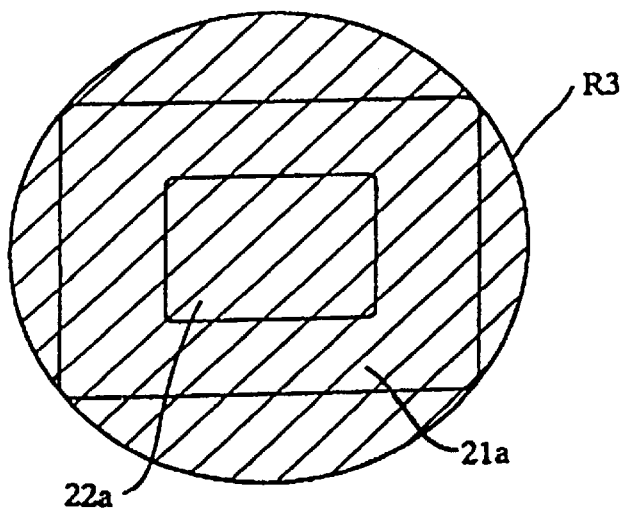

If the distance between the light source 10 and the diffusing means 20 increases, the amount of light, emitted from the light source 10, incident on the diffusing means increases as indicated by R2 and R3 in FIG. 41(B) and FIG. 41(C), and the ratio of light incident on the central portion decreases, while the ratio of light incident on the peripheral portion increases.

If the light source 10 is moved towards the diffusing means 20, the ratio of light emitted from the central portion and incident on the lens 1 to be inspected becomes relatively high, in comparison to the ratio of light emitted from the peripheral portion, and thus the average luminance increases. At the same time, since the ratio of light emitted from the peripheral portion and incident on the lens 1 becomes relatively low, the luminance of the high luminance portion due to the scatterable defect decreases.

Light incident on an absorptive defect, may be scattered from an edge of the defect, and in the case that a large quantity of the incident light is emitted from the peripheral portion, the luminance of the low luminance portion tends to increase due to the absorptive defect. While, in the case that a small quantity of the incident light is emitted from the peripheral portion, the scattering of light from the edge of the defect will be slight, and the luminance of the low luminance portion will decrease due to the absorptive defect.

Therefore, as shown in FIG. 37, the difference between the low luminance portion and the average luminance increases due to the absorptive defect, and the ability to detect the absorptive defect increases. However, since the difference between the luminance of the high luminance portion and the average luminance decreases due to the scatterable defect, the ability to detect the scatterable defect will decrease.

On the other hand, if the light source 10 is moved away from the diffusing means 20, the ratio of light emitted from the peripheral portion, incident on the lens 1, compared with all the light incident on the lens 1, increases, and therefore the luminance of the picked-up image in the high luminance portion increases due to the scatterable defect. At the same time, since the ratio of light emitted from the central portion, incident on the lens 1, compared with all the light incident on the lens 1, decreases, the average luminance of the inspection portion decreases.

Therefore, as shown in FIG. 36(A), the difference between the high luminance portion and the average luminance increases due to the scatterable defect, and the ability to detect the scatterable defect will increase. However, due to the increased quantity of incident light emitted from the peripheral portion, due to the scattering of light at the edge of the defect, the luminance of the low luminance portion increases due to the absorptive defect, and therefore the difference between the luminance of the low luminance portion and the average luminance decreases due to the absorptive defect, and thus the ability to detect the absorptive defect will decrease.

Figure 42:
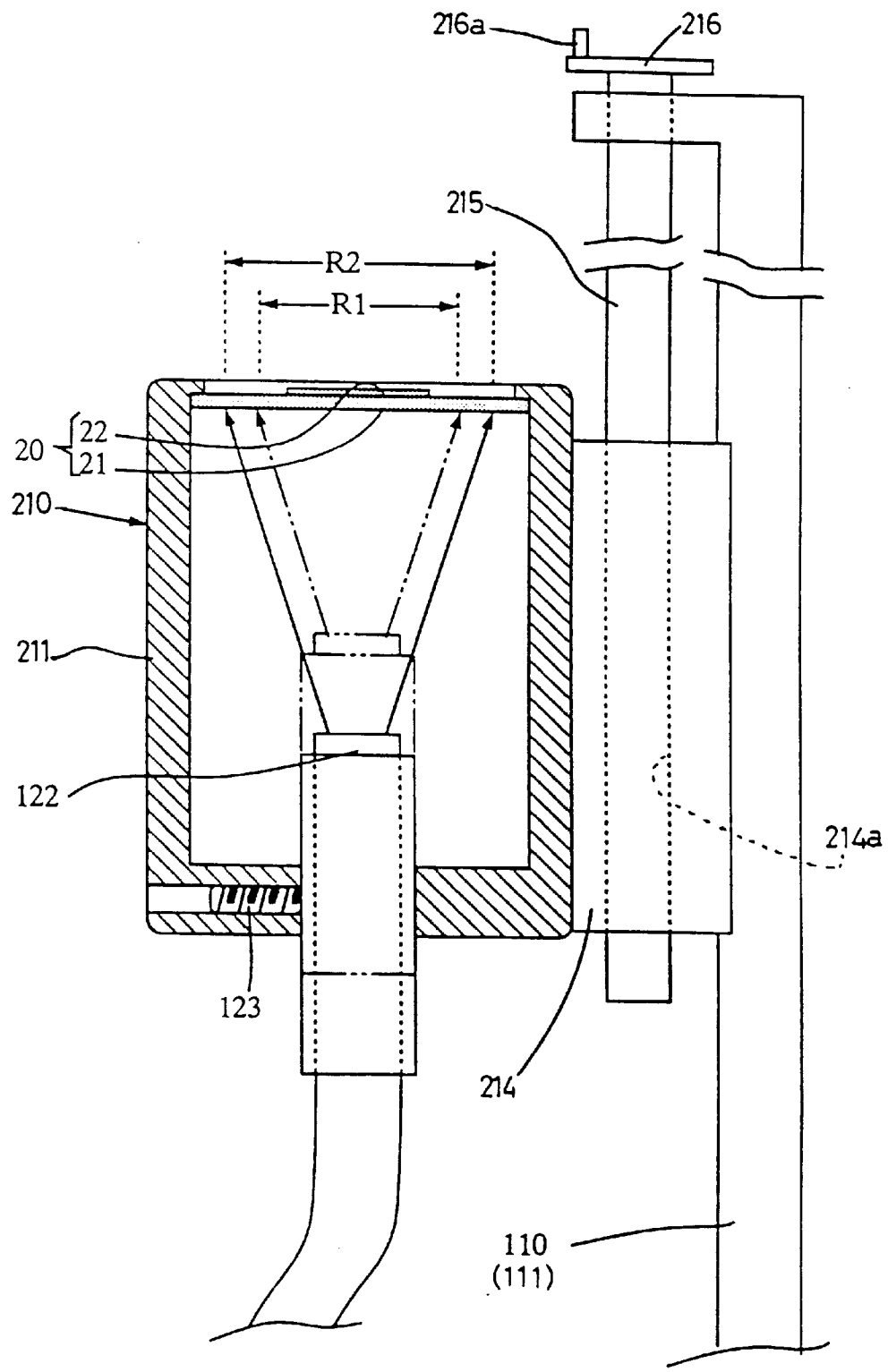
FIG. 42 is a sectional view showing an example of a structure of a lighting unit of the apparatus shown in FIG. 40.

FIG. 42 is a sectional view illustrating an example of a structure of the fifth embodiment of the first aspect of the present invention, and is substantially the same as that of the fourth embodiment shown in FIG. 38.

As already described, that end of the optical fiber 122 projecting from the casing 211 is fixed by a set screw 123, and by loosening the set screw 123, it is possible to vary the length of insertion of the optical fiber 122. Since the emission angle of the light from the optical fiber 122 is fixed, if the length of insertion of the optical fiber 122 is varied, an effect similar to that caused by varying the distance between the light source 10 and the diffusing means 20 will result, and therefore the ratio of the emissive quantity of light from the central portion and the emissive quantity of light from the peripheral portion of the diffusing means 20 may be adjusted. In the fifth embodiment, the means for moving the optical fiber 122 consists of the moving means 66.

For example, if the angle of emission of light emitted from the optical fiber 122 is R2, when the position of the optical fiber 122 is fixed, indicated by the solid lines in FIG. 42, and that the angle of emission of light emitted from the optical fiber 122 is R1, when the position of the emission end of the optical fiber 122 is moved towards the diffusing means 20, indicated by the broken lines in FIG. 42, then the following relationship is defined, namely, R2>R1. The closer the emission end of the optical fiber 122 is to the diffusing means 20, the narrower the angle of emission becomes, and accordingly the ratio of that light emitted from the peripheral portion of the diffusing means 20 and incident on the lens 1 to be inspected, compared with all the light incident on the lens 1, decreases, while the ratio of that light emitted from the central portion of the diffusing means 20 and incident on the lens 1, compared with all the light incident on the lens 1, increases.

Figure 43:
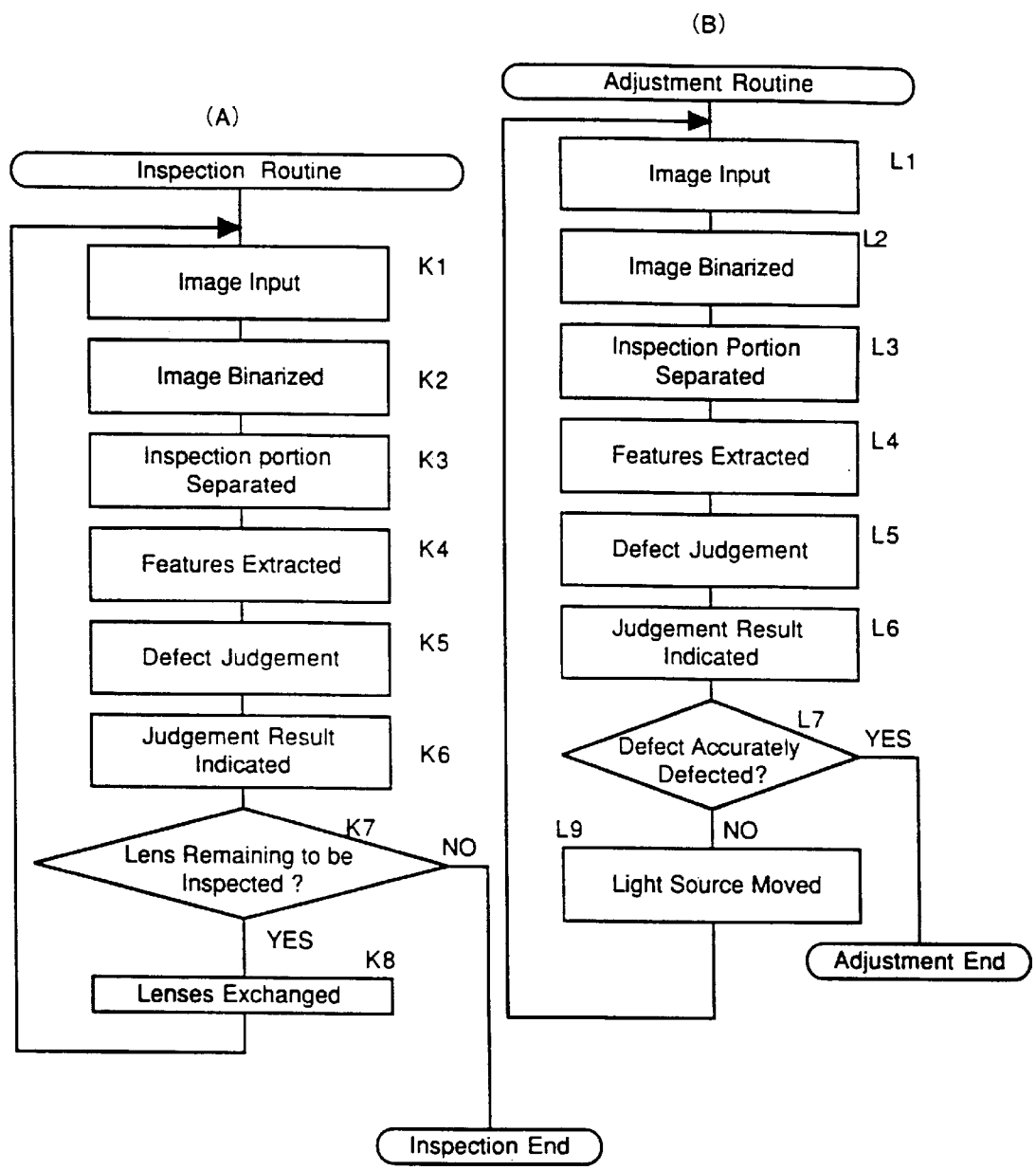
FIG. 43(A) is a flow chart showing an Inspection Routine of the apparatus shown in FIG. 40.
FIG. 43(B) is a flow chart showing an Adjustment Routine thereof.

FIG. 43 is a flow chart illustrating the processes of inspection for the fifth embodiment of the present invention. FIG. 43(A) illustrates the actual Inspection Routine and is substantially the same as the Inspection Routine of the fourth embodiment shown in FIG. 39(A). FIG. 43(B) illustrates the Adjustment Routine during an adjustment of the ability to detect, and is substantially the same as the Adjustment Routine of the fourth embodiment shown in FIG. 39(B), except that the process at L-8 in the fourth embodiment in FIG. 39(B) is replaced by the process at L-9 in FIG. 43(B). Therefore, only the process at L-9 will be described here. Namely, if the inspection is inaccurate, the light source 10 is moved at L-9, until the inspection is approved (i.e., the inspection is OK).

As above described, according to the optical inspection apparatus of the fifth embodiment of the first aspect of the present invention, by additionally moving the light source towards the diffusing means in the optical axis direction, it is possible to adjust the balance of light emitted from the central and peripheral portions, incident on the lens to be inspected, and therefore it is possible to adjust the balance of the ability to detect between the absorptive defect and the scatterable defect.

Figure 44:
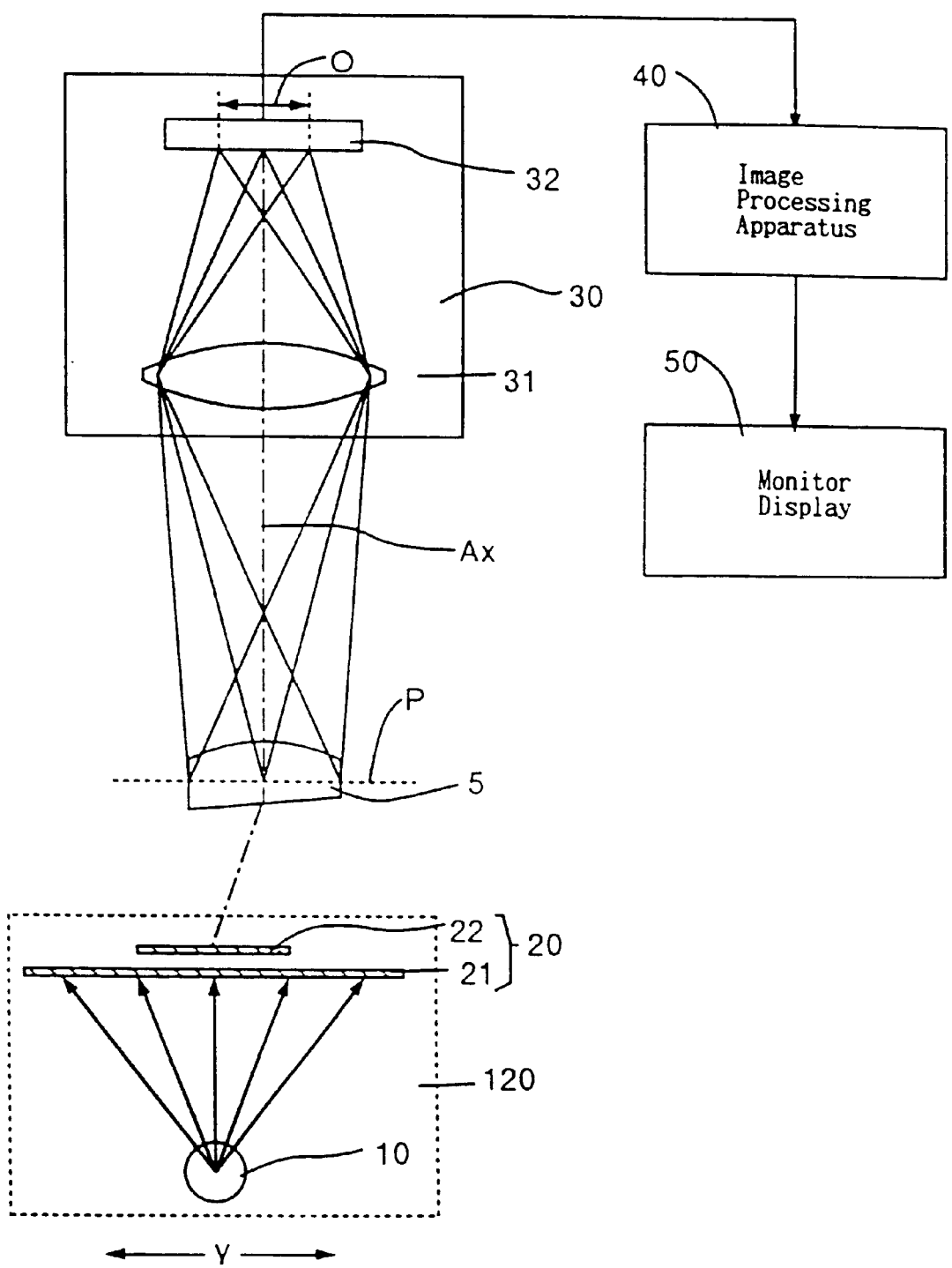
FIG. 44 is a schematic view of an overall construction of an optical system and a block diagram of a processing system of a sixth embodiment of an optical member inspection apparatus, according to the first aspect of the present invention.

FIG. 44 illustrates an overall construction of an optical system and a block diagram of a processing system of a sixth embodiment of an optical member inspection apparatus according to the first aspect of the present invention. In the sixth embodiment, similar to the first embodiment of the first aspect of the present invention, a supporting structure which supports the light source 10 and a diffusing means 20 movable in the Y direction, perpendicular to the optical axis Ax of the CCD camera 30, are provided.

In the inspection apparatus of the sixth embodiment of the present invention, the lighting unit 120 is supported to be movable in the Y direction, as indicated by "Y" in FIG. 44.

Figure 45:
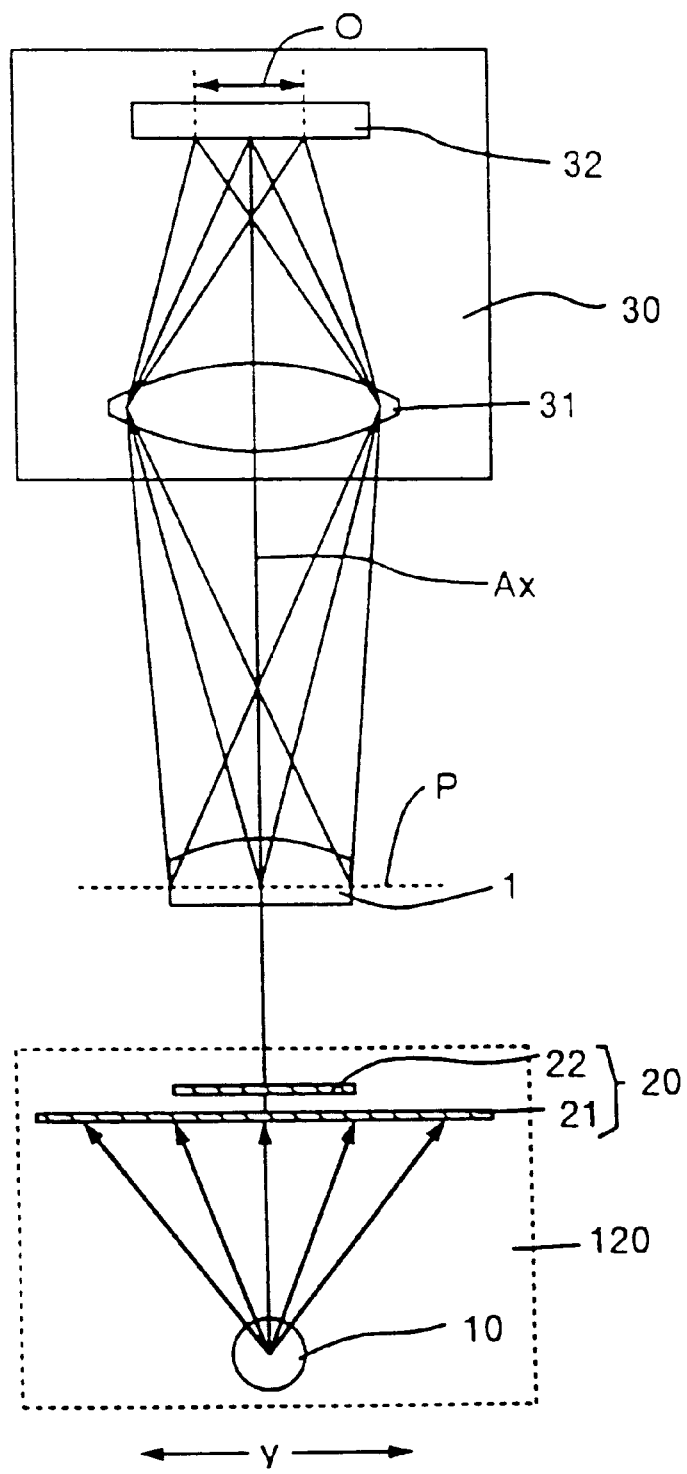
FIG. 45 is a schematic view showing a positioning of an optical system for inspection of a lens not having a prismatic function by the apparatus shown in FIG. 44.

FIG. 44 illustrates an arrangement of an inspection of a lens, when the lens 5 to be inspected is formed in the shape of a wedge prism which deflects light in one direction, or has a rotationally asymmetric shape having the same function as the wedge prism (hereinafter referred to as prismatic function), and FIG. 45 illustrates an arrangement of an inspection of a lens 1 to be inspected having a rotationally symmetric shape in the rotative direction of the optical axis, or a lens, such as a plane parallel plate, which does not have a prismatic function, i.e., of being able to deflect light in one direction.

In the optical member inspection apparatus of the sixth embodiment, by making the shape of the second diffusing plate 22 to be approximately the same as the plan shape of the optical member (i.e., the lenses 1 and 5 to be inspected), that light emitted from the lighting unit 120 and transmitted through the lens to be inspected, to be incident on the CCD camera 30, is adjusted to approximately be the light emitted from the central portion of the diffusing means 20 and transmitted through the second diffusing plate 22.

If the distance between the CCD camera 30 and the diffusing means 20 is sufficiently long, the light incident on the CCD camera 30 is approximately limited to be that light which is parallel to the optical axis Ax of the CCD camera 30. Therefore, in the case that light transmitted through the lens to be inspected and incident on the CCD camera 30, is limited to only that light transmitted through the second diffusing plate 22, it is necessary to set the direction of the light, which is transmitted through the second diffusing plate 22 and the lens 1 or 5 to be inspected, to be parallel to the optical axis Ax. In this case, the phrase "direction of light" indicates the direction of the light as a whole, and is considered to be the direction of that light passing through the center of the lens, irrespective of the power of lens.

In order to satisfy the above requirements, if the lens does not have a prismatic function, it will be necessary to align the position of the optical axis of the CCD camera 30, the lens to be inspected and the diffusing means 20, as shown in FIG. 45. While, if the lens has a prismatic function, it will be necessary to adjust the position of the lighting unit 120 such that the light transmitted through the second diffusing plate 22 and which is deflected by the lens (having the prismatic function) of lens, is parallel to the optical axis Ax.

By making the above adjustment, that light which is transmitted through the non-defective portion (i.e., that portion of the lens having no defect) of the lens to be inspected and which is incident on the CCD camera 30, is limited to approximately only that light which is transmitted through the second diffusing plate 22, and the image of the inspection portion in the picked-up image shall be formed by that light having low luminance which is transmitted through the second diffusing plate 22. On the other hand, both the light having low luminance which is transmitted through the second diffusing plate 22, and the light having high luminance which is only transmitted through the first diffusing plate 21, are incident on the CCD sensor 32 so as to form the background area around the inspection portion, but since the CCD sensor 32 cannot focus on the diffusing means 20, in the background area, the uniform distribution of light, higher than the average distribution of light thereof at the inspection portion, shall be obtained.

Therefore, it is possible to separate the inspection portion from the background area as portions having different luminance, and at the same time, it is also possible to detect, the scatterable defect as the high luminance portion in the inspection portion, and the absorptive defect as the low luminance portion in the inspection portion, in the lens to be inspected. If that light which is not transmitted through the second diffusing plate 22 but is transmitted through the non-defective portion of the lens to be inspected, is incident on the CCD camera 30 without the above adjustment, at least one part of the inspection portion shall be in high luminance, and it is impossible to separate the portions according to the luminance, and also in the case of the existence of a scatterable defect in the inspection portion having high luminance, it is difficult to detect the scatterable defect.

Figure 46A:
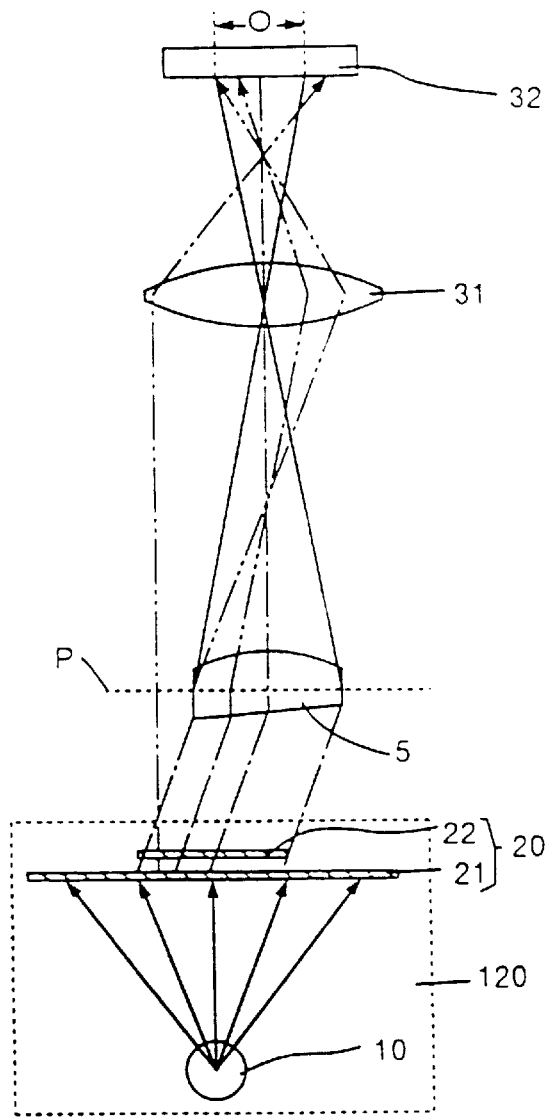
FIG. 46 is a schematic view of optical paths in the optical system shown in FIG. 44, for lenses to be inspected being set.
Figure 46B:
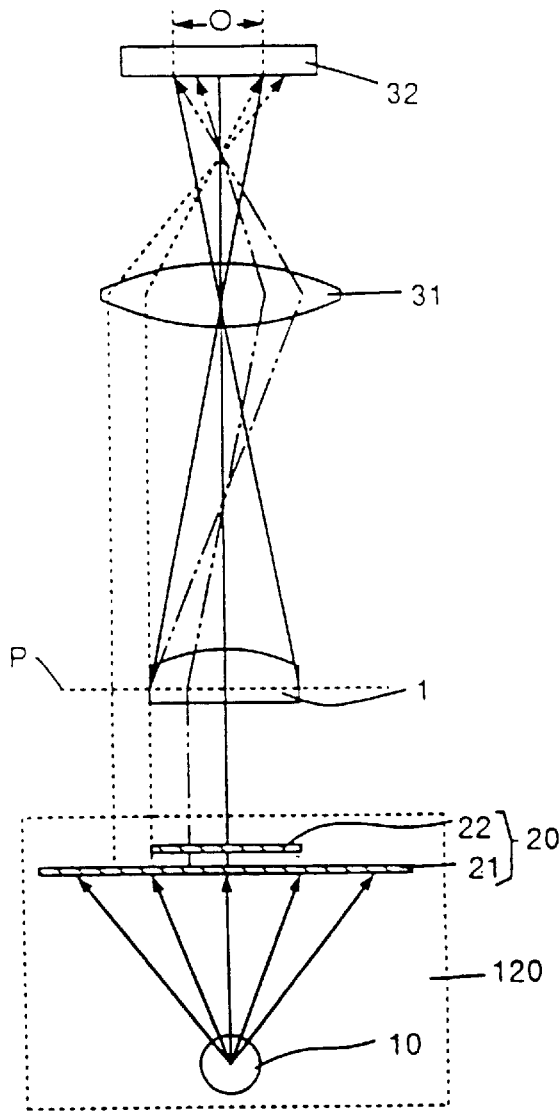

FIG. 46 is a schematic view illustrating examples of optical paths between the light source 10 and the CCD sensor 32. FIG. 46(A) illustrates an optical path in the case of a lens to be inspected has a prismatic function and a rotationally asymmetric shape, and FIG. 46(B) illustrates an optical path in the case of a lens to be inspected does not have a prismatic function and a rotationally symmetric shape. In both cases, that light which is incident within the lens image forming portion (i.e., the inspection portion) ο of the sensor 32 (i.e., that light transmitted through the lens to be inspected), is limited to approximately that light having low luminance which is emitted from the central portion of the diffusing means 20 and is transmitted through the second diffusing plate 22. Therefore, the luminance of the inspection portion S becomes lower than that of the surrounding portion.

The following description will be made in regard to the amount of movement of the lighting unit 120, in the case that the lens to be inspected has a prismatic function. If the arrangement, shown in FIG. 45, i.e., in which the optical axis Ax of the CCD camera 30 and the axis of the lighting unit 120 are aligned, is designated as the basic position, the amount of movement of the lighting unit 120, namely Δy, is obtained by the following formula (1):

$$\Delta y = h \times \tan(\phi) \quad (1)$$

in which h represents the distance between the lens to be inspected and the lighting unit 120 in the optical axis direction, and φ represents the deflection angle of the lens 5 to be inspected due to the function of the wedge prism.

In theory, if the lighting unit 120 is moved by the amount Δy obtained from formula (1), it will be possible for the CCD camera 30 to pick-up the inspection portion of the lens to be inspected using that light which is transmitted through the second diffusing plate 22. Since the above formula (1) solely depends on the prismatic function of the optical member being inspected, the formula (1) is applicable to both cases in which the optical member has the power of a lens, and in which the optical member does not have the power of a lens.

Figure 47:
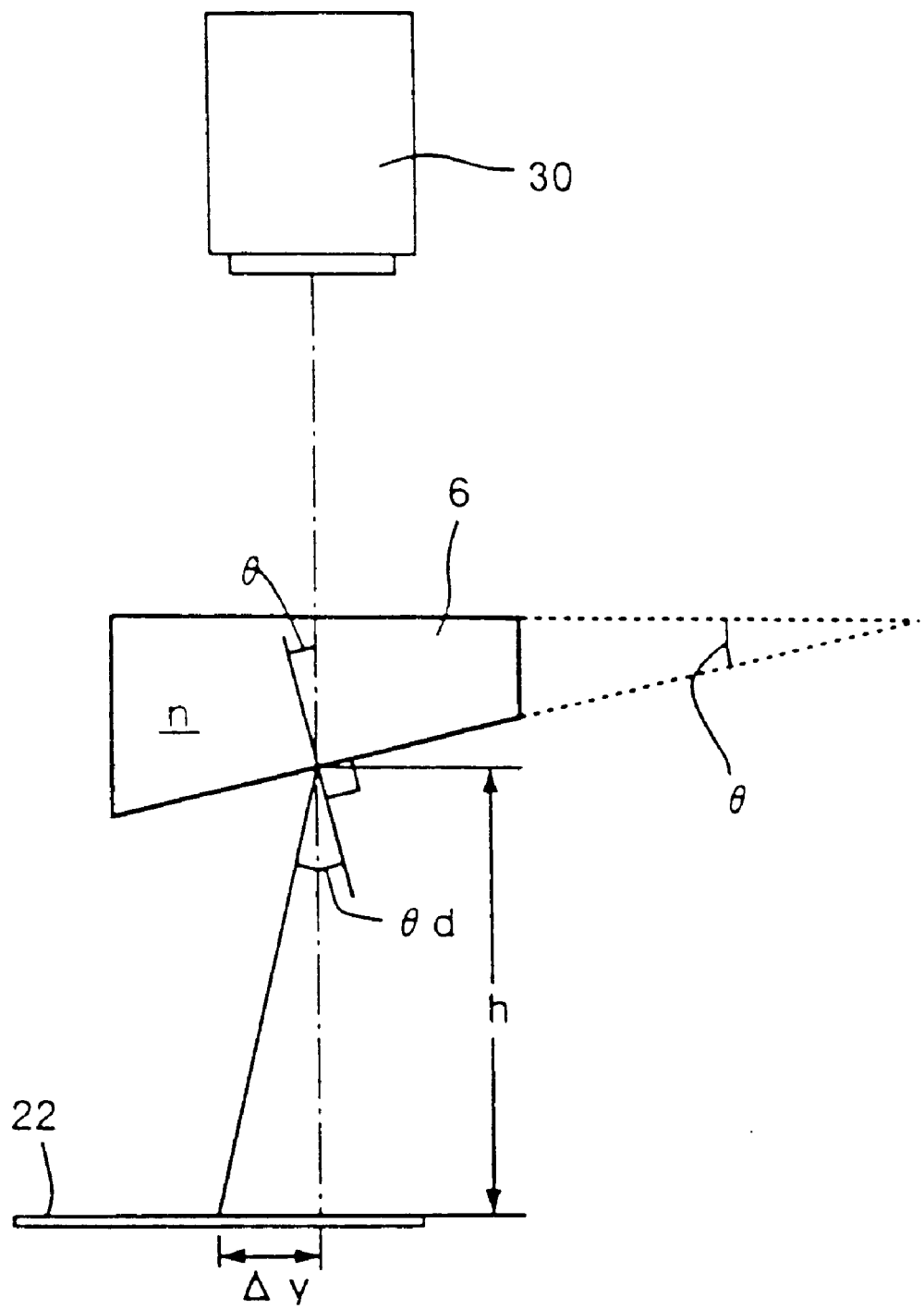
FIG. 47 is a schematic view of an optical path during inspection of a wedge prism by the apparatus shown in FIG. 44.

FIG. 47 illustrates an example, in which the shape of the optical member is simplified, for the purposes of explanation, to that of a wedge prism 6 having a vertex angle θ. The emission surface of the wedge prism 6, on the side of the CCD camera 30, is set perpendicular to the optical axis Ax. The normal of the incident surface of the wedge prism 6, on the side of the lighting unit 120, and the optical axis Ax, is at an angle θ, and the incident angle of the ray of light θd, which is incident on the incident surface coincidentally with the optical Ax, according to Snell's law, are denoted as follows:

$$n \times \sin\theta = \sin\theta d$$

$$\theta D = \sin^{-1}(n \times \sin\theta)$$

in which, n represents the refractive index of the optical member in the form of the wedge prism 6.

Therefore, in the case of the inspection of the wedge prism 6 in the position shown in FIG. 47, the amount of movement of the lighting unit 120 Δy is given by the following formula (2):

$$\Delta y = h \times \text{Tan}(\sin^{-1}(n \times \sin\theta)) \quad (2)$$

During the actual inspection, the lighting unit 120 is moved by making the value calculated in formula (2) to be an index value. Eventually a picked-up image is indicated on the monitor display 50, and the position of the lighting unit 120 is adjusted until the defect of the lens being inspected can be optimally detected.

In the present embodiment, the structure of the lighting unit 120 is such that it is moved as a whole, namely, the first and second diffusing plates 21 and 22 are moved together in parallel to each other. However, in order to satisfy the purpose of the present invention, it will be sufficient if at least the diffusing means 20 moves in the Y direction, and furthermore it will be sufficient if only the second diffusing plate 22, which defines the central portion of the diffused light, is moved in the Y direction.

With the structure of the present embodiment, in the case that the lighting unit 120 is moved as a whole, or in the case that only the diffusing means 20 is moved, it is necessary to determine the area of the first diffusing plate 21 according to the area of the range of picking-up of the CCD camera 30. If the area of the first diffusing plate 21 is not sufficient, due to the movement of the first diffusing plate 21, there is a possibility that some part of the range of picking-up of the CCD camera 30 may be outside the first diffusing plate 21, thus resulting in the background area of that portion outside the picking-up range becoming darker, the distribution of luminance of the background, which should essentially be uniform, may become dispersed, thus leading to difficulties in image processing.

If the area of the first diffusing plate 21 is sufficient, with respect to the area of the range of picking-up of the CCD camera 30, the distribution of luminance of the background portion will not be dispersed during a movement of the lighting unit 120. Additionally, during the separation of the inspection portion from the picked-up portion in image processing, it is possible to easily separate the background (high luminance portion) portion.

Figure 48:
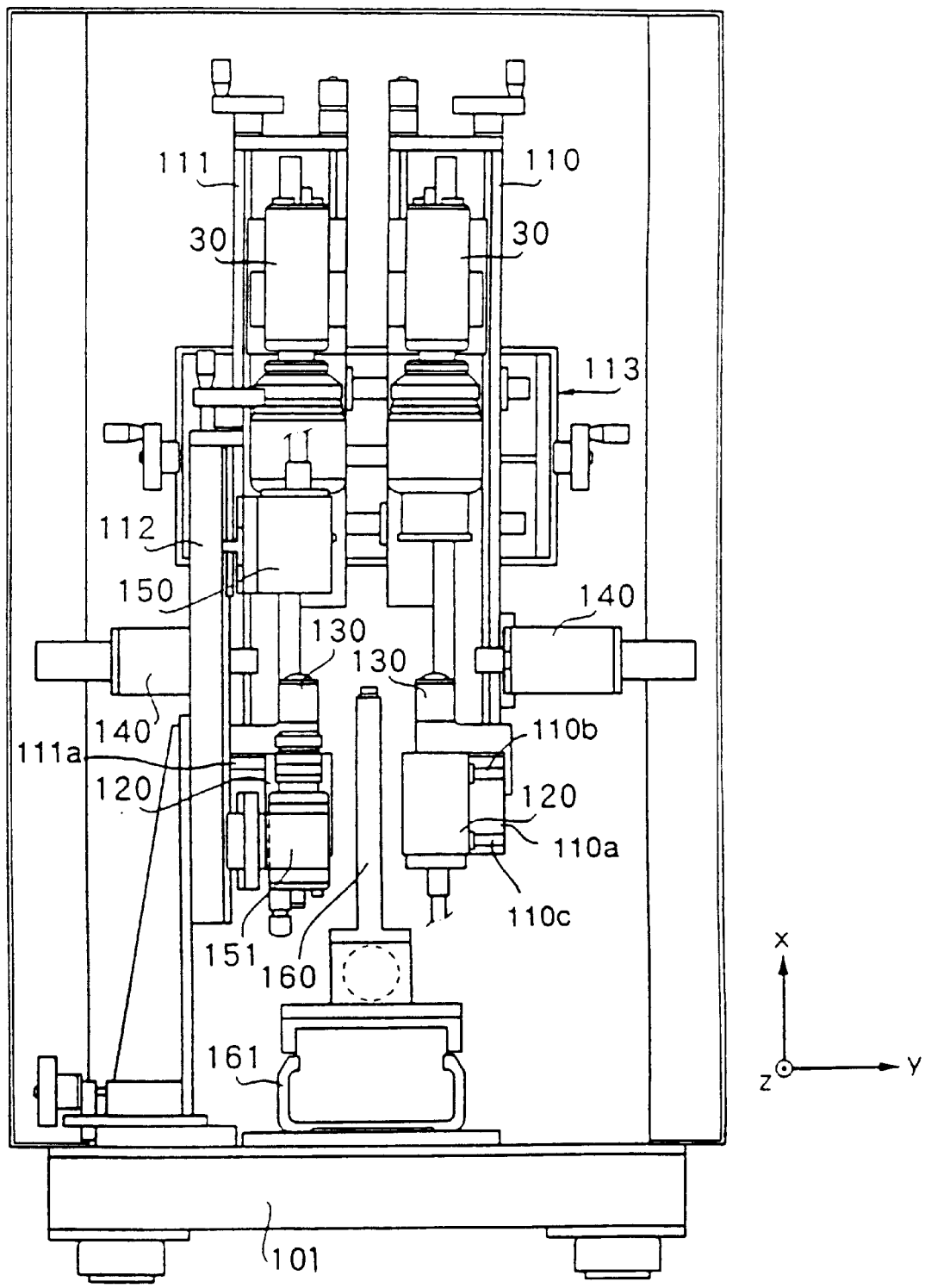
FIG. 48 is a front elevational view of an example of the structure in the sixth embodiment of the first aspect of the present invention.
Figure 49:
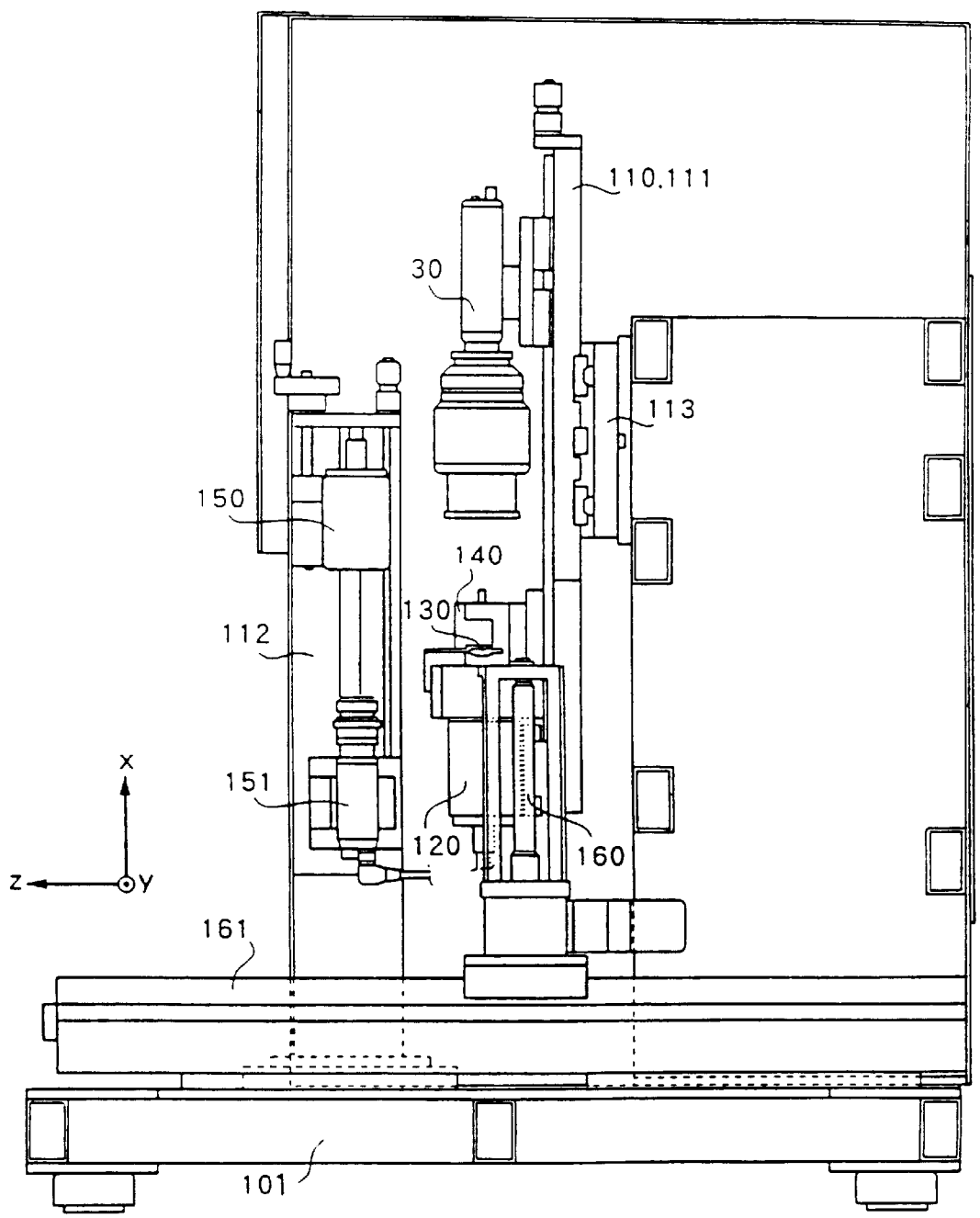
FIG. 49 is a longitudinal sectional view of the apparatus shown in FIG. 48.
Figure 50:
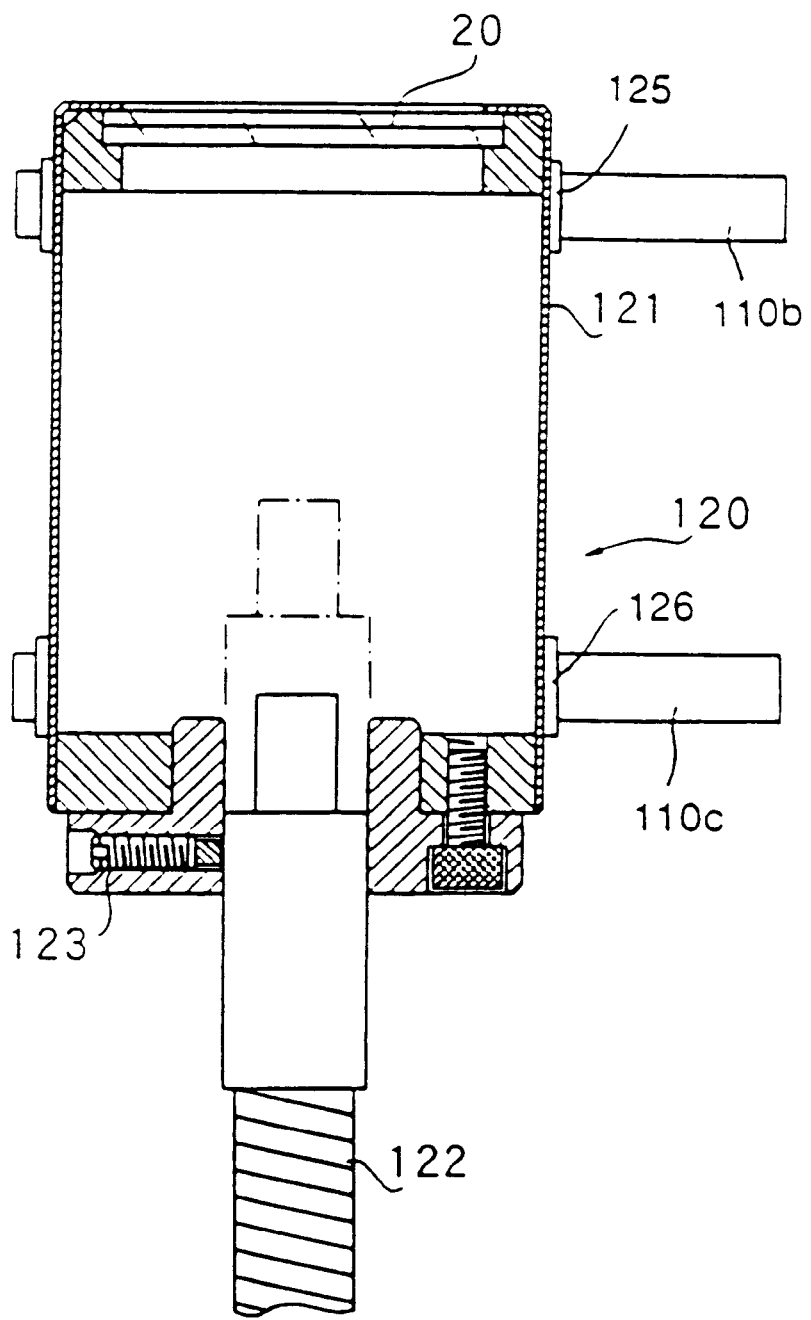
FIG. 50 is a sectional view of a lighting unit of the apparatus shown in FIG. 48.

The following description will be made with reference to FIGS. 48 through 51, in regard to an example of a lens inspection apparatus having two separate inspection systems on the right and left sides thereof, based on the structure of the sixth embodiment of the first aspect of the present invention. For the purpose of explanation, in the drawings an X-axis parallel to the optical axis of the apparatus, and a Y-axis and a Z-axis, perpendicular to each other in a plane perpendicular to the X-axis, are designated. Many aspects of the lens inspection apparatus shown in FIG. 48 and FIG. 49, are common to the lens inspection apparatus of the first embodiment of the first aspect of the present invention shown in FIGS. 11 and 12. Therefore, in regard to the lens inspection apparatus shown in FIG. 48 and FIG. 49, the description will only be made towards those aspects which differ from the lens inspection apparatus of the first embodiment. Lighting units 120, slidable in the Y-axis direction, are mounted to supporting substrates 110a and 111a fixed on the bottom of the first and second guide rail members 110 and 111. Slide rails 110b and 110c, positioned in the Y-axis direction, are provided on the supporting substrate 110a and the casing 121 of the lighting unit 120, in order to movably support the lighting unit 120, as shown in FIG. 50. Sliding members 125 and 126 are provided to respectively connect to the slide rails 110b and 110c. Along the other supporting substrate 111a on the guide rail member 111, slide rails are arranged in a similar manner.

Figure 51:
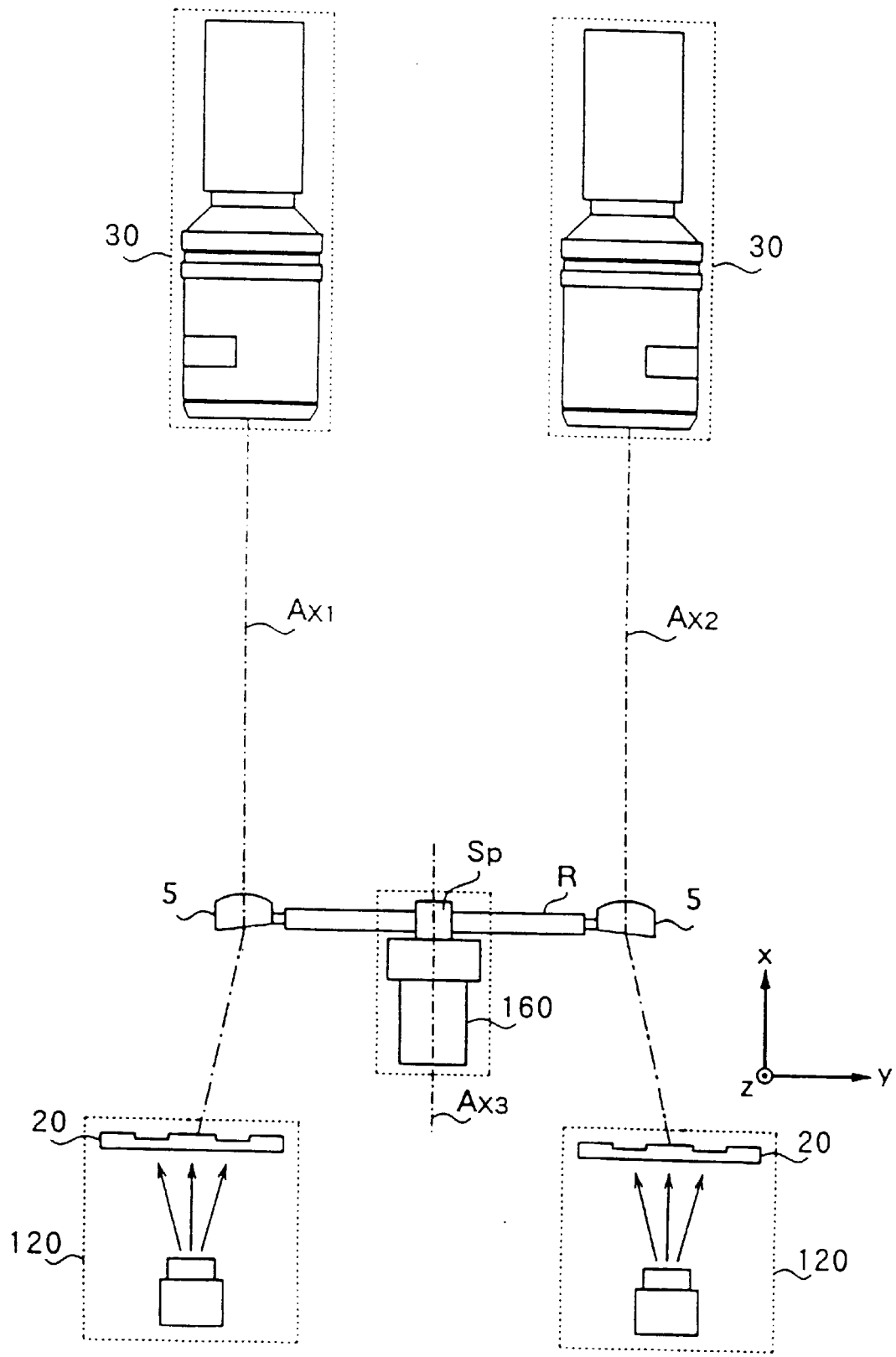
FIG. 51 is a schematic view showing a relationship between lenses to be inspected, in a state connected to runners, set in a lens supporting unit of the apparatus shown in FIG. 48, and inspection optical systems on the right and left of the apparatus.

FIG. 51 is a schematic view illustrating the positioning of the lenses 5 to be inspected, when positioned in a lens supporting unit 160 in the state when connected to the runners R, and the inspection optical systems on the right and left. The lenses 5 are held in such a manner that the end of the spool Sp is inserted into the insertion bore at the top end of the lens supporting unit 160, and are supported rotatively around the rotational axis Ax3, which is parallel to an optical axis Ax1 of the left inspection optical system and an optical axis Ax2 of the right inspection optical system. The distance between the optical axes Ax1, Ax2 of the inspection optical systems may be adjusted by operating the position adjusting means 113, and each of the axes Ax1 and Ax2 is adjusted so that they may approximately coincide with the optical axes of the lenses 5 to be inspected.

The positions of the lighting units 120 are set in order to satisfy the above requirements, namely, positions at which light transmitted through the respective lenses 5, can be moved in parallel in the Y-axis direction by a specified amount, so that the respective light transmitted through each lens may be parallel to the respective optical axis of each CCD camera 30.

As described above, according to the optical member inspection apparatus of the sixth embodiment of the first aspect of the present invention, since the diffusing means is at least movable in the direction perpendicular to the optical axis of the image pick-up means, in the case that the lens to be inspected has a prismatic function, the light emitted from the central portion of the diffusing means and transmitted through the optical member, is efficiently made incident on the image pick-up means.

Figure 52:
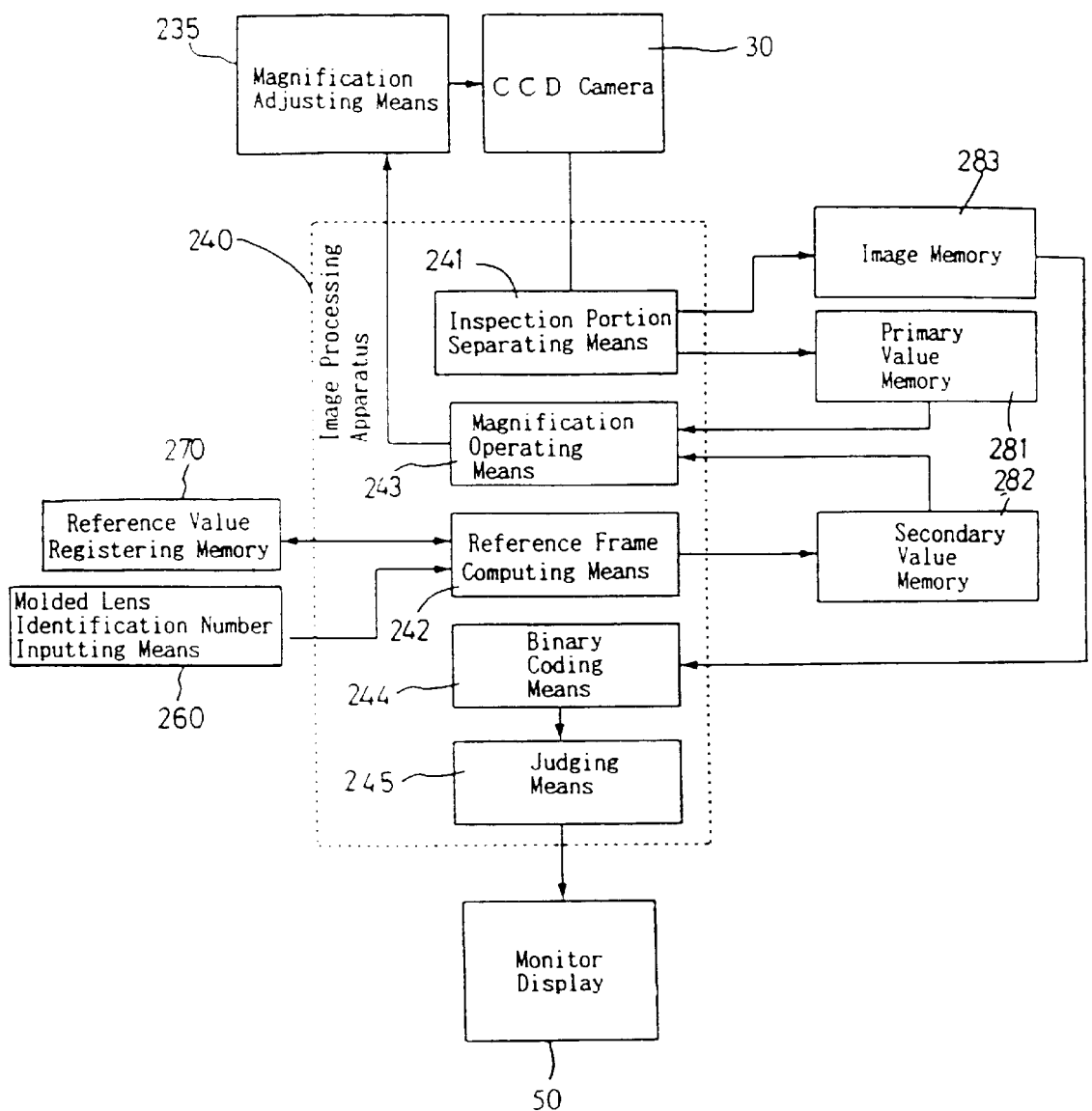
FIG. 52 is a schematic view showing a block diagram of a processing system of a first embodiment of an optical member inspection apparatus, according to a second aspect of the present invention.

FIG. 52 illustrates an overall construction of an optical system and a block diagram of a processing system of a first embodiment of an optical member inspection apparatus according to a second aspect of the present invention.

This first embodiment of the second aspect is characterized in that the magnification of the CCD camera 30 is automatically adjusted so that the image of the inspection portion, in the picked-up image, may correspond to the reference outline, that has been initially registered according to the type of the optical member and also the reference frame, that is calculated by using the value of a recommended magnification of the CCD camera 30.

Similar to the embodiments of the first aspect of the present invention, preferably an optical member made of plastic is designated as the subject to be inspected. The overall structure of the optical member inspection apparatus in the present embodiment will now be described with reference to FIG. 52.

The signal output from the CCD camera 30, which serves as an image pick-up means to pick-up an image of a lens to be inspected, is input to an image processing apparatus 240 to be processed, and the detected information is indicated on the monitor display 50. In the image processing apparatus 240, an inspection portion separating means 241, a magnification operating means 243, a reference frame computing means 242, a binary coding means 244, and a judging means 245 are provided. Additionally, in the image processing apparatus 240, a molded lens identification number inputting means 260 which inputs the molded lens identification number (number of the cavity) of the optical member being inspected, a reference value registering memory 270 in which the design (ideal) value of the outline and the recommended magnification of the CCD camera 30 during picking-up are recorded in relation to the molded lens identification number corresponding to each type of optical member, a primary value memory 281, a secondary value memory 282, and an image memory 283, are connected.

The inspection portion separating means 241 binarizes the input image and separates the inspection portion, in which the object to be inspected exists, from the background portion, and stores the information in regard to the outline of the inspection portion in the primary value memory 281 as the number of pixels, and at the same time stores an image of the inspection portion in the image memory 283. The reference frame computing means 242 reads, according to the molded lens identification number input from the molded lens identification number inputting means 260, the design value of the outline and the recommended magnification of the lens being inspected, and computes the reference frame which is stored in the secondary value memory 282.

The magnification operating means 243 calculates the magnification, by comparing the size of the inspection portion with the size of the reference frame stored in the value memories 281 and 282, so that the size of the inspection portion and the reference frame coincide with each other. The image of the inspection portion picked-up at the appropriate magnification and stored in the image memory 283 is binarized by the binary coding means 244, and based on the binarized image, the judging means 245 judges whether the optical member is defective or not.

A magnification adjusting means 235 automatically adjusts. the magnification, according to the magnification obtained by the magnification operating means 243. The magnification adjusting means 235 varies magnification, by varying the distance between the lens being inspected and the CCD camera 30, or if the CCD camera 30 has a zoom lens, by varying the zooming ratio of the zoom lens.

Figure 53:
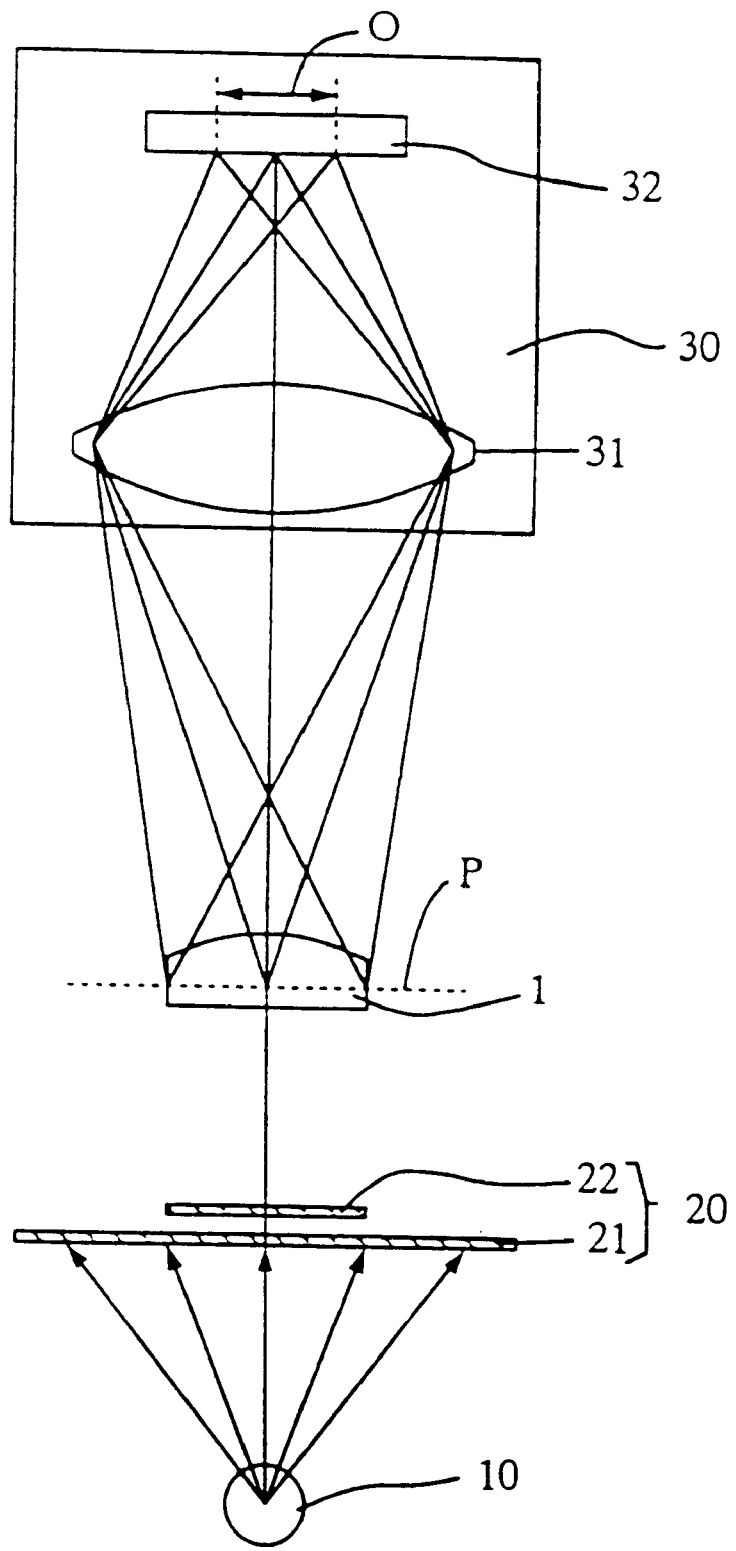
FIG. 53 is a schematic view of an optical system of an optical member inspection apparatus in the first embodiment of the second aspect of the present invention.

FIG. 53 illustrates an overall structure of the optical system of the first embodiment of the second aspect of the present invention, used to form an image picked-up by the CCD camera 30. Since the optical system is identical to the optical system of the first embodiment of the first aspect of the present invention, shown in FIG. 1, no explanation will be given.

Figure 54:
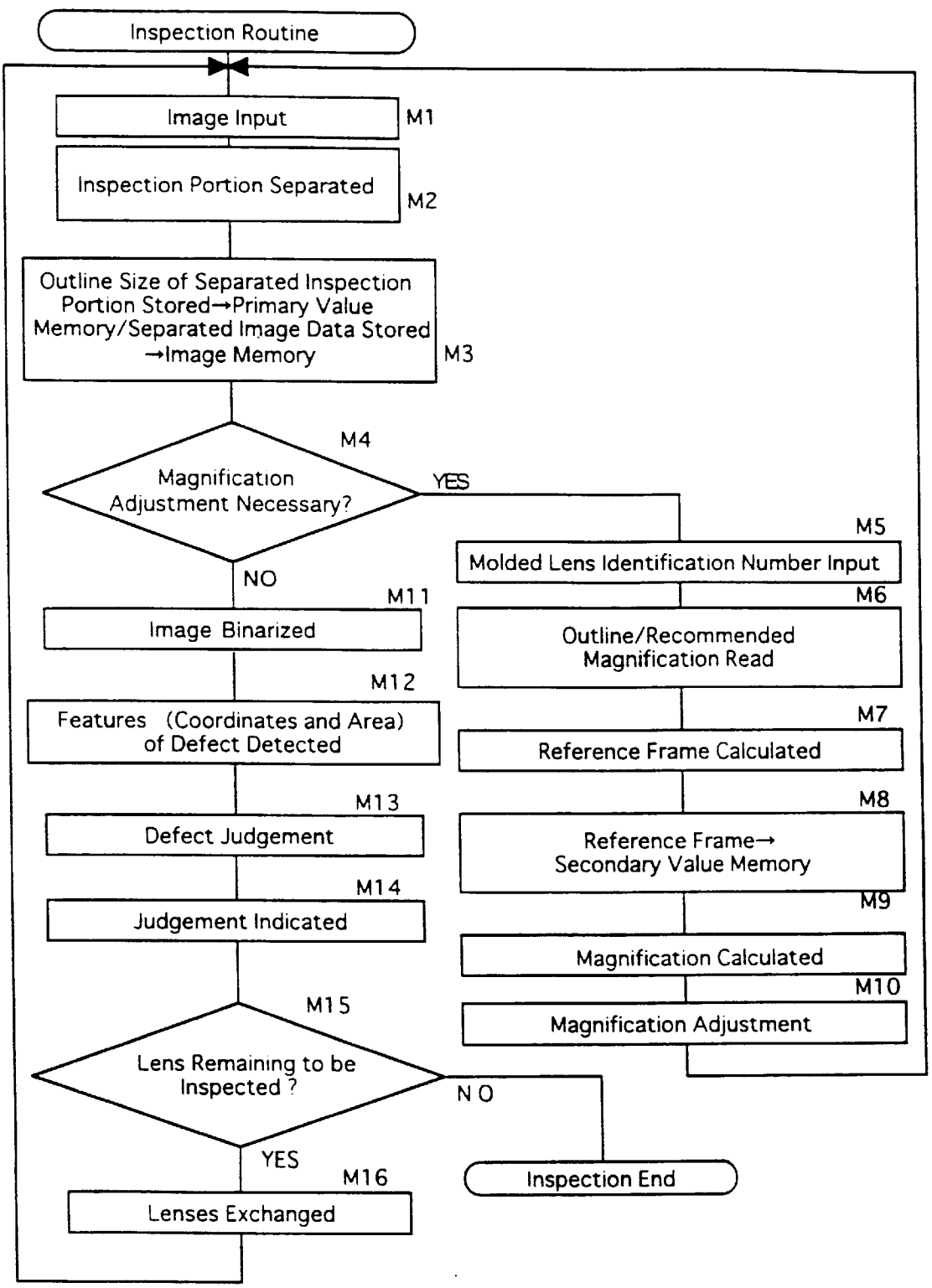
FIG. 54 is a flow chart showing an Inspection Routine of the apparatus of the first embodiment of the second aspect of the present invention.

An inspection process using the apparatus of the first embodiment of the second aspect of the present invention will now described with reference to the flow chart shown in FIG. 54. At M-1, the image is input from the CCD camera 30, and at M-2, that inspection portion of the image corresponding to the image of the lens 1 to be inspected is separated according to the distribution of luminance, i.e., the inspection portion is separated. At M-3, the size of the outline of the separated inspection portion is stored in the primary value memory 281, and the separated image data is stored in the image memory 283.

At M-4, whether it is necessary to adjust the magnification of the-CCD camera 30 is judged. At the start of the inspection, or when the type of lens to be inspected is changed, the magnification of the CCD camera 30 is varied according to the size of the lens to be inspected. If the magnification of the CCD camera 30 needs to be adjusted, at M-5 through M-7, the image processing apparatus 240 reads the outline and the recommended magnification from the reference value registering memory 270 corresponding to the molded lens identification number of the lens being inspected, input from the molded lens identification number inputting means 260, and calculates the size of the reference frame.

At M-8, the calculated size of the reference frame is stored in the secondary value memory 282 as value data corresponding to the number of pixels. At M-9 and M-10, the magnification operating means 243 compares the images'stored in the two value memories 281, 282, and based on the current magnification, the magnification is calculated so that the image of the lens may coincide with the reference frame, and the magnification adjusting means 235 is controlled so that it may coincide with the calculated magnification. Then, control returns to M-1 before the inspection begins, so that the image is again read with the magnification being appropriately set.

In the case that it is not necessary to adjust the magnification, namely in the case that the lens to be inspected is continuously the same type of lens, or in the case that the magnification has already been adjusted, at M-11 the image of the inspection portion stored in the image memory 283 is binarized by dynamic binary processing, and at M-12, the features of the defect are detected from the binary image.

At M-13 and M-14, the image processing apparatus 240 judges whether the lens 1 to be inspected is defective or not according to the detected result, and the result of this judgement is displayed on the monitor display 50. At M-15, it is judged whether there are any remaining lens to be inspected, and if there is a lens to be inspected at M-16 the lenses are exchanged, and the processes from M-1 are repeated, while if there is no lens, the inspection is ended.

Figure 55:
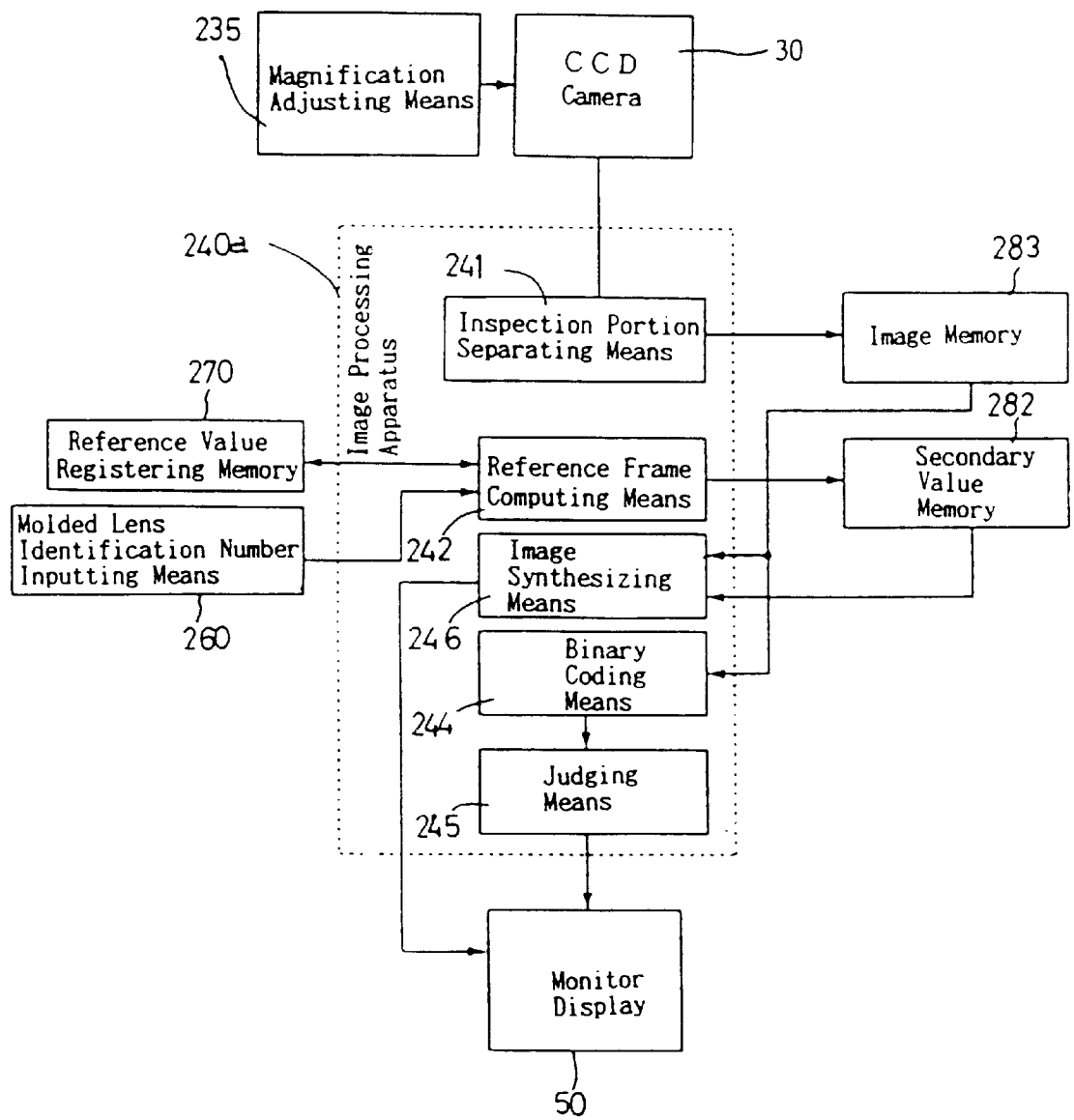
FIG. 55 is a schematic view showing a block diagram of a processing system of a second embodiment of an optical member inspection apparatus, according to the second aspect of the present invention.

FIG. 55 illustrates an overall construction of an optical system and a block diagram of a processing system of a second embodiment of an optical member inspection apparatus according to the second aspect of the present invention. The second embodiment of the second aspect of the present invention only differs from the first embodiment of the second aspect in the following areas, namely, an image processing apparatus 240a, shown in FIG. 55, is used instead of the magnification operating means 243, an image synthesizing means 246 is provided, while the primary value memory 281, which stores the size of the outline of the lens based on the input image, is not provided. The remaining structure of the second embodiment of the second aspect of the present invention is the same as that of the inspection apparatus shown in FIG. 52.

Figure 56:
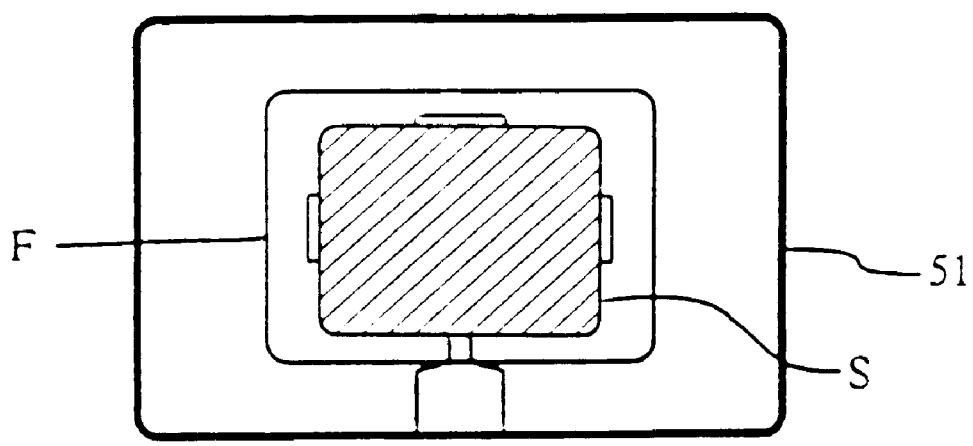
FIG. 56 is a schematic view of an example of an indication on a monitor display of the apparatus of the second embodiment of the second aspect of the present invention.

The image synthesizing means 246 forms an image of a reference frame according to the size of the reference frame stored in the secondary value memory 282, and can display the image of the reference frame, on the monitor display 50, with the reference frame overlaid on the synthesized input image stored in the image memory 283. For example, as shown in FIG. 56, the inspection portion S and the reference frame F are shown overlapping on a screen 51 of the monitor display 50. The inspector may operate a magnification adjusting means 235 by observing such a display and making a manual adjustment of the magnification of the CCD camera 30, so that the outline of the inspection portion S coincides with the reference frame F. In this case, since the reference frame F may be obtained according to the data registered beforehand, as long as the inspection portion S coincides with such a reference memory, it is possible to maintain unitary criteria during the inspection.

As above described, according to the optical inspection apparatus of the second aspect of the present invention, since it is possible to specify the magnification corresponding to a lens to be inspected, based on the objective criteria according to the data registered beforehand, inconsistency in magnification due to different inspectors will be reduced, and unitary criteria will be maintained during inspection.

The following description is made in regard to an embodiment of a method of inspection of an optical member, according to an embodiment of a third aspect of the present invention.

This embodiment of the third aspect is characterized in that firstly, an image of the optical member is input from the image pick-up means. Secondly, the input image is binarized and a preliminary separating operation is executed, in which the image of the optical member is roughly separated from the input image according to a luminance distribution of the binarized input image. Thirdly, it is judged whether or not the preliminary separating operation has been successfully executed. If it is judged that the preliminary separating operation has been success the a main separating operation is executed, in which an image to be inspected is separated from the roughly separated image of the optical member, and fifthly, the separated image to be inspected is binarized to judge whether or not the optical member is defective.

Figure 57:
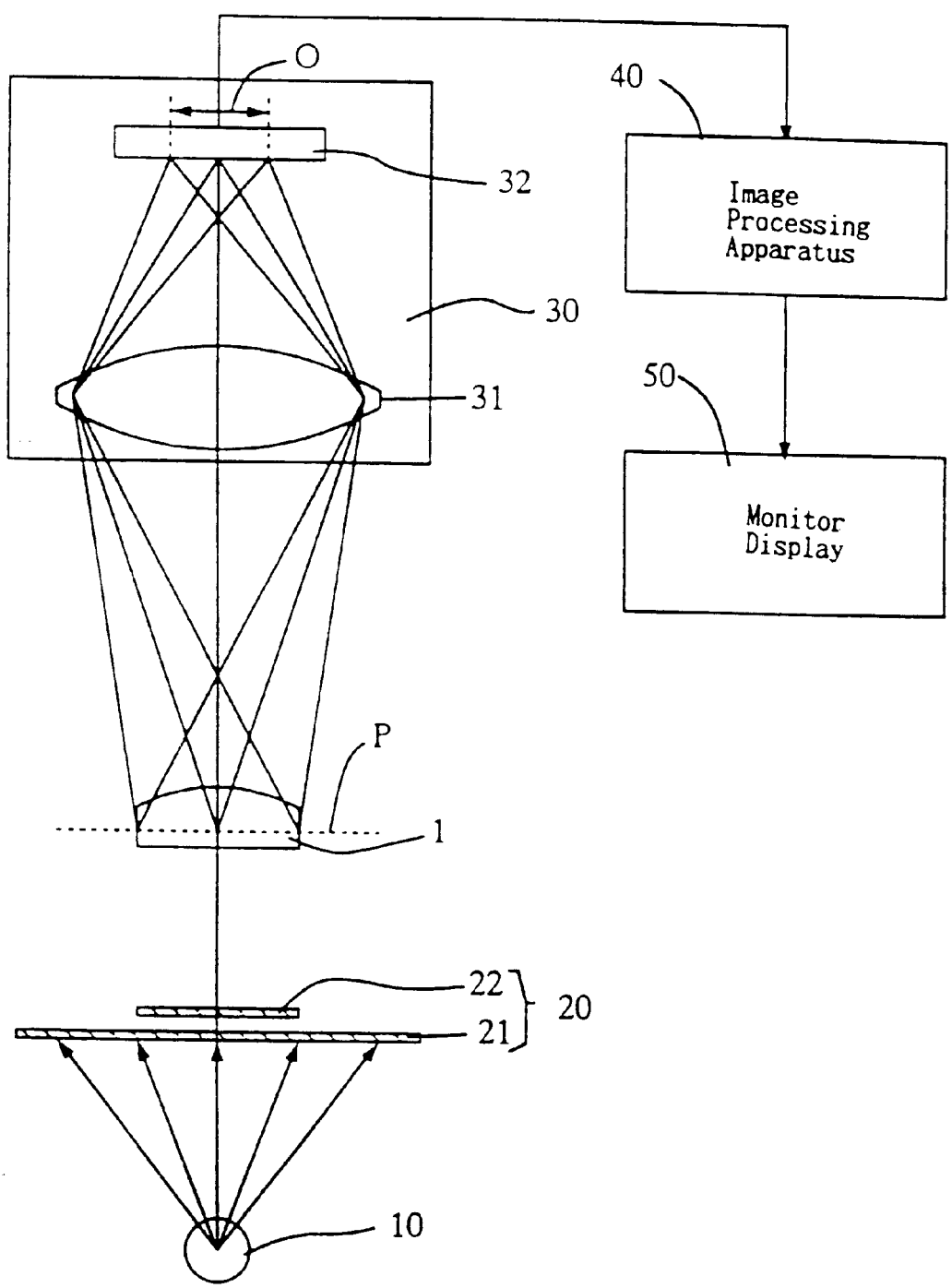
FIG. 57 is a schematic view of an overall construction of optical system and a block diagram of a processing system of an embodiment of an optical member inspection apparatus, according to a third aspect of the present invention.

In the method of the embodiment of the third aspect, similar to the previous aspects of the present invention, an optical member made of plastic is preferably designated as the subject to be inspected. FIG. 57 illustrates an overall structure of the optical system and a block diagram of a processing system of the optical member inspection apparatus of the embodiment of the third aspect of the present invention. The optical system and the processing system of this embodiment are identical to those of the first embodiment of the first aspect of the present invention, shown in FIG. 1, and therefore no explanation will be given.

Figure 58:
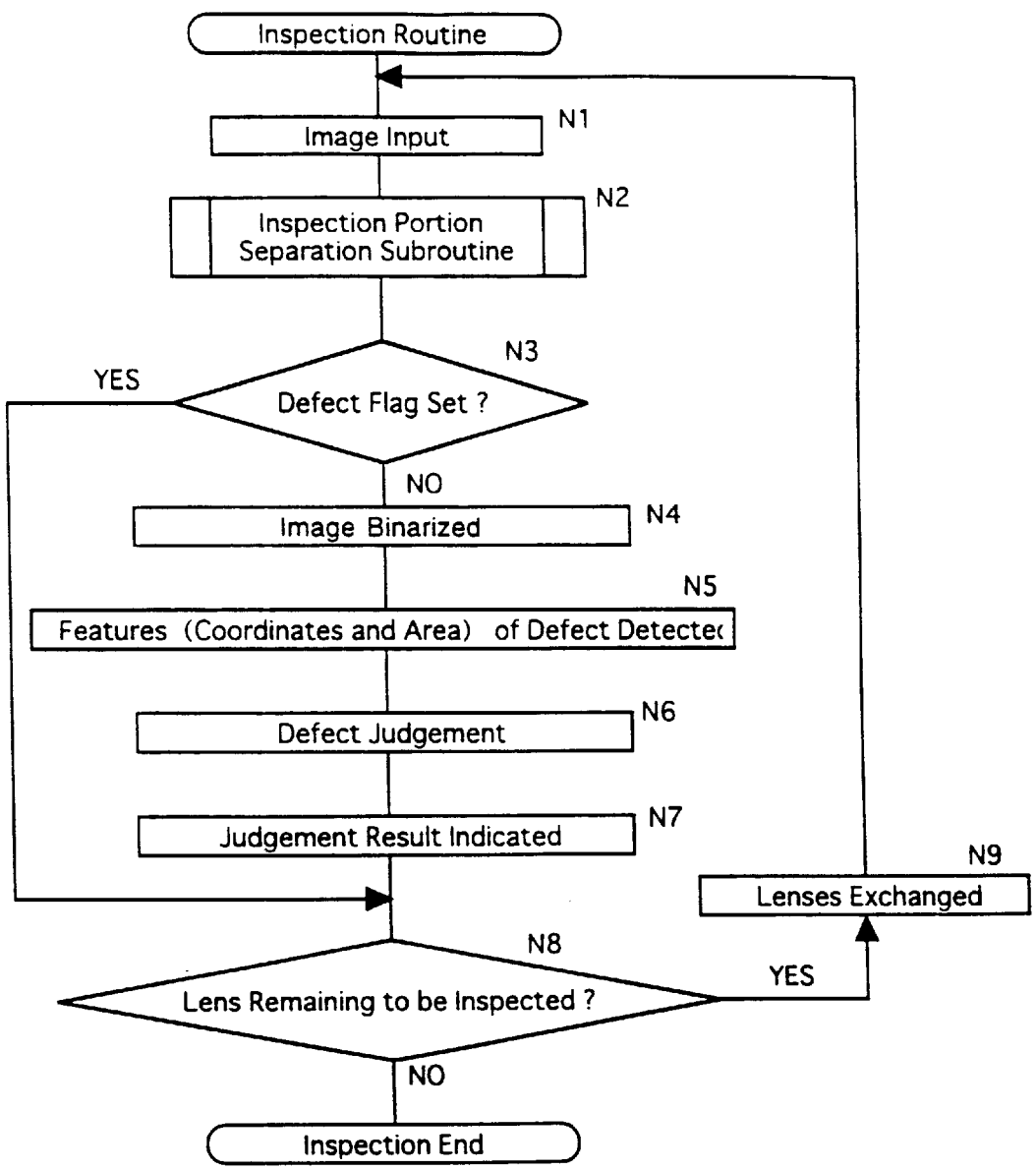
FIG. 58 is a flow chart showing an Inspection Routine of the embodiment of the third aspect of the present invention.

The following explanation refers to the inspection process of the optical member inspection apparatus of the embodiment of the third aspect of the present invention, with reference to the flow chart shown in FIG. 58. In preparation of the inspection, information regarding the lens to be inspected, is loaded in the form of a data table. In addition, appropriate diffusing plates are selected according to the information regarding the lens, and the magnification of the CCD camera 30 is set.

The overall Inspection Routine is shown in the flow chart of FIG. 58. At N-1, the image is input from the CCD camera 30, and at N-2, the inspection portion corresponding to the image of the lens 1 to be inspected is separated according to the distribution of luminance.

During the separation process of the inspection portion, if the lens is not positioned at the specified inspection position the defect flag is set during the separation process of the inspection portion, and in the inspection routine, the decision as to whether the inspection should be continued or not is made according to whether the defect flag is set or not at N-3.

If the lens is positioned at the specified inspection position, the inspection process is executed. At N-4, an image of the inspection portion obtained by the main separation, is binarized by dynamic binarization, and at N-5, the features. of the defect are detected from the binarized image. At N-6, the image processing apparatus 40 judges whether the lens 1 to be inspected is defective, according to the detected result, and at N-7, the result of judgement is displayed on the monitor display 50.

If the defect flag is set at N-3, processes N-4 through N-7 are skipped. At N-8, a judgement is made as to whether there are any lenses remaining to be inspected, and if there is a lens to be inspected, at N-9 the lenses are exchanged and the processes from N-1 are repeated, while if there is no lens to be inspected the inspection process is ended.

The Inspection Portion Separation Subroutine at N-2, included in the above mentioned inspection process, is identical to the Inspection Portion Separation Subroutine of the first embodiment of the first aspect of the present invention, shown in FIG. 17.

For reference, in the claim 50 of the present invention, "the first process" to input the image of an object to be inspected, corresponds to the process N-1 in FIG. 58, "the second process" to make preliminary separation of the inspection portion by binarization of the input image, corresponds to the processes B-1, B-2, B-3, B-5 and B-6 in FIG. 17, "the third process" to judge whether the preliminary separation succeeded or not, corresponds to the processes B-4 and B-7 in FIG. 17, "the fourth process" to make the main separation of the portion as the subject for inspection from the inspection portion preliminary separated, corresponds to the processes B-12 and B-13 in FIG. 17, and "the fifth process" to judge whether the object to be inspected is defective or not by binarization of the separated image of portion as the subject for inspection, corresponds to the processes N-4 through N-6 in FIG. 58.

As described above, according to the method of inspection of an optical member according to the third aspect of the present invention, the separation of the inspection portion is made in two stages, namely, a preliminary separation is made in which process loading is light and the accuracy is low, and a main separation in which process loading is heavy and the accuracy is high, and by judging the defects of lenses in the preliminary separation stage, in the case of the lenses having defects, inspection time can be reduced.

The following explanation is made in regard to an embodiment of an optical member inspection apparatus according to a fourth aspect of the present invention.

This embodiment of the fourth aspect of the present invention is characterized in that a means for picking-up an image of an optical member to be inspected is provided, to output an image of the optical member. The output image of the optical member is binarized by provided means, to detect a suspected mold defect. A first plurality of counters, each counting a number of appearances of the suspected mold defect at a common position on a plurality of optical members molded by a common mold, are also provided. When the number of appearances reaches a first predetermined number, means are provided for deciding that the suspected mold defect appearing at the common position is a real mold defect.

In the inspection apparatus of the fourth aspect of the present invention, similar to the embodiments of the previous aspects of the present invention, an optical member made of plastic is preferably designated as the subject to be inspected.

If plastic is used to-produce an optical member, when the member is taken out from the mold, if the molding has not sufficiently hardened, a possibility exists that some plastic may remain adhered to the mold. This remaining plastic, if not removed, will hardened to form a chip which may adversely affect future moldings, e.g., lead to a hollow-shaped defect, or may damage the mold itself, e.g., resulting in a projection-shaped defect. It should be noted that in the present invention, both hollow-shaped and projection shaped defects are hereinafter generically referred to as "mold marks".

When a mold mark is detected such as to render a lens defective, immediate feedback thereof to the production line is required, and it is necessary to remove any plastic adhered to the mold, or to exchange the mold itself. However, if visual inspection is used, it is difficult to distinguish the mold mark from other defects, thus delaying feedback to the production line, and leading to reductions in amounts of production.

Figure 59:
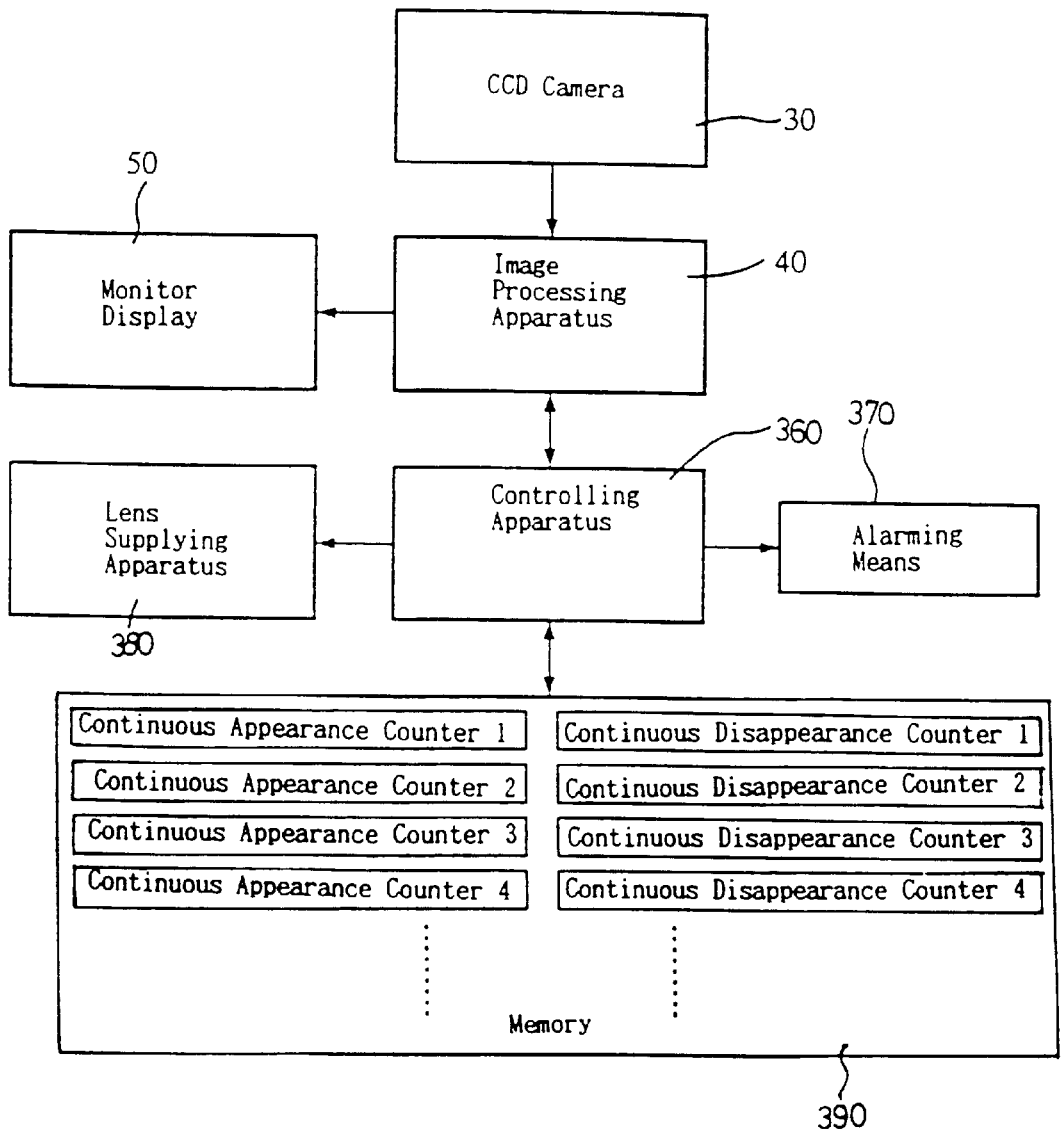
FIG. 59 is a schematic view showing a block diagram of a processing system of an embodiment of an optical member inspection apparatus, according to a fourth aspect of the present invention.

The overall structure of the optical member inspection apparatus of the fourth aspect of the present invention will now be described with reference to FIG. 59.

A signal output from the CCD camera 30, which serves as the image pick-up means to pick-up an image of an object (i.e., lens) to be inspected, is input to an image processing apparatus 40, which serves as a defect coding means. The image processing apparatus 40 detects a defect of the lens to be inspected by binarizing the input image of the lens, and displays the detected information on the monitor display 50, and additionally outputs the detected information to a controlling apparatus 360, which serves as a mold mark inspection apparatus.

The controlling apparatus 360 controls an alarming means 370 which emits an alarm, in the form of light, if a mold mark exists, and a lens supplying apparatus 380 which supplies the lenses to be inspected to the inspection points, and at the same time detects the existence of a mold mark using continuous appearance counters and continuous disappearance counters provided in a memory 390.

The controlling apparatus 360 judges the position and size of the scatterable defect, as to whether the scatterable defect should be considered to be a suspected mold mark, using the defect detected by the image processing apparatus 40, and stores the number of times the defect appears at the same position on the optical member molded by the same mold, for the suspected mold mark in the continuous appearance counter in the memory 390.

When the value in the continuous appearance counter exceeds the limit specified for the detection of a mold mark, the controlling apparatus 360 detects the defect to be a mold mark, and outputs a signal in order for the alarming means 370 to emit the alarm. The value in the continuous appearance counter is reset if the detection of the defect is completely discontinued, i.e., the defect does not appear again. However, if the defect reappears after a short period of disappearance, it is assumed that the disappearance is due to an error in detection, and the previous value in the appearance counter is restored, without resetting the value therein. Therefore, the controlling apparatus 360 counts the number of times the suspected mold mark disappears using the continuous disappearance counter provided in the memory 390, and if the suspected mold mark is detected again while the value in the continuous disappearance counter is less than the specified limit of continuous disappearance, counting in the continuous disappearance counter is resumed without resetting the value in the continuous appearance counter.

The continuous appearance counter is reset in the case that the value therein reaches the specified limit of mold mark detection, or in the case that the continuous disappearance counter reaches the specified limit of the continuous disappearance limit. The continuous disappearance counter is reset if the value therein reaches the specified limit of the continuous disappearance limit, or if the suspected mold mark is detected to be a defect before reaching the specified limit value.

For example, if the limit of mold mark detection is set at 20, and the continuous disappearance limit is set at 5, a suspected mold mark appearing at the same position is judged to be a mold mark when the mold mark detection limit exceeds 20. This does not mean that the suspected mold mark continuously appears, namely, the suspected mold mark could temporarily disappear, as long as the disappearance is within the continuous disappearance limit, i.e. 5.

The controlling apparatus 360 is provided with a detecting means which detects that a suspected mold mark is a defect under the above-mentioned conditions, a first resetting means which resets the value in the continuous appearance counter, and a second resetting means which resets the value in the continuous disappearance counter.

Figure 60:
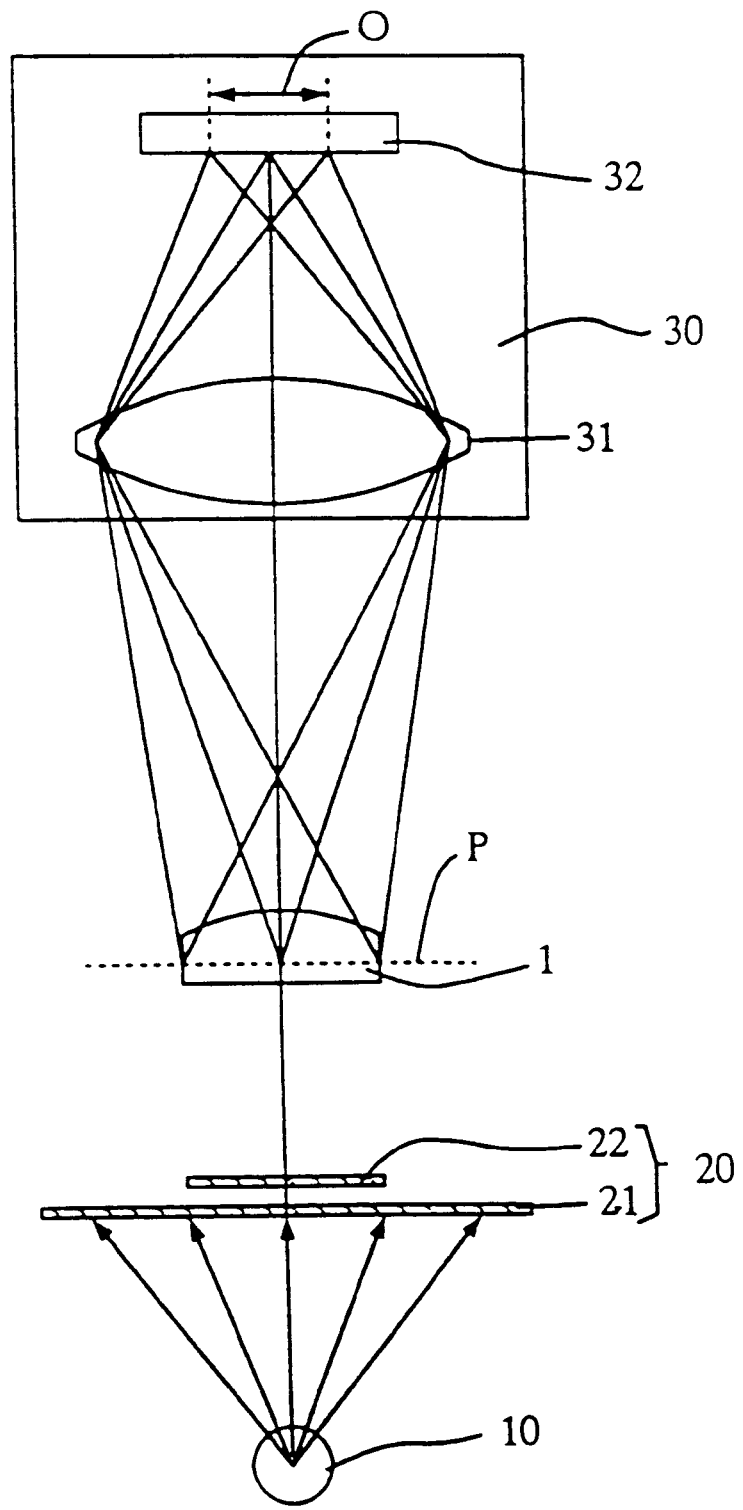
FIG. 60 is a schematic view of an optical system of an optical member inspection apparatus of the embodiment of the fourth aspect of the present invention.

FIG. 60 illustrates an optical system used to form an image picked-up by the CCD camera 30 of the optical member inspection apparatus of the fourth aspect of the present invention. The optical system of the present embodiment is identical to the optical system of the first embodiment of the first aspect of the present invention, shown in FIG. 1, and therefore no explanation shall be given.

The following explanation will be given regarding the inspection process of the optical member inspection apparatus of the embodiment of the fourth aspect of the present invention, with reference to the flow chart shown in FIG. 61. In preparation for the inspection, information concerning the lens to be inspected, is loaded in the form of a data table. Additionally, appropriate diffusing plates are selected according to this information, and the magnification of the CCD camera 30 is set.

Figure 61:
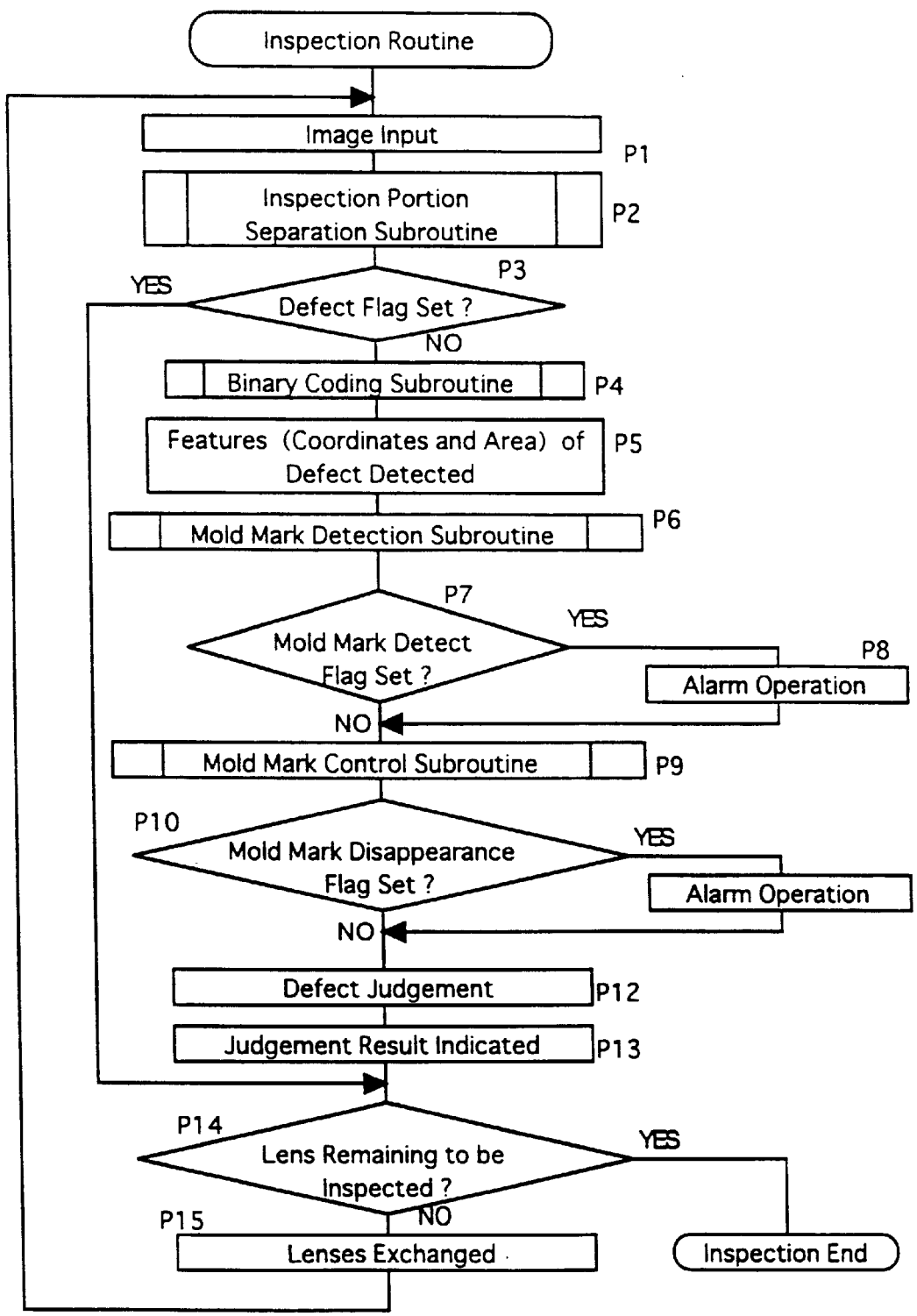
FIG. 61 is a flow chart showing an Inspection Routine of the apparatus of the fourth aspect of the present invention.

The overall Inspection Routine is shown in the flow chart of FIG. 61. At P-1, the image is input from the CCD camera 30, and at P-2, the inspection portion corresponding to the image of the lens 1 to be inspected is separated according to the distribution of luminance (Inspection Portion Separation Subroutine).

During the separation process of the inspection portion, if the lens to be inspected is not positioned at the specified inspection position, the defect flag is set during the separation process of the inspection portion, and in the Inspection Routine, the decision as to whether the inspection should be continued or not is made according to the whether the defect flag is set or not at P-3.

At P-4, an image of the separated inspection portion is separated by dynamic binarization processing, into the scatterable defect, having a luminance higher than the average luminance, and the absorptive defect, having a luminance lower than the average luminance, and at P-5, the features of the defect are detected.

At P-6 it is judged whether the mold mark appears, and if the appearance of the mold mark is detected a detection flag is set. At P-7, it is checked if the detection flag is set, and if the detection flag is checked, it is immediately notified to the inspector by the alarm 30 at P-8.

At P-9 it is judged whether the mold mark disappears, and if the disappearance of the mold mark is detected a disappearance flag is set. At P-10 it is checked if the disappearance flag is set, and if the disappearance flag is checked, it is immediately notified to the inspector by the alarm 30 at P-11.

At P-12 the image processing apparatus 40 judges whether the lens 1 to be inspected is defective or not according to the detected result, and at P-13, the result of this judgement is displayed on the monitor display 50. At P-14, it is judged if there are any remaining lenses to be inspected or not, and if there is a remaining lens to be inspected, at P-15 lenses are exchanged and the processes from P-1 are repeated, and if there are no lenses left to be inspected, the inspection ends.

The Mold Mark Detection Subroutine at P-6 included in the above Inspection Routine, is identical to the Mold Mark Detection Subroutine of the first embodiment of the first aspect of the present invention, shown in FIG. 24. Additionally, the Mold Mark Control Subroutine at P-9 included in the above Inspection Routine, is identical to the Mold Mark Control Subroutine of the first embodiment of the first aspect of the present invention, shown in FIG. 25.

As above described, according to the optical member inspection apparatus of the embodiment of the fourth aspect of the present invention, it is possible to statistically detect a mold mark appearing on an object to be inspected, according to the picked-up image of the object to be inspected, and feedback to the production line may be expedited thus improving production capacity.

The following is a description of an embodiment of an optical member inspection apparatus using a method of mark separation according to the fifth aspect of the present invention.

This embodiment of the fifth aspect of the present invention is characterized in that firstly, an input image of the optical member is binarized to draw (extract) a figure corresponding to the mark or a defect of the optical member from the binarized input image. Secondly, a binarized image of a reference mark having no defect is expanded. Thirdly, a primary image is generated, including a figure corresponding to the mark and a figure corresponding to the defect, the defect being located in a vicinity of the figure corresponding to the mark, by executing an AND operation of the binarized input image and the expanded binarized reference mark per pixel. Fourthly, the image of the mark is generated by removing all figures of defects not connected to the figure corresponding to the mark from the primary image, in accordance with information regarding the reference mark, and fifthly generating an image excluding the image of the mark, by extracting the image of the mark generated from the binarized input image.

In the fifth aspect of the present invention, similar to the embodiments of the previous aspects of the present invention, preferably an optical member made of plastic is designated as the subject to be inspected.

In the prior art, it is widely known to use a plano-convex lens as a plastic lens for a finder of a camera. On the plane surface (on one side) thereof, a visual field mark defining a visual field of the finder, or an autofocus mark defining a range of automatic focusing, is formed. These marks are formed as projections, compared with the surrounding surface, due to a slight hollow being formed on the mold which is used for molding the lens. Light, from a subject to be photographed, incident on the mark is scattered, thus the mark is darker than the surrounding area, and it may be seen as a frame within the visual field of the finder.

In the inspection apparatus using image processing technology, if the characteristics of the marks and defects are similar, they may be detected in the same way, and therefore it is necessary to separate the figure (i.e., the area defined by the mark) of the mark from the inputted image before defect inspection, thus making the separation process complicated.

Figure 62:
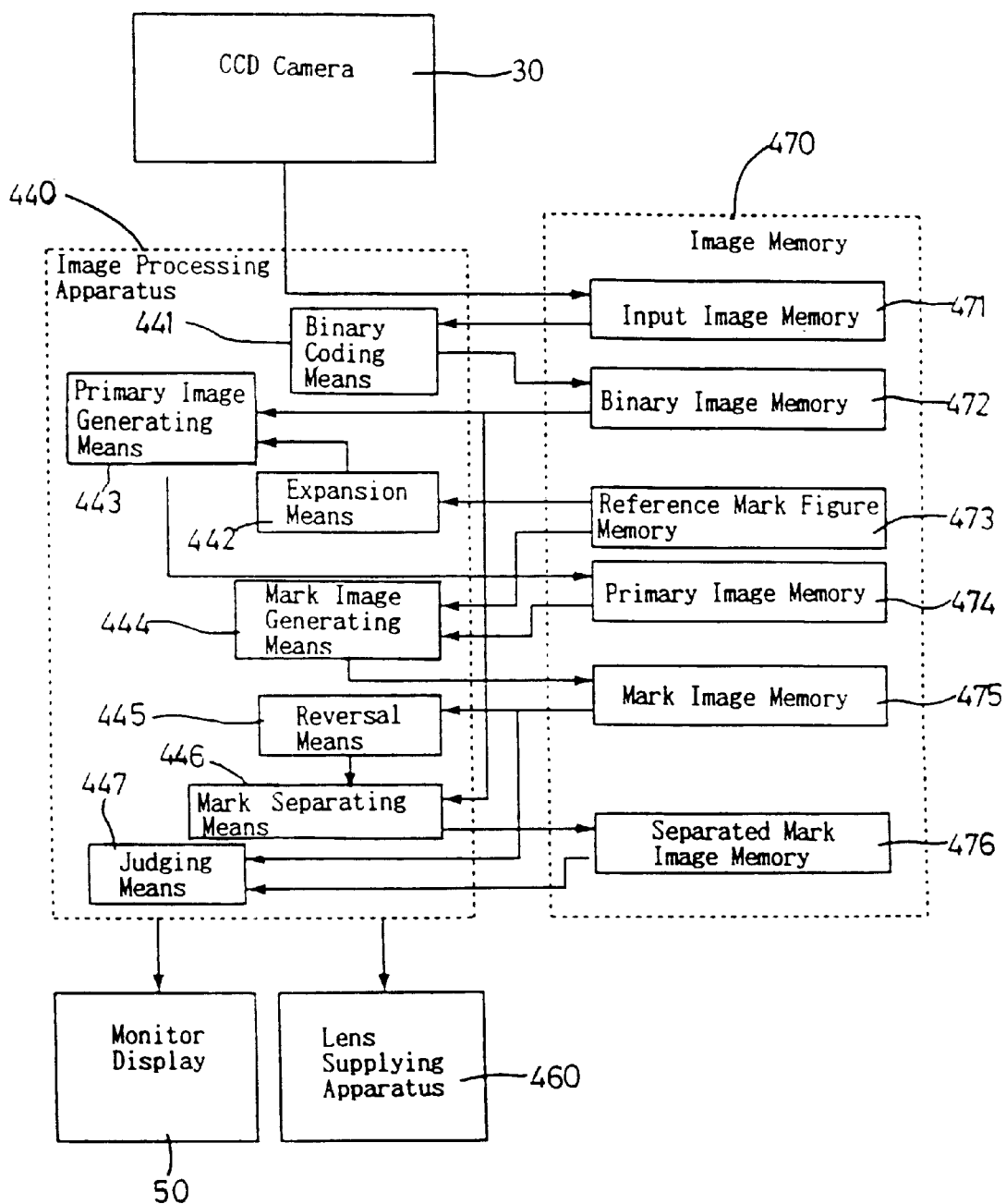
FIG. 62 is a schematic view showing a block diagram of a processing system of an embodiment of an optical member inspection apparatus by using a mark separation method, according to a fifth aspect of the present invention.

The overall structure of the optical member inspection apparatus of the present embodiment will now be described with reference to FIG. 62.

A signal output from the CCD camera 30, which serves as an image pick-up means to pick-up an image of a lens to be inspected, is input to an image processing apparatus 440. The image processing apparatus 440 displays the detected information on the monitor display 50, controls a lens supplying apparatus 460 which supplies the lenses to the inspection position, and additionally generates the separated mark image by using a plurality of frame memories provided in an image memory 470.

In the image processing apparatus 440, a binary coding means 441, which binarizes the input image to detect the mark and defect of a lens to be inspected, an expansion means 442, which expands the binarized image of the defectless reference mark figure, a primary image generating means 443, which generates the primary image by the AND operation of the binarized image detected by the binary coding means 441 and the reference mark figure expanded by the expansion means 442 per pixel, a mark image generating means 444, which labels the figures included in the primary image equal to the number of marks, in order of largeness of area, and which generates the mark image by removing the unmarked figures, a reversal means 445 which reverses the mark image, a mark separating means 446 which generates the separated mark image by the AND operation of the binarized image and the reversal mark image, and a judging means 447 which judges whether the lens is defective or not, according to the mark image and the mark separated image, are all provided.

In the image memory 470, an input image memory 471, a binary image memory 472, a reference mark figure memory 473, primary image memory 474, a mark image memory 475 and a separated mark image memory 476, are respectively provided to correspond to each of the means provided in the image processing apparatus 440.

Figure 63:
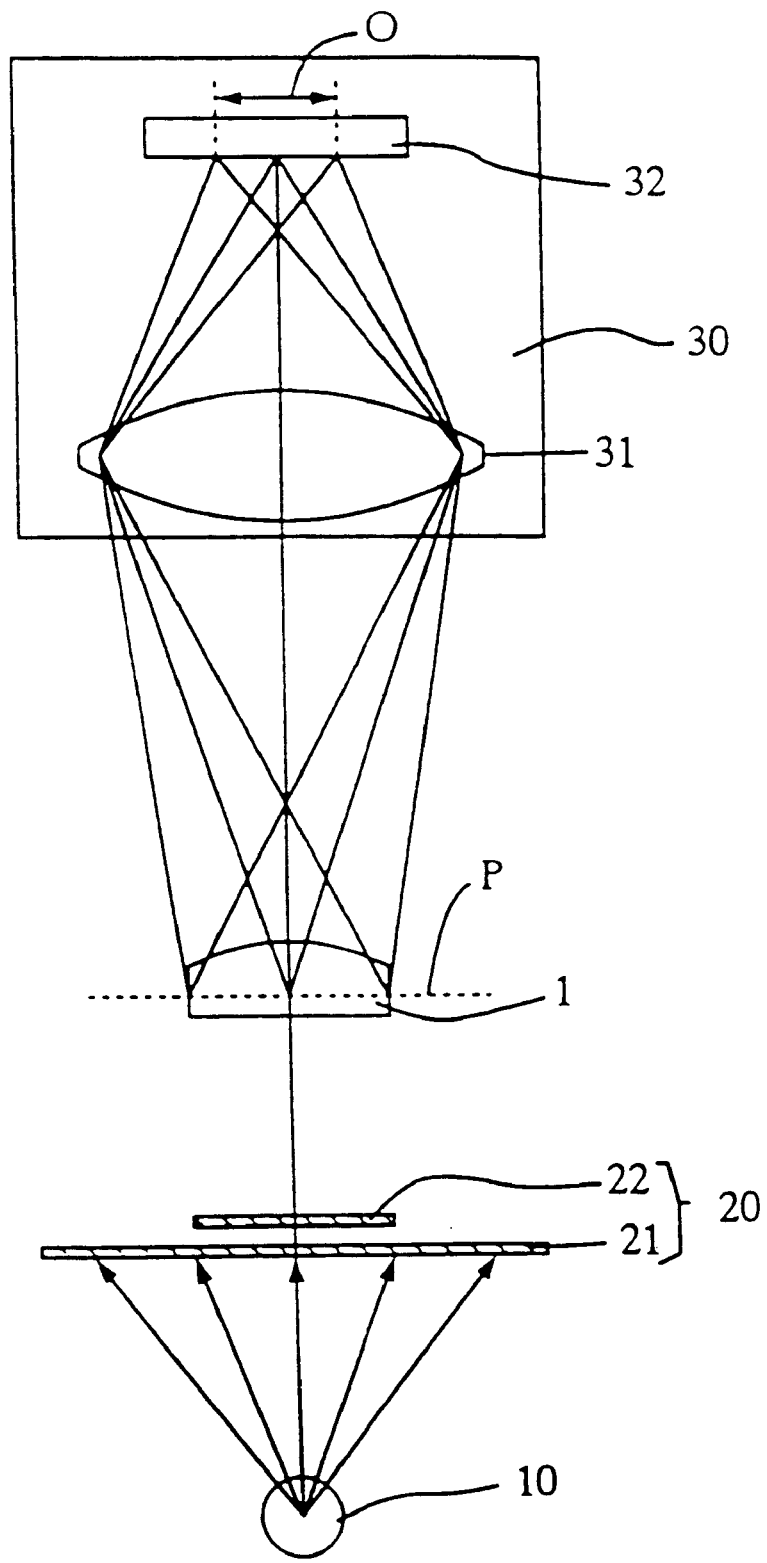
FIG. 63 is a schematic view of an optical system of the optical member inspection apparatus of the embodiment of the fifth aspect of the present invention.

FIG. 63 illustrates the overall structure of the optical system of the embodiment of the fifth aspect of the present invention used to form an image picked-up by the CCD camera 30. The optical system of the fifth aspect of the present invention is identical to the optical system of the first embodiment of the first aspect of the present invention, shown in FIG. 1, and therefore no explanation shall be given.

The process of inspection using the above apparatus of the embodiment of the fifth aspect of the present invention will now be described with reference to the flow chart shown in FIG. 64. In preparation for the inspection, information concerning the lens is input in the form of a data table. In addition, appropriate diffusing plates are selected according to the input information, and the magnification of the CCD camera 30 is appropriately set.

Figure 64:
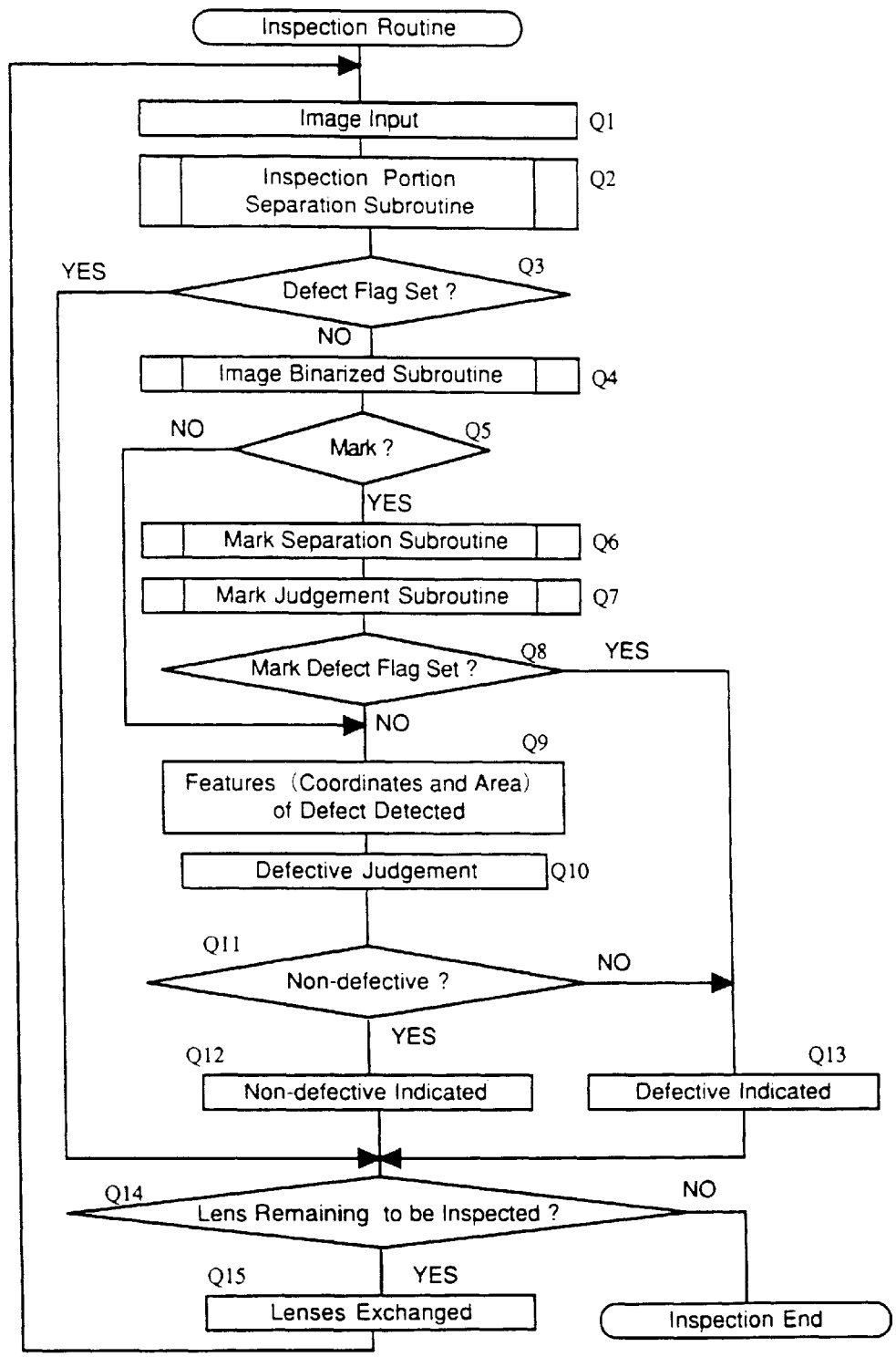
FIG. 64 is a flow chart showing an Inspection Routine of the apparatus of the embodiment of the fifth aspect of the present invention.

The Inspection Routine (inspection process) is shown in the flow chart in FIG. 64. At Q-1, the image is input from the CCD camera 30, and at Q-2, the inspection portion corresponding to the image of the lens to be inspected is separated according to the distribution of luminance.

During the separation process of the inspection portion, if the lens is not positioned at the specified inspection position the defect flag is set during the separation process of the inspection portion, and in the inspection routine, the decision as to whether the inspection should be continued or not is made according to whether the defect flag is set or not (at Q-3).

At Q-4, an image of the separated inspection portion is separated by dynamic binarization processing, into the scatterable defect having a luminance higher than the average luminance, and the absorptive defect having a luminance lower than the average luminance, and at Q-5, it is judged whether there is a mark on the lens to be inspected, and if a mark exists, at Q-6 the mark is separated, and at Q-7 it is judged whether the separated mark is defective or not. If the mark defect flag is not set during the mark separation and the mark judgement processes, at Q-8 and Q-9, the features of the defect are detected.

At Q-10, the judging means 447 of the image processing apparatus 440 judges whether the lens 1 to be inspected is defective, according to the detected result, and at Q-12 and Q-13, the result of the judgement is displayed on the monitor display 50. At Q-8, it is checked if the mark defect flag has been set, and if the flag has been set, it is displayed that the mark is defective without detecting the features of the defect at Q-13.

At Q-14, it is judged whether there are any remaining lens left to be inspected, and if there are any remaining lenses, at Q-15 the lenses are exchanged by the lens supplying apparatus 460 and the processes from Q-1 are repeated until there are no more remaining lenses to be inspected, then the inspection is ended.

In general, the criteria used to judge a defect is stricter for the central portion of the optical member, through which the majority of light is transmitted, than for the peripheral portion of the optical member. However, for a finder lens having a mark formed thereon, the criteria used to judge a defect is stricter for the mark itself and the surrounding portion of the mark, than the other portion. Therefore, in the inspection routine of the present embodiment, it is firstly judged whether the mark has a defect, and if a defect exists on the mark itself or on the surrounding portion of the mark, the mark is judged to be defective without any inspection of the other portion of the lens, and only if no defect exists on the mark and the surrounding portion, is it judged whether that the remaining portion of the lens, other than the mark, has a defect.

The mark separation subroutine at Q-6, included in the above inspection routine of the present embodiment, is identical to the mark separation subroutine of the first embodiment of the first aspect of the present invention, shown in FIG. 21, and thus no explanation shall be given. In addition, the mark judgement subroutine at Q-7, included in the above inspection routine of the present embodiment, is identical to the mark judgement subroutine of the first embodiment of the first aspect of the present invention, shown in FIG. 23.

As above described, according to the optical member inspection apparatus of the embodiment of the fifth aspect of the present invention, with the preliminary separation by the AND operation, the defect in the image of the lens not overlapping with the expanded reference mark figure is removed from the primary image, and the mark figure is detected by simply labelling the mark figure of the primary image. Therefore, by inspecting the defective condition during labelling, it is not necessary to execute a complicated process, and the mark figure can be separated accurately by simple processing.

The following is a description of an optical member inspection apparatus and the method thereof of an embodiment of a sixth aspect of the present invention.

This embodiment of the sixth aspect of the present invention is characterized in that a plurality of optical members are inspected. Each optical member is inspected by a plurality of types of inspection, to detect a defect. In this optical member inspection apparatus, the higher a frequency of detection of the defect in one type of inspection, amongst the plurality of types of inspection, is, the earlier that inspection is executed. The frequency of detection being statistically obtained through an inspecting operation.

Figure 65:
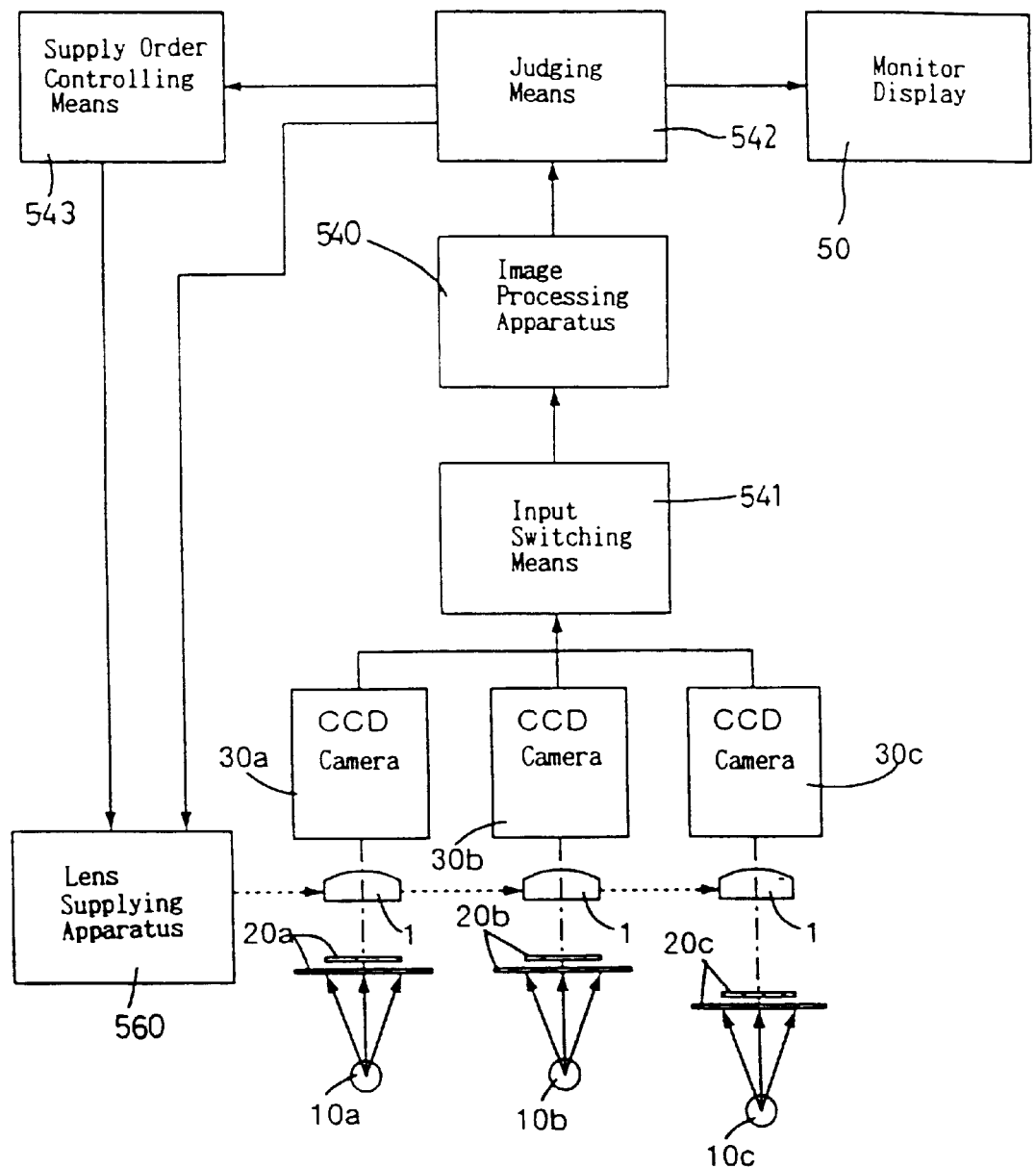
FIG. 65 is a schematic view showing a block diagram of a processing system of an embodiment of an optical member inspection apparatus, according to a sixth aspect of the present invention.

Similar to the embodiments of the previous aspects of the present invention, preferably an optical member made of plastic is designated as the subject to be inspected. The overall structure of the optical member inspection apparatus and the method thereof of the embodiment of the sixth aspect of the present invention will now be described with reference to FIG. 65.

In the optical member inspection apparatus of the present embodiment, CCD cameras 30 (30a, 30b and 30c), which serve as image input means, corresponding to first, second and third lenses (each denoted by the reference numeral 1) to be inspected, an input switching means 541, which switches and selects an image from among the images of three lenses 1 to be inspected, picked-up by the CCD cameras, an image processing apparatus 540, which processes the switched image signal, a judging means 542, which judges, according to the information detected by the image processing apparatus 540, whether the detected defect corresponding to each lens to be inspected exceeds the specified criteria or not, and a monitor display 50 which displays the result of the judgement, are all provided.

The CCD cameras (30a, 30b, 30c) each inspect for a different type of defect, i.e., there are three different types of inspection, namely a first type of inspection, a second type of inspection and a third type of inspection. For example, the CCD camera 30a inspects for defects on the upper surface of the lens, the CCD camera 30c inspects for defects inside the lens, and the CCD camera 30b inspects for defects on the lower surface of the lens.

At positions opposite to each of the CCD cameras (30a, 30b, 30c) light source apparatuses (10a, 10b and 10c) respectively consisting of light sources 10 and diffusing means 20 (20a, 20b and 20c) are provided. The lenses 1 to be inspected are respectively positioned between each respective CCD camera and each respective diffusing means, i.e., each lens is positioned at a respective image input position of each CCD camera. By choosing a specific light source apparatus or CCD camera, the type of inspection to be undertaken can be selected.

Furthermore, in the inspection apparatus a lens supplying apparatus 560 sequentially supplies the lenses 1 to be inspected to the respective image input position of each CCD camera. A supply order controlling means 543, provided in the inspection apparatus, controls the order in which the lenses are supplied (supply order) by the lens supplying means 560, based on the frequency of existence of defects per type of inspection. The frequency of existence of defects per type of inspection is statistically obtained from the judgement results of the judging means 552.

The lens supplying means 560 supplies each lens to the corresponding image input position in order. If a lens is detected to have a defect exceeding the inspection criteria of one type of inspection (i.e., the inspection for defects inside the lens), then that lens is no longer supplied to subsequent image inputting positions and is removed, i.e., the remaining inspections (i.e., the inspection for defects on the upper surface of the lens and the inspection for defects on the lower surface of the lens) are not carried out. Those lenses for which no defect is detected, are supplied to all the image input positions in order.

In the supply order controlling means 543, a command to supply the lenses, to the CCD cameras 30a, 30b and 30c, is initially fixed in a determined order, i.e, lenses are firstly supplied to CCD camera 30a, secondly-supplied to CCD camera 30b and thirdly supplied to CCD camera 30c, and during a sequential inspection of the lenses, the frequency of existence of a defect per type of inspection is judged by the judging means 542. According to the result of judgement of the judging means 542, the order in which the lenses are supplied to the CCD cameras is modified, so that that type of inspection having the highest frequency of defects, has priority of inspection. Namely, if the highest frequency of defects is detected inside the lens (i.e., detected by the CCD camera 30c, for example), then subsequent lens are firstly supplied to the CCD camera 30c, while if the lowest frequency of defects is detected on the upper surface of the lens (i.e., detected by the CCD camera 30a, for example), then subsequent lens are supplied to the CCD camera 30a, after being supplied to the CCD camera 30c and the CCD camera 30b (i.e., having a frequency of defects detected between CCD camera 30a and CCD camera 30c).

Note that the inspection having the highest frequency of defects will be referred to as the first ranked inspection, the inspection having the lowest frequency of defects will be referred to as the third ranked inspection, and that the inspection having a frequency of defects between the highest frequency and the lowest frequency will be referred to as the second ranked inspection.

In the supply order controlling means 543, a counter is provided to count the total number of lenses that have been inspected, the number of non-defective lenses, and the number of defective lenses, for each of the three types of inspection. By statistically judging the frequency of existence of a type of defect (i.e., a defect inside a lens), according to the value of the counter, the supply order of the lenses to the CCD cameras is decided. For example, when a predetermined number of lenses have been inspected, provided that the proportion of defective lenses detected by the first type of inspection, judged by the image picked-up by the CCD camera 30*a*, is 0%, and that the proportion of defective lenses detected by the second type of inspection, judged by the image picked-up by the CCD camera 30*b*, is 5%, and that the proportion of defective lenses detected by the third type of inspection, judged by the image picked-up by the CCD camera 30*c*, is 30%, the supply order of lenses to the CCD camera is set in such a manner that the inspection is made in the order of CCD camera 30*c*, 30*b* and then 30*a*.

If the lens to be inspected is a plastic lens, there is a possibility that a defect in the mold may be transferred to the lens, and in this case the possibility of a sequential existence of the same defect will be high. In addition, in regard to other lenses, for example lenses manufactured in the same lot from the same material, or by the same apparatus, they may also have a high probability of the existence of the same type of defect. Therefore, by making that type of inspection having the highest frequency of defects, a priority inspection, the number of inspections in regard to the defective lenses is reduced, and therefore the efficiency of the total inspection will improve.

Figure 66:
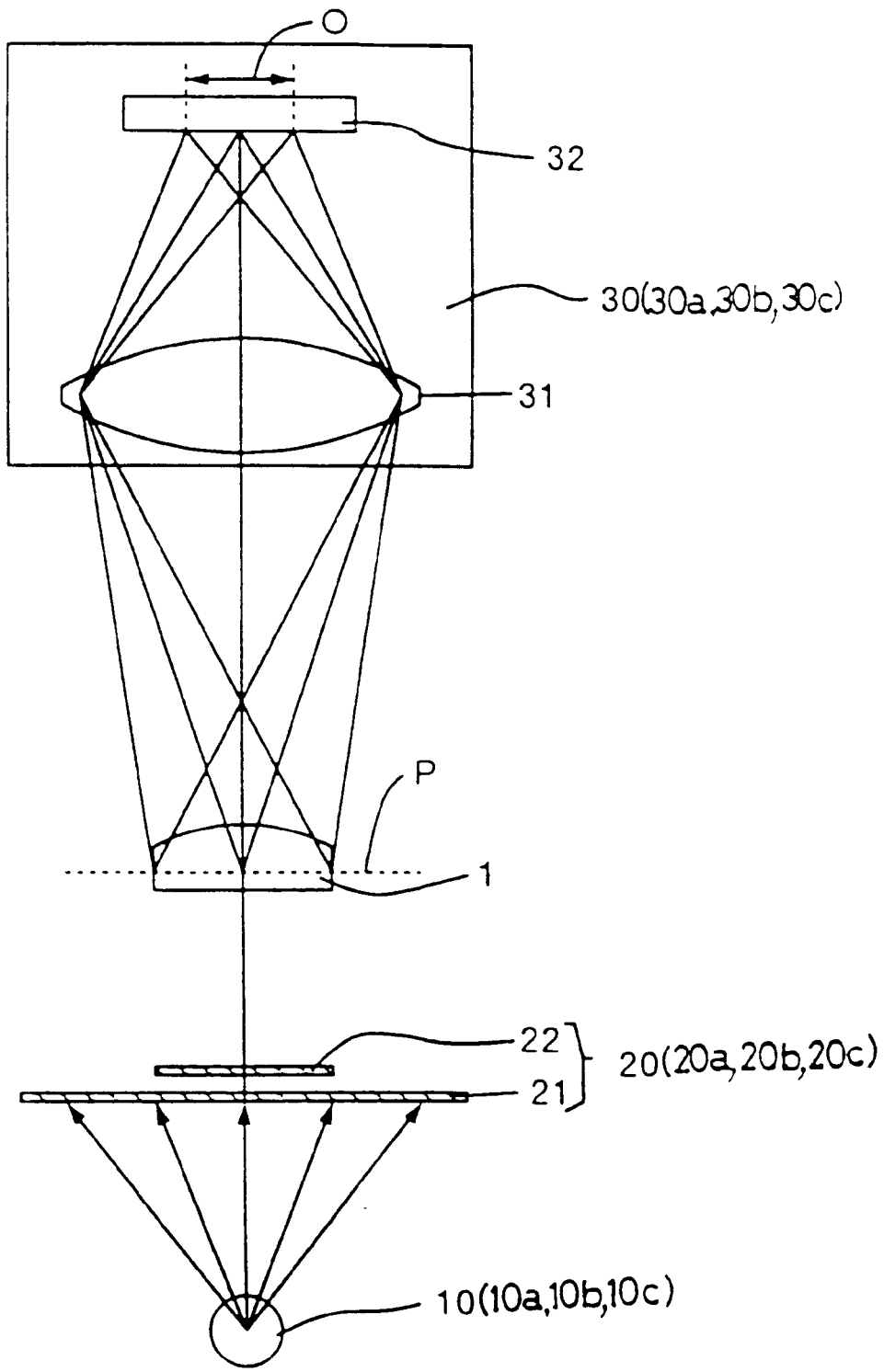
FIG. 66 is a schematic view of an optical system of the optical member inspection apparatus of the embodiment of the sixth aspect of the present invention.

FIG. 66 illustrates the structure of an optical system of the present embodiment used to form an image picked-up by one of the CCD cameras 30*a*, 30*b* and 30*c*. It should be noted that in fact three optical systems are respectively provided to correspond to each of the CCD cameras. Each optical system is identical to the optical system of the first embodiment of the first aspect of the present invention, shown in FIG. 1, and therefore no explanation shall be given.

As described above, the balance of the ability to detect between the absorptive defect and the scatterable defect may be adjusted by varying the position of the light source in the optical axis direction. The ability to detect a defect will increase if the difference between the luminance of the defect portion and the average luminance increases, and will decrease if the difference between the luminance of the defect portion and the average luminance decreases.

In the structure of the optical system of the embodiment of the sixth aspect of the present invention, if the incident angle of that light, emitted from the peripheral portion of the diffusing means, on the lens to be inspected, increases, the strength of the scattering light due to the defect will increase accordingly, and therefore if the incident angle is set larger, the ability to detect the scatterable defect will increase, while if the incident angle is set smaller, the ability to detect the scatterable defect will decrease. In addition, among the total quantity of light incident on the lens to be inspected, if the ratio of that light, emitted from the peripheral portion of the diffusing means having high luminance, incident on the lens to be inspected, increases, the strength of scattering light due to the defect will increase accordingly, and therefore the higher such a ratio is set, the ability to detect the scatterable defect will increase, while the lower the ratio is set, the ability to detect the scatterable defect will decrease.

The light sources 10*a* and 10*b*, respectively provided for the CCD cameras 30*a* and 30*b*, are fixed at positions relatively close to the respective lenses 1 to be inspected, as compared with the position of the CCD camera 30*c* relative to the corresponding lens 1 to be inspected. Regarding each CCD camera 30*a* or 30*b*, since the quantity of all the light incident on the lens 1 is relatively large, the average luminance, will also be large. At the same time, since the angle of light, emitted from the peripheral portion of the diffusing means, incident on the lens 1 is large, both the luminance in the high luminance portion DH due to the scatterable defect and the luminance in the low luminance portion DL due to the absorptive defect will become large. In this case, the ability to detect the scatterable defect increases, while the ability to detect the absorptive defect decreases.

The diaphragms of the CCD cameras 30*a* and 30*b* are set in such a manner that the respective depth of field is reduced by making the opening of the diaphragm large. The CCD camera 30*a* is set to focus on the upper surface of the lens 1 to be inspected, and the CCD camera 30*b* is set to focus on the lower surface of the lens 1. The image of the CCD camera 30*a* is used to detect the scatterable defect, such as a flaw, on the upper surface of the lens 1 (i.e., the first type of defect), while the image of the CCD camera 30*b* is used to detect the scatterable defect, such as a flaw, on the lower surface of the lens 1 (i.e., the second type of defect).

The light source corresponding to the CCD camera 30*c* is set in a remote position away from the corresponding lens 1 to be inspected. Since the total quantity of light incident on the lens 1 is relatively small, as compared with that in the case of the CCD camera 30*a* or 30*b*, the average luminance is accordingly small. While at the same time, the incident angle of light, emitted from the peripheral portion of the diffusing means and incident on the lens to be inspected, is relatively small, and therefore, the luminance of the high luminance portion DH due to the scatterable defect, and the luminance of the low luminance portion DL due to the absorptive defect, both decrease. In this case, the ability to detect an absorptive defect is increased, and the ability to defect a scatterable defect is decreased.

The diaphragm of the CCD camera 30*c* is set so that the depth of field is greater than the depths of field of the CCD cameras 30*a* and 30*b*, so that the CCD camera 30*c* may be able to detect an absorptive defect, such as dust, located inside the lens to be inspected (i.e., the third type of defect).

The process of inspection of the embodiment of the seventh aspect of the present invention will now be described with reference to the flow charts shown in FIG. 67 and FIG. 68.

At R-1, a specified number n is set in a counter C to determine the interval for resetting the order for inspection. In such a manner, in the Order Setting Subroutine at R-28, the order of inspection is reset when the number of inspected lenses reaches n.

With regard to the third ranked inspection (i.e., that inspection having the lowest frequency of defects) at R-2 an image from the CCD camera of the third ranked inspection is input, and if at R-3 it is detected that there is no lens in position to be inspected by the third ranked inspection, control proceeds to R-11.

If at R-3 a lens is detected, at R-4 a counter for the number of lenses inspected by third ranked inspection is increased by an increment, and then at R-5 it is judged whether the lens has a defect or not. If no defect is detected at R-6, a counter for the number of non-defective lenses is increased by an increment at R-7, and at R-8 the non-defective lens is ejected from the inspection process. While if at R-6 a defect is detected, a counter for the number of defects detected by the third ranked inspection is increased by an increment at R-9, and at R-10 the defective lens is ejected from the inspection process.

If at R-3, no lens is detected at the position to be inspected by the third ranked inspection, then at R-11 an image from the CCD camera of the second ranked inspection (i.e., that inspection having a frequency of defects of more than the third ranked inspection and less than the first ranked inspection) is input. If at R-12, no lens is detected at the position to be inspected by the second ranked inspection, control proceeds to R-19.

If at R-12 a lens is detected, then at R-13 it is judged whether the lens has a defect. If at R-14 the lens has no defect, then at R-15 the non-defective is moved to the position to be inspected by the third ranked defect. While if at R-14 the lens has a defect, a counter for the number of lenses inspected by the second ranked inspection is increased by an increment at R-16. At R-17, a counter for the number of defective lenses detected by the second ranked inspection is increased by an increment. Subsequently, at R-18 the defective lens is ejected from the inspection process.

At R-19 an image from the CCD camera of the first ranked inspection is input. If at R-20, a lens is not at the position to be inspected by the first ranked inspection, control proceeds to R-27. While, if at R-20 a lens is in position to be inspected, control proceeds to R-21 to judge whether the lens has a defect or not. If at R-22 no defect is detected, the lens is moved to the position to be inspected by the second ranked inspection. While if the lens is defective at R-22, a counter for the number of lenses inspected by the first ranked inspection is increased by an increment at R-24. Subsequently, at R-25, a counter for the number of defects detected in the first ranked inspection is increased by an increment, and at R-26 the defective lens is ejected from the inspection process.

At R-27 it is checked whether the inspection is complete, i.e. if there are any lenses remaining to-be inspected. If there are no more lenses to be inspected at R-27, the inspection routine is ended, while if at least one lens remains uninspected at R-27, control proceeds to the Order Resetting Subroutine at R-28 (see FIG. 68). After the Order Resetting Subroutine is complete, the next lens is positioned to be inspected at the first ranked inspection.

Figure 67:
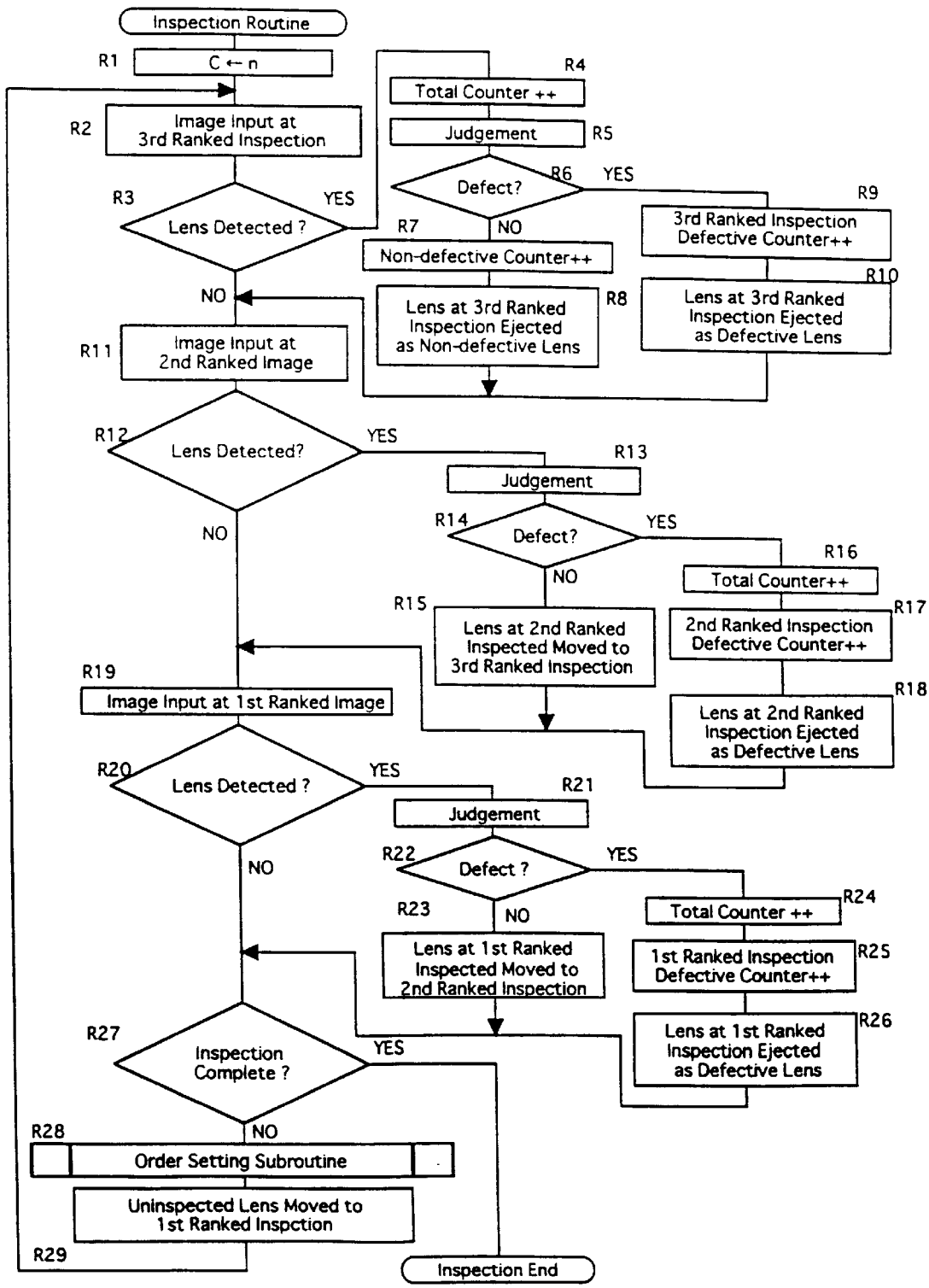
FIG. 67 is a flow chart showing an Inspection Routine of the apparatus of the embodiment of the sixth aspect of the present invention.

In the flow chart shown in FIG. 67, from the point of view of the inspection apparatus, the three types of inspections are executed, at one time (i.e., one loop of the flow chart), for a maximum of three lenses, at R-2 through R-26, and for the purpose of producing an efficient flow of lenses, the inspection, the transfer and the ejection from the inspection process, are executed in order from the third ranked inspection to the first ranked inspection.

Considering a single lens 1 to be inspected, by repeating the routine of the flow chart shown in FIG. 67, three times, a maximum of three inspections will be executed, according to the order of inspection specified on the basis of the frequency of existence of a defect. Namely, the inspected lens having no defect is ejected as non-defective, after being inspected, in the order of, the first ranked inspection, the second ranked inspection, and the third ranked inspection. On the other hand, if any of the inspected lenses having a defect exceeding the criteria is detected, it is immediately ejected as defective, and the following types of inspection are of not executed.

Figure 68:
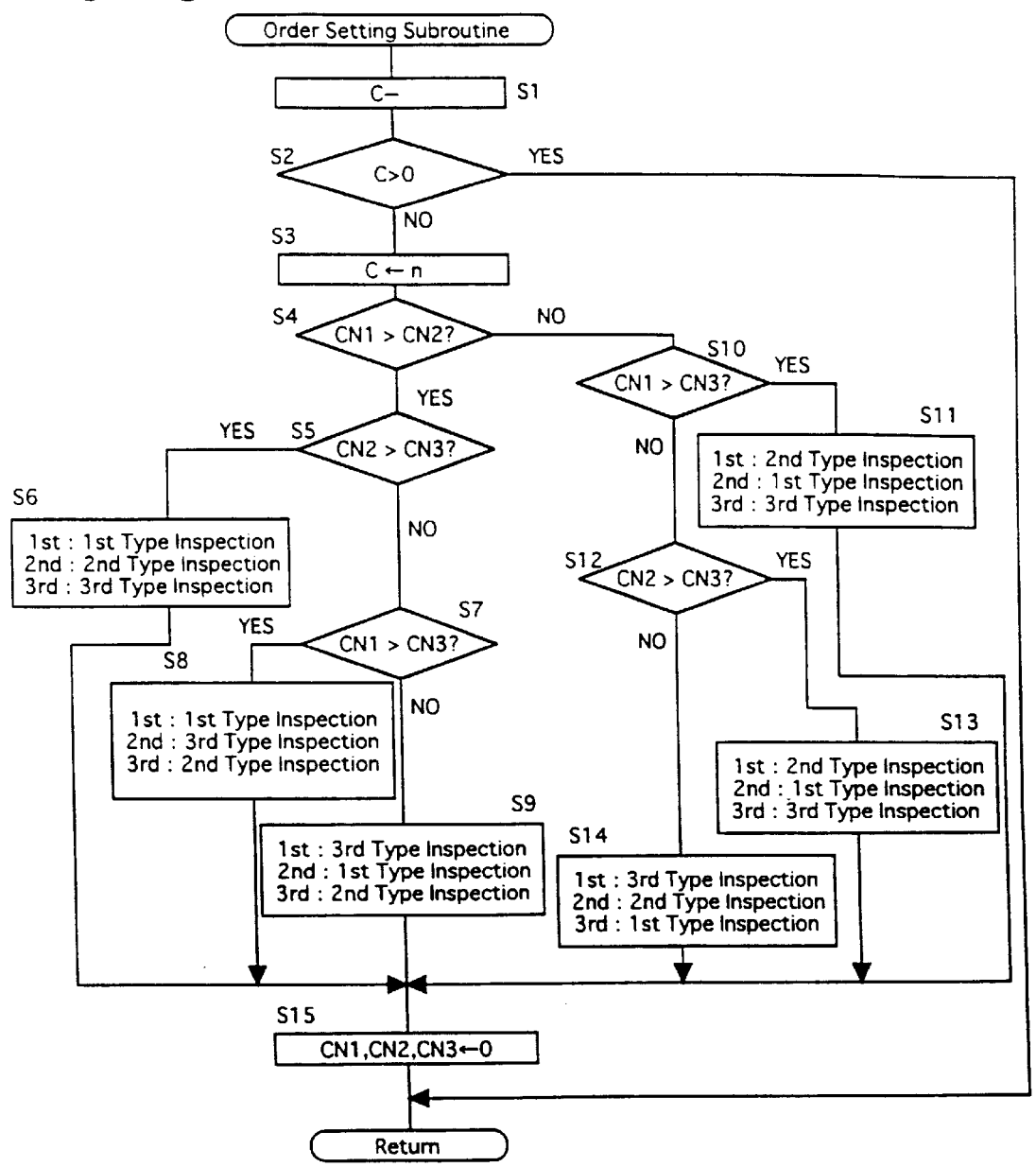
FIG. 68 is a f low chart showing an Order Setting subroutine of the Inspection Routine shown in FIG. 67.

The Order Setting Subroutine shown in FIG. 68, sets the order of priority of the inspection types, according to the values of the various counters set in the flow chart of FIG. 67, i.e., a defective counter for the first ranked inspection CN1, which counts the number of defective lenses detected by the first ranked inspection, a defective counter for the second ranked inspection CN2, which counts the number of defective lenses detected by the second ranked inspection, and a defective counter for the third ranked inspection CN3, which counts the number of defective lenses detected by the third ranked inspection. In the flow chart shown in FIG. 68, the code "++" indicates the increment of the counter, and "−−" indicates the decrement thereof.

In the flow chart shown in FIG. 67, the defective counters are specified in order of priority thereof, but the counters do not correspond to the type of inspection. The correspondences are decided in the order setting in FIG. 68. For example, at R-9 the defective counter of the third ranked inspection is increased in increments, it does not indicate that the defective counter of the third type of inspection is increased. On the other hand, the defective counters in FIG. 68 correspond to the type of defect.

At S-1 in FIG. 68, the counter C, for setting the interval for resetting the order of increments, is decreased in increments, and at S-2 control returns to the flow chart in FIG. 67 without any processing until the value of C is 0. If the value of the counter C is 0, at S-3 the value of the counter C is reset to be n, and at S-4 through S-14, the values of the defective counters in each type of inspection are compared and the priority order of the types of inspection is set in order of largeness of value of the counter.

In such a manner, each time when the three types of inspections are set n times, the priority order of the type of inspections is reset in order of the inspection having the highest frequency of existence of defects during the latest n times of inspections. When the order is reset, at S-15 the values of each defective counter are reset to be 0, and the flow returns to the flow chart in FIG. 67.

As above described, according to the optical member inspection apparatus and the method thereof using the mark separation method of the embodiment of the sixth aspect of the present invention, the type of inspection having the highest frequency of detection has priority to inspect, at the time of detection of a defect, the following types of inspections are not required to inspect, and comparing with the case of inspection in the fixed order without considering the frequency of detection, the overall throughput of the inspection process will improve.

The following is a description of an embodiment of an optical member inspection apparatus according to a seventh aspect of the present invention.

In regard to a lens being used as an optical member, since the portion of the lens used for actually transmitting the light is defined as an effective aperture, the optical performance inspection may be sufficiently made in theory as long as an inner periphery of the effective aperture is designated as a subject (portion) for inspection. In fact however, the portion for inspection is designated to be wider than that of the effective aperture. This is made in consideration of a misalignment when the optical member is assembled as a product, and so almost the whole area inside the outer periphery of the lens is included in the subject for inspection.

If the inspection portion covers a large area such as mentioned above (i.e., larger than the effective aperture), it may lead to a higher possibility that noise, generated outside the effective aperture, e.g., noise generated during the separation of the binarized image from the initial image, or noise due to dirt on and around the optical member, is included in the inspection portion. Such types of noise are not due to a defect of the optical member, and thus if such noise exists in the expanded effective aperture, it will be necessary to remove the noise upon inspection. In order to remove such noise, included in the portion around the boundary line of the effective aperture, complicated image processing is necessary, which may overload the processing apparatus, and increases inspection time.

This embodiment of the seventh aspect of the present invention is characterized in that a means for picking-up an image of an optical member to be inspected is provided, to output an image of the optical member. Means for setting a plurality of areas to be inspected in the image of the optical member, is also provided. One of the plurality of areas is an outermost area including a boundary line defining a designed effective aperture of the optical member. In addition, means are provided for setting a criterion for judgement for each of the plurality of areas, the criteria being different from one another. A criterion set for the outermost area is alleviative, compared with the other criteria. Means are also provided for judging whether or not each of the plurality of areas is defective, in accordance with a corresponding criterion from the criteria set by the criterion setting means.

Figure 69:
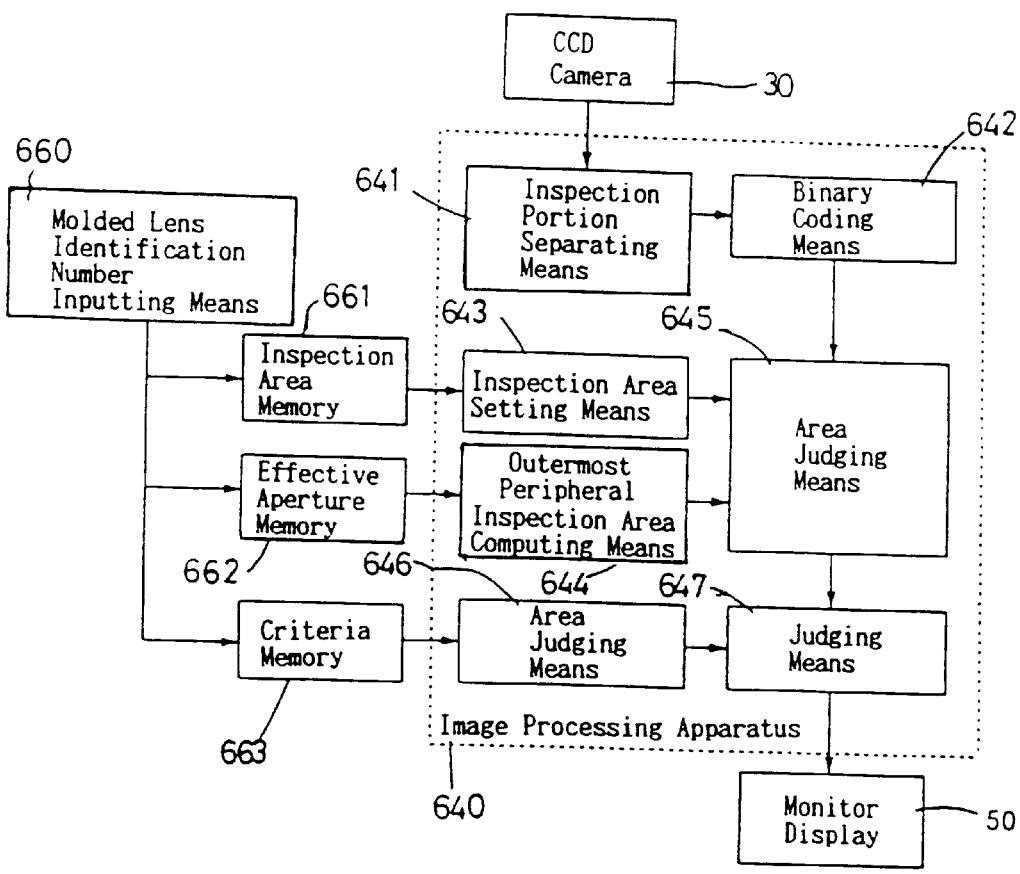
FIG. 69 is a schematic view showing a block diagram of a processing system of an embodiment of an optical member inspection apparatus, according to a seventh aspect of the present invention.

The overall structure of the optical member inspection apparatus of the present embodiment will now be described with reference to FIG. 69.

The output signal from the CCD camera 30, which serves as the image pick-up means to pick-up an image of a lens to be inspected, is input to an image processing apparatus 640, and the detected information is displayed on the monitor display 50. In addition, to the image processing apparatus 640, an inspection area memory 661, in which a design value of the outline of the inspection area is registered, in relation to the molded lens identification number of the optical member being inspected, input from a molded lens identification number inputting means 660, an effective aperture memory 662 in which the design value of the effective aperture is registered, and a criteria memory 663 in which the criteria per inspection area are registered, are connected.

The input image picked-up by the CCD camera 30 is divided, by an inspection portion separating means 641 provided in the image processing apparatus 640, into the inspection area, in which an object to be inspected exists, and the background area, and by a binary coding means 642, the separated inspection area is binarized and the defect or the like is detected as a figure. Each detected figure includes information regarding its position, area and luminance.

As described above, in regard to the optical member, the area around the optical axis, through which the majority of light is transmitted, is more vital, than the area toward the periphery. For example, if the defect is judged to be defective around the optical axis, there is a case that such a defect may be allowable in a portion of the lens away from the optical axis. Therefore, in the present apparatus, the optical member is divided into a plural number of inspection areas according to the distance from the optical axis, and according to the inspection area to which the figure detected, as a defect or the like, belongs, the figure is judged to be defective or not, using different criteria.

Figure 70:
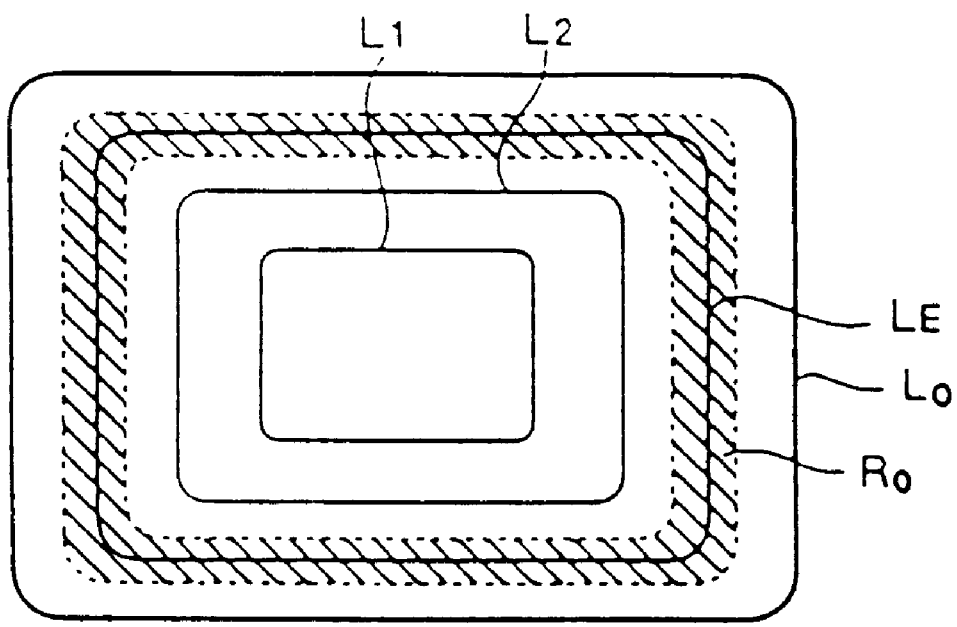
FIG. 70 is a schematic view showing a setting of an outermost peripheral inspection portion of the optical member inspection apparatus of the embodiment of the seventh aspect of the present invention.

An inspection area setting means 643 sets the inspection area read from the inspection area memory 661 according to the molded lens identification number of the optical member being inspected, input from the molded lens identification number inputting means 660. For example, in the present case as shown in FIG. 70, a primary inspection area is set as the portion enclosed by a primary inspection area line L1 which defines the central part through which the optical axis passes, and a secondary inspection area is set as the portion enclosed by a secondary inspection area line L2, at an intermediate area outside L1. L0 is the outline of the optical member to be inspected.

An outermost peripheral area computing means 644, reads a designed effective aperture line LE from the effective aperture memory 662 corresponding to the molded lens identification number of the lens, and an outermost peripheral inspection area R0 (indicated by hatching in FIG. 70), including the designed effective aperture line LE therein, is obtained by calculation. The outermost peripheral inspection area R0 is set as the area positioned between two parallel lines which are respectively positioned inside and outside of the effective aperture line LE, and the portion outside the secondary inspection area line L2 and inside the outermost peripheral inspection area R0 is the tertiary inspection area.

An area judging means 645 judges in which inspection area, specified by the inspection area setting means 643 and the outermost peripheral inspection area computing means 644, the coordinates of the figure encoded by the binary coding means 642 belongs. A criteria setting means 646 sets the criteria of each inspection area by reading the criteria from the criteria memory 663 corresponding to the molded lens identification number of the lens. A judging means 647 judges, in regard to each encoded figure, whether the figure is a defect, according to the criteria of the area where the figure is positioned, and the result of judgement is indicated on the monitor display 50.

Figure 71:
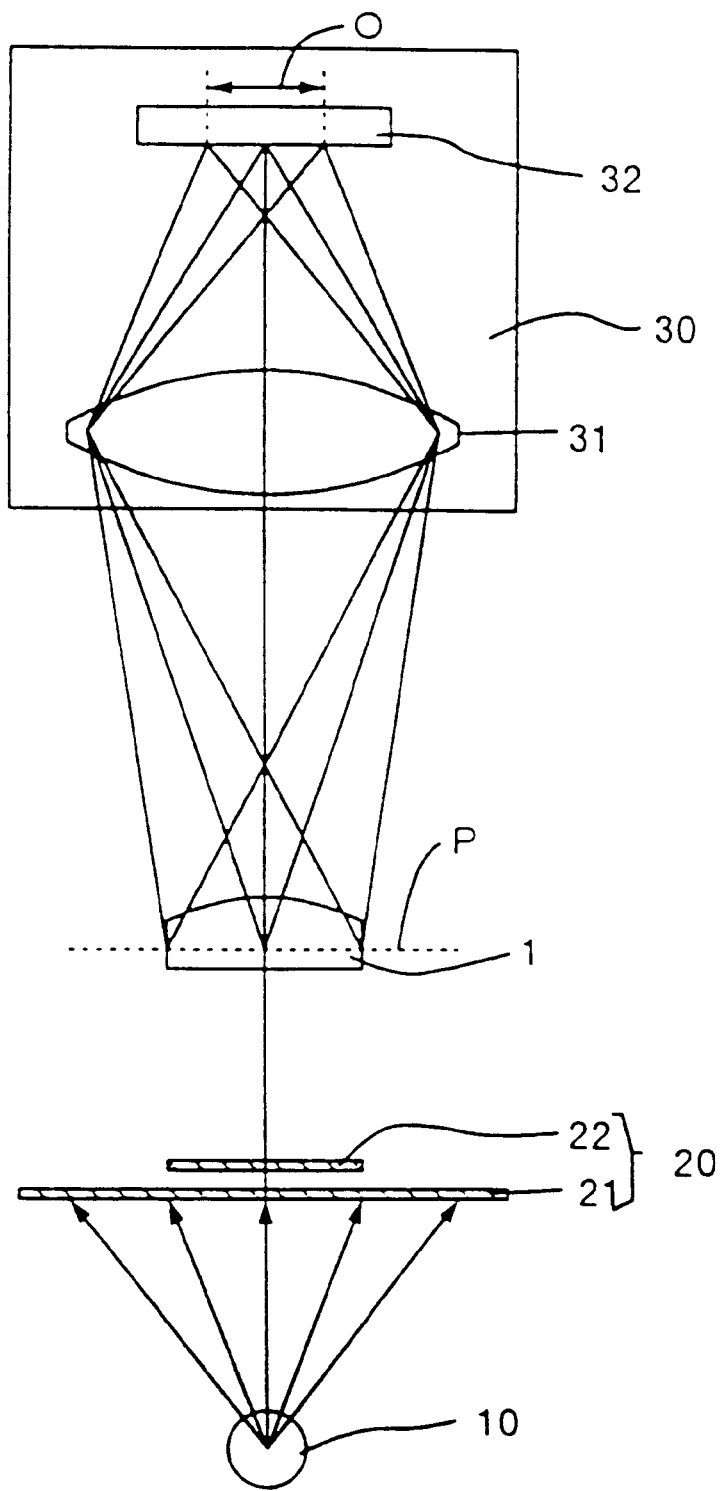
FIG. 71 is a schematic view of an optical system of the optical member inspection apparatus of the embodiment of the seventh aspect of the present invention.

FIG. 71 illustrates the overall structure of the optical system of the embodiment of the seventh aspect of the present invention used to form an image picked-up by the CCD camera 30. Since, the optical system of the present embodiment is identical to the optical system of the first embodiment of the first aspect of the present invention, shown in FIG. 1, no explanation shall be given.

The Inspection Routine of the apparatus of the present embodiment of the present invention will now be described with reference to the flow charts shown in FIG. 72 and FIG. 73. At T-1, if the type of lens to be inspected is different from that of the previously inspected lens, corresponding to the molded lens identification number of the lens, at T-2 through T-4 each inspection area, and the effective aperture, are read from the corresponding memories 661 and 662, and at T-5 the outermost peripheral inspection area RO is calculated according to the effective aperture, and at T-6 the criteria are read from the criteria memory 663.

After the setting corresponding to the type of the optical member to be inspected is made, at T-7 the image is input from the CCD camera 30, and at T-8 the inspection portion corresponding to the image of the lens to be inspected is separated according to the distribution of luminance. At T-9, the image of the inspection portion is binarized by dynamic binarization processing, and the features of the defect are detected.

The image processing apparatus 640 judges whether the lens to be inspected is defective, according to the detected result at T-10, (Judgement Subroutine, shown in FIG. 73), and at T-11 the result of the judgement is displayed on the monitor display 50. At T-12, it is judged whether there are any remaining lenses to be inspected, and if there are lenses remaining to be inspected, at T-13, the processes from T-1 are repeated, while if there are no remaining lenses the inspection is ended.

Figure 72:
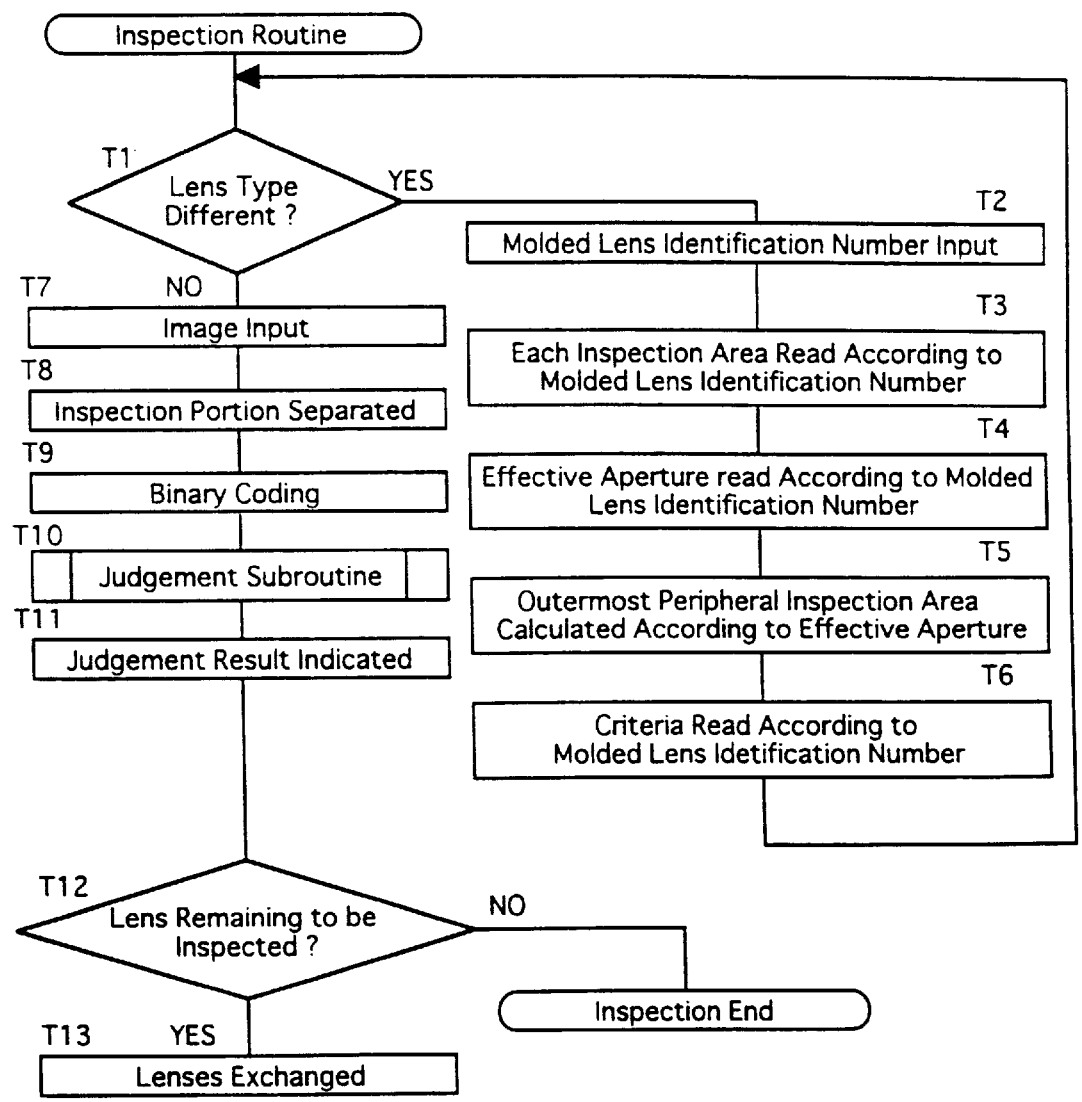
FIG. 72 is a flow chart showing an Inspection Routine of the apparatus of the embodiment of the seventh aspect of the present invention.
Figure 73:
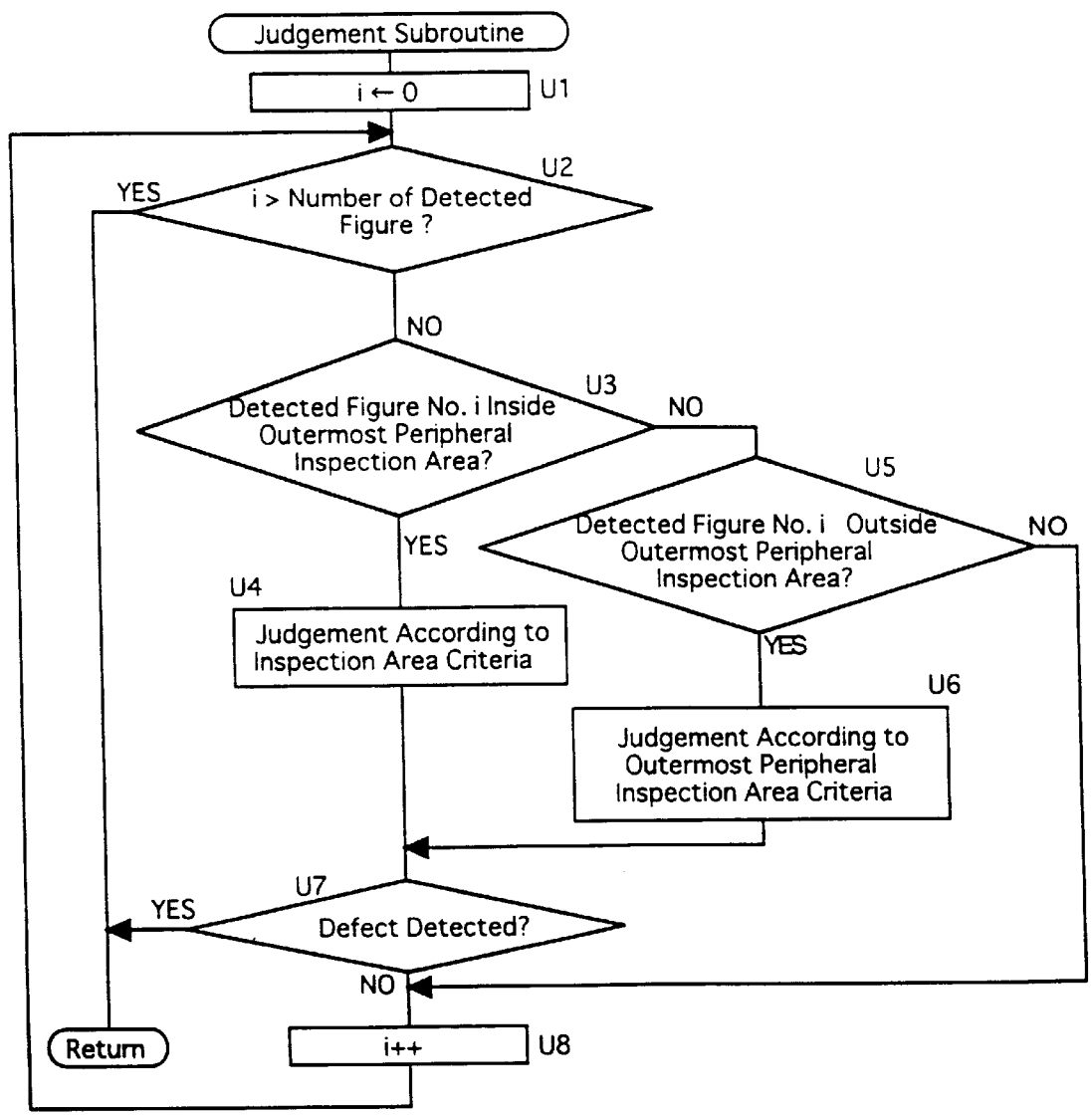
FIG. 73 is a flow chart showing a Judgement Subroutine in the Inspection Routine shown in FIG. 72.

The Judgement Subroutine (judgement processing), executed at T-10 in the Inspection Routine of FIG. 72, is executed according to the flow chart in FIG. 73. At U-1 the counter i is reset to 0, and at U-2 and U-8, the counter i is increased in increments until the value of the counter i reaches the number of the detected figures (i.e., defects or the like); and, for each of the figures, it is judged whether the binary encoded figure is defective or not.

At U-3 through U-6, it is judged, based on the criteria corresponding to the inspection area, where the figure is positioned, and at U-7, if any defect is detected, control is returned to the Inspection Routine- (FIG. 72), without inspecting the remaining figures.

At U-3, if the position of the figure is judged to be inside the outermost peripheral inspection area RO, at U-4, the criteria is selected according to the position, namely in which area (primary, secondary or tertiary) the figure is positioned, and it is judged whether the figure is defective based on the selected criteria. If the figure is not positioned inside the outermost peripheral inspection area, as long as the figure is positioned within the outermost peripheral area, at U-5 and U-6, the judgement to be defective or not is made based on mitigated criteria, with respect to the criteria for the primary, secondary and tertiary inspection areas. If the figure is positioned outside (i.e., not in the primary, secondary or tertiary inspection areas) the outermost peripheral inspection area, since it is not necessary to judge the defect, the inspection proceeds for a subsequent figure.

The criteria shall be set in such a manner that, for example, in the primary inspection area, a figure consisting of more than four pixels is judged to be defective, while in the secondary portion, a figure consisting of more than six pixels is judged to be defective, while in the tertiary inspection area, a figure consisting of more than eight pixels is judged to be defective, and in the outermost peripheral inspection area, a figure consisting of more than thirty pixels is judged to be defective.

If all the detected figures are judged to be non-defective, control returns to the Inspection Routine (FIG. 72), and the indication to be non-defective is made. If any figure is judged to be defective, control returns to the Inspection Routine from U-7, and the indication to be defective is made, and corresponding optical members are judged to be defective.

As described above, according to the optical member inspection apparatus of the embodiment of the seventh aspect of the present invention, considering the positional error, by designating the subject for inspection to be wider than that of the design value of the effective aperture required for inspection, and by mitigating the criteria in the outermost peripheral inspection area, including the effective aperture line, in respect to the criteria for the areas inside the effective aperture, in the outermost peripheral inspection area, only a relatively large figure is detected as a defect, and therefore it is possible to define certain defects to be not detected. Therefore, it is not necessary to remove those defects, such as defects in the form of noise, which are not necessary to be recognized as defects, before inspection, and thus the time necessary for inspection can be reduced.

The following is a description of an embodiment of an optical member inspection apparatus having a marking function, according to an eighth aspect of the present invention.

This embodiment of the eighth aspect of the present invention is characterized in that placing means are provided for consecutively placing each of a plurality of optical members to be inspected, firstly, at a first position, where each image of each optical member is picked-up, and subsequently at a second position, where each optical member is stamped with a predetermined mark. Means for picking-up an image of each optical member at the first position, to output an image, are also provided. In addition, means are provided for judging whether or not each optical member is defective, according to the image of the optical member output from the image pick-up means, and means for stamping the predetermined mark on each optical member at the second position, depending on a judgement of the judging means regarding the optical member, are also provided. The placing means conveys one optical member to be inspected, which has not yet been inspected, to the first position, while conveying another optical member to be inspected, which has been already inspected at the first position, to the second position.

The overall structure of the optical member inspection apparatus of the present embodiment will now be described with reference to FIG. 74.

In the optical member inspection apparatus according to the present embodiment, a lens 1 to be inspected is positioned at an image pick-up position, and two CCD cameras 30 (30A and 30B), serving as the image input means, input one image, two marking apparatus 700 and 710 which mark (stamp) the lens to be inspected 1 positioned at a marking position different from the image pick-up position, and a lens supplying apparatus 760 which forwards the lenses sequentially in the direction of the marking apparatuses, are provided.

At positions opposite to each of the CCD cameras 30A and 30B, light source apparatuses 120a and 120b, respectively consisting of light sources 10 (10A and 10B) and diffusing means 20 (20A and 20B), are provided. The lenses to be inspected are positioned between the CCD cameras and the light sources. By setting the light source apparatus or the CCD camera, the lens to be inspected can be specified.

For one judging operation the image picked-up by either the CCD camera 30A or 30B is first input to an image processing means 740 through an input switching means 741. For the subsequent judging operation another image picked-up by the other of the CCD camera 30A or 30B is input to the image processing means 740 through the input switching means 741. After inputting either one of the images, the image processing means 740 detects information regarding defects or the like included in the lens 1 and outputs the information to a judging means 742. According to the output information, the judging means judges whether or not the defect detected at each type of inspection exceeds a predetermined criteria and indicates the judging result on the 50.

A controlling means 743 controls the lens supplying apparatus 760 so that the lens 1 to be inspected can be forwarded in the order of, firstly, the inspection position, and secondly, the marking position, and when the lens 1 to be inspected, having a defect that is detected during inspection, is forwarded to the marking position, a mark is made on the lens, indicating the lens to be defective, by controlling the marking apparatuses 700 and 710.

In the present embodiment, based on the signals of the two image inputting means, different lenses are inspected, and if the result of inspection, based on the output of the primary CCD camera 30A, is defective, the lens is marked by the primary marking apparatus 700, and if the result of inspection, based on the output of the secondary CCD camera 30B, is to be defective, the lens is marked by the secondary marking apparatus 710.

In the above structure, by forwarding the lens to be inspected in order, the judgement of the existence of a defect is made based on the outputs of the primary and the secondary CCD cameras 30A and 30B, and during marking by the marking apparatus, based on the result of judgement, a subsequent lens may be inspected.

Figure 75:
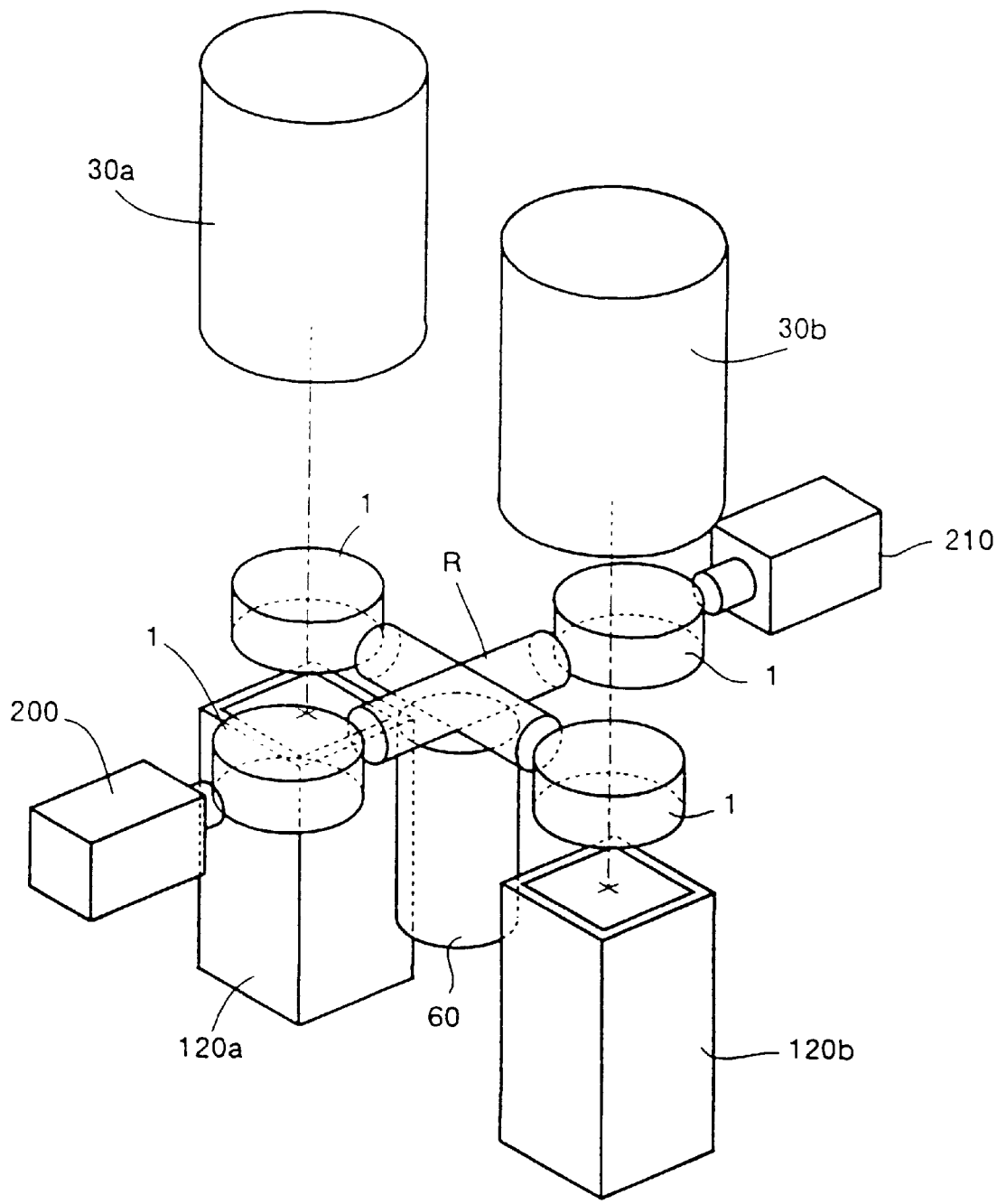
FIG. 75 is a schematic perspective view showing an example of positioning of each means of the optical member inspection apparatus of the embodiment of the eighth aspect of the present invention.

FIG. 75 is a schematic perspective view illustrating an example of positioning each part of the inspection apparatus of the present embodiment. In the present example, similar to the first embodiment of the first aspect of the present invention, the lenses 1 to be inspected are molded by a four-cavity mold as shown in FIG. 10, and are inspected without being removed from a spool Sp and runners R. The lenses 1 to be inspected are positioned perpendicularly to the spool Sp.

At the image pick-up positions of the CCD cameras 30A and 30B, the two lenses 1 to be inspected are positioned facing each other (i.e., the lenses to be inspected are in the same plane). At the marking positions on the marking apparatuses 700 and 710, the two lenses 1 to be inspected are positioned facing each other (i.e., the lenses in the marking positions are in the same plane).

In the present embodiment, by rotating the lenses to be inspected as a whole by an angle of 90°, with the spool Sp being the center of rotation, the lens supplying apparatus 760 forwards each lens to be inspected to the image pick-up position and the marking position, alternately. When the spool has rotated once (i.e., 360°) and each lens has passed through the four positions, the inspection of the four lenses will be complete, and the next set of lenses will be inspected.

Figure 76:
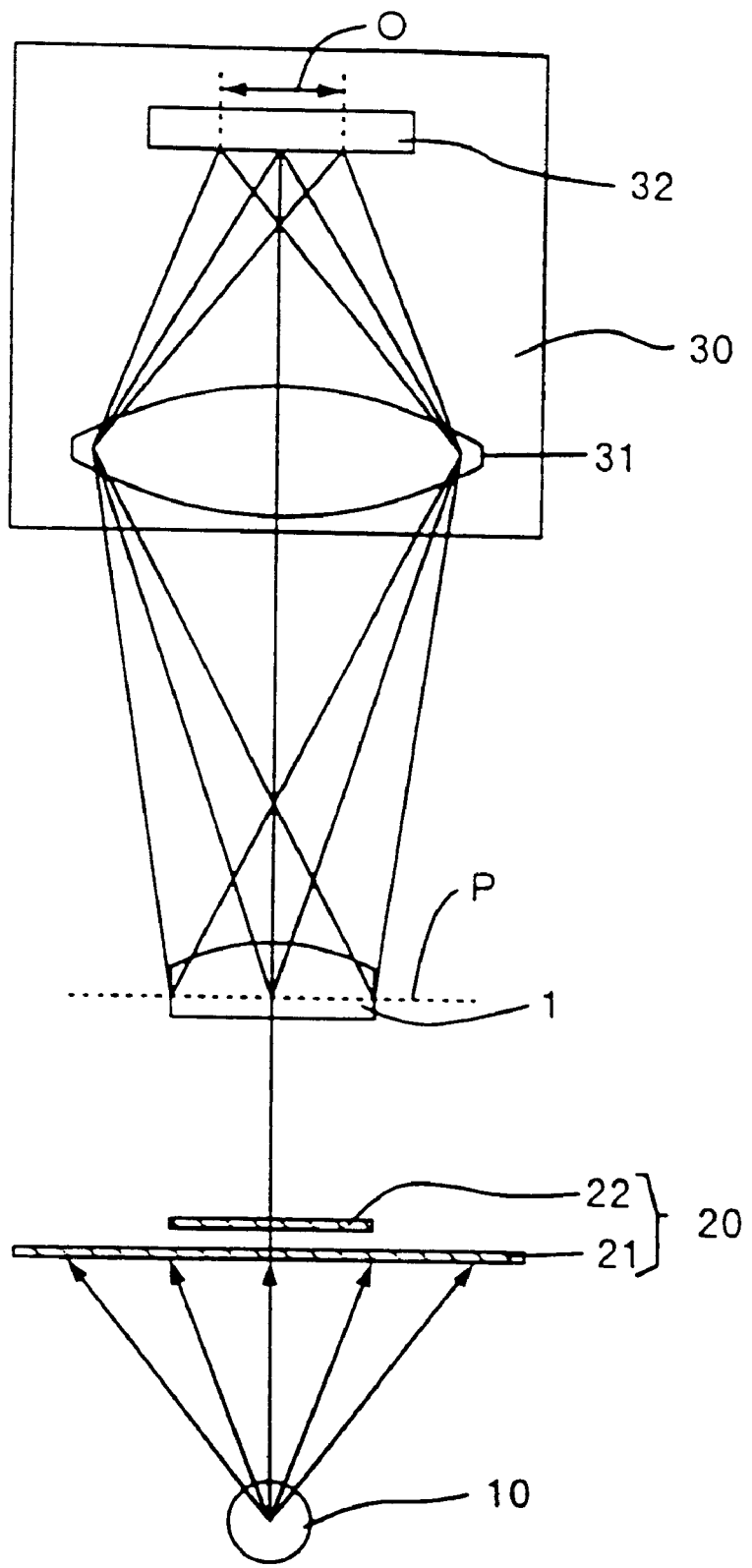
FIG. 76 is a schematic view of an optical system of an optical member inspection apparatus of the embodiment of the eighth aspect of the present invention.

FIG. 76 illustrates the overall structure of one of the optical systems used to form images picked-up by the CCD cameras 30A and 30B. Each optical system is identical to the optical system of the first embodiment of the first aspect of the present invention, shown in FIG. 1, and therefore no explanation shall be given.

As already described, for example, if a low luminance image DL due to the absorptive defect, and a high luminance image DH due to the scatterable defect are formed on a scanning line in the X-axis direction, the output sequence of pixels along the scanning line is as shown in FIG. 7(A). The image processing apparatus 740 is capable of detecting the two types of different defects separately, as shown in FIG. 7(B) and FIG. 7(C), by binarization using two threshold values SH1 and SH2.

In the inspection apparatus of the present embodiment, the judgement whether the detected figure is a defect or not is made based on the specified criteria, and in the case that detected figure is judged to be a defect, the marking apparatus marks the defective lens. After inspection, only those lenses having no mark will be selected as non-defective and used.

As described above, according to the optical member inspection apparatus having a marking function of the embodiment according to the eighth aspect of the present invention, by executing inspection and marking in parallel at different positions, compared to the case that the inspection and the marking are executed at the same position, even if the durations of each execution are the same, the executions may be expedited.

The following is a description of an embodiment of an optical member inspection apparatus using a method of lighting luminance control according to a ninth aspect of the present invention.

In order to maintain a stable inspection, by preventing unevenness of criteria during inspection, it is desirable that the setting of the apparatus should be fixed as much as possible, and that variations in lighting luminance should be within a range designated to be permissive.

This embodiment of the ninth aspect of the present invention is characterized in that luminance of light, emitted from a light source used in an inspection apparatus for inspecting an optical member, is controlled. The light emitted from the light source is transmitted to means for picking-up an image of the optical member through the optical member, an image output from the image pick-up means being image-processed to obtain an image of the optical member. The method consists of firstly, forming a histogram showing a luminance distribution of the image of the optical member by a number of pixels. Secondly, a threshold value is obtained according to a discriminant analysis method, based on the histogram, and thirdly, the luminance of light emitted from the light source is controlled, in accordance with the threshold value.

Figure 77:
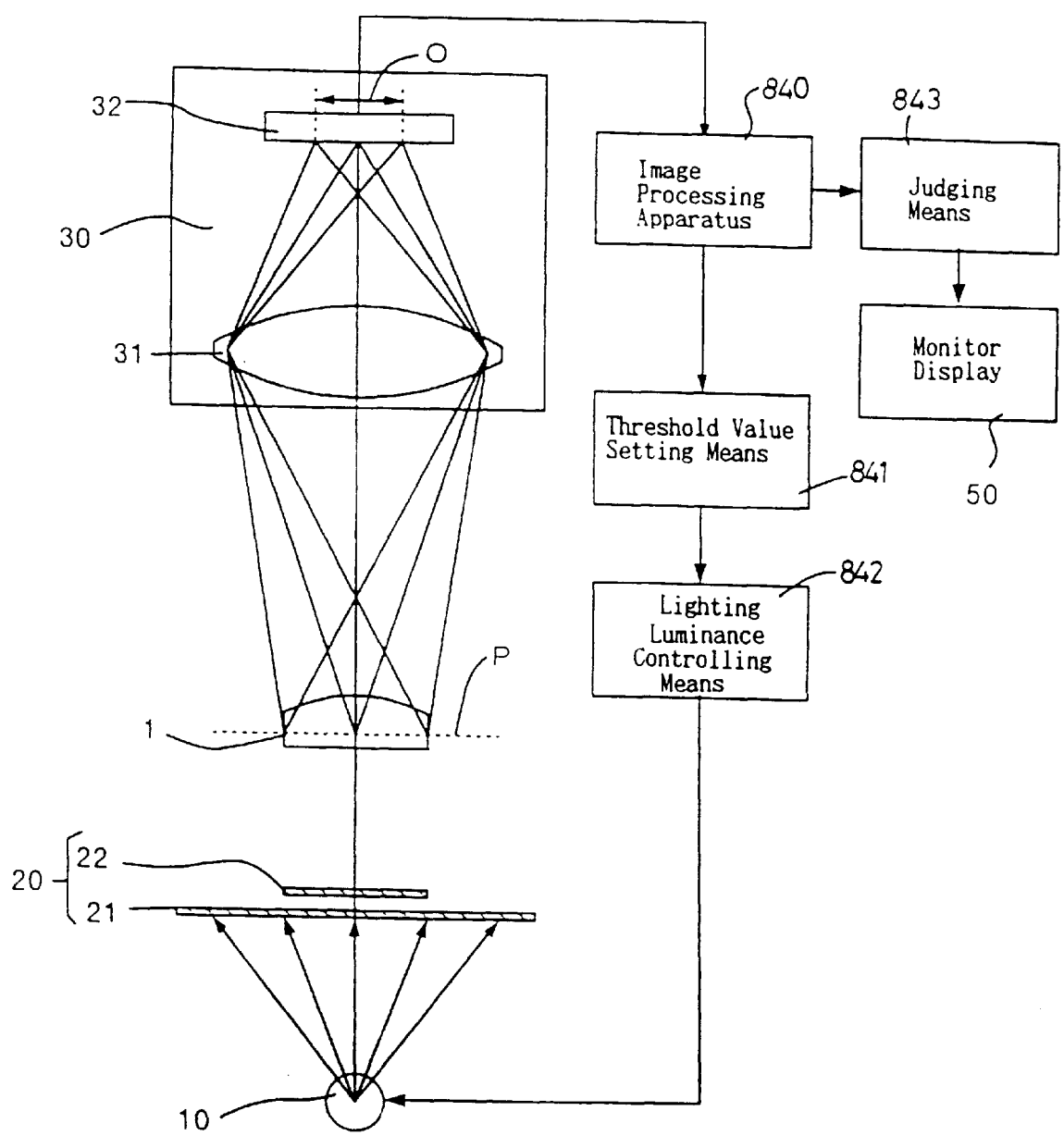
FIG. 77 is a schematic combination view showing a block diagram of an optical system and a processing system of an embodiment of an optical member inspection apparatus by using a lighting luminance control process, according to a ninth aspect of the present invention.

The overall structure of the optical system and the controlling system of the optical member inspection apparatus of the present embodiment will now be described with reference to FIG. 77.

The optical system of the present embodiment is identical to the optical system of the first embodiment of the first aspect of the present invention and therefore no explanation shall be given.

In the image output from the CCD camera 30, the features of the image are detected by an image processing means 840, and based on the detected information, it is judged whether the lens 1 to be inspected is defective or not, by a judging means 843, and the result of this judgement is displayed on the monitor display 50.

The image processing apparatus 840 registers the histogram of the input image, output from the CCD camera 30, and outputs it to a threshold value setting means 841. The threshold value setting means 841 decides a threshold value by a discriminant analysis method, according to the input histogram, and a lighting luminance controlling means 842 controls the lighting luminance of the light source 10 so that the threshold value may be within a specified range.

The control of lighting luminance is made by adjusting the quantity of light emission, through adjustments in the applied voltage and the width of the pulse to the light source 10, and also by positioning a diaphragm or a filter between the light source 10 and the diffusing means 20, and also by adjusting the diffusion transmittance of the diffusing means 20.

Figure 78:
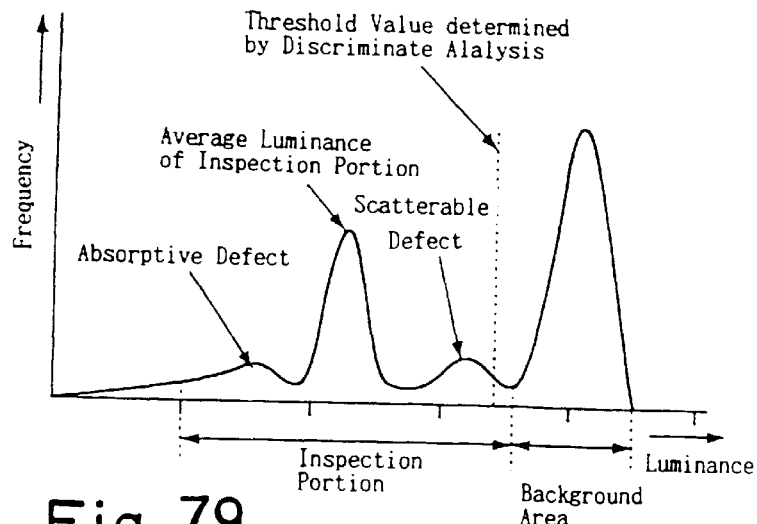
FIG. 78 is a graphic chart of an example of a histogram of an image picked-up by the apparatus of the embodiment of the ninth aspect of the present invention.

If the input image output from the CCD camera 30 has a background area having high luminance and an inspection portion having middle luminance, a histogram, as shown in FIG. 78, will be produced. The threshold value used as an index to control the lighting luminance is decided by the discriminant analysis method. The discriminant analysis method is a method to decide the threshold value during the binary processing of the image, and when the pixels in the image are classified according to the threshold values, as long as the classification is made appropriately, the dispersion of luminance within the class (i.e., the dispersion within a class σw) is small, and the dispersion of luminance between the classes (i.e., the dispersion between the classes σb) is large, and decides the threshold value in such a manner that the ratio thereof Fo, obtained by the following equation Fo=σb/σw, is the maximum.

Figure 79:
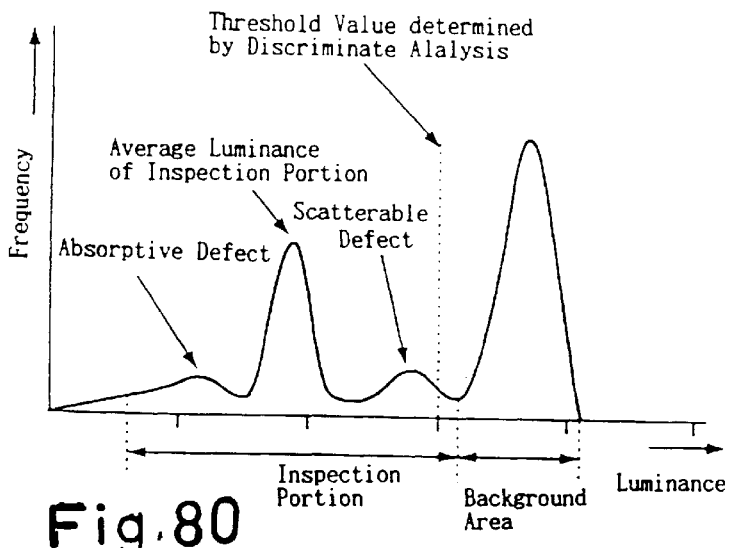
FIG. 79 is a graphic chart when the histogram shown in FIG. 78 shifts to a side of low luminance.
Figure 80:
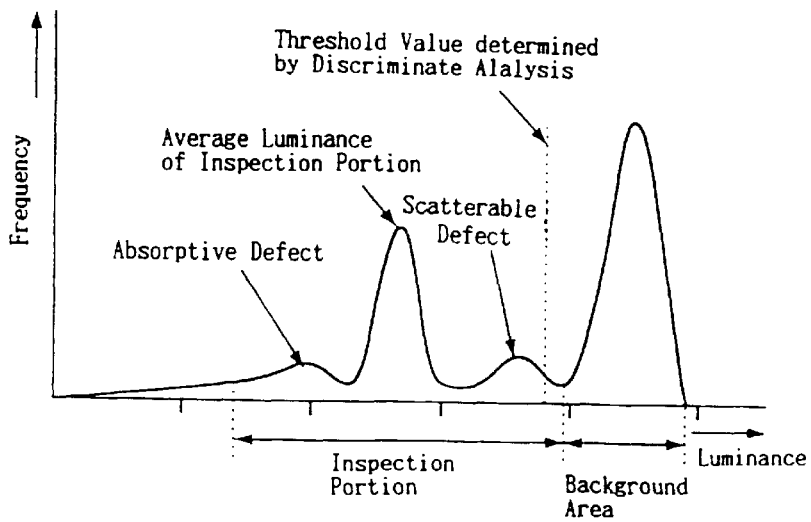
FIG. 80 is a graphic chart when the histogram shown in FIG. 78 shifts to a side of high luminance.

If the lighting luminance varies, the histogram of the image will shift, while approximately maintaining the form thereof, to the side of low luminance, as shown in FIG. 79, or to the side of high luminance, as shown in FIG. 80, and the threshold value, determined by the discriminant analysis method, will also vary according to the variation of the lighting luminance. Therefore, by observing the threshold value, it is possible to control the lighting luminance.

The threshold value, used for lighting luminance control, is determined according to the histogram of the whole image, including the background area and the inspection portion, and is different from the threshold values SH1 and SH2 used for detecting the absorptive and the scatterable defects, according to the distribution of luminance in the inspection portion.

The following discussion will be made in regard to the problems encountered in the case of controlling the lighting luminance, according to the threshold value obtained by any method other than the discriminant analysis method, in the structure of the inspection apparatus of the present embodiment of the present invention.

In general, other than the discriminant analysis method, methods used to decide the threshold value for obtaining the binarized image include the P-tile method, the mode method or the peak method etc., and, compared with the threshold value obtained by the discriminant analysis method, the threshold value obtained by these methods tends to be affected by variations in the state of the lens to be inspected.

Figure 81:
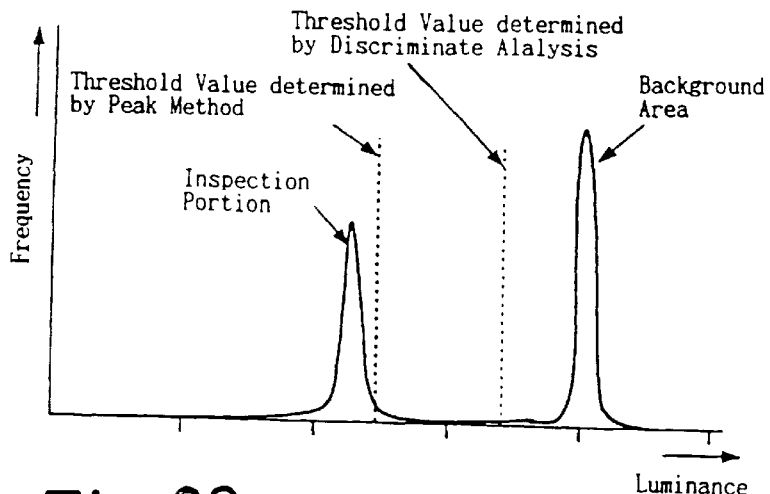
FIG. 81 is a graphic chart of a further example of a histogram of an image picked-up by the apparatus of the embodiment of the ninth aspect of the present invention.
Figure 82:
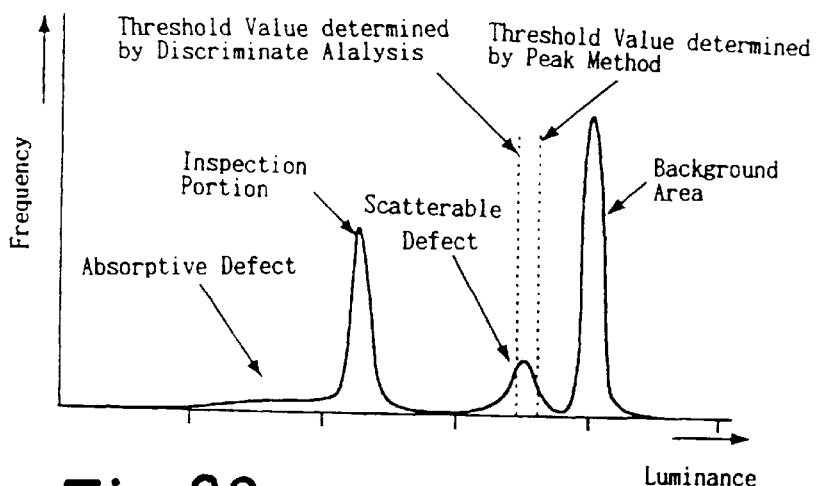
FIG. 82 is a graphic chart when a scatterable defect exists in the histogram shown in FIG. 81.

In the P-tile method, the luminances of the inspection portion S and the background area B are very stable, and if the formation of the histogram changes according to the non-existence of a defect as shown in FIG. 81, and of the existence of a scatterable defect as shown in FIG. 82, the threshold value will vary even if there is no variation in the lighting luminance.

Figure 83:
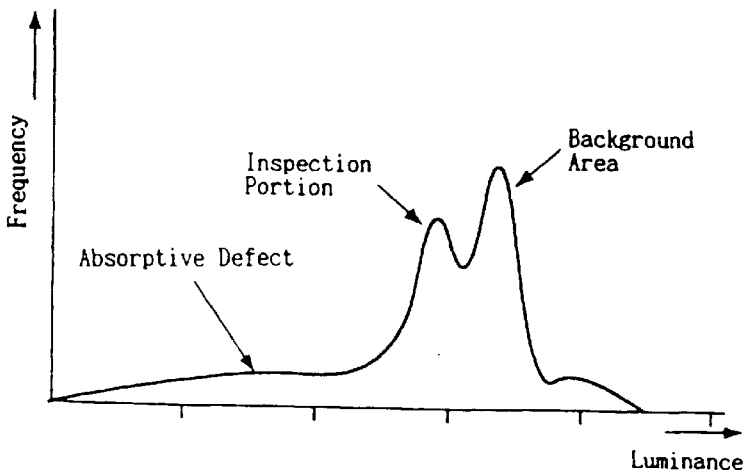
FIG. 83 is a graphic chart of still a further example of a histogram of an image picked-up by the apparatus of the embodiment of the ninth aspect of the present invention.

In the mode method, if scatterable and absorptive defects exist and a plural number of minute values exist on the histogram, it is difficult to determine the threshold value, especially in the case that the size of the scatterable defect is large, and that the distribution of the histogram of the inspection portion and the background area become closer as shown in FIG. 83, it will be impossible to determine the threshold value.

The peak method is a method that, by recording the histogram of the sum of the differential values of the luminances, the luminance of the largest number of pixels is determined to be the threshold value. In such a method, around the boundary of the inspection portion and background area, if there is a variation of luminance due to dirt or the like on the lens, such a variation may become noise, and thus it will be impossible to determine the threshold value.

The threshold value obtained by the discriminant analysis method is hardly affected by a small variation in distribution, or in the case of extreme deviations in distributions of luminance, as shown in FIG. 81 and FIG. 82, and in addition, even if the peaks of the luminance of the inspection portion and the background area become closer, as shown in FIG. 83, and even if there is a variation of luminance around the boundary portion, it is still possible to determine the threshold value.

Figure 84:
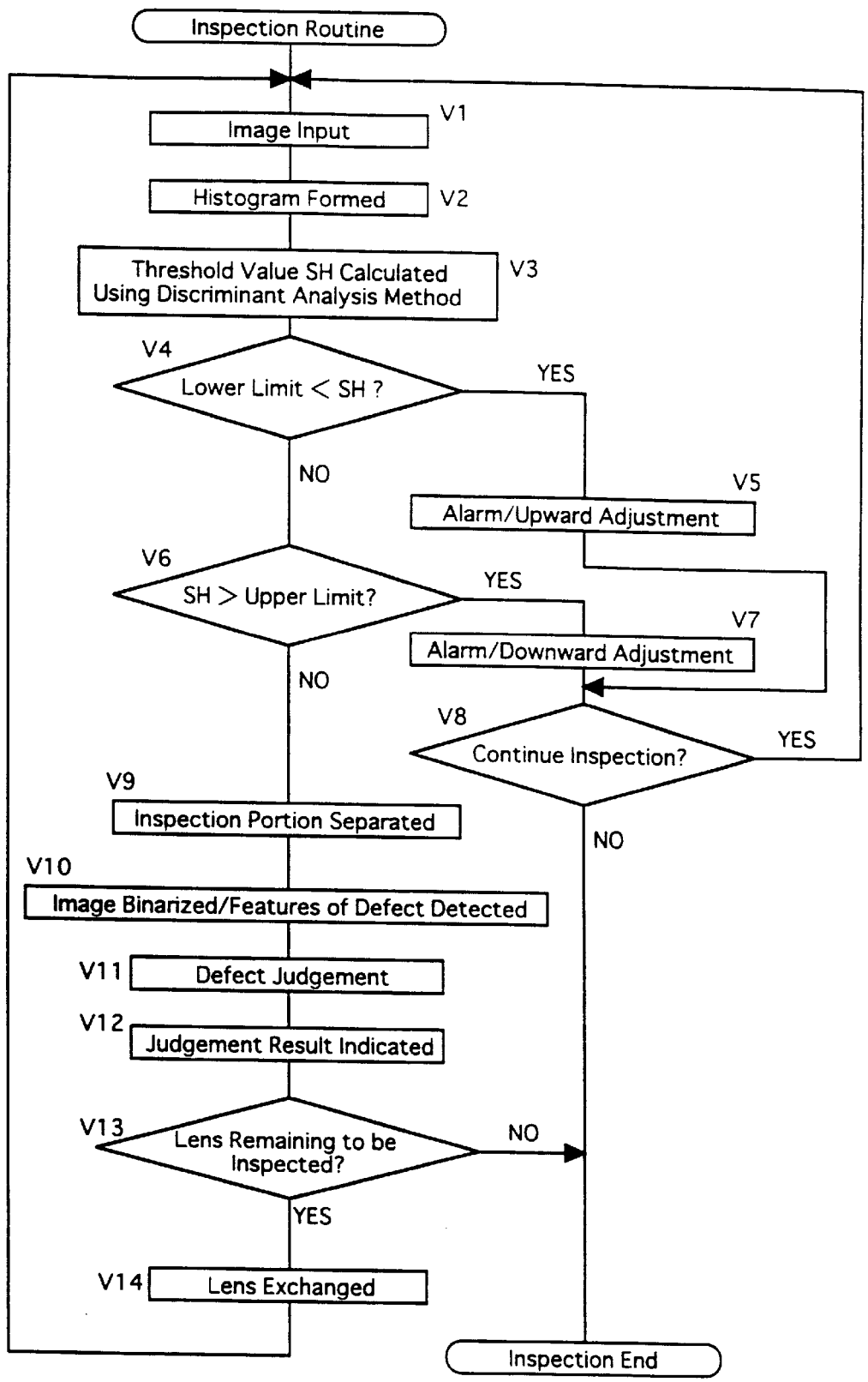
FIG. 84 is a flow chart showing an Inspection Routine of the apparatus of the embodiment of the ninth aspect of the present invention.

The Inspection Routine of the above apparatus of the present embodiment will now be described with reference to the flow chart shown in FIG. 84. At V-1, the image is input from the CCD camera 30, and at V-2, the histogram is formed according to the distribution of luminance in the image processing apparatus 840.

At V-3, the threshold value setting means 841 calculates the threshold value SH by the discriminant analysis method according to the histogram, and at V-4 through V-7, if the threshold value is less than the lower limit, the alarm is given and the threshold value is adjusted upwards, and if the threshold value is more than the upper limit, the alarm is given and the threshold value is adjusted downwards. If the luminance can not be positioned within the specified range after adjustment, at V-8 it is judged whether the inspection should be continued or not, and in the case of continuity, control returns to V-1 and the image is input. If the luminance can not be positioned within the specified range, for example after several adjustments, the inspection is abandoned at V-8, and the inspection is completed.

If the luminance is within the specified range, at V-9 the inspection portion, corresponding to an image of the lens to be inspected, is separated from the input image, and at V-10, the image of the inspection portion is binarized by dynamic binarization processing, and the features of the defect are detected.

At V-11 and V-12, the image processing apparatus 840 judges whether the lens to be inspected is defective or not according to the detected result, and the result of judgement is displayed on the monitor display 50. At V-13, it is judged whether there are any remaining lenses to be inspected, and if so, at V-14 the lenses are exchanged and the processes from V-1 are repeated. If there are no remaining parts to be inspected, the inspection is completed.

As described above, according to the optical member inspection apparatus using the lighting luminance control method of the embodiment according to the ninth aspect of the present invention, by controlling the lighting luminance, by making the threshold value an index, obtained by the discriminant analysis. method, it is possible to control the lighting luminance accurately.

Of course, it is clear that the present invention is not limited to the embodiments described above, nor those illustrated in the drawings, and the invention can be modified without departing from the spirit and scope of the claimed invention.

What is claimed is:

1. An optical member inspection apparatus, comprising:
   a light source;
   means for diffusing light emitted from said light source, said diffusing means comprising a central portion and a peripheral portion, a diffusion transmittance of said peripheral portion being higher than that of said central portion;
   means for photographing an optical member to be inspected, said photographing means being positioned to receive light emitted from said light source and transmitted through said diffusing means and said optical member;
   means for judging whether or not said optical member has a defect, in accordance with image signal output from said photographing means;
   wherein said central portion and said peripheral portion are each variable in shape;
   wherein said optical member inspection apparatus further comprises means for setting each shape of said central portion and said peripheral portion;
   wherein said diffusing means comprises a liquid crystal panel including a plurality of segments, a diffusion transmittance of each segment being varied in accordance with a voltage applied thereto; and
   wherein said setting means sets each shape of said peripheral portion and said central portion by controlling said voltage to said each segment.

2. The optical member inspection apparatus in accordance with claim 1, wherein said setting means sets said shape of said central portion such that light emitted perpendicularly from said central portion substantially corresponds to a size and shape of said optical member.

3. The optical member inspection apparatus in accordance with claim 1, wherein said setting means sets each shape of said central portion and said peripheral portion to be a shape similar to a plan shape of said optical member.

* * * * *